United States Patent
Cheng et al.

(10) Patent No.: US 12,552,838 B2
(45) Date of Patent: Feb. 17, 2026

(54) ADENO-ASSOCIATED VIRUS WITH ENGINEERED CAPSID

(71) Applicant: Tenaya Therapeutics, Inc., South San Francisco, CA (US)

(72) Inventors: Ze Cheng, South San Francisco, CA (US); Christopher A. Reid, Walnut Creek, CA (US)

(73) Assignee: Tenaya Therapeutics, Inc., South San Francisco, CA (US)

( * ) Notice: Subject to any disclaimer, the term of this patent is extended or adjusted under 35 U.S.C. 154(b) by 483 days.

(21) Appl. No.: 17/996,611

(22) PCT Filed: Apr. 19, 2021

(86) PCT No.: PCT/US2021/027979
§ 371 (c)(1),
(2) Date: Oct. 19, 2022

(87) PCT Pub. No.: WO2021/216456
PCT Pub. Date: Oct. 28, 2021

(65) Prior Publication Data
US 2023/0220014 A1 Jul. 13, 2023

Related U.S. Application Data

(60) Provisional application No. 63/012,703, filed on Apr. 20, 2020.

(51) Int. Cl.
C07K 14/075 (2006.01)
A61K 35/76 (2015.01)
(Continued)

(52) U.S. Cl.
CPC ............ *C07K 14/075* (2013.01); *A61K 35/76* (2013.01); *A61P 9/00* (2018.01); *C12N 7/00* (2013.01); *C12N 2750/14122* (2013.01)

(58) Field of Classification Search
None
See application file for complete search history.

(56) References Cited

U.S. PATENT DOCUMENTS 6,156,303 A 12/2000 Russell et al.
6,962,815 B2 11/2005 Bartlett
(Continued)

FOREIGN PATENT DOCUMENTS

EP 3387137 B1 2/2021
EP 3941929 A1 1/2022
(Continued)

OTHER PUBLICATIONS

DiMattia, Michael; et al; "Structural Insight into the Unique Properties of Adeno-Associated Virus Serotype 9" Journal of Virology, 86, 6947-6958, 2012 (Year: 2012).*
(Continued)

*Primary Examiner* — David W Berke-Schlessel
(74) *Attorney, Agent, or Firm* — Goodwin Procter LLP

(57) ABSTRACT

The present disclosure provides recombinant adeno-associated virus (rAAV) virions with an engineered capsid protein. In particular, the disclosure provides AAV9 virions with engineered AAV9 capsid, AAV5/9 chimeric capsid or combinatory capsid that achieves increased transduction efficiency in cardiac cells, increased cell-type selectivity, and/or other desirable properties.

29 Claims, 8 Drawing Sheets
Specification includes a Sequence Listing.

(51) Int. Cl.
*A61P 9/00* (2006.01)
*C12N 7/00* (2006.01)

(56) References Cited

U.S. PATENT DOCUMENTS

| | | | |
|---|---|---|---|
| 6,984,517 | B1 | 1/2006 | Chiorini et al. |
| 7,105,345 | B2 | 9/2006 | Wilson et al. |
| 7,198,951 | B2 | 4/2007 | Gao et al. |
| 7,259,151 | B2 | 8/2007 | Arbetman et al. |
| 7,718,424 | B2 | 5/2010 | Chiorini et al. |
| 7,790,449 | B2 | 9/2010 | Gao et al. |
| 7,906,111 | B2 * | 3/2011 | Wilson ............... C07K 14/705 435/456 |
| 8,524,446 | B2 | 9/2013 | Gao et al. |
| 9,233,131 | B2 | 1/2016 | Schaffer et al. |
| 9,737,618 | B2 | 8/2017 | Wilson et al. |
| 10,526,617 | B2 | 1/2020 | Gao et al. |
| 11,149,256 | B2 | 10/2021 | Gradinaru et al. |
| 11,499,165 | B2 | 11/2022 | Deverman et al. |
| 11,920,150 | B2 | 3/2024 | Sabeti et al. |
| 11,981,967 | B2 | 5/2024 | McGovern et al. |
| 12,049,648 | B2 | 7/2024 | Gradinaru et al. |
| 2013/0216503 | A1 | 8/2013 | Srivastava et al. |
| 2014/0301991 | A1 | 10/2014 | Srivastava et al. |
| 2016/0186141 | A1 | 6/2016 | Cao et al. |
| 2016/0251624 | A1 | 9/2016 | Wang et al. |
| 2017/0159027 | A1 | 6/2017 | Wilson et al. |
| 2018/0030479 | A1 | 2/2018 | Gao et al. |
| 2018/0057839 | A1 | 3/2018 | Willenbring et al. |
| 2018/0112282 | A1 | 4/2018 | Mohamed et al. |
| 2018/0230815 | A1 | 8/2018 | Jones |
| 2020/0370137 | A1 | 11/2020 | McGovern et al. |
| 2021/0123073 | A1 | 4/2021 | Wilson et al. |
| 2021/0363193 | A1 | 11/2021 | Grimm et al. |
| 2021/0371471 | A1 | 12/2021 | McCoy |
| 2021/0380643 | A1 | 12/2021 | Kirn et al. |
| 2022/0031866 | A1 | 2/2022 | Lombardi |
| 2022/0047655 | A1 | 2/2022 | Ramkumar |
| 2022/0064675 | A1 | 3/2022 | McCoy et al. |
| 2022/0119775 | A1 | 4/2022 | Gradinaru et al. |
| 2022/0154217 | A1 | 5/2022 | Reid |
| 2022/0228173 | A1 | 7/2022 | Sabeti et al. |
| 2022/0306696 | A1 | 9/2022 | Strelkova et al. |
| 2022/0340929 | A1 | 10/2022 | Sabeti et al. |
| 2022/0402974 | A1 | 12/2022 | Colosi et al. |
| 2022/0403414 | A1 | 12/2022 | Ji et al. |
| 2023/0159949 | A1 | 5/2023 | Sabeti et al. |
| 2025/0084385 | A1 | 3/2025 | Cheng et al. |

FOREIGN PATENT DOCUMENTS

| | | |
|---|---|---|
| EP | 3959226 A2 | 3/2022 |
| EP | 4019642 A1 | 6/2022 |
| EP | 3856913 A4 | 10/2022 |
| WO | WO-2012145601 A2 | 10/2012 |
| WO | WO-2015038958 A1 | 3/2015 |
| WO | WO-2015164757 A1 | 10/2015 |
| WO | WO-2017083750 A1 | 5/2017 |
| WO | WO-2017100671 A1 | 6/2017 |
| WO | WO-2018022608 A2 | 2/2018 |
| WO | WO-2018075798 A1 | 4/2018 |
| WO | WO-2018222503 A1 | 12/2018 |
| WO | WO-2019046069 A1 | 3/2019 |
| WO | WO-2019195444 A1 | 10/2019 |
| WO | WO-2019207132 A1 | 10/2019 |
| WO | WO-2020068990 A1 | 4/2020 |
| WO | WO-2020191300 A1 | 9/2020 |
| WO | WO-2020219988 A2 | 10/2020 |
| WO | WO-2021034222 A1 | 2/2021 |
| WO | WO-2021072197 A1 | 4/2021 |
| WO | WO-2021073567 A1 | 4/2021 |
| WO | WO-2021073568 A1 | 4/2021 |
| WO | WO-2021077000 A1 | 4/2021 |
| WO | WO-2021216456 A2 | 10/2021 |
| WO | WO-2022020616 A1 | 1/2022 |
| WO | WO-2022053630 A1 | 3/2022 |
| WO | WO-2022136655 A1 | 6/2022 |
| WO | WO-2022173847 A2 | 8/2022 |
| WO | WO-2022229807 A1 | 11/2022 |
| WO | WO-2023201207 A1 | 10/2023 |
| WO | WO-2025024826 A1 | 1/2025 |
| WO | WO-2025054256 A1 | 3/2025 |

OTHER PUBLICATIONS

Buning, H. and Srivastava, A., "Capsid Modifications for Targeting and Improving the Efficacy of AAV Vectors," Molecular Therapy Methods & Clinical Development, vol. 12, 248-265 (Mar. 2019).
International Preliminary Report on Patentability for International Application No. PCT/US2021/027979 dated Nov. 3, 2022, 9 pages.
International Search Report and Written Opinion for Application No. PCT/US2021/027979, mailed Oct. 12, 2021, 13 pages.
Invitation to Pay Additional Fees and, Where Applicable, Protest Fee, mailed Aug. 3, 2021, for International Application No. PCT/US2021/027979 (2 total pages).
Koerber, et al., "DNA Shuffling of Adeno-associated Virus Yields Functionally Diverse Viral Progeny." Mol Ther. (Oct. 2008); 16(10): 1703-1709, 17 pages. Epub Aug. 6, 2008.
UniProtKB Accession No. A0A318UAU0, "Putative alpha-E superfamily protein," Oct. 10, 2018 (online), retrieved on Sep. 17, 2021 from the internet at URL: https://www.uniprot.org/uniprot/A0A318UAU0, 3 pages.
DiMattia, et al., "Structural insight into the unique properties of adeno-associated virus serotype 9," J Virol. Jun. 2012; 86(12):6947-58.
Extended European Search Report dated Jul. 15, 2024 for EP Application No. 21793043.7, 14 pages.
International Preliminary Report on Patentability, issued Oct. 8, 2024, for International Application No. PCT/US2023/065598, 10 pages.
International Search Report and Written Opinion, mailed Aug. 4, 2023, for International Application No. PCT/US2023/065598, 17 pages.
International Search Report and Written Opinion, mailed Dec. 10, 2024, for International Application No. PCT/US2024/039931, 13 pages.
International Search Report and Written Opinion, mailed Feb. 11, 2025, for International Application No. PCT/US2024/045297, 20 pages.
Invitation to Pay Fees, dated Dec. 12, 2024 for PCT/US2024/045297, 3 pages.
Invitation to Pay Fees, dated Oct. 17, 2024 for PCT/US2024/039931, 3 pages.
Kienle, Eike, "Secrets to finding the ideal mate: New insights into parametes that govern successful Adeno-associated virus (AAV) vector evolution," Dissertation, University Heidelberg, 2014, pp. 1-194.
Mearini, et al., "Mybpc3 gene therapy for neonatal cardiomyopathy enables long-term disease prevention in mice," Nat Commun. Dec. 2, 2014; 5:5515, 10 pages.
Olivieri, et al., "AAVmod2, an AAV Capsid Engineered to Independently Detarget the Liver and Enhance Gene Delivery to Skeletal Muscle," Molecular Therapy 2021; vol. 29, No. 4S1, 24th Annual Meeting of the American Society of Gene & Cell Therapy, May 11-14, 2021, 14 pages retrieved online on Apr. 14, 2025 at: https://affiniatx.com/wp-content/uploads/asgct_2021_olivieri.pdf.
Partial Supplementary European Search Report for European Application No. EP21793043.7 mailed Apr. 24, 2024, 14 pages.
Pulicherla, et al., "Engineering liver-detargeted AAV9 vectors for cardiac and musculoskeletal gene transfer," Mol Ther. Jun. 2011; 19(6): 1070-8. Epub Mar. 1, 2011.
Qian, Randolph, "Bioengineering of Adeno-Associated Virus Serotype 5 for Increased Liver Transduction and Retention of Low Humoral Seroreactivity," PhD Dissertation, University of North Carolina at Chapel Hill, 2020, 169 pages.
Ying, et al., "Heart-targeted adeno-associated viral vectors selected by in vivo biopanning of a random viral display peptide library," Gene Ther. Aug. 2010; 17(8):980-90. Epub Apr. 15, 2010.

(56) References Cited

OTHER PUBLICATIONS

International Search Report and Written Opinion, mailed Sep. 19, 2025, for International Application No. PCT/US2025/031254, 13 pages.

* cited by examiner

FIG. 3B

SEQ ID No 473

SEQ ID No 474

SEQ ID No 475

SEQ ID No 476

ADENO-ASSOCIATED VIRUS WITH ENGINEERED CAPSID

CROSS REFERENCE TO RELATED APPLICATIONS

This application is a U.S. National Stage Application under 35 U.S.C. § 371 of International Patent Application No. PCT/US2021/027979, filed Apr. 19, 2021, which claims the benefit of priority of U.S. Provisional Patent Application No. 63/012,703 filed on Apr. 20, 2020, the contents of which are hereby incorporated by reference in their entireties.

FIELD OF THE INVENTION

The present disclosure relates generally to gene therapy with adeno-associated virus vectors. In particular, the disclosure relates to recombinant adeno-associated virus virions having an engineered capsid protein.

REFERENCE TO SEQUENCE LISTING

This application is being filed electronically via EFS-Web and includes an electronically submitted sequence listing in .txt format. The .txt file contains a sequence listing entitled "TENA_019_01WO_SeqList_ST25.txt" created on Apr. 13, 2021 and having a size of ~479 kilobytes. The sequence listing contained in this .txt file is part of the specification and is incorporated herein by reference in its entirety.

BACKGROUND

Adeno-associated virus (AAV) holds promise for gene therapy and other biomedical applications. In particular, AAV can be used to deliver gene products to various tissues and cells, both in vitro and in vivo. The capsid proteins of AAV largely determine the immunogenicity and tropism of AAV vectors.

For cardiac tissues, AAV subtype 9 (AAV9) is a preferred AAV vector due to its ability to transduce the heart following systemic delivery. While AAV9 can achieve moderate transduction of the heart, the majority of vector traffics to the liver. Moreover, in order to achieve therapeutic levels of transduction in the heart, relatively high systemic doses are required, potentially leading to systemic inflammation and in turn, toxicity.

There is a need for developing an Adeno-associated virus with engineered capsid protein that achieves improved cardiac tropism, and optionally improved selectivity of cardiac tissues over liver. The present disclosure provides variants of the AAV9 capsid and/or chimeric AAV5/AAV9 capsid that form rAAV virions capable of transducing cardiac tissues and/or cell types for more efficiently and/or with more selectivity than rAAV virions comprising wild-type AAV9 capsid proteins, which can be used for safe and efficacious cardiac gene therapy.

SUMMARY OF THE DISCLOSURE

In one aspect, the present disclosure provides recombinant adeno-associated virus (rAAV) capsid proteins comprising a variant polypeptide sequence at one or more of a VR-IV site, a VR-V site, a VR-VII site, and a VR-VIII site of a parental sequence, wherein the parental sequence comprises a sequence at least 95%, at least 98%, at least 99%, or 100% identical to SEQ ID NO: 463. In some embodiments, the variant polypeptide sequence is a cardiotrophic variant polypeptide sequence.

In some embodiments, the capsid protein of the disclosure comprises a variant polypeptide at the VR-IV site of the parental sequence. In some embodiments, the variant polypeptide at the VR-IV site has a sequence:

$$-X_1-X_2-X_3-X_4-X_5-X_6-X_7-X_8-X_9-$$

wherein: $X_1$ is G, S or V; $X_2$ is Y, Q or I; $X_3$ is H, W, V or I; $X_4$ is K or N; $X_5$ is S, G or I; $X_6$ is G or R; $X_7$ is A, P or V; $X_8$ is A or R; and $X_9$ is Q or D (SEQ ID NO: 477). In some embodiments, the variant polypeptide at the VR-IV site comprises an amino acid sequence selected from SEQ ID NOs: 6-104. In some embodiments, the variant polypeptide at the VR-IV site comprises an amino acid sequence selected from GYHKSGAAQ (SEQ ID NO: 6), VIIKSGAAQ (SEQ ID NO: 7), GYHKIGAAQ (SEQ ID NO: 8), SQVNGRPRD (SEQ ID NO: 33) and GYHKSGVAQ (SEQ ID NO: 9). In some embodiments, the variant polypeptide at the VR-IV site comprises the amino acid sequence GYHKSGAAQ (SEQ ID NO: 6) or a sequence comprising at most 1, 2, 3, or 4 amino-acid substitutions relative to GYHKSGAAQ (SEQ ID NO: 6).

In some embodiments, the capsid protein of the disclosure comprises a variant polypeptide at the VR-V site of the parental sequence. In some embodiments, the variant polypeptide at the VR-V site has a sequence:

$$-X_1-X_2-X_3-X_4-X_5-X_6-$$

wherein: $X_1$ is S, L, H, N, or A; $X_2$ is T, M, K, G, or N; $X_3$ is S, T, M or I; $X_4$ is S, P, F, M, or N; $X_5$ is F, S, P or L; and $X_6$ is I, V, or T (SEQ ID NO: 474). In some embodiments, the variant polypeptide at the VR-V site comprises an amino acid sequence selected from SEQ ID NOs: 105-203. In some embodiments, the variant polypeptide at the VR-V site comprises an amino acid sequence selected from LNSMLI (SEQ ID NO: 105), NGMSFT (SEQ ID NO: 106), HKTFSI (SEQ ID NO: 107) and SMSNFV (SEQ ID NO: 108). In some embodiments, the variant polypeptide at the VR-V site comprises the amino acid sequence LNSMLI (SEQ ID NO: 105) or a sequence comprising at most 1, 2, 3, or 4 amino-acid substitutions relative to LNSMLI (SEQ ID NO: 105).

In some embodiments, the capsid protein of the disclosure comprises a variant polypeptide at the VR-VII site of the parental sequence. In some embodiments, the variant polypeptide at the VR-VII site has a sequence:

$$-X_1-X_2-X_3-X_4-X_5-$$

wherein: $X_1$ is V, L, Q, C, or R; $X_2$ is S, H, G, C, or D; $X_3$ is Y, S, L, G, or N; $X_4$ is S, L, H, Q, or N; and $X_5$ is V, I, or R (SEQ ID NO: 475). In some embodiments, the variant polypeptide at the VR-VII site comprises an amino acid sequence selected from SEQ ID NOs: 204-302. In some embodiments, the variant polypeptide at the VR-VII site comprises an amino acid sequence selected from RGNQV (SEQ ID NO: 204), VSLNR (SEQ ID NO: 205), CDYSV (SEQ ID NO: 206), and QHGHI (SEQ ID NO: 207). In some embodiments, the variant polypeptide at the VR-VII site comprises the amino acid sequence RGNQV (SEQ ID NO: 204) or a sequence comprising at most 1, 2, or 3 amino-acid substitutions relative to RGNQV (SEQ ID NO: 204).

In some embodiments, the capsid protein of the disclosure comprises a variant polypeptide at the VR-VII site of the parental sequence. In some embodiments, the variant polypeptide at the VR-VIII site has a sequence:
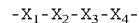

$$-X_1-X_2-X_3-X_4-$$

wherein: $X_1$ is S, N, or A; $X_2$ is V, M, N, or A; $X_3$ is Y, V, S, or G; and $X_4$ is Y, T, M, G, or N (SEQ ID NO: 476). In some embodiments, the variant polypeptide at the VR-VIII site comprises an amino acid sequence selected from SEQ ID NOs: 303-401. In some embodiments, the variant polypeptide at the VR-VIII site comprises an amino acid sequence selected from ANYG (SEQ ID NO: 305), NVSY (SEQ ID NO: 303), SMVN (SEQ ID NO: 304), and NVGT (SEQ ID NO: 306). In some embodiments, the variant polypeptide at the VR-VIII site comprises the amino acid sequence ANYG (SEQ ID NO: 305) or a sequence comprising at most 1 or 2 amino-acid substitutions relative to ANYG (SEQ ID NO: 305). In some embodiments, the variant polypeptide at the VR-VIII site comprises the amino acid sequence NVSY (SEQ ID NO: 303) or a sequence comprising at most 1 or 2 amino-acid substitutions relative to NVSY (SEQ ID NO: 303).

In one aspect, the present disclosure provides recombinant adeno-associated virus (rAAV) capsid proteins comprising a variant polypeptide sequence at one or more of a VR-IV site, a VR-V site, a VR-VII site, and a VR-VIII site of a parental sequence, wherein the parental sequence comprises a sequence at least 95%, at least 98%, at least 99%, or 100% identical to SEQ ID NO: 463. In some embodiments, the capsid protein comprises an amino acid sequence at least 95% identical to a sequence selected from SEQ ID NOs: 402-410. In some embodiments, the capsid protein comprises an amino acid sequence at least 95%, at least 98%, at least 99%, or 100% identical to SEQ ID NO: 402. In some embodiments, the capsid protein comprises an amino acid sequence at least 95%, at least 98%, at least 99%, or 100% identical to SEQ ID NO: 403. In some embodiments, the capsid protein comprises an amino acid sequence at least 95%, at least 98%, at least 99%, or 100% identical to SEQ ID NO: 404. In some embodiments, the capsid protein comprises an amino acid sequence at least 95%, at least 98%, at least 99%, or 100% identical to SEQ ID NO: 406. In some embodiments, the capsid protein comprises an amino acid sequence at least 95%, at least 98%, at least 99%, or 100% identical to SEQ ID NO: 409. In some embodiments, the capsid protein comprises an amino acid sequence at least 95%, at least 98%, at least 99%, or 100% identical to 482. In some embodiments, the capsid protein comprises an amino acid sequence at least 95%, at least 98%, at least 99%, or 100% identical to 483. In some embodiments, the capsid protein comprises an amino acid sequence at least 95%, at least 98%, at least 99%, or 100% identical to 484. In some embodiments, the capsid protein comprises an amino acid sequence at least 95%, at least 98%, at least 99%, or 100% identical to 485.

In some embodiments, the capsid protein is a AAV5/AAV9 chimeric capsid protein. In some embodiments, the capsid protein comprises at least one segment from an AAV5 capsid protein. In some embodiments, the capsid protein comprises: a) a first segment comprising a sequence at least 95% identical to SEQ ID NO: 411 or SEQ ID NO: 412; b) a second segment comprising a sequence at least 95% identical to SEQ ID NO: 413 or SEQ ID NO: 414; c) a third segment comprising a sequence at least 95% identical to SEQ ID NO: 415 or SEQ ID NO: 416; d) a fourth segment comprising a sequence at least 95% identical to SEQ ID NO: 417 or SEQ ID NO: 418; e) a fifth segment comprising a sequence at least 95% identical to SEQ ID NO: 419 or SEQ ID NO: 420; wherein at least one segment is from an AAV5 capsid protein and at least one segment is from an AAV5 capsid protein. In some embodiments, the chimeric capsid protein comprises an amino acid sequence at least 95% identical to a sequence selected from SEQ ID NOs: 445-462. In some embodiments, the capsid protein comprises an amino acid sequence at least 95%, at least 98%, at least 99%, or 100% identical to SEQ ID NO: 457. In some embodiments, capsid protein comprises an amino acid sequence at least 95%, at least 98%, at least 99%, or 100% identical to SEQ ID NO: 459. In some embodiments, the capsid protein comprises an amino acid sequence at least 95%, at least 98%, at least 99%, or 100% identical to SEQ ID NO: 445. In some embodiments, the capsid protein comprises an amino acid sequence at least 95%, at least 98%, at least 99%, or 100% identical to SEQ ID NO: 446. In some embodiments, the capsid protein comprises an amino acid sequence at least 95%, at least 98%, at least 99%, or 100% identical to SEQ ID NO: 447. In some embodiments, the capsid protein comprises an amino acid sequence at least 95%, at least 98%, at least 99%, or 100% identical to SEQ ID NO: 448.

In one aspect, the present disclosure provides recombinant adeno-associated virus (rAAV) capsid proteins comprising a sequence at least 95%, at least 98%, at least 99%, or 100% identical to SEQ ID NO: 463. In some embodiments, the variant polypeptide sequence is a cardiotrophic variant polypeptide sequence. In some embodiments, the capsid protein comprises at least one segment from an AAV5 capsid protein. In some embodiments, the capsid protein comprises:

- a) a first segment comprising a sequence at least 95% identical to SEQ ID NO: 411 or SEQ ID NO: 412;
- b) a second segment comprising a sequence at least 95% identical to SEQ ID NO: 413 or SEQ ID NO: 414;
- c) a third segment comprising a sequence at least 95% identical to SEQ ID NO: 415 or SEQ ID NO: 416;
- d) a fourth segment comprising a sequence at least 95% identical to SEQ ID NO: 417 or SEQ ID NO: 418;
- e) a fifth segment comprising a sequence at least 95% identical to SEQ ID NO: 419 or SEQ ID NO: 420.

wherein at least one segment is from an AAV5 capsid protein and at least one segment from an AAV9 capsid protein. In some embodiments, the chimeric capsid protein comprising a sequence at least 95% identical to a sequence selected from SEQ ID NOs: 421-444. In some embodiments, the capsid protein comprises an amino acid sequence at least 95%, at least 98%, at least 99%, or 100% identical to SEQ ID NO: 434. In some embodiments, the capsid protein comprises an amino acid sequence at least 95%, at least 98%, at least 99%, or 100% identical to SEQ ID NO: 438. In some embodiments, the capsid protein comprises an amino acid sequence at least 95%, at least 98%, at least 99%, or 100% identical to SEQ ID NO: 441.

In one aspect, the present disclosure provides recombinant adeno-associated virus (rAAV) virions comprising a capsid protein of the disclosure and a heterologous nucleic acid comprising a nucleotide sequence encoding one or more gene products. In some embodiments, the rAAV virion comprises a capsid protein comprising an amino acid sequence at least 95%, at least 98%, at least 99%, or 100% identical to SEQ ID NO: 404. In some embodiments, the rAAV virion comprises a capsid protein comprising an amino acid sequence at least 95%, at least 98%, at least 99%, or 100% identical to SEQ ID NO: 483. In some embodiments, the rAAV virion exhibits increased transduction efficiency in cardiac cells compared to an AAV virion comprising the parental sequence. In some embodiments, the cardiac cells are located in the left ventricle of the heart. In some embodiments, the rAAV virion exhibits increased transduction efficiency in induced pluripotent stem cell-derived cardiomyocyte (iPS-CM) cells compared to an AAV virion comprising the parental sequence. In some embodiments, the rAAV virion exhibits increased transduction efficiency in human cardiac fibroblast (hCF) cells compared to an AAV virion comprising the parental sequence. In some embodiments, the rAAV virion exhibits at least 2-fold increased transduction efficiency in iPS-CM cells at a multiplicity of infection (MOI) of 100,000. In some embodiments, the rAAV virion exhibits at least 2-fold increased transduction efficiency in iPS-CM cells at a multiplicity of infection (MOI) of 75,000. In some embodiments, the rAAV virion exhibits at least 2-fold increased cardiac transduction efficiency in a C57BL/6J mouse, wherein the mouse is injected with a virion dosage of 2.5E+11 vg/mouse. In some embodiments, the rAAV virion exhibits at least 1.5-fold increased cardiac transduction efficiency in a C57BL/6J mouse, wherein the mouse is injected with a virion dosage of 2E+11 vg/mouse. In some embodiments, the rAAV virion exhibits at least 2-fold increased cardiac transduction efficiency in a C57BL/6J mouse, wherein the mouse is injected with a virion dosage of 1E+11 vg/mouse. In some embodiments, the rAAV virion exhibits decreased transduction efficiency in liver cells compared to an AAV virion comprising the parental sequence. In some embodiments, the rAAV virion exhibits improved NAb evasion compared to an AAV virion comprising the parental sequence. In some embodiments, the rAAV virion exhibits increased selectivity of the rAAV virion for cardiac cells over liver cells. In some embodiments, the rAAV virion exhibits increased selectivity of the rAAV virion for iPS-CM cells over liver cells.

In one aspect, the present disclosure provides pharmaceutical compositions comprising an rAAV virion of the disclosure and a pharmaceutically acceptable carrier.

In one aspect, the present disclosure provides polynucleotides encoding the capsid protein of the disclosure. In some embodiments, the polynucleotide comprises a sequence encoding a capsid protein comprising an amino acid sequence at least 95%, at least 98%, at least 99%, or 100% identical to SEQ ID NO: 404. In some embodiments, the polynucleotide comprises a sequence encoding a capsid protein comprising an amino acid sequence at least 95%, at least 98%, at least 99%, or 100% identical to SEQ ID NO: 483.

In one aspect, the present disclosure provides methods of transducing a cardiac cell, comprising contacting the cardiac cell with an rAAV virion of the disclosure, wherein the rAAV virion transduces the cardiac cell. In some embodiments, the cardiac cell is a cardiomyocyte. In some embodiments, the rAAV virion exhibits increased transduction efficiency in the cell compared to an AAV virion comprising AAV9 capsid protein sequence. In some embodiments, the rAAV virion exhibits at least 2-fold increased transduction efficiency in the cell compared to an AAV virion comprising AAV9 capsid protein sequence at a multiplicity of infection (MOI) of 75,000.

In one aspect, the present disclosure provides methods of delivering one or more gene products to a cardiac cell, comprising contacting the cardiac cell with an rAAV virion of the disclosure. In some embodiments, the cardiac cell is a cardiomyocyte.

In one aspect, the present disclosure provides methods of treating a cardiac pathology in a subject in need thereof, comprising administering a therapeutically effective amount of a rAAV virion of the disclosure or a pharmaceutical composition of the disclosure to the subject, wherein the rAAV virion transduces cardiac tissue. In some embodiments, the rAAV virion comprises a heterologous nucleic acid comprising a nucleotide sequence encoding one or more gene products. In some embodiments, the one or more gene products comprise MYBPC3, DWORF, KCNH2, TRPM4, DSG2, PKP2 and/or ATP2A2. In some embodiments, the one or more gene products comprise CACNA1C, DMD, DMPK, EPG5, EVC, EVC2, FBN1, NF1, SCN5A, SOS1, NPR1, ERBB4, VIP, MYH7, and/or Cas9. In some embodiments, the one or more gene products comprise MYOCD, ASCL1, GATA4, MEF2C, TBX5, miR-133, and/or MESP1.

In one aspect, the present disclosure provides kits comprising a pharmaceutical composition of the disclosure and instructions for use.

BRIEF DESCRIPTION OF THE DRAWINGS

FIG. 5 shows that AAV VR-IV modified variants exhibit superior hiPSC-CM transduction compared to AAV9. Human IPSC-derived cardiomyocytes were infected at a MOI of 100,000 with AAV9 or various evolved capsid variants packaging a ubiquitously expressing GFP reporter. Three days following infection, GFP expression was quantified by flow cytometry. CR9-01 (129-fold), CR9-07 (16-fold) and CR9-13 (9-fold) displayed significantly improved transduction compared to AAV9, while CR9-10, CR9-13 and CR9-14 showed a modest increase in transduction. Lower half of the figure shows representative images of AAV9 and CR9-01 showing a dramatic increase in transduction.

FIG. 6 shows in vivo characterization of novel AAV variants. AAV9:CAG-GFP or CAG-GFP packaged in a novel capsid were retro-orbitally injected in C57BL/6J at 2.5×1011 vg/mouse (n=2-3 mice per group). FIG. 6A shows that CR9-07, CR9-10, CR9-13 and CR9-14 exhibited significantly higher heart transduction than AAV9 as determined by ELISA (p<0.05, One-way ANOVA; Dunnett's multiple comparison test). FIG. 6B shows representative cross sections of the heart for the top transducing variants. FIG. 6C shows that CR9-10 and CR9-14 demonstrated significantly decreased liver tropism compared to AAV9 (p<0.03, One-way ANOVA; Dunnett's multiple comparison test). FIG. 6D shows representative IHC images of the liver for the top variants.

FIGS. 7A-7C shows susceptibility of novel AAV variants to NAb inhibition against pooled human IgG. FIG. 7A is a graphical illustration of the experimental design to assess neutralizing antibody evasion at various doses of pooled human IgG (2000 patients) ranging from 0-600 μg/mL. FIG. 7B shows a dose response curve demonstrating decreased neutralization of CR9-07 and CR9-13 at IgG concentrations above 300 μg/mL. FIG. 7C shows that CR9-07 and CR9-13 have significantly decreased neutralization compared to AAV9 (p<0.0001, One-way ANOVA; Dunnett's multiple comparison test)

FIG. 8 shows a visual depiction of AAV5/9 chimeric library generation through DNA shuffling. AAV9 was codon modified to improve homology to AAV5 and both Cap genes were fragmented by DNaseI digestion and re-assembled via PCR on the basis of partial homology between the two Cap genes.

FIG. 9 shows that library complexity of the AAV5/9 chimeric library was significantly reduced following one round of in vivo screening. The sequences of individual AAV chimeras are depicted graphically.

FIG. 10 shows in vitro characterization of the top AAV5/9 chimeras. FIG. 10A shows transduction efficiency of hiPSC-CMs at a MOI of 75,000. ZC44 exhibits improved hiPSC-CM transduction compared to AAV9. FIG. 10B shows evaluation of NAb evasion of the top AAV5/9 chimeras at 1 mg/mL of pooled human IgG. ZC44 shows enhanced NAb evasion compared to AAV9.

FIG. 11 shows in vivo characterization of chimeric AAV variants. AAV9:CAG-GFP or CAG-GFP packaged in a chimeric capsid were retro-orbitally injected in C57BL/6J at 2×1011 vg/mouse (n=3 mice per group). 14 days following injection, the heart (FIG. 11A) and liver (FIG. 11B) were harvested and GFP expression was assessed to evaluate the transfection efficiency and specificity. ZC40 and ZC47 demonstrated improved cardiac specificity compared to wildtype AAV9.

FIG. 12 depicts the generation of combinatory AAV variants by combining the top AAV5/9 chimeras and AAV9 VR-modified variants.

FIG. 13 shows the assessment of manufacturability of VR-modified and combinatory AAV capsid variants. Midi-scale vector production was conducted to assess the manufacturability of AAV capsid variants. CR9-07, CR9-10 and TN40-14 had improved manufacturability when compared to AAV9.

FIG. 14 demonstrates that combinatory AAV variants have significantly improved hiPSC-CM transduction. Human IPSC-derived cardiomyocytes were infected at a MOI of 100,000 with AAV9 or various combinatory capsid variants packaging a ubiquitously expressing GFP reporter. Five days following infection, GFP expression was quantified using the Cytation 5 cell imaging reader. TN44-07 and TN47-07 had significantly improved transduction (>15-fold) of hiPSC-CMs compared to AAV9.

FIG. 15 shows the result of in vivo characterization of novel AAV variants. AAV9:CAG-GFP or CAG-GFP packaged in a novel capsid were retro-orbitally injected in make C57BL/6J at 1×1011 vg/mouse (n=4 mice per group). 14 days following injection the heart and liver were harvested and GFP expression was assessed. FIG. 15A shows the transduction efficiency of each capsid variant in heart. FIG. 15B shows the transduction efficiency of each capsid variant in liver. FIG. 15C shows the ratio of transduction efficiency in heart/transduction efficiency in liver. TN44-07 and TN47-10 displayed enhanced heart transduction compared to AAV9, while TN47-14 was detargeted from the liver and had a meaningfully higher heart to liver transduction ratio than AAV9.

FIG. 16 shows the evaluation of human NAb evasion of the top combinatory capsid variants. All combinatory AAV capsid variants demonstrated improved evasion from neutralizing antibodies in pooled human IgG, with TN44-07 being the most stealth capsid, having a highly significant reduction of NAb neutralization (p=0.0002, t-test, Welch's correction) compared to AAV9.

FIG. 17A shows the relative transduction of rAAV virions with different engineered capsids in the left ventricle of cynomolgus macaques benchmarked against a standard AAV9 capsid. Two capsid variants TN3 and TN6 exhibited significant improvement in left ventricle transduction. FIG. 17B shows the transduction profile of the capsid variants in the liver. The majority of the capsid variants demonstrate decreased liver tropism compared to AAV9. FIG. 17C shows the relative heart to liver transduction ratio normalized to AAV9 capsid. TN3 revealed a 5-fold increase cardiac to liver specificity, when compared to AAV9.

DETAILED DESCRIPTION

Figure 1:
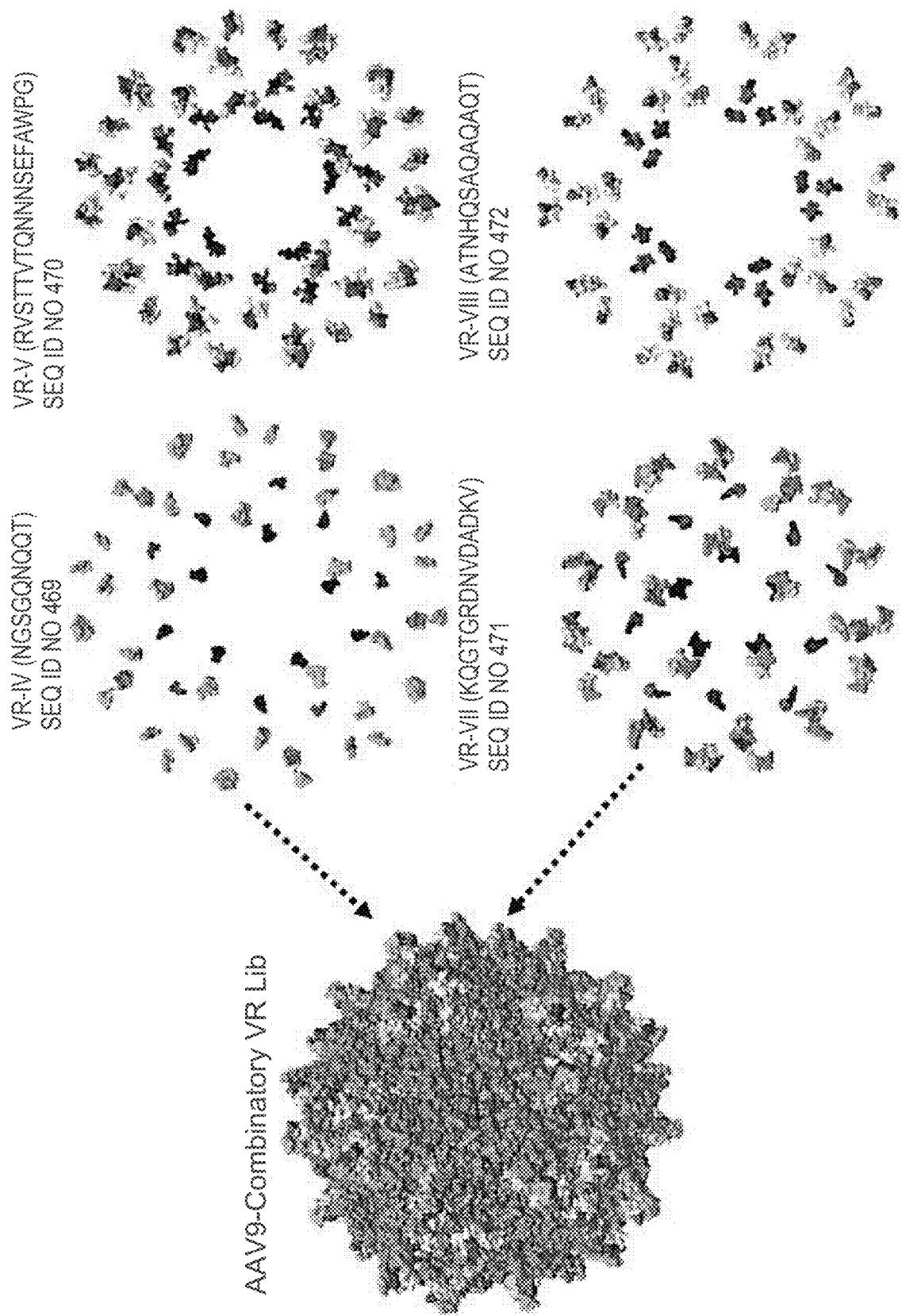
FIG. 1 depicts the AAV9 capsid highlighting amino acids in selected AAV9 variable regions (VR-IV, VR-V, VR-VII and VR-VIII site).

The disclosure provides recombinant adeno-associated virus (rAAV) virions. In particular, the disclosure provides engineered capsid proteins (including chimeric capsid proteins), methods of identifying them, and methods of using them. The methods of identifying new capsid proteins disclosed herein have wide applicability for any serotype of AAV, including chimeric capsid proteins. In addition, they can be applied to iteratively improve capsid proteins that have mutations from this or other methods. In general, the methods of the disclosure relate to preparation of randomized or semi-randomized libraries of AAV capsids in the form of cap gene polynucleotides, preparation of AAV virions comprising such capsids (either by incorporating the cap gene library into an AAV genome or providing it in trans such as on a plasmid transfected into the packaging line), positively or negatively selecting the AAV virions, and recovering the cap gene for sequencing. In some embodiments, the recovery and sequencing include nanopore sequencing. Other high-throughput or next-generation-sequencing (NGS) methods can be used.

In some embodiments, the present disclosure provides recombinant adeno-associated virus (rAAV) virions comprising:
 a) a capsid protein as described herein; and
 b) a heterologous nucleic acid comprising a nucleotide sequence encoding one or more gene products.

In some embodiments, the rAAV virions disclosed herein comprise an AAV9 capsid protein as disclosed herein. In some embodiments, the rAAV virions disclosed herein comprise a chimeric AAV5/AAV9 capsid protein as disclosed herein. In some embodiments, the rAAV virions disclosed herein comprise a combinatory capsid protein as disclosed herein.

In some embodiments, the AAV9 capsid protein comprises a sequence that shares at least about 80%, 85%, 90%, 95%, 96%, 97%, 98%, 99%, 99.5%, or 100% identity to SEQ ID NO: 1, as shown below. The N-terminal residue of VP1, VP2, and VP3, as well as the VR sites (VR-IV, VR-V, VR-VII and VR-VIII), are indicated in the sequence of full-length VP1 (SEQ ID NO: 1) below.

(SEQ ID NO: 1)
VP1-->
MAADGYLPDWLEDNLSEGIREWWALKPGAPQPKANQQHQDNARGLV

LPGYKYLGPGNGLDKGEPVNAADAAALEHDKAYDQQLKAGDNPYLK

YNHADAEFQERLKEDTSFGGNLGRAVFQAKKRLL

VP2-->
EPLGLVEEAAKTAPGKKRPVEQSPQEPDSSAGIGKSGAQPAKKRLN

FGQTGDTESVPDPQPIG

VP3-->
EPPAAPSGVGSLTMASGGGAPVADNNEGADGVGSSSGNWHCDSQWL

GDRVITTSTRTWALPTYNNHLYKQISNSTSGGSSNDNAYFGYSTPW

GYFDFNRFHCHFSPRDWQRLINNNWGFRPKRLNFKLFNIQVKEVTD

NNGVKTIANNLTSTVQVFTDSDYQLPYVLGSAHEGCLPPFPADVFM

IPQYGYLTLNDGSQAVGRSSFYCLEYFPSQMLRTGNNFQFSYEFEN

VPFHSSYAHSQSLDRLMNPLID

VR-IV
QYLYYLSKTINGSGQNQQTLKFSVAGPSNMAVQGRN

VR-V
YIPGPSYRQQRVSTTVTQNNNSEFAWP

GASSWALNGRNSLMNPGPAMASHKEGEDRFFPLSGSLIFGKQGT

VR-VII
GRDNVDADKVMITNEEEIK

VR-VIII
TTNPVATESYGQVATNHQSAQAQAQTGWVQNQGIL

PGMVWQDRDVYLQGPIWAKIPHTDGNFHPSPLMGG

FGMKHPPPQILIKNTPVPADPPTAFNKDKLNSFIT

QYSTGQVSVEIEWELQKENSKRWNPEIQYTSNYYK

SNNVEFAVNTEGVYSEPRPIGTRYLTRNL

Capsid Protein with Variant Polypeptide Sequence at VR Sites

In one aspect, the present disclosure provides AAV9 capsid proteins, wherein the capsid protein comprises variant polypeptide sequences with respect to the parental sequence at one or more sites of the parental sequence. In some embodiments, the one or more sites of the parental sequence are selected from the group consisting of VR-IV site, VR-V site, VR-VII site and VR-VIII site. As labeled in the SEQ ID NO: 1 above, the VR-IV site is between residues 452 and 460 in the parental sequence ("NGSGQNQQT", SEQ ID NO: 2); the VR-V site is between residues 497 and 502 in the parental sequence ("NNSEFA", SEQ ID NO: 3); the VR-VII site is between residues 549 and 553 in the parental sequence ("GRDNV", SEQ ID NO: 4); the VR-VIII site is between residues 586 and 589 in the parental sequence ("SAQA", SEQ ID NO: 5). In some embodiments, the AAV9 capsid protein comprises a sequence that shares at least about 80%, 85%, 90%, 95%, 96%, 97%, 98%, 99%, 99.5%, or 100% identity to SEQ ID NO: 1, excluding the VR-IV site, VR-V site, VR-VII site and/or the VR-VIII site. In some embodiments, the AAV9 capsid protein comprises a variant polypeptide sequence at one or more of a VR-IV site, a VR-V site, a VR-VII site, and a VR-VIII site of a parental sequence, wherein the parental sequence comprises a sequence at least 80%, at least 85%, at least 90%, at least 95%, at least 98%, at least 99%, or 100% identical to SEQ ID NO: 463. (In SEQ ID NO:463, the amino acids residues labeled "X" are excluded from sequence identity calculation.)

In some embodiments, the AAV9 capsid protein comprises a variant polypeptide sequence that are either rationally designed; introduced by mutagenesis; or randomized through generating a library of sequences with random codon usage at one or more sites. The capsid proteins of the disclosure include any variant polypeptide sequences identified as enriched by directed evolution followed by sequencing, as shown in, but not limited to, the Examples. Without being limited to any particular substitution site, in some embodiments, one or more sites selected from the group consisting of the VR-IV site, the VR-V site, the VR-VII site and VR-VIII site have the amino acid substitutions as described herein.

In some embodiments, the capsid protein of the present disclosure comprises a variant polypeptide sequence at the VR-IV site. In some embodiments, the entire VR-IV site ("NGSGQNQQT", SEQ ID NO: 2) is substituted by a peptide of formula:

$$—(X)_n—$$

wherein n is 7-11, and X represents any of the 20 standard amino acids (SEQ ID NO: 478).

In some embodiments, the variant polypeptide sequence at the VR-IV site is:

$$-X_1-X_2-X_3-X_4-X_5-X_6-X_7-X_8-X_9-.$$

In some embodiments, the variant polypeptide sequence at the VR-IV site is:

$$-X_1-X_2-X_3-X_4-X_5-X_6-X_7-X_8-X_9-$$

Wherein $X_1$ is G, S or V; $X_2$ is Y, Q or I; $X_3$ is H, W, V, or I; $X_4$ is K or N; $X_5$ is S, G or I; $X_6$ is G or R; $X_7$ is A, P or V; $X_8$ is A or R; and/or $X_9$ is Q or D (SEQ ID NO: 477).

In some embodiments, the variant polypeptide sequence at the VR-IV site comprises or consists of a sequence selected from GYHKSGAAQ (SEQ ID NO: 6), VIIKSGAAQ (SEQ ID NO: 7), GYHKIGAAQ (SEQ ID NO: 8), GYHKSGVAQ (SEQ ID NO: 9), VYHKSGAAQ (SEQ ID NO: 10), GYHKISAAQ (SEQ ID NO: 11), TTVPSSSRY (SEQ ID NO: 12), VIIRVVRLS (SEQ ID NO: 13), TVLGQNQQT (SEQ ID NO: 14), IYHKSGAAQ (SEQ ID NO: 15), TVLDKNQQT (SEQ ID NO: 16), YSGTDVRYK (SEQ ID NO: 17), VTASGKEHR (SEQ ID NO: 18), GYRKSGAAQ (SEQ ID NO: 19), NRTVSNGSE (SEQ ID NO: 20), TVLDRINKT (SEQ ID NO: 21), TGVGHLTSA (SEQ ID NO: 22), GYHKGGAAQ (SEQ ID NO: 23), VIAKSGAAQ (SEQ ID NO: 24), GYHKSGAAH (SEQ ID NO: 25), FIIKSGAAQ (SEQ ID NO: 26), GYHKVVRLS (SEQ ID NO: 27), GATRSAVES (SEQ ID NO: 28), TVSGQNQQT (SEQ ID NO: 29), LSHKSGAAQ (SEQ ID NO: 30), SSSGQNQQT (SEQ ID NO: 31), SGSGQNQQT (SEQ ID NO: 32), SQVNGRPRD (SEQ ID NO: 33), GYHKEWCGS (SEQ ID NO: 34), VVSSKSLNS (SEQ ID NO: 35), GYHKSGAAP (SEQ ID NO: 36), DASSREKVR (SEQ ID NO: 37), SYHKSGAAQ (SEQ ID NO: 38), TANGSQKYL (SEQ ID NO: 39), VIIRVGAAQ (SEQ ID NO: 40), SSTNKISTA (SEQ ID NO: 41), TVLDRIQQT (SEQ ID NO: 42), GYHKSGAVQ (SEQ ID NO: 43), TVLDQNQQT (SEQ ID NO: 44), VNMSSPIKT (SEQ ID NO: 45), AAYNSNSAF (SEQ ID NO: 46), GYHKSGAAR (SEQ ID NO: 47), VIIRVVRLQ (SEQ ID NO: 48), RFWTQNQQT (SEQ ID NO: 49), SSPRASSAL (SEQ ID NO: 50), IIIRVVRLS (SEQ ID NO: 51), KSSNLTAMP (SEQ ID NO: 52), NLNSDRHSA (SEQ ID NO: 53), LSLKSGAAQ (SEQ ID NO: 54), TVLDRNQQT (SEQ ID NO: 55), GSERVSNSG (SEQ ID NO: 56), VIAKIGAAQ (SEQ ID NO: 57), VYHKIGAAQ (SEQ ID NO: 58), LSYKSGAAQ (SEQ ID NO: 59), STVSQPVRT (SEQ ID NO: 60), GHHKSGAAQ (SEQ ID NO: 61), YAGIDPRYH (SEQ ID NO: 62), DRSRKSMCD (SEQ ID NO: 63), VIIRSGAAQ (SEQ ID NO: 64), GYHKSGGSA (SEQ ID NO: 65), VIIKIGAAQ (SEQ ID NO: 66), GYHKVVQLS (SEQ ID NO: 67), VIIKLVAAQ (SEQ ID NO: 68), KVSSHSVCD (SEQ ID NO: 69), GYHKRVRLS (SEQ ID NO: 70), GYHKSSAAQ (SEQ ID NO: 71), GYRKIGAAQ (SEQ ID NO: 72), GYHKSGAAC (SEQ ID NO: 73), GYRQSGAAQ (SEQ ID NO: 74), VIIKLIAAQ (SEQ ID NO: 75), VIIRVVRAQ (SEQ ID NO: 76), GYHKSGAAW (SEQ ID NO: 77), GYHKSGAVS (SEQ ID NO: 78), GYHKEWCSS (SEQ ID NO: 79), SSSSNRLAD (SEQ ID NO: 80), SNNSSSAKF (SEQ ID NO: 81), VKLSSTSSS (SEQ ID NO: 82), GYHKEWCAQ (SEQ ID NO: 83), AGSGQNQQT (SEQ ID NO: 84), NPHGTATYL (SEQ ID NO: 85), NGSGQNQHT (SEQ ID NO: 86), GYHKVGAAQ (SEQ ID NO: 87), VIIRVVRLK (SEQ ID NO: 88), NSIPSTSKW (SEQ ID NO: 89), VIIRVVQLQ (SEQ ID NO: 90), SQVNGRPQD (SEQ ID NO: 91), NGSGQDQQT (SEQ ID NO: 92), GLNSSDRRL (SEQ ID NO: 93), IYHKIGAAQ (SEQ ID NO: 94), YHKSGAAQL (SEQ ID NO: 95), YSGTDVQYK (SEQ ID NO: 96), LGSGQNQQT (SEQ ID NO: 97), PVSSGADRR (SEQ ID NO: 98), EHSTKLNAC (SEQ ID NO: 99), NGSDRINKR (SEQ ID NO: 100), VIIKGGAAQ (SEQ ID NO: 101), GYHRVVRLS (SEQ ID NO: 102), VIIRVVRLL (SEQ ID NO: 103), and VILKSGAAQ (SEQ ID NO: 104).

In some embodiments, the variant polypeptide sequence at the VR-IV site comprises, consists essentially of, or consists of a polypeptide sequence at least about 60%, 70%, 80%, 90%, or 100% identical to one of SEQ ID NOs: 6-104.

In some embodiments, the variant polypeptide sequence at the VR-IV site comprises, consists essentially of, or consists of a sequence at least about 60%, 70%, 80%, 90%, or 100% identical to GYHKSGAAQ (SEQ ID NO: 6). In some embodiments, the variant polypeptide sequence at the VR-IV site comprises, consists essentially of, or consists of a sequence consisting of at most 1, 2, 3, or 4 amino-acid substitutions relative to GYHKSGAAQ (SEQ ID NO: 6). In some embodiments, the variant polypeptide sequence at the VR-IV site comprises, consists essentially of, or consists of a sequence consisting of at most 1, 2, 3, or 4 conservative amino-acid substitutions relative GYHKSGAAQ (SEQ ID NO: 6). In some embodiments, the variant polypeptide sequence at the VR-IV site is GYHKSGAAQ (SEQ ID NO: 6).

In some embodiments, the variant polypeptide sequence at the VR-IV site comprises, consists essentially of, or consists of a sequence at least about 60%, 70%, 80%, 90%, or 100% identical to SQVNGRPRD (SEQ ID NO: 33). In some embodiments, the variant polypeptide sequence at the VR-IV site comprises, consists essentially of, or consists of a sequence consisting of at most 1, 2, 3, or 4 amino-acid substitutions relative to SQVNGRPRD (SEQ ID NO: 33). In some embodiments, the variant polypeptide sequence at the VR-IV site comprises, consists essentially of, or consists of a sequence consisting of at most 1, 2, 3, or 4 conservative amino-acid substitutions relative SQVNGRPRD (SEQ ID NO: 33). In some embodiments, the variant polypeptide sequence at the VR-IV site is SQVNGRPRD (SEQ ID NO: 33).

In some embodiments, the capsid protein of the present disclosure comprises a variant polypeptide sequence at the VR-V site. In some embodiments, the entire VR-V site ("NNSEFA", SEQ ID NO: 3) is substituted by a peptide of formula:

$$-(X)_n-$$

wherein n is 4-8, and X represents any of the 20 standard amino acids (SEQ ID NO: 479).

In some embodiments, the variant polypeptide sequence at the VR-V site is:

$$-X_1-X_2-X_3-X_4-X_5-X_6-$$

In some embodiments, the variant polypeptide sequence at the VR-V site is:

$$-X_1-X_2-X_3-X_4-X_5-X_6-$$

Wherein $X_1$ is S, L, H, N, or A; $X_2$ is T, M, K, G, or N; $X_3$ is S, T, M or I; $X_4$ is S, P, F, M, or N; $X_5$ is F, S, P or L; and $X_6$ is I, V, or T (SEQ ID NO: 474).

In some embodiments, the variant polypeptide sequence at the VR-V site comprises or consists of a sequence selected from LNSMLI (SEQ ID NO: 105), NGMSFT (SEQ ID NO: 106), HKTFSI (SEQ ID NO: 107), SMSNFV (SEQ ID NO: 108), ATIPPI (SEQ ID NO: 109), SSTHFD (SEQ ID NO: 110), NNQFSY (SEQ ID NO: 111), NMGHYS (SEQ ID NO: 112), SKQMFQ (SEQ ID NO: 113), WPSAGV (SEQ ID NO: 114), NGGYQC (SEQ ID NO: 115), STSPIV (SEQ ID NO: 116), SQSGLW (SEQ ID NO: 117), VNSQFS (SEQ ID NO: 118), SGIEFR (SEQ ID NO: 119), SASKFT (SEQ ID NO: 120), QLNWTS (SEQ ID NO: 121), SMGFPV (SEQ ID NO: 122), SSFMGL (SEQ ID NO: 123), GSNFHV (SEQ ID NO: 124), DMTLYA (SEQ ID NO: 125), MGCLFT (SEQ ID NO: 126), ALAFNS (SEQ ID NO: 127), SKFLFA (SEQ ID NO: 128), QDAGLL (SEQ ID NO: 129), QDASLL (SEQ ID NO: 130), RDDMFS (SEQ ID NO: 131), LSRCFQ (SEQ ID NO: 132), LSRDFQ (SEQ ID NO: 133), QGLTPV (SEQ ID NO: 134), QWDVFT (SEQ ID NO: 135), PRVSFA (SEQ ID NO: 136), QSYYNP (SEQ ID NO: 137), RASHLG (SEQ ID NO: 138), IILFVP (SEQ ID NO: 139), IISFSY (SEQ ID NO: 140), LDSMLI (SEQ ID NO: 141), NIGHYS (SEQ ID NO: 142), NRMSFT (SEQ ID NO: 143), NGMSFA (SEQ ID NO: 144), IILLLP (SEQ ID NO: 145), RMRSLL (SEQ ID NO: 146), RRRCRF (SEQ ID NO: 147), PKQMFQ (SEQ ID NO: 148), LMSNFV (SEQ ID NO: 149), GASHLG (SEQ ID NO: 150), CASISW (SEQ ID NO: 151), SMTTFR (SEQ ID NO: 152), AAIPPI (SEQ ID NO: 153), PGCESL (SEQ ID NO: 154), SMGFAC (SEQ ID NO: 155), FLPSLM (SEQ ID NO: 156), NGISFT (SEQ ID NO: 157), ESSRWA (SEQ ID NO: 158), QLYFVP (SEQ ID NO: 159), SSNFHV (SEQ ID NO: 160), LEFMLI (SEQ ID NO: 161), QFDSFD (SEQ ID NO: 162), SPVFAC (SEQ ID NO: 163), VRLIFD (SEQ ID NO: 164), NGMSFI (SEQ ID NO: 165), LLFPPI (SEQ ID NO: 166), GAGVTG (SEQ ID NO: 167), QWMSFT (SEQ ID NO: 168), SIGFPV (SEQ ID NO: 169), RMQSLL (SEQ ID NO: 170), TSALQV (SEQ ID NO: 171), SLTHFD (SEQ ID NO: 172), QELPFL (SEQ ID NO: 173), LYFLLP (SEQ ID NO: 174), LSFFFA (SEQ ID NO: 175), LSRIFQ (SEQ ID NO: 176), DEVILF (SEQ ID NO: 177), RAGVAG (SEQ ID NO: 178), NGMSLP (SEQ ID NO: 179), PFEDFQ (SEQ ID NO: 180), QYGSLF (SEQ ID NO: 181), NYTFVL (SEQ ID NO: 182), MSGYQC (SEQ ID NO: 183), NYAFVP (SEQ ID NO: 184), RAGVTG (SEQ ID NO: 185), WNSMLI (SEQ ID NO: 186), IRRFSI (SEQ ID NO: 187), NGMSFY (SEQ ID NO: 188), IIQFSY (SEQ ID NO: 189), NGCLFT (SEQ ID NO: 190), RDASLL (SEQ ID NO: 191), ADSMLI (SEQ ID NO: 192), VDSQFS (SEQ ID NO: 193), SIGNFV (SEQ ID NO: 194), NGMSLL (SEQ ID NO: 195), NYTFVP (SEQ ID NO: 196), IRRLVF (SEQ ID NO: 197), PMSNFV (SEQ ID NO: 198), LWVFPV (SEQ ID NO: 199), VRLHFD (SEQ ID NO: 200), SMSNLF (SEQ ID NO: 201), STSLIV (SEQ ID NO: 202), and HKTFGI (SEQ ID NO: 203).

In some embodiments, the variant polypeptide sequence at the VR-V site comprises, consists essentially of, or consists of a polypeptide sequence at least about 60%, 70%, 80%, 90%, or 100% identical to one of SEQ ID NOs: 105-203.

In some embodiments, the variant polypeptide sequence at the VR-V site comprises, consists essentially of, or consists of a sequence at least about 60%, 70%, 80%, 90%, or 100% identical to LNSMLI (SEQ ID NO: 105). In some embodiments, the variant polypeptide sequence at the VR-V site comprises, consists essentially of, or consists of a sequence consisting of at most 1, 2, 3, or 4 amino-acid substitutions relative to LNSMLI (SEQ ID NO: 105). In some embodiments, the variant polypeptide sequence at the VR-V site comprises, consists essentially of, or consists of a sequence consisting of at most 1, 2, 3, or 4 conservative amino-acid substitutions relative LNSMLI (SEQ ID NO: 105). In some embodiments, the variant polypeptide sequence at the VR-V site is LNSMLI (SEQ ID NO: 105).

In some embodiments, the capsid protein of the present disclosure comprises a variant polypeptide sequence at the VR-VII site. In some embodiments, the entire VR-VII site ("GRDNV", SEQ ID NO: 4) is substituted by a peptide of formula:

$$-(X)_n-$$

wherein n is 3-7, and X represents any of the 20 standard amino acids (SEQ ID NO: 480).

In some embodiments, the variant polypeptide sequence at the VR-VII site is:

$$-X_1-X_2-X_3-X_4-X_5-$$

In some embodiments, the variant polypeptide sequence at the VR-VII site is:

$$-X_1-X_2-X_3-X_4-X_5-$$

Wherein $X_1$ is V, L, Q, C, or R; $X_2$ is S, H, G, C, or D; $X_3$ is Y, S, L, G, or N; $X_4$ is S, L, H, Q, or N; and $X_5$ is V, I, or R (SEQ ID NO: 475).

In some embodiments, the variant polypeptide sequence at the VR-VII site comprises or consists of a sequence selected from RGNQV (SEQ ID NO: 204), VSLNR (SEQ ID NO: 205), CDYSV (SEQ ID NO: 206), QHGHI (SEQ ID NO: 207), LCSLV (SEQ ID NO: 208), PTIYV (SEQ ID NO: 209), DVIHI (SEQ ID NO: 210), AEFYA (SEQ ID NO: 211), NSVVC (SEQ ID NO: 212), VRSNC (SEQ ID NO: 213), LANNI (SEQ ID NO: 214), NLQFM (SEQ ID NO: 215), EFRDL (SEQ ID NO: 216), DFGSL (SEQ ID NO: 217), VTNYC (SEQ ID NO: 218), WNTNA (SEQ ID NO: 219), TESTC (SEQ ID NO: 220), SGAAV (SEQ ID NO: 221), GGCDI (SEQ ID NO: 222), SGSVV (SEQ ID NO: 223), SSNAC (SEQ ID NO: 224), YNTTV (SEQ ID NO: 225), SKCLA (SEQ ID NO: 226), SAYTV (SEQ ID NO: 227), VRDTV (SEQ ID NO: 228), WRSMV (SEQ ID NO: 229), AYHGV (SEQ ID NO: 230), GMNTI (SEQ ID NO: 231), AETSL (SEQ ID NO: 232), TLVYV (SEQ ID NO: 233), NHDWI (SEQ ID NO: 234), TVGIV (SEQ ID NO: 235), SLPTV (SEQ ID NO: 236), TGILC (SEQ ID NO: 237), TDTYI (SEQ ID NO: 238), LPVTY (SEQ ID NO: 239), GDVYI (SEQ ID NO: 240), LYGTV (SEQ ID NO: 241), GCEFI (SEQ ID NO: 242), SAGLL (SEQ ID NO: 243), IKSNI (SEQ ID NO: 244), VTTSL (SEQ ID NO: 245), AVTSV (SEQ ID NO: 246), RDIHI (SEQ ID NO: 247), SAISL (SEQ ID NO: 248), VASTC (SEQ ID NO: 249), IKGLL (SEQ ID NO: 250), GSYHT (SEQ ID NO: 251), RIGFV (SEQ ID NO: 252), NDIYI (SEQ ID NO: 253), AVSCV (SEQ ID NO: 254), QHNLL (SEQ ID NO: 255), VSSCV (SEQ ID NO: 256), LNLDV (SEQ ID NO: 257), LGATI (SEQ ID NO: 258), PVLCV (SEQ ID NO: 259), SARHI (SEQ ID NO: 260), RATLI (SEQ ID NO: 261), PYNHA (SEQ ID NO: 262), IGDSI (SEQ ID NO: 263), SPMLC (SEQ ID NO: 264), YDSTL (SEQ ID NO: 265), ALKHV (SEQ ID NO: 266), ADLLT (SEQ ID NO: 267), NNGHL (SEQ ID NO: 268), INSEV (SEQ ID NO: 269), SNKTT (SEQ ID NO: 270), GSTGL (SEQ ID NO: 271), DSDMI (SEQ ID NO: 272), TSNFI (SEQ ID NO: 273), RNFTT (SEQ ID NO: 274), SHKYS (SEQ ID NO: 275), VSDIV (SEQ ID NO: 276), RVVQA (SEQ ID NO: 277), AACAV (SEQ ID NO: 278), RGRQI (SEQ ID NO: 279), AVANI (SEQ ID NO: 280), AGYDL (SEQ ID NO: 281), LSEAA (SEQ ID NO: 282), MSNYL (SEQ ID NO: 283), NFSDN (SEQ ID NO: 284), SCCDV (SEQ ID NO: 285), LASSV (SEQ ID NO: 286), PDHAV (SEQ ID NO: 287), KFDII (SEQ ID NO: 288), NSSSA (SEQ ID NO: 289), HTMHV (SEQ ID NO: 290), TLSYC (SEQ ID NO: 291), ADTHR (SEQ ID NO: 292), SMYSV (SEQ ID NO: 293), SVNLV (SEQ ID NO: 294), MSGHL (SEQ ID NO: 295), KISDT (SEQ ID NO: 296), TGLLA (SEQ ID NO: 297), AWTTS (SEQ ID NO: 298), GGALI (SEQ ID NO: 299), SCIEV (SEQ ID NO: 300), PPVIC (SEQ ID NO: 301), and GTYNL (SEQ ID NO: 302).

In some embodiments, the variant polypeptide sequence at the VR-VII site comprises, consists essentially of, or consists of a polypeptide sequence at least about 60%, 70%, 80%, 90%, or 100% identical to one of SEQ ID NOs: 204-302.

In some embodiments, the variant polypeptide sequence at the VR-VII site comprises, consists essentially of, or consists of a sequence at least about 60%, 70%, 80%, 90%, or 100% identical to RGNQV (SEQ ID NO: 204). In some embodiments, the variant polypeptide sequence at the VR-VII site comprises, consists essentially of, or consists of a sequence consisting of at most 1, 2, 3, or 4 amino-acid substitutions relative to RGNQV (SEQ ID NO: 204). In some embodiments, the variant polypeptide sequence at the VR-VII site comprises, consists essentially of, or consists of a sequence consisting of at most 1, 2, 3, or 4 conservative amino-acid substitutions relative RGNQV (SEQ ID NO: 204). In some embodiments, the variant polypeptide sequence at the VR-VII site is RGNQV (SEQ ID NO: 204).

In some embodiments, the capsid protein of the present disclosure comprises a variant polypeptide sequence at the VR-VII site. In some embodiments, the entire VR-VIII site ("SAQA", SEQ ID NO: 5) is substituted by a peptide of formula:

$$—(X)_n—$$

wherein n is 2-6, and X represents any of the 20 standard amino acids (SEQ ID NO: 481).

In some embodiments, the variant polypeptide sequence at the VR-VIII site is:

$$-X_1-X_2-X_3-X_4-$$

In some embodiments, the variant polypeptide sequence at the VR-VIII site is:

$$-X_1-X_2-X_3-X_4-$$

Wherein $X_1$ is S, N, or A; $X_2$ is V, M, N, or A; $X_3$ is Y, V, S, or G; and $X_4$ is Y, T, M, G, or N (SEQ ID NO: 476).

In some embodiments, the variant polypeptide sequence at the VR-VIII site comprises or consists of a sequence selected from NVSY (SEQ ID NO: 303), SMVN (SEQ ID NO: 304), ANYG (SEQ ID NO: 305), NVGT (SEQ ID NO: 306), SAYM (SEQ ID NO: 307), EKVT (SEQ ID NO: 308), TTPG (SEQ ID NO: 309), GVYS (SEQ ID NO: 310), SYVG (SEQ ID NO: 311), LQYN (SEQ ID NO: 312), DPAK (SEQ ID NO: 313), THFS (SEQ ID NO: 314), IGGV (SEQ ID NO: 315), SSWN (SEQ ID NO: 316), SVYV (SEQ ID NO: 317), TLNG (SEQ ID NO: 318), NTSN (SEQ ID NO: 319), VQYA (SEQ ID NO: 320), DQYR (SEQ ID NO: 321), MPVS (SEQ ID NO: 322), SAQA (SEQ ID NO: 323), MTVA (SEQ ID NO: 324), TVMG (SEQ ID NO: 325), FSSI (SEQ ID NO: 326), SLRL (SEQ ID NO: 327), SAMG (SEQ ID NO: 328), YIKL (SEQ ID NO: 329), LMTM (SEQ ID NO: 330), QVHL (SEQ ID NO: 331), YNSV (SEQ ID NO: 332), CVIS (SEQ ID NO: 333), RLDG (SEQ ID NO: 334), AIMV (SEQ ID NO: 335), GTTG (SEQ ID NO: 336), ASYT (SEQ ID NO: 337), LHVG (SEQ ID NO: 338), LQFA (SEQ ID NO: 339), VRGD (SEQ ID NO: 340), NVMI (SEQ ID NO: 341), SLYG (SEQ ID NO: 342), GTVG (SEQ ID NO: 343), FNSV (SEQ ID NO: 344), TRLG (SEQ ID NO: 345), LKVL (SEQ ID NO: 346), SIRV (SEQ ID NO: 347), KIQG (SEQ ID NO: 348), QILG (SEQ ID NO: 349), QRDA (SEQ ID NO: 350), EAVR (SEQ ID NO: 351), AITV (SEQ ID NO: 352), KESI (SEQ ID NO: 353), LMVN (SEQ ID NO: 354), INLS (SEQ ID NO: 355), GQVS (SEQ ID NO: 356), TSLL (SEQ ID NO: 357), SSTL (SEQ ID NO: 358), YEKF (SEQ ID NO: 359), DGKL (SEQ ID NO: 360), QVYS (SEQ ID NO: 361), QKEG (SEQ ID NO: 362), ARDM (SEQ ID NO: 363), DNFR (SEQ ID NO: 364), SHGL (SEQ ID NO: 365), VSVN (SEQ ID NO: 366), GLKD (SEQ ID NO: 367), QPVF (SEQ ID NO: 368), VYSM (SEQ ID NO: 369), VMAQ (SEQ ID NO: 370), FVGM (SEQ ID NO: 371), WSTP (SEQ ID NO: 372), SYPV (SEQ ID NO: 373), TTYS (SEQ ID NO: 374), TVTT (SEQ ID NO: 375), KDKT (SEQ ID NO: 376), YREL (SEQ ID NO: 377), LSHF (SEQ ID NO: 378), SPGT (SEQ ID NO: 379), LMGT (SEQ ID NO: 380), AASL (SEQ ID NO: 381), FSNN (SEQ ID NO: 382), QARL (SEQ ID NO: 383), YHIA (SEQ ID NO: 384), ARQD (SEQ ID NO: 385), VAYT (SEQ ID NO: 386), TPSY (SEQ ID NO: 387), MILH (SEQ ID NO: 388), LGNV (SEQ ID NO: 389), TSIS (SEQ ID NO: 390), TMVY (SEQ ID NO: 391), LVVG (SEQ ID NO: 392), SPLY (SEQ ID NO: 393), YKSE (SEQ ID NO: 394), FTRL (SEQ ID NO: 395), VSYN (SEQ ID NO: 396), ERTP (SEQ ID NO: 397), FRSE (SEQ ID NO: 398), NYTE (SEQ ID NO: 399), QTIN (SEQ ID NO: 400), and DVHR (SEQ ID NO: 401).

In some embodiments, the variant polypeptide sequence at the VR-VIII site comprises, consists essentially of, or consists of a polypeptide sequence at least about 60%, 70%, 80%, 90%, or 100% identical to one of SEQ ID NOs: 303-401.

In some embodiments, the variant polypeptide sequence at the VR-VIII site comprises, consists essentially of, or consists of a sequence at least about 60%, 70%, 80%, 90%, or 100% identical to ANYG (SEQ ID NO: 305). In some embodiments, the variant polypeptide sequence at the VR-VIII site comprises, consists essentially of, or consists of a sequence consisting of at most 1, 2, or 3 amino-acid substitutions relative to ANYG (SEQ ID NO: 305). In some embodiments, the variant polypeptide sequence at the VR-VIII site comprises, consists essentially of, or consists of a sequence consisting of at most 1, 2, or 3 conservative amino-acid substitutions relative ANYG (SEQ ID NO: 305). In some embodiments, the variant polypeptide sequence at the VR-VIII site is ANYG (SEQ ID NO: 305).

In some embodiments, the variant polypeptide sequence at the VR-VIII site comprises, consists essentially of, or consists of a sequence at least about 60%, 70%, 80%, 90%, or 100% identical to NVSY (SEQ ID NO: 303). In some embodiments, the variant polypeptide sequence at the VR-VIII site comprises, consists essentially of, or consists of a sequence consisting of at most 1, 2, or 3 amino-acid substitutions relative to NVSY (SEQ ID NO: 303). In some embodiments, the variant polypeptide sequence at the VR-VIII site comprises, consists essentially of, or consists of a sequence consisting of at most 1, 2, or 3 conservative amino-acid substitutions relative NVSY (SEQ ID NO: 303). In some embodiments, the variant polypeptide sequence at the VR-VIII site is NVSY (SEQ ID NO: 303).

In some embodiments, the capsid protein comprises, consists essentially of, or consists of a polypeptide sequence at least 80%, 85%, 90%, 95%, 96%, 97%, 98%, 99%, 99.5%, or 100% identical to one of SEQ ID NOs: 402-410 and 464-468, or a functional fragment thereof.

TABLE 1

Capsid Protein Sequences

| Name/Alternate Name | SEQ ID NO: |
|---|---|
| CR9-01/TN1 | 402 |
| CR9-07 | 403 |
| CR9-07-A/TN5 | 482 |
| CR9-07-E/TN6 | 483 |
| CR9-08 | 464 |
| CR9-09 | 465 |
| CR9-10/TN3 | 404 |
| CR9-11 | 466 |
| CR9-13 | 405 |
| CR9-14/TN4 | 406 |
| CR9-15 | 467 |
| CR9-16 | 468 |
| CR9-17 | 407 |
| CR9-20 | 408 |
| CR9-21 | 409 |
| CR9-22 | 410 |
| HV1/TN7 | 484 |
| HV2/TN11 | 485 |

Chimeric AAV5/AAV9 Capsid

The present disclosure also provides recombinant adeno-associated virus (rAAV) capsid proteins comprising a sequence at least 80%, at least 85%, at least 90%, at least 95%, at least 98%, at least 99%, or 100% identical to SEQ ID NO: 463. (In SEQ ID NO:463, the amino acids residues labeled "X" are excluded from sequence identity calculation.) In some embodiments, the capsid protein is an AAV5/AAV9 chimeric capsid protein. In some embodiments, the AAV5/AAV9 chimeric capsid protein sequence is more than about 50%, 55%, 60%, 65%, 70%, 75%, 80%, 85%, 90%, 95%, 96%, 97%, 98%, 99%, or 99.5% identical to the AAV9 capsid protein sequence (SEQ ID NO: 1). In some embodiments, the C-terminal 500 residues of the AAV5/AAV9 chimeric capsid protein sequence is at least about 80%, 85%, 90%, 95%, 96%, 97%, 98%, 99%, 99.5%, or 100% identical to the C-terminal 500 residues of the AAV9 capsid protein sequence (SEQ ID NO: 1). In some embodiments, the residue at the position equivalent to Q688 of the AAV9 capsid protein sequence (SEQ ID NO: 1) is a lysine (K) in the chimeric capsid protein.

In some embodiments, the chimeric capsid protein comprises at least 1, 2, 3, 4, 5 or more polypeptide segments that are derived from AAV5 capsid protein. In some embodiments, the chimeric capsid protein comprises at least 1, 2, 3, 4, 5 or more polypeptide segments that are derived from AAV9 capsid protein. In some embodiments, at least one polypeptide segment is derived from the AAV5 capsid protein and at least one polypeptide segment is derived from the AAV9 capsid protein.

In some embodiments, the first 250 residues at the N-terminus of the chimeric capsid protein comprise one or more AAV5 capsid derived polypeptide segments. In some embodiments, the first 225 residues at the N-terminus of the chimeric capsid protein comprise one or more AAV5 capsid derived polypeptide segments. In some embodiments, the first 200 residues at the N-terminus of the chimeric capsid protein comprise one or more AAV5 capsid derived polypeptide segments. In some embodiments, the first 150 residues at the N-terminus of the chimeric capsid protein comprise one or more AAV5 capsid derived polypeptide segments. In some embodiments, the first 100 residues at the N-terminus of the chimeric capsid protein comprise one or more AAV5 capsid derived polypeptide segments. In some embodiments, the first 50 residues at the N-terminus of the chimeric capsid protein comprise one or more AAV5 capsid derived polypeptide segments. In some embodiments, each of the one or more AAV5 capsid derived polypeptide segments has at least about 80%, 85%, 90%, 95%, 96%, 97%, 98%, 99%, 99.5%, or 100% sequence identity to the corresponding AAV5 capsid sequence.

In some embodiments, residues 50-250 of the chimeric capsid protein comprise one or more AAV5 capsid derived polypeptide segments. In some embodiments, residues 50-200 of the chimeric capsid protein comprise one or more AAV5 capsid derived polypeptide segments. In some embodiments, residues 50-150 of the chimeric capsid protein comprise one or more AAV5 capsid derived polypeptide segments. In some embodiments, residues 100-250 of the chimeric capsid protein comprise one or more AAV5 capsid derived polypeptide segments. In some embodiments, residues 100-200 of the chimeric capsid protein comprise one or more AAV5 capsid derived polypeptide segments. In some embodiments, residues 150-250 of the chimeric capsid protein comprise one or more AAV5 capsid derived polypeptide segments. In some embodiments, each of the one or more AAV5 capsid derived polypeptide segments has at least about 80%, 85%, 90%, 95%, 96%, 97%, 98%, 99%, 99.5%, or 100% sequence identity to the corresponding AAV5 capsid sequence.

In some embodiments, the last 100 residues at the C-terminus of the chimeric capsid protein comprise one or more AAV5 capsid derived polypeptide segments. In some embodiments, the last 50 residues at the C-terminus of the chimeric capsid protein comprise one or more AAV5 capsid derived polypeptide segments. In some embodiments, each of the one or more AAV5 capsid derived polypeptide segments has at least about 80%, 85%, 90%, 95%, 96%, 97%, 98%, 99%, 99.5%, or 100% sequence identity to the corresponding AAV5 capsid sequence. In some embodiments, the chimeric capsid protein comprises one or more AAV5 capsid derived polypeptide segments at or near the N-terminus of the chimeric capsid protein, as described above, and one or more AAV5 capsid derived polypeptide segments at or near the C-terminus of the chimeric capsid protein, as described in this paragraph.

In some embodiments, the chimeric capsid protein comprises, in N-terminal to C-terminal order, a first polypeptide segment having sequence at least about 80%, 85%, 90%, 95%, 96%, 97%, 98%, 99%, 99.5%, or 100% identical to SEQ ID NO: 411 or at least about 80%, 85%, 90%, 95%, 96%, 97%, 98%, 99%, 99.5%, or 100% identical to SEQ ID NO: 412; a second polypeptide segment having sequence at least about 80%, 85%, 90%, 95%, 96%, 97%, 98%, 99%, 99.5%, or 100% identical to SEQ ID NO: 413 or at least about 80%, 85%, 90%, 95%, 96%, 97%, 98%, 99%, 99.5%, or 100% identical to SEQ ID NO: 414; a third polypeptide segment having sequence at least about 80%, 85%, 90%, 95%, 96%, 97%, 98%, 99%, 99.5%, or 100% identical to SEQ ID NO: 415 or at least about 80%, 85%, 90%, 95%, 96%, 97%, 98%, 99%, 99.5%, or 100% identical to SEQ ID NO: 416; a fourth polypeptide segment having sequence at least about 80%, 85%, 90%, 95%, 96%, 97%, 98%, 99%, 99.5%, or 100% identical to SEQ ID NO: 417 or at least about 80%, 85%, 90%, 95%, 96%, 97%, 98%, 99%, 99.5%, or 100% identical to SEQ ID NO: 418; and a fifth polypeptide segment having sequence at least about 80%, 85%, 90%, 95%, 96%, 97%, 98%, 99%, 99.5%, or 100% identical to SEQ ID NO: 419 or at least about 80%, 85%, 90%, 95%, 96%, 97%, 98%, 99%, 99.5%, or 100% identical to SEQ ID NO: 420. In some embodiments, at least one polypeptide segment is derived from the AAV5 capsid protein and at least one polypeptide segment is derived from the AAV9 capsid protein.

```
AAV9 derived polypeptide segment 1:
                                    (SEQ ID NO: 411)
MAADGYLPDWLEDNLSEGIREWWALKPGAPQPKANQQHQDNARGLVLPG
Y Sequence of AAV5 derived polypeptide segment 1:
                                    (SEQ ID NO: 412)
MSFVDHPPDWLEEVGEGLREFLGLEAGPPKPKPNQQHQDQARGLVLPGY Sequence of AAV9 derived polypeptide segment 2:
                                    (SEQ ID NO: 413)
KYLGPGNGLDKGEPVNAADAAALEHDKAYDQQLK Sequence of AAV5 derived polypeptide segment 2:
                                    (SEQ ID NO: 414)
NYLGPGNGLDRGEPVNRADEVAREHDISYNEQLE Sequence of AAV9 derived polypeptide segment 3:
                                    (SEQ ID NO: 415)
AGDNPYLKYNHADAEFQERLKEDTSFGGNLGRAVFQAKKRLLEP Sequence of AAV5 derived polypeptide segment 3:
                                    (SEQ ID NO: 416)
AGDNPYLKYNHADAEFQEKLADDTSFGGNLGKAVFQAKKRVLEP
```

-continued

Sequence of AAV9 derived polypeptide segment 4:
(SEQ ID NO: 417)
LGLVEEAAKTAPGKKRPVEQSPQEPDSSAGIGKSGAQPAKKRLNFGQTGD

TESVPDPQPIGEPPAAPSGVGSLTMASGGGAPVA

Sequence of AAV5 derived polypeptide segment 4:
(SEQ ID NO: 418)
FGLVEEGAKTAPTGKRIDDHFPKRKKARTEEDSKPSTSSDAEAGPSGSQQ

LQIPAQPASSLGADTMSAGGGGPLG

Sequence of AAV9 derived polypeptide segment 5:
(SEQ ID NO: 419)
DNNEGADGVGSSSGNWHCDSQWLGDRVITTSTRTWALPTYNNHLYKQISN

STSGGSSNDNAYFGYSTPWGYFDFNRFHCHFSPRDWQRLINNNWGFRPKR

LNFKLFNIQVKEVTDNNGVKTIANNLTSTVQVFTDSDYQLPYVLGSAHEG

CLPPFPADVFMIPQYGYLTLNDGSQAVGRSSFYCLEYFPSQMLRTGNNFQ

FSYEFENVPFHSSYAHSQSLDRLMNPLIDQYLYYLSKTINGSGQNQQTLK

FSVAGPSNMAVQGRNYIPGPSYRQQRVSTTVTQNNNSEFAWPGASSWALN

GRNSLMNPGPAMASHKEGEDRFFPLSGSLIFGKQGTgrdnvDADKVMITN

EEEIKTTNPVATESYGQVATNHQSAQAQAQTGWVQNQGILPGMVWQDRDV

YLQGPIWAKIPHTDGNFHPSPLMGGFGMKHPPPQILIKNTPVPADPPTAF

NKDKLNSFITQYSTGQVSVEIEWELQKENSKRWNPEIQYTSNYYKSNNVE

FAVNTEGVYSEPRPIGTRYLTRNL

Sequence of AAV9 derived polypeptide segment 5
with Q688K mutation:
(SEQ ID NO: 420)
DNNEGADGVGSSSGNWHCDSQWLGDRVITTSTRTWALPTYNNHLYKQISN

STSGGSSNDNAYFGYSTPWGYFDFNRFHCHFSPRDWQRLINNNWGFRPKR

LNFKLFNIQVKEVTDNNGVKTIANNLTSTVQVFTDSDYQLPYVLGSAHEG

CLPPFPADVFMIPQYGYLTLNDGSQAVGRSSFYCLEYFPSQMLRTGNNFQ

FSYEFENVPFHSSYAHSQSLDRLMNPLIDQYLYYLSKTINGSGQNQQTLK

FSVAGPSNMAVQGRNYIPGPSYRQQRVSTTVTQNNNSEFAWPGASSWALN

GRNSLMNPGPAMASHKEGEDRFFPLSGSLIFGKQGTgrdnvDADKVMITN

EEEIKTTNPVATESYGQVATNHQSAQAQAQTGWVQNQGILPGMVWQDRDV

YLQGPIWAKIPHTDGNFHPSPLMGGFGMKHPPPQILIKNTPVPADPPTAF

NKDKLNSFITQYSTGQVSVEIEWELKKENSKRWNPEIQYTSNYYKSNNVE

FAVNTEGVYSEPRPIGTRYLTRNL

In some embodiments, the chimeric capsid protein comprises, consists essentially of, or consists of a polypeptide sequence at least about 80%, 85%, 90%, 95%, 96%, 97%, 98%, 99%, 99.5%, or 100% identical to one of SEQ ID NOs: 421-444, or a functional fragment thereof.

TABLE 2

| Capsid Protein Sequences | |
| --- | --- |
| Name/Alternate Name | SEQ ID NO: |
| ZC23 | 421 |
| ZC24 | 422 |
| ZC25 | 423 |
| ZC26 | 424 |
| ZC27 | 425 |

TABLE 2-continued

| Capsid Protein Sequences | |
| --- | --- |
| Name/Alternate Name | SEQ ID NO: |
| ZC28 | 426 |
| ZC29 | 427 |
| ZC30 | 428 |
| ZC31 | 429 |
| ZC32 | 430 |
| ZC33 | 431 |
| ZC34 | 432 |
| ZC35 | 433 |
| ZC40/TN8 | 434 |
| ZC41 | 435 |
| ZC42 | 436 |
| ZC43 | 437 |
| ZC44/TN10 | 438 |
| ZC45 | 439 |
| ZC46 | 440 |
| ZC47/TN14 | 441 |
| ZC48 | 442 |
| ZC49 | 443 |
| ZC50 | 444 |

Combinatory Capsid Protein

In one aspect, the present disclosure provides combinatory capsid proteins. As used herein, "combinatory capsid protein" refers to a AAV5/AAV9 chimeric capsid protein as described in the present disclosure, which further comprises amino acid variations with respect to the chimeric parental sequence at one or more sites. In some embodiments, the one or more sites of the chimeric parental sequence are selected from those equivalent to the VR-IV site, the VR-V site, the VR-VII site and the VR-VIII site of the AAV9 capsid protein.

The combinatory capsid proteins of the present disclosure include any variant polypeptide sequences identified as shown in, but not limited to, the Examples. Without being limited to any particular example, in some embodiments, the combinatory capsid protein comprises a chimeric AAV5/AAV9 capsid protein backbone, and further comprises the variant polypeptide sequence at one or more sites selected from the group consisting of those equivalent to the VR-IV site, the VR-V site, the VR-VII site and the VR-VIII site of the AAV9 capsid protein as described herein.

In some embodiments, the combinatory capsid protein comprises, in N-terminal to C-terminal order, a first polypeptide segment having sequence at least about 80%, 85%, 90%, 95%, 96%, 97%, 98%, 99%, 99.5%, or 100% identical to SEQ ID NO: 411 or at least about 80%, 85%, 90%, 95%, 96%, 97%, 98%, 99%, 99.5%, or 100% identical to SEQ ID NO: 412; a second polypeptide segment having sequence at least about 80%, 85%, 90%, 95%, 96%, 97%, 98%, 99%, 99.5%, or 100% identical to SEQ ID NO: 413 or at least about 80%, 85%, 90%, 95%, 96%, 97%, 98%, 99%, 99.5%, or 100% identical to SEQ ID NO: 414; a third polypeptide segment having sequence at least about 80%, 85%, 90%, 95%, 96%, 97%, 98%, 99%, 99.5%, or 100% identical to SEQ ID NO: 415 or at least about 80%, 85%, 90%, 95%, 96%, 97%, 98%, 99%, 99.5%, or 100% identical to SEQ ID NO: 416; a fourth polypeptide segment having sequence at least about 80%, 85%, 90%, 95%, 96%, 97%, 98%, 99%, 99.5%, or 100% identical to SEQ ID NO: 417 or at least about 80%, 85%, 90%, 95%, 96%, 97%, 98%, 99%, 99.5%, or 100% identical to SEQ ID NO: 418; and a fifth polypeptide segment having sequence at least about 80%, 85%, 90%, 95%, 96%, 97%, 98%, 99%, 99.5%, or 100% identical to SEQ ID NO: 419 or at least about 80%, 85%, 90%, 95%, 96%, 97%, 98%, 99%, 99.5%, or 100% identical to SEQ ID NO: 420 (here, regions equivalent to the VR-IV site, the VR-V site, the VR-VII site and the VR-VIII site of the AAV9 capsid protein are excluded in the sequence identity calculation of the fifth polypeptide segment). In some embodiments, the combinatory capsid protein comprises a variant polypeptide sequence at one or more of a VR-IV site, a VR-V site, a VR-VII site, and a VR-VIII site of a parental sequence, wherein the parental sequence comprises a sequence at least 80%, at least 85%, at least 90%, at least 95%, at least 98%, at least 99%, or 100% identical to SEQ ID NO: 463. (In SEQ ID NO:463, the amino acids residues labeled "X" are excluded from sequence identity calculation.)

In some embodiments, at least one polypeptide segment is derived from the AAV5 capsid protein and at least one polypeptide segment is derived from the AAV9 capsid protein.

In some embodiments, the combinatory capsid protein further comprises variant polypeptide sequence at one or more sites selected from those equivalent to the VR-IV site, the VR-V site, the VR-VII site and the VR-VIII site of the AAV9 capsid protein.

In some embodiments, the combinatory capsid protein has a variant polypeptide sequence at the site equivalent to the VR-IV site of the AAV9 capsid protein, which comprises, consists essentially of, or consists of a sequence at least about 60%, 70%, 80%, 90%, or 100% identical to GYHKSGAAQ (SEQ ID NO: 6). In some embodiments, the variant polypeptide sequence at the site equivalent to the VR-IV site of the AAV9 capsid protein comprises, consists essentially of, or consists of a sequence consisting of at most 1, 2, 3, or 4 conservative amino-acid substitutions relative GYHKSGAAQ (SEQ ID NO: 6).

In some embodiments, the combinatory capsid protein has a variant polypeptide sequence at the site equivalent to the VR-V site of the AAV9 capsid protein, which comprises, consists essentially of, or consists of a sequence at least about 60%, 70%, 80%, 90%, or 100% identical to LNSMLI (SEQ ID NO: 105). In some embodiments, the variant polypeptide sequence at the site equivalent to the VR-V site of the AAV9 capsid protein comprises, consists essentially of, or consists of a sequence consisting of at most 1, 2, 3, or 4 conservative amino-acid substitutions relative LNSMLI (SEQ ID NO: 105).

In some embodiments, the combinatory capsid protein has a variant polypeptide sequence at the site equivalent to the VR-VIII site of the AAV9 capsid protein, which comprises, consists essentially of, or consists of a sequence at least about 60%, 70%, 80%, 90%, or 100% identical to ANYG (SEQ ID NO: 305) or NVSY (SEQ ID NO: 303). In some embodiments, the variant polypeptide sequence at the site equivalent to the VR-VIII site of the AAV9 capsid protein comprises, consists essentially of, or consists of a sequence consisting of at most 1, 2, 3, or 4 conservative amino-acid substitutions relative ANYG (SEQ ID NO: 305) or NVSY (SEQ ID NO: 303).

In some embodiments, the residue at the position equivalent to Q688 of the AAV9 capsid protein sequence (SEQ ID NO: 1) is a lysine (K) in the combinatory capsid protein.

In some embodiments, the combinatory capsid protein comprises, consists essentially of, or consists of a polypeptide sequence at least about 80%, 85%, 90%, 95%, 96%, 97%, 98%, 99%, 99.5%, or 100% identical to one of SEQ ID NOs: 445-462, or a functional fragment thereof.

TABLE 3

| Capsid Protein Sequences | |
|---|---|
| Name/Alternate Name | SEQ ID NO: |
| TN47-07 | 445 |
| TN47-10/TN12 | 446 |
| TN47-13 | 447 |
| TN47-14 | 448 |
| TN47-17 | 449 |
| TN47-22 | 450 |
| TN40-07 | 451 |
| TN40-10 | 452 |
| TN40-13 | 453 |
| TN40-14 | 454 |
| TN40-17 | 455 |
| TN40-22 | 456 |
| TN44-07/TN13 | 457 |
| TN44-10 | 458 |
| TN44-13 | 459 |
| TN44-14 | 460 |
| TN44-17 | 461 |
| TN44-22 | 462 |

Additional Mutations

Additional amino acid substitutions may be incorporated, for example, to further improve transduction efficiency or tissue selectivity. Exemplary non-limiting substitutions include, but are not limited to, S651A, T578A or T582A relative to the sequence of AAV5, in either an AAV5 or AAV9-based capsid.

In some embodiments, the capsid protein comprises a mutation selected from S651A, T578A, T582A, K251R, Y709F, Y693F, or S485A relative to the sequence of AAV5, in either an AAV5 or AAV9-based capsid. In some embodiments, the capsid protein comprises a mutation selected from K251R, Y709F, Y693F, or S485A relative to the sequence of AAV5, in either an AAV5 or AAV9-based capsid.

Transduction Efficiency, Tropism, and NAb Evasion

Transduction efficiency can be determined using methods known in the art or those described in the Examples. In some embodiments, the rAAV virion with engineered capsid protein exhibits increased transduction efficiency in cardiac cells compared to an AAV virion comprising the parental sequence.

In some embodiments, the rAAV virion exhibits increased transduction efficiency in human cardiac fibroblast (hCF) cells compared to an AAV virion comprising the parental sequence. In some embodiments, the human cardiac fibroblasts are located in the left ventricle of the heart.

In some embodiments, the rAAV virion exhibits at least 2-, 3-, 4-, 5-, 6, 7-, 8-, 9-, 10-, 11-, 12-, 13-, 14, or 15-fold increased transduction efficiency in hCF cells at a multiplicity of infection (MOI) of 100,000. In some embodiments, the rAAV virion exhibits about 2- to about 16-fold, about 2- to about 14-fold, about 2- to about 12-fold, about 2- to about 10-fold, about 2- to about 8-fold, about 2- to about 6-fold, about 2- to about 4-fold, or about 2- to about 3-fold increased transduction efficiency in hCF cells at a multiplicity of infection (MOI) of 100,000. In some embodiments, the rAAV virion exhibits at least 2-, 3-, 4-, 5-, 6, 7-, 8-, 9-, 10, 11-, 12-, 13-, 14, or 15-fold increased transduction efficiency in hCF cells at a multiplicity of infection (MOI) of 100,000. In some embodiments, the rAAV virion exhibits about 20% to 30%, about 30% to 40%, about 40% to 50%, about 50% to 80%, about 80% to 100%, about 100% to 125%, about 125% to 150%, about 150% to 175%, or about 175% to 200% increased transduction efficiency in hCF cells at a multiplicity of infection (MOI) of 100,000.

In some embodiments, the rAAV virion exhibits at least 2-, 3-, 4-, 5-, 6, 7-, 8-, 9-, 10-, 11-, 12-, 13-, 14, or 15-fold increased transduction efficiency in hCF cells at a multiplicity of infection (MOI) of 1,000. In some embodiments, the rAAV virion exhibits about 2- to about 16-fold, about 2- to about 14-fold, about 2- to about 12-fold, about 2- to about 10-fold, about 2- to about 8-fold, about 2- to about 6-fold, about 2- to about 4-fold, or about 2- to about 3-fold increased transduction efficiency in hCF cells at a multiplicity of infection (MOI) of 1,000. In some embodiments, the rAAV virion exhibits about 20% to 30%, about 30% to 40%, about 40% to 50%, about 50% to 80%, about 80% to 100%, about 100% to 125%, about 125% to 150%, about 150% to 175%, or about 175% to 200% increased transduction efficiency in hCF cells at a multiplicity of infection (MOI) of 1,000.

In some embodiments, the rAAV virion exhibits increased transduction efficiency in induced pluripotent stem cell-derived cardiomyocyte (iPS-CM) cells compared to an AAV virion comprising the parental sequence.

In some embodiments, the rAAV virion exhibits at least 2-, 3-, 4-, 5-, 6, 7-, 8-, 9-, 10-, 11-, 12-, 13-, 14, or 15-fold increased transduction efficiency in iPS-CM cells at a multiplicity of infection (MOI) of 100,000. In some embodiments, the rAAV virion exhibits about 2- to about 16-fold, about 2- to about 14-fold, about 2- to about 12-fold, about 2- to about 10-fold, about 2- to about 8-fold, about 2- to about 6-fold, about 2- to about 4-fold, or about 2- to about 3-fold increased transduction efficiency in iPS-CM cells at a multiplicity of infection (MOI) of 100,000. In some embodiments, the rAAV virion exhibits about 20% to 30%, about 30% to 40%, about 40% to 50%, about 50% to 80%, about 80% to 100%, about 100% to 125%, about 125% to 150%, about 150% to 175%, or about 175% to 200% increased transduction efficiency in iPS-CM cells at a multiplicity of infection (MOI) of 100,000.

In some embodiments, the rAAV virion exhibits at least 2-, 3-, 4-, 5-, 6, 7-, 8-, 9-, 10-, 11-, 12-, 13-, 14, or 15-fold increased transduction efficiency in iPS-CM cells at a multiplicity of infection (MOI) of 75,000. In some embodiments, the rAAV virion exhibits about 2- to about 16-fold, about 2- to about 14-fold, about 2- to about 12-fold, about 2- to about 10-fold, about 2- to about 8-fold, about 2- to about 6-fold, about 2- to about 4-fold, or about 2- to about 3-fold increased transduction efficiency in iPS-CM cells at a multiplicity of infection (MOI) of 75,000. In some embodiments, the rAAV virion exhibits about 20% to 30%, about 30% to 40%, about 40% to 50%, about 50% to 80%, about 80% to 100%, about 100% to 125%, about 125% to 150%, about 150% to 175%, or about 175% to 200% increased transduction efficiency in iPS-CM cells at a multiplicity of infection (MOI) of 75,000.

In some embodiments, the rAAV virion exhibits at least 2-, 3-, 4-, 5-, 6, 7-, 8-, 9-, 10-, 11-, 12-, 13-, 14, or 15-fold increased transduction efficiency in iPS-CM cells at a multiplicity of infection (MOI) of 1,000. In some embodiments, the rAAV virion exhibits about 2- to about 16-fold, about 2- to about 14-fold, about 2- to about 12-fold, about 2- to about 10-fold, about 2- to about 8-fold, about 2- to about 6-fold, about 2- to about 4-fold, or about 2- to about 3-fold increased transduction efficiency in iPS-CM cells at a multiplicity of infection (MOI) of 1,000. In some embodiments, the rAAV virion exhibits about 20% to 30%, about 30% to 40%, about 40% to 50%, about 50% to 80%, about 80% to 100%, about 100% to 125%, about 125% to 150%, about 150% to 175%, or about 175% to 200% increased transduction efficiency in iPS-CM cells at a multiplicity of infection (MOI) of 1,000.

In some embodiments, the rAAV virion comprising the engineered capsid protein of the present disclosure exhibits increased transduction efficiency in heart compared to an AAV virion comprising the parental sequence. In some embodiments, transduction efficiency in heart is monitored by injecting C57BL/6J mice with either AAV9:CAG-GFP or CAG-GFP encapsulated by the engineered capsid protein of the present disclosure. In some embodiments, the injection dosage is 2.5E+11 vg/mouse. In some embodiments, the injection dosage is 2E+11 vg/mouse. In some embodiments, the injection dosage is 1E+11 vg/mouse. In some embodiments, the rAAV virion exhibits at least 2-, 3-, 4-, 5-, 6, 7-, 8-, 9-, 10-, 11-, 12-, 13-, 14, or 15-fold increased transduction efficiency in heart. In some embodiments, the rAAV virion exhibits about 2- to about 16-fold, about 2- to about 14-fold, about 2- to about 12-fold, about 2- to about 10-fold, about 2- to about 8-fold, about 2- to about 6-fold, about 2- to about 4-fold, or about 2- to about 3-fold increased transduction efficiency in heart. In some embodiments, the rAAV virion exhibits about 20% to 30%, about 30% to 40%, about 40% to 50%, about 50% to 80%, about 80% to 100%, about 100% to 125%, about 125% to 150%, about 150% to 175%, or about 175% to 200% increased transduction efficiency in heart.

In some embodiments, the rAAV virion comprising the engineered capsid protein of the present disclosure exhibits decreased transduction efficiency in liver cells compared to an AAV virion comprising the parental sequence. In some embodiments, liver transduction efficiency is monitored by injecting C57BL/6J mice with either AAV9:CAG-GFP or CAG-GFP encapsulated by the engineered capsid protein of the present disclosure. In some embodiments, the injection dosage is 2.5E+11 vg/mouse. In some embodiments, the injection dosage is 2E+11 vg/mouse. In some embodiments, the injection dosage is 1E+11 vg/mouse. In some embodiments, the rAAV virion exhibits at least 2-, 3-, 4-, 5-, 6, 7-, 8-, 9-, 10-, 11-, 12-, 13-, 14, or 15-fold decreased transduction efficiency in liver. In some embodiments, the rAAV virion exhibits about 2- to about 16-fold, about 2- to about 14-fold, about 2- to about 12-fold, about 2- to about 10-fold, about 2- to about 8-fold, about 2- to about 6-fold, about 2- to about 4-fold, or about 2- to about 3-fold decreased transduction efficiency in liver. In some embodiments, the rAAV virion exhibits about 20% to 30%, about 30% to 40%, about 40% to 50%, about 50% to 80%, or about 80% to 100 decreased transduction efficiency in liver.

Selectivity for a cell type and/or a tissue/organ type is increased when the ratio of the transduction efficiencies for one cell/tissue/organ type over another is increased for rAAV virions comprising the engineered capsid protein of the present disclosure compared to an AAV virion comprising the parental sequence. In some embodiments, the rAAV virion comprising the engineered capsid protein exhibits increased selectivity for iPS-CM cells over liver cells. In some embodiments, the rAAV virion comprising the engineered capsid protein exhibits increased selectivity for heart over liver when injected in vivo. In some embodiments, the rAAV virion comprising the engineered capsid protein exhibits increased selectivity for the left ventricle of the heart over liver when injected in vivo.

In some embodiments, the rAAV virion comprising the engineered capsid protein exhibits at least 2-, 3-, 4-, 5-, 6, 7-, 8-, 9-, 10-, 11-, 12-, 13-, 14, or 15-fold increased selectivity of iPS-CM cells over liver cells and/or heart over liver. In some embodiments, the rAAV virion comprising the engineered capsid protein exhibits about 2- to about 16-fold, about 2- to about 14-fold, about 2- to about 12-fold, about 2- to about 10-fold, about 2- to about 8-fold, about 2- to about 6-fold, about 2- to about 4-fold, or about 2- to about 3-fold increased selectivity of iPS-CM cells over liver cells and/or heart over liver. In some embodiments, the rAAV virion comprising the engineered capsid protein exhibits about 20% to 30%, about 30% to 40%, about 40% to 50%, about 50% to 80%, about 80% to 100%, about 100% to 125%, about 125% to 150%, about 150% to 175%, or about 175% to 200% increased selectivity of iPS-CM cells over liver cells and/or heart over liver.

In some embodiments, the rAAV virion comprising the engineered capsid protein of the present disclosure exhibits improved ability to evade human NAb (neutralizing antibodies) compared to an AAV virion comprising the parental sequence. In some embodiments, the ability to evade human NAb is measured via an NAb inhibition assay. Non-limiting examples of NAb inhibition assays are described in the Example section of the present disclosure. In some embodiments, NAb inhibition assays are performed by incubating AAV virions with pooled human NAb (e.g., IgG) before treating a target cell at a pre-determined MOI and measure the decrease of transduction efficiency compared to AAV virions not incubated with pooled human NAb. Less NAb inhibition indicates improved ability of the AAV virion to evade human NAb. In some embodiments, the rAAV virion comprising the engineered capsid protein exhibits at least 2-, 3-, 4-, 5-, 6, 7-, 8-, 9-, 10, 11-, 12-, 13-, 14, or 15-fold improved ability to evade human NAb. In some embodiments, the rAAV virion comprising the engineered capsid protein exhibits about 2- to about 16-fold, about 2- to about 14-fold, about 2- to about 12-fold, about 2- to about 10-fold, about 2- to about 8-fold, about 2- to about 6-fold, about 2- to about 4-fold, or about 2- to about 3-fold improved ability to evade human NAb. In some embodiments, the rAAV virion comprising the engineered capsid protein exhibits about 20% to 30%, about 30% to 40%, about 40% to 50%, about 50% to 80%, about 80% to 100%, about 100% to 125%, about 125% to 150%, about 150% to 175%, or about 175% to 200% improved ability to evade human NAb.

The polynucleotide encoding the capsid protein can comprise a sequence comprising either the native codons of the wild-type cap gene, or alternative codons selected to encode the same protein. The codon usage of the insertion can be varied. It is within the skill of those in the art to select appropriate nucleotide sequences and to derive alternative nucleotide sequences to encode any capsid protein of the disclosure. Reverse translation of the protein sequence can be performed using the codon usage table of the host organism, i.e. Eukaryotic codon usage for humans.

In some embodiments, the disclosure provides a polynucleotide encoding an AAV9 derived capsid protein comprising a sequence at least 80%, 85%, 90%, 95%, 99%, or 100% identical to any one of SEQ ID NOs: 402-410 and 464-468.

In some embodiments, the disclosure provides a polynucleotide encoding an AAV5/AAV9 chimeric capsid protein comprising a sequence at least 80%, 85%, 90%, 95%, 99%, or 100% identical to any one of SEQ ID NOs: 421-444.

In some embodiments, the disclosure provides a polynucleotide encoding an combinatory capsid protein comprising a sequence at least 80%, 85%, 90%, 95%, 99%, or 100% identical to any one of SEQ ID NO: 445-462.

In some embodiments, the disclosure provides an AAV9, AAV5/AAV9 chimeric, or combinatory capsid protein comprising a sequence at least 80%, 85%, 90%, 95%, 99%, or 100% identical to a modified capsid selected from SEQ ID NOs: 402-410, 421-462, 464-468, wherein the amino acid substitutions, optionally conservative substitutions, with the specified percent identity level are tolerated.

Gene Product

In some embodiments, the rAAV virion of the present disclosure comprises a heterologous nucleic acid comprising a nucleotide sequence that encodes one or more gene products selected from MYBPC3, KCNH2, TRPM4, DSG2, ATP2A2, CACNA1C, DMD, DMPK, EPG5, EVC, EVC2, FBN1, NF1, SCN5A, SOS1, NPR1, ERBB4, VIP, MYH7, or a mutant, variant, or fragment thereof.

In some embodiments, the rAAV virion of the present disclosure comprises a heterologous nucleic acid comprising a nucleotide sequence that encodes one or more gene products selected from ASCL1, MYOCD, MEF2C, and TBX5. In some embodiments, the rAAV virion of the present disclosure comprises a heterologous nucleic acid comprising a nucleotide sequence that encodes one or more gene products selected from ASCL1, MYOCD, MEF2C, AND TBX5, CCNB1, CCND1, CDK1, CDK4, AURKB, OCT4, BAF60C, ESRRG, GATA4, GATA6, HAND2, IRX4, ISLL, MESP1, MESP2, NKX2.5, SRF, TBX20, ZFPM2, and MIR-133.

In some embodiments, the rAAV virion of the present disclosure comprises a heterologous nucleic acid comprising a nucleotide sequence that encodes one or more gene products selected from MYBPC3, DWORF, KCNH2, TRPM4, DSG2, PKP2 and ATP2A2.

In some embodiments, the rAAV virion of the present disclosure comprises a heterologous nucleic acid comprising a nucleotide sequence that encodes one or more gene products selected from CACNA1C, DMD, DMPK, EPG5, EVC, EVC2, FBN1, NF1, SCN5A, SOS1, NPR1, ERBB4, VIP, MYH7, and Cas9.

In some embodiments, the rAAV virion of the present disclosure comprises a heterologous nucleic acid comprising a nucleotide sequence that encodes one or more gene products selected from MYOCD, ASCL1, GATA4, MEF2C, TBX5, miR-133, and MESP1.

Definitions

Unless the context indicates otherwise, the features of the invention can be used in any combination. Any feature or combination of features set forth can be excluded or omitted. Certain features of the invention, which are described in separate embodiments may also be provided in combination in a single embodiment. Features of the invention, which are described in a single embodiment may also be provided separately or in any suitable sub-combination. All combinations of the embodiments are disclosed herein as if each and every combination were individually disclosed. All sub-combinations of the embodiments and elements are disclosed herein as if every such sub-combination were individually disclosed.

Unless defined otherwise, all technical and scientific terms used herein have the same meaning as commonly understood by one of ordinary skill in the art to which this invention belongs. The detailed description is divided into sections only for the reader's convenience and disclosure found in any section may be combined with that in another section. Although any methods and materials similar or equivalent to those described herein can also be used in the practice or testing of the present invention, the exemplary methods and materials are now described. All publications mentioned herein are incorporated by reference to disclose and describe the methods and/or materials in connection with which the publications are cited. Reference to a publication is not an admission that the publication is prior art.

The singular forms "a," "an," and "the" include plural referents unless the context clearly dictates otherwise. For example, reference to "a recombinant AAV virion" includes a plurality of such virions and reference to "the cardiac cell" includes one or more cardiac cells.

The conjunction "and/or" means both "and" and "or," and lists joined by "and/or" encompasses all possible combinations of one or more of the listed items.

The term "vector" refers to a macromolecule or complex of molecules comprising a polynucleotide or protein to be delivered to a cell.

"AAV" is an abbreviation for adeno-associated virus. The term covers all subtypes of AAV, except where a subtype is indicated, and to both naturally occurring and recombinant forms. The abbreviation "rAAV" refers to recombinant adeno-associated virus. "AAV" includes AAV or any subtype. "AAV5" refers to AAV subtype 5. "AAV9" refers to AAV subtype 9. The genomic sequences of various serotypes of AAV, as well as the sequences of the native inverted terminal repeats (ITRs), Rep proteins, and capsid subunits may be found in the literature or in public databases such as GenBank. See, e.g., GenBank Accession Numbers NC_002077 (AAV1), AF063497 (AAV1), NC_001401 (AAV2), AF043303 (AAV2), NC_001729 (AAV3), NC_001829 (AAV4), U89790 (AAV4), NC_006152 (AAV5), AF513851 (AAV7), AF513852 (AAV8), NC_006261 (AAV8), and AY530579 (AAV9). Publications describing AAV include Srivistava et al. (1983) *J. Virol.* 45:555; Chiorini et al. (1998) *J. Virol.* 71:6823; Chiorini et al. (1999) *J. Virol.* 73:1309; Bantel-Schaal et al. (1999) *J. Virol.* 73:939; Xiao et al. (1999) *J. Virol.* 73:3994; Muramatsu et al. (1996) *Virol.* 221:208; Shade et al. (1986) *J. Virol.* 58:921; Gao et al. (2002) *Proc. Nat. Acad. Sci. USA* 99: 11854; Moris et al. (2004) *Virology* 33:375-383; Int'l Pat. Publ Nos. WO2018/222503A1, WO2012/145601A2, WO2000/028061A2, WO1999/61601A2, and WO1998/11244A2; U.S. patent application Ser. Nos. 15/782,980 and 15/433,322; and U.S. Pat. Nos. 10,036,016, 9,790,472, 9,737,618, 9,434,928, 9,233,131, 8,906,675, 7,790,449, 7,906,111, 7,718,424, 7,259,151, 7,198,951, 7,105,345, 6,962,815, 6,984,517, and 6,156,303.

An "AAV vector" or "rAAV vector" as used in the art to refer either to the DNA packaged into in the rAAV virion or to the rAAV virion itself, depending on context. As used herein, unless otherwise apparent from context, rAAV vector refers to a nucleic acid (typically a plasmid) comprising a polynucleotide sequence capable of being packaged into an rAAV virion, but with the capsid or other proteins of the rAAV virion. Generally an rAAV vector comprises a heterologous polynucleotide sequence (i.e., a polynucleotide not of AAV origin) and one or two AAV inverted terminal repeat sequences (ITRs) flanking the heterologous polynucleotide sequence. Only one of the two ITRs may be packaged into the rAAV and yet infectivity of the resulting rAAV virion may be maintained. See Wu et al. (2010) *Mol Ther.* 18:80. An rAAV vector may be designed to generate either single-stranded (ssAAV) or self-complementary (scAAV). See McCarty D. (2008) *Mo. Ther.* 16:1648-1656; WO2001/11034; WO2001/92551; WO2010/129021.

An "rAAV virion" refers to an extracellular viral particle including at least one viral capsid protein (e.g. VP1) and an encapsidated rAAV vector (or fragment thereof), including the capsid proteins.

For brevity and clarity, the disclosure refers to "capsid protein" or "capsid proteins." Those skilled in the art understand that such references refer to VP1, VP2, or VP3, or combinations of VP1, VP2, and VP3. As in wild-type AAV and most recombinant expression systems VP1, VP2, and VP3 are expressed from the same open reading frame, engineering of the sequence that encodes VP3 inevitably alters the sequences of the C-terminal domain of VP1 and VP2. One may also express the capsid proteins from different open reading frames, in which case the capsid of the resulting rAAV virion could contain a mixture of wild-type and engineered capsid proteins, and mixtures of different engineered capsid proteins.

The term "inverted terminal repeats" or "ITRs" as used herein refers to AAV viral cis-elements named so because of their symmetry. These elements are essential for efficient multiplication of an AAV genome. Without being bound by theory, it is believed that the minimal elements indispensable for ITR function are a Rep-binding site and a terminal resolution site plus a variable palindromic sequence allowing for hairpin formation. The disclosure contemplates that alternative means of generating an AAV genome may exist or may be prospectively developed to be compatible with the capsid proteins of the disclosure.

"Helper virus functions" refers to functions encoded in a helper virus genome which allow AAV replication and packaging.

"Packaging" refers to a series of intracellular events that result in the assembly of an rAAV virion including encapsidation of the rAAV vector. AAV "rep" and "cap" genes refer to polynucleotide sequences encoding replication and encapsidation proteins of adeno-associated virus. AAV rep and cap are referred to herein as AAV "packaging genes." Packaging requires either a helper virus itself or, more commonly in recombinant systems, helper virus function supplied by a helper-free system (i.e. one or more helper plasmids).

A "helper virus" for AAV refers to a virus that allows AAV (e.g. wild-type AAV) to be replicated and packaged by a mammalian cell. The helper viruses may be an adenovirus, herpesvirus or poxvirus, such as vaccinia.

An "infectious" virion or viral particle is one that comprises a competently assembled viral capsid and is capable of delivering a polynucleotide component into a cell for which the virion is tropic. The term does not necessarily imply any replication capacity of the virus.

"Infectivity" refers to a measurement of the ability of a virion to inflect a cell. Infectivity can be expressed as the ratio of infectious viral particles to total viral particles. Infectivity is general determined with respect to a particular cell type. It can be measured both in vivo or in vitro. Methods of determining the ratio of infectious viral particle to total viral particle are known in the art. See, e.g., Grainger et al. (2005) *Mol. Ther.* 11:S337 (describing a $TCID_{50}$ infectious titer assay); and Zolotukhin et al. (1999) *Gene Ther.* 6:973.

The terms "parental capsid" or "parental sequence" refer to a reference sequence from which a particle capsid or sequence is derived. Unless otherwise specified, parental sequence refers to the sequence of the wild-type capsid protein of the same serotype as the engineered capsid protein.

A "replication-competent" virus (e.g. a replication-competent AAV) refers to a virus that is infectious, and is also capable of being replicated in an infected cell (i.e. in the presence of a helper virus or helper virus functions). In some embodiments, the rAAV virion of the disclosure comprises a genome that lacks the rep gene, or both the rep and cap genes, and therefore is replication incompetent.

The practice of the present disclosure will employ, unless otherwise indicated, conventional techniques of tissue culture, immunology, molecular biology, cell biology and recombinant DNA, which are within the skill of the art. See, e.g., Sambrook and Russell eds. (2001) Molecular Cloning: A Laboratory Manual, $3^{rd}$ edition; Ausubel et al. eds. (2007) Current Protocols in Molecular Biology; Methods in Enzymology (Academic Press, Inc., N.Y.); MacPherson et al. (1991) PCR 1: A Practical Approach (IRL Press at Oxford University Press); MacPherson et al. (1995) PCR 2: A Practical Approach; Harlow and Lane eds. (1999) Antibodies, A Laboratory Manual; Freshney (2005) Culture of Animal Cells: A Manual of Basic Technique, $5^{th}$ edition; Gait ed. (1984) Oligonucleotide Synthesis; U.S. Pat. No. 4,683,195; Hames and Higgins eds. (1984) Nucleic Acid Hybridization; Anderson (1999) Nucleic Acid Hybridization; Hames and Higgins eds. (1984) Transcription and Translation; IRL Press (1986) Immobilized Cells and Enzymes; Perbal (1984) A Practical Guide to Molecular Cloning; Miller and Calos eds. (1987) Gene Transfer Vectors for Mammalian Cells (Cold Spring Harbor Laboratory); Makrides ed. (2003) Gene Transfer and Expression in Mammalian Cells; Mayer and Walker eds. (1987) Immunochemical Methods in Cell and Molecular Biology (Academic Press, London); Herzenberg et al. eds (1996) Weir's Handbook of Experimental Immunology; Manipulating the Mouse Embryo: A Laboratory Manual, $3^{rd}$ edition (2002) Cold Spring Harbor Laboratory Press; Sohail (2004) Gene Silencing by RNA Interference: Technology and Application (CRC Press); and Sell (2013) Stem Cells Handbook.

The terms "nucleic acid" and "polynucleotide" are used interchangeably and refer to a polymeric form of nucleotides of any length, either deoxyribonucleotides or ribonucleotides, or analogs thereof. Non-limiting examples of polynucleotides include linear and circular nucleic acids, messenger RNA (mRNA), cDNA, recombinant polynucleotides, vectors, probes, and primers. Unless otherwise specified or required, any embodiment of the invention described herein that is a polynucleotide encompasses both the double-stranded form and each of two complementary single-stranded forms known or predicted to make up the double-stranded form.

The terms "polypeptide" and "protein," are used interchangeably herein and refer to a polymeric form of amino acids of any length, which can include genetically coded and non-genetically coded amino acids, chemically or biochemically modified or derivatized amino acids, and polypeptides having modified peptide backbones. The terms also encompass an amino acid polymer that has been modified; for example, disulfide bond formation, glycosylation, lipidation, phosphorylation, or conjugation with a labeling component.

The term "peptide" refers to a short polypeptide, e.g. a peptide having between about 4 and 30 amino acid residues.

The term "isolated" means separated from constituents, cellular and otherwise, in which the virion, cell, tissue, polynucleotide, peptide, polypeptide, or protein is normally associated in nature. For example, an isolated cell is a cell that is separated form tissue or cells of dissimilar phenotype or genotype.

As used herein, "sequence identity" or "identity" refers to the percentage of number of amino acids that are identical between a sequence of interest and a reference sequence. Generally identity is determined by aligning the sequence of interest to the reference sequence, determining the number of amino acids that are identical between the aligned sequences, dividing that number by the total number of amino acids in the reference sequence, and multiplying the result by 100 to yield a percentage. Sequences can be aligned using various computer programs, such BLAST, available at ncbi.nlm.nih.gov. Other techniques for alignment are described in Methods in Enzymology, vol. 266: Computer Methods for Macromolecular Sequence Analysis (1996); and *Meth. Mol. Biol.* 70: 173-187 (1997); *J. Mol. Biol.* 48: 44. Skill artisans are capable of choosing an appropriate alignment method depending on various factors including sequence length, divergence, and the presence of absence of insertions or deletions with respect to the reference sequence.

"Recombinant," as applied to a polynucleotide means that the polynucleotide is the product of various combinations of cloning, restriction or ligation steps, and other procedures that result in a construct that is distinct from a polynucleotide found in nature, or that the polynucleotide is assembled from synthetic oligonucleotides. A "recombinant" protein is a protein produced from a recombinant polypeptide. A recombinant virion is a virion that comprises a recombinant polynucleotide and/or a recombinant protein, e.g. a recombinant capsid protein.

A "gene" refers to a polynucleotide containing at least one open reading frame that is capable of encoding a particular protein after being transcribed and translated. A "gene product" is a molecule resulting from expression of a particular gene. Gene products may include, without limitation, a polypeptide, a protein, an aptamer, an interfering RNA, or an mRNA. Gene-editing systems (e.g. a CRISPR/Cas system) may be described as one gene product or as the several gene products required to make the system (e.g. a Cas protein and a guide RNA).

A "short hairpin RNA," or shRNA, is a polynucleotide construct used to express an siRNA.

A "control element" or "control sequence" is a nucleotide sequence involved in an interaction of molecules that contributes to the functional regulation of a polynucleotide, including replication, duplication, transcription, splicing, translation, or degradation of the polynucleotide. The regulation may affect the frequency, speed, or specificity of the process, and may be enhancing or inhibitory in nature. Control elements include transcriptional regulatory sequences such as promoters and/or enhancers.

A "promoter" is a DNA sequence capable under certain conditions of binding RNA polymerase and initiating transcription of a coding region usually located downstream (in the 3' direction) from the promoter. The term "tissue-specific promoter" as used herein refers to a promoter that is operable in cells of a particular organ or tissue, such as the cardiac tissue.

"Operatively linked" or "operably linked" refers to a juxtaposition of genetic elements, wherein the elements are in a relationship permitting them to operate in the expected manner. For instance, a promoter is operatively linked to a coding region if the promoter helps initiate transcription of the coding sequence. There may be intervening residues between the promoter and coding region so long as this functional relationship is maintained.

An "expression vector" is a vector comprising a coding sequence which encodes a gene product of interest used to effect the expression of the gene product in target cells. An expression vector comprises control elements operatively linked to the coding sequence to facilitate expression of the gene product.

The term "expression cassette" refers to a heterologous polynucleotide comprising a coding sequence which encodes a gene product of interest used to effect the expression of the gene product in target cells. Unless otherwise specified, the expression cassette of an AAV vector include the polynucleotides between (and not including) the ITRs.

The term "gene delivery" or "gene transfer" as used herein refers to methods or systems for reliably inserting foreign nucleic acid sequences, e.g., DNA, into host cells. Such methods can result in transient expression of non-integrated transferred DNA, extrachromosomal replication and expression of transferred replicons (e.g., episomes), or integration of transferred genetic material into the genomic DNA of host cells.

"Heterologous" means derived from a genotypically distinct entity from that of the rest of the entity to which it is being compared. For example, a polynucleotide introduced by genetic engineering techniques into a plasmid or vector derived from a different species is a heterologous polynucleotide. A promoter removed from its native coding sequence and operatively linked to a coding sequence with which it is not naturally found linked is a heterologous promoter. Thus, for example, an rAAV that includes a heterologous nucleic acid is an rAAV that includes a nucleic acid not normally included in a naturally-occurring AAV.

The terms "genetic alteration" and "genetic modification" (and grammatical variants thereof), are used interchangeably herein to refer to a process wherein a genetic element (e.g., a polynucleotide) is introduced into a cell other than by mitosis or meiosis. The element may be heterologous to the cell, or it may be an additional copy or improved version of an element already present in the cell. Genetic alteration may be effected, for example, by transfecting a cell with a recombinant plasmid or other polynucleotide through any process known in the art, such as electroporation, calcium phosphate precipitation, or contacting with a polynucleotide-liposome complex. Genetic alteration may also be effected, for example, by transduction or infection with a vector.

A cell is said to be "stably" altered, transduced, genetically modified, or transformed with a polynucleotide sequence if the sequence is available to perform its function during extended culture of the cell in vitro. Generally, such a cell is "heritably" altered (genetically modified) in that a genetic alteration is introduced which is also inheritable by progeny of the altered cell.

The term "transfection" is as used herein refers to the uptake of an exogenous nucleic acid molecule by a cell. A cell has been "transfected" when exogenous nucleic acid has been introduced inside the cell membrane. A number of transfection techniques are generally known in the art. See, e.g., Graham et al. (1973) *Virology,* 52:456, Sambrook et al. (1989) Molecular Cloning, a laboratory manual, Cold Spring Harbor Laboratories, New York, Davis et al. (1986) Basic Methods in Molecular Biology, Elsevier, and Chu et al. (1981) *Gene* 13:197. Such techniques can be used to introduce one or more exogenous nucleic acid molecules into suitable host cells.

The term "transduction" is as used herein refers to the transfer of an exogenous nucleic acid into a cell by a recombinant virion, in contrast to "infection" by a wild-type virion. When infection is used with respect to a recombinant virion, the terms "transduction" and "infectious" are synonymous, and therefore "infectivity" and "transduction efficiency" are equivalent and can be determined using similar methods.

Unless otherwise specified, all medical terminology is given the ordinary meaning of the term used by medical professional as, for example, in *Harrison's Principles of Internal Medicine,* 15ed., which is incorporated by reference in its entirety for all purposes, in particular the chapters on cardiac or cardiovascular diseases, disorders, conditions, and dysfunctions.

"Treatment," "treating," and "treat" are defined as acting upon a disease, disorder, or condition with an agent to reduce or ameliorate harmful or any other undesired effects of the disease, disorder, or condition and/or its symptoms.

"Administration," "administering" and the like, when used in connection with a composition of the invention refer both to direct administration (administration to a subject by a medical professional or by self-administration by the subject) and/or to indirect administration (prescribing a composition to a patient). Typically, an effective amount is administered, which amount can be determined by one of skill in the art. Any method of administration may be used. Administration to a subject can be achieved by, for example, intravenous, intraarterial, intramuscular, intravascular, or intramyocardial delivery.

As used herein the term "effective amount" and the like in reference to an amount of a composition refers to an amount that is sufficient to induce a desired physiologic outcome (e.g., reprogramming of a cell or treatment of a disease). An effective amount can be administered in one or more administrations, applications or dosages. Such delivery is dependent on a number of variables including the time period which the individual dosage unit is to be used, the bioavailability of the composition, the route of administration, etc. It is understood, however, that specific amounts of the compositions (e.g., rAAV virions) for any particular subject depends upon a variety of factors including the activity of the specific agent employed, the age, body weight, general health, sex, and diet of the subject, the time of administration, the rate of excretion, the composition combination, severity of the particular disease being treated and form of administration.

The terms "individual," "subject," and "patient" are used interchangeably herein, and refer to a mammal, including, but not limited to, human and non-human primates (e.g., simians); mammalian sport animals (e.g., horses); mammalian farm animals (e.g., sheep, goats, etc.); mammalian pets (e.g., dogs, cats, etc.); and rodents (e.g., mice, rats, etc.).

The terms "cardiac pathology" or "cardiac dysfunction" are used interchangeably and refer to any impairment in the heart's pumping function. This includes, for example, impairments in contractility, impairments in ability to relax (sometimes referred to as diastolic dysfunction), abnormal or improper functioning of the heart's valves, diseases of the heart muscle (sometimes referred to as cardiomyopathies), diseases such as angina pectoris, myocardial ischemia and/or infarction characterized by inadequate blood supply to the heart muscle, infiltrative diseases such as amyloidosis and hemochromatosis, global or regional hypertrophy (such as may occur in some kinds of cardiomyopathy or systemic hypertension), and abnormal communications between chambers of the heart.

As used herein, the term "cardiomyopathy" refers to any disease or dysfunction that affects myocardium directly. The etiology of the disease or disorder may be, for example, inflammatory, metabolic, toxic, infiltrative, fibroplastic, hematological, genetic, or unknown in origin. Two fundamental forms are recognized (1) a primary type, consisting of heart muscle disease of unknown cause; and (2) a secondary type, consisting of myocardial disease of known cause or associated with a disease involving other organ systems. "Specific cardiomyopathy" refers to heart diseases associated with certain systemic or cardiac disorders; examples include hypertensive and metabolic cardiomyopathy. The cardiomyopathies include dilated cardiomyopathy (DCM), a disorder in which left and/or right ventricular systolic pump function is impaired, leading to progressive cardiac enlargement; hypertrophic cardiomyopathy, characterized by left ventricular hypertrophy without obvious causes such as hypertension or aortic stenosis; and restrictive cardiomyopathy, characterized by abnormal diastolic function and excessively rigid ventricular walls that impede ventricular filling. Cardiomyopathies also include left ventricular non-compaction, arrhythmogenic right ventricular cardiomyopathy, and arrhythmogenic right ventricular dysplasia.

"Heart failure" refers to the pathological state in which an abnormality of cardiac function is responsible for failure of the hear to pump blood at a rate commensurate with the requirements of the metabolizing tissues and/or allows the heart to do so only from an abnormally elevated diastolic volume. Heart failure includes systolic and diastotic failure. Patient with heart failure are classified into those with low cardiac output (typically secondary to ischemic heart disease, hypertension, dilated cardiomyopathy, and/or valvular or pericardial disease) and those with elevated cardiac output (typically due to hyperthyroidism, anemia, pregnancy, arteriovenous fistulas, beriberi, and Paget's disease). Heart failure includes heart failure with reduced ejection fraction (HFrEF) and heart failure with preserved ejection fraction (HFpEF).

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The term "purified" as used herein refers to material that has been isolated under conditions that reduce or eliminate the presence of unrelated materials, i.e. impurities, including native materials from which the material is obtained. For example, purified rAAV vector DNA is preferably substantially free of cell or culture components, including tissue culture components, contaminants, and the like.

The terms "regenerate," "regeneration" and the like as used herein in the context of injured cardiac tissue shall be given their ordinary meanings and shall also refer to the process of growing and/or developing new cardiac tissue in a heart or cardiac tissue that has been injured, for example, injured due to ischemia, infarction, reperfusion, or other disease. In some embodiments, cardiac tissue regeneration comprises generation of cardiomyocytes.

The term "therapeutic gene" as used herein refers to a gene that, when expressed, confers a beneficial effect on the cell or tissue in which it is present, or on a mammal in which the gene is expressed. Examples of beneficial effects include amelioration of a sign or symptom of a condition or disease, prevention or inhibition of a condition or disease, or conferral of a desired characteristic. Therapeutic genes include genes that partially or wholly correct a genetic deficiency in a cell or mammal.

As used herein, the term "functional cardiomyocyte" refers to a differentiated cardiomyocyte that is able to send or receive electrical signals. In some embodiments, a cardiomyocyte is said to be a functional cardiomyocyte if it exhibits electrophysiological properties such as action potentials and/or $Ca^{2+}$ transients.

As used herein, a "differentiated non-cardiac cell" can refer to a cell that is not able to differentiate into all cell types of an adult organism (i.e., is not a pluripotent cell), and which is of a cellular lineage other than a cardiac lineage (e.g., a neuronal lineage or a connective tissue lineage). Differentiated cells include, but are not limited to, multipotent cells, oligopotent cells, unipotent cells, progenitor cells, and terminally differentiated cells. In particular embodiments, a less potent cell is considered "differentiated" in reference to a more potent cell.

A "somatic cell" is a cell forming the body of an organism. Somatic cells include cells making up organs, skin, blood, bones and connective tissue in an organism, but not germ cells.

As used herein, the term "totipotent" means the ability of a cell to form all cell lineages of an organism. For example, in mammals, only the zygote and the first cleavage stage blastomeres are totipotent.

As used herein, the term "pluripotent" means the ability of a cell to form all lineages of the body or soma. For example, embryonic stem cells are a type of pluripotent stem cells that are able to form cells from each of the three germs layers, the ectoderm, the mesoderm, and the endoderm. Pluripotent cells can be recognized by their expression of markers such as Nanog and Rex1.

As used herein, the term "multipotent" refers to the ability of an adult stem cell to form multiple cell types of one lineage. For example, hematopoietic stem cells are capable of forming all cells of the blood cell lineage, e.g., lymphoid and myeloid cells.

As used herein, the term "oligopotent" refers to the ability of an adult stem cell to differentiate into only a few different cell types. For example, lymphoid or myeloid stem cells are capable of forming cells of either the lymphoid or myeloid lineages, respectively.

As used herein, the term "unipotent" means the ability of a cell to form a single cell type. For example, spermatogonial stem cells are only capable of forming sperm cells.

As used herein, the term "reprogramming" or "transdifferentiation" refers to the generation of a cell of a certain lineage (e.g., a cardiac cell) from a different type of cell (e.g., a fibroblast cell) without an intermediate process of de-differentiating the cell into a cell exhibiting pluripotent stem cell characteristics.

As used herein the term "cardiac cell" refers to any cell present in the heart that provides a cardiac function, such as heart contraction or blood supply, or otherwise serves to maintain the structure of the heart. Cardiac cells as used herein encompass cells that exist in the epicardium, myocardium or endocardium of the heart. Cardiac cells also include, for example, cardiac muscle cells or cardiomyocytes, and cells of the cardiac vasculatures, such as cells of a coronary artery or vein. Other non-limiting examples of cardiac cells include epithelial cells, endothelial cells, fibroblasts, cardiac stem or progenitor cells, cardiac conducting cells and cardiac pacemaking cells that constitute the cardiac muscle, blood vessels and cardiac cell supporting structure. Cardiac cells may be derived from stem cells, including, for example, embryonic stem cells or induced pluripotent stem cells.

The term "cardiomyocyte" or "cardiomyocytes" as used herein refers to sarcomere-containing striated muscle cells, naturally found in the mammalian heart, as opposed to skeletal muscle cells. Cardiomyocytes are characterized by the expression of specialized molecules e.g., proteins like myosin heavy chain, myosin light chain, cardiac α-actinin. The term "cardiomyocyte" as used herein is an umbrella term comprising any cardiomyocyte subpopulation or cardiomyocyte subtype, e.g., atrial, ventricular and pacemaker cardiomyocytes.

The term "cardiomyocyte-like cells" is intended to mean cells sharing features with cardiomyocytes, but which may not share all features. For example, a cardiomyocyte-like cell may differ from a cardiomyocyte in expression of certain cardiac genes.

The term "culture" or "cell culture" means the maintenance of cells in an artificial, in vitro environment. A "cell culture system" is used herein to refer to culture conditions in which a population of cells may be grown as monolayers or in suspension. "Culture medium" is used herein to refer to a nutrient solution for the culturing, growth, or proliferation of cells. Culture medium may be characterized by functional properties such as, but not limited to, the ability to maintain cells in a particular state (e.g., a pluripotent state, a quiescent state, etc.), to mature cells—in some instances, specifically, to promote the differentiation of progenitor cells into cells of a particular lineage (e.g., a cardiomyocyte).

As used herein, the term "expression" or "express" refers to the process by which polynucleotides are transcribed into mRNA and/or the process by which the transcribed mRNA is subsequently being translated into peptides, polypeptides, or proteins. If the polynucleotide is derived from genomic DNA, expression may include splicing of the mRNA in a eukaryotic cell. The expression level of a gene may be determined by measuring the amount of mRNA or protein in a cell or tissue sample.

The term "induced cardiomyocyte" or the abbreviation "iCM" refers to a non-cardiomyocyte (and its progeny) that has been transformed into a cardiomyocyte (and/or cardiomyocyte-like cell). The methods of the present disclosure can be used in conjunction with any methods now known or later discovered for generating induced cardiomyocytes, for example, to enhance other techniques.

The term "induced pluripotent stem cell-derived cardiomyocytes" as used herein refers to human induced pluripotent stem cells that have been differentiated into cardiomyocyte-like cells. Exemplary methods for prepared iPS-CM cells are provided by Karakikes et al. *Circ Res.* 2015 Jun. 19; 117(1): 80-88.

The terms "human cardiac fibroblast" and "mouse cardiac fibroblast" as used herein refer to primary cell isolated from the ventricles of the adult heart of a human or mouse, respectively, and maintain in culture ex vivo.

The term "non-cardiomyocyte" as used herein refers to any cell or population of cells in a cell preparation not fulfilling the criteria of a "cardiomyocyte" as defined and used herein. Non-limiting examples of non-cardiomyocytes include somatic cells, cardiac fibroblasts, non-cardiac fibroblasts, cardiac progenitor cells, and stem cells.

As used herein "reprogramming" includes transdifferentiation, dedifferentiation and the like.

As used herein, the term "reprogramming efficiency" refers to the number of cells in a sample that are successfully reprogrammed to cardiomyocytes relative to the total number of cells in the sample.

The term "reprogramming factor" as used herein includes a factor that is introduced for expression in a cell to assist in the reprogramming of the cell from one cell type into another. For example, a reprogramming factor may include a transcription factor that, in combination with other transcription factors and/or small molecules, is capable of reprogramming a cardiac fibroblast into an induced cardiomyocyte. Unless otherwise clear from context, a reprogramming factor refers to a polypeptide that can be encoded by an AAV-delivered polynucleotide. Reprogramming factors may also include small molecules.

The term "stem cells" refer to cells that have the capacity to self-renew and to generate differentiated progeny. The term "pluripotent stem cells" refers to stem cells that can give rise to cells of all three germ layers (endoderm, mesoderm and ectoderm), but do not have the capacity to give rise to a complete organism.

As used herein, the term "equivalents thereof" in reference to a polypeptide or nucleic acid sequence refers to a polypeptide or nucleic acid that differs from a reference polypeptide or nucleic acid sequence, but retains essential properties (e.g., biological activity). A typical variant of a polynucleotide differs in nucleotide sequence from another, reference polynucleotide. Changes in the nucleotide sequence of the variant may or may not alter the amino acid sequence of a polypeptide encoded by the reference polynucleotide. Nucleotide changes may result in amino acid substitutions, deletions, additions, fusions and truncations in the polypeptide encoded by the reference sequence. Generally, differences are limited so that the sequences of the reference polypeptide and the variant are closely similar overall and, in many regions, identical.

As used herein, the term "progenitor cell" refers to a cell that is committed to differentiate into a specific type of cell or to form a specific type of tissue. A progenitor cell, like a stem cell, can further differentiate into one or more kinds of cells, but is more mature than a stem cell such that it has a more limited/restricted differentiation capacity.

The term "genetic modification" refers to a permanent or transient genetic change induced in a cell following introduction of new nucleic acid (i.e., nucleic acid exogenous to the cell). Genetic change can be accomplished by incorporation of the new nucleic acid into the genome of the cardiac cell, or by transient or stable maintenance of the new nucleic acid as an extrachromosomal element. Where the cell is a eukaryotic cell, a permanent genetic change can be achieved by introduction of the nucleic acid into the genome of the cell. Suitable methods of genetic modification include viral infection, transfection, conjugation, protoplast fusion, electroporation, particle gun technology, calcium phosphate precipitation, direct microinjection, and the like.

The term "stem cells" refer to cells that have the capacity to self-renew and to generate differentiated progeny. The term "pluripotent stem cells" refers to stem cells that can give rise to cells of all three germ layers (endoderm, mesoderm and ectoderm), but do not have the capacity to give rise to a complete organism. In some embodiments, the compositions for inducing cardiomyocyte phenotype can be used on a population of cells to induce reprogramming. In other embodiments, the compositions induce a cardiomyocyte phenotype.

The term "induced pluripotent stem cells" shall be given its ordinary meaning and shall also refer to differentiated mammalian somatic cells (e.g., adult somatic cells, such as skin) that have been reprogrammed to exhibit at least one characteristic of pluripotency. See, for example, Takahashi et al. (2007) *Cell* 131(5):861-872, Kim et al. (2011) *Proc. Natl. Acad. Sci.* 108(19): 7838-7843, Sell (2013) Stem Cells Handbook.

The term "transduction efficiency" refers to the percentage of cells transduced with at least one AAV genome. For example, if $1 \times 10^6$ cells are exposed to a virus and $0.5 \times 10^6$ cells are determined to contain at least one copy of the AAV genome, then the transduction efficiency is 50%. An illustrative method for determining transduction efficiency is flow cytometry. For example, the percentage of GFP+ cells is a measure of transduction efficiency when the AAV genome comprises a polynucleotide encoding green fluorescence protein (GFP).

The term "selectivity" refers to the ratio of transduction efficiency for one cell type over another, or over all other cells types.

The term "infectivity" refers to the ability of an AAV virion to infect a cell, in particularly an in vivo cell. Infectivity therefore is a function of, at least, biodistribution and neutralizing antibody escape.

Unless stated otherwise, the abbreviations used throughout the specification have the following meanings: AAV, adeno-associated virus; rAAV, recombinant adeno-associated virus; AHCF, adult human cardiac fibroblast; APCF, adult pig cardiac fibroblast, a-MHC-GFP; alpha-myosin heavy chain green fluorescence protein; CF, cardiac fibroblast; cm, centimeter; CO, cardiac output; EF, ejection fraction; FACS, fluorescence activated cell sorting; GFP, green fluorescence protein; GMT, Gata4, Mef2c and Tbx5; GMTc, Gata4, Mef2c, Tbx5, TGF-βi, WNTi; GO, gene ontology; hCF, human cardiac fibroblast; iCM, induced cardiomyocyte; kg, killigram; µg, microgram; µl, microliter; mg, milligram; ml, milliliter; MI, myocardial infarction; msec, millisecond; min, minute; MyAMT, Myocardin, Ascl1, Mef2c and Tbx5; MyA, Myocardin and Ascl1; MyMT, Myocardin, Mef2c and Tbx5; MyMTc, Myocardin, Mef2c, Tbx5, TGF-βi, WNTi; MRI, magnetic resonance imaging; PBS, phosphate buffered saline; PBST, phosphate buffered saline, triton; PFA, paraformaldehyde; qPCR, quantitative polymerase chain reaction; qRT-PCR, quantitative reverse transcriptase polymerase chain reaction; RNA, ribonucleic acid; RNA-seq, RNA sequencing; RT-PCR, reverse transcriptase polymerase chain reaction; sec, second; SV, stroke volume; TGF-β, transforming growth factor beta; TGF-βi, transforming growth factor beta inhibitor; WNT, wingless-Int; WNTi, wingless-Int inhibitor; YFP, yellow fluorescence protein; 4F, Gata4, Mef2c, TBX5, and Myocardin; 4Fc, Gata4, Mef2c, TBX5, and Myocardin+TGF-βi and WNTi; 7F, Gata4, Mef2c, and Tbx5, Essrg, Myocardin, Zfpm2, and Mesp1; 7Fc, Gata4, Mef2c, and Tbx5, Essrg, Myocardin, Zfpm2, and Mesp1+TGF-β and WNTi.

The term "conservative amino-acid substitutions" refers to substitutions of amino acid residues that share similar sidechain physical properties with the residues being substituted. Conservative substitutions include polar for polar residues, non-polar for non-polar residues, hydrophobic for hydrophobic residues, small for small residues, and large for large residues. Conservative substitutions further comprise substitutions within the following groups: {S, T}, {A, G}, {F, Y}, {R, H, K, N, E}, {S, T, N, Q}, {C, U, G, P, A}, and {A, V, I, L, M, F, Y, W}.

Compositions

Efforts to identify capsid variants with properties useful for gene therapy have included shuffling the DNA of AAV2 and AAV5 cap genes as described in U.S. Pat. No. 9,233,131; as well as directed evolution as described in Int'l Pat. Appl. Nos. WO2012/145601A2 and WO2018/222503A1. The disclosures of these documents are incorporated here for all purposes, and particularly for the methods of making and using AAV virions and for the polynucleotide sequences and gene products therein disclosed, as well as for the combinations of transcription factors useful in treating cardiac diseases or disorders.

The AAV capsid is encoded by the cap gene of AAV, which is also termed the right open-reading frame (ORF) (in contrast to the left ORF, rep). The structures of representative AAV capsids are described in various publications including Xie et al. (2002) *Proc. Natl. Acad. Sci USA* 99:10405-1040 (AAV2); Govindasamy et al. (2006) *J. Virol.* 80:11556-11570 (AAV4); Nam et a. (2007) *J. Virol.* 81:12260-12271 (AAV8) and Govindasamy et al. (2013) *J. Virol.* 87:11187-11199 (AAV5).

The AAV capsid contain 60 copies (in total) of three viral proteins (VPs), VP1, VP2, and VP3, in a predicted ratio of 1:1:10, arranged with T=1 icosahedral symmetry. The three VPs are translated from the same mRNA, with VP1 containing a unique N-terminal domain in addition to the entire VP2 sequence at its C-terminal region. VP2 contains an extra N-terminal sequence in addition to VP3 at its C terminus. In most crystal structures, only the C-terminal polypeptide sequence common to all the capsid proteins (~530 amino acids) is observed. The N-terminal unique region of VP1, the VP1-VP2 overlapping region, and the first 14 to 16 N-terminal residues of VP3 are thought to be primarily disordered. Cryo-electron microscopy and image reconstruction data suggest that in intact AAV capsids, the N-terminal regions of the VP1 and VP2 proteins are located inside the capsid and are inaccessible for receptor and antibody binding. Thus, receptor attachment and transduction phenotypes are, generally, determined by the amino acid sequences within the common C-terminal domain of VP1, VP2 and VP3

In some embodiments, the one or more amino acid insertions, substitutions, or deletions is/are in the GH loop, or loop IV, of the AAV capsid protein, e.g., in a solvent-accessible portion of the GH loop, or loop IV, of the AAV capsid protein. For the GH loop/loop IV of AAV capsid, see, e.g., van Vliet et al. (2006) *Mol. Ther.* 14:809; Padron et al. (2005) *Virol.* 79:5047; and Shen et al. (2007) *Mol. Ther.* 15: 1955. In some embodiments, a "parental" AAV capsid protein is a wild-type AAV5 capsid protein. In some embodiments, a "parental" AAV capsid protein is a chimeric AAV capsid protein. Amino acid sequences of various AAV capsid proteins are known in the art. See, e.g., GenBank Accession No. NP_049542 for AAV1; GenBank Accession No. NP_044927 for AAV4; GenBank Accession No. AAD13756 for AAV5; GenBank Accession No. AAB95450 for AAV6; GenBank Accession No. YP_077178 for AAV7; GenBank Accession No. YP_077180 for AAV 8; GenBank Accession No. AAS99264 for AAV9 and GenBank Accession No. AAT46337 for AAV10. See, e.g., Santiago-Ortiz et al. (2015) *Gene Ther.* 22:934 for a predicted ancestral AAV capsid.

Adeno-associated virus (AAV) is a replication-deficient parvovirus, the single-stranded DNA genome of which is about 4.7 kb in length including two 145 nucleotide inverted terminal repeat (ITRs). There are multiple serotypes of AAV. The nucleotide sequences of the genomes of the AAV serotypes are known. For example, the AAV5 genome is provided in GenBank Accession No. AF085716. The life cycle and genetics of AAV are reviewed in Muzyczka, *Current Topics in Microbiology and Immunology,* 158: 97-129 (1992). Production of pseudotyped rAAV is disclosed in, for example, WO 01/83692. Other types of rAAV variants, for example rAAV with capsid mutations, are also contemplated. See, for example, Marsic et al., *Molecular Therapy,* 22(11): 1900-1909 (2014). Illustrative AAV vectors are provided in U.S. Pat. No. 7,105,345; U.S. Ser. No. 15/782,980; U.S. Pat. Nos. 7,259,151; 6,962,815; 7,718,424; 6,984,517; 7,718,424; 6,156,303; 8,524,446; 7,790,449; 7,906,111; 9,737,618; U.S. application Ser. No. 15/433,322; U.S. Pat. No. 7,198,951, each of which is incorporated by reference in its entirety for all purposes.

The rAAV virions of the disclosure comprise a heterologous nucleic acid comprising a nucleotide sequence encoding one or more gene product. The gene product(s) may be either a polypeptide or an RNA, or both. When the gene product is a polypeptide, the nucleotide sequence encodes a messenger RNA, optionally with one or more introns, which is translated into the gene product polypeptide. The nucleotide sequence may encode one, two, three, or more gene products (though the number is limited by the packaging capacity of the rAAV virion, typically about 5.2 kb). The gene products may be operatively linked to one promoter (for a single transcriptional unit) or more than one. Multiple gene products may also be produced using internal ribosome entry signal (IRES) or a self-cleaving peptide (e.g., a 2A peptide).

In some embodiments, the gene product is a polypeptide. In some embodiments, the polypeptide gene product is a polypeptide that induces reprogramming of a cardiac fibroblast, to generate an induced cardiomyocyte-like cell (iCM). In some embodiments, the polypeptide gene product is a polypeptide that enhances the function of a cardiac cell. In some embodiments, the polypeptide gene product is a polypeptide that provides a function that is missing or defective in the cardiac cell. In some embodiments, the polypeptide gene product is a genome-editing endonuclease.

In some embodiments, the gene product comprises a fusion protein that is fused to a heterologous polypeptide. In some embodiments, the gene product comprises a genome editing nuclease fused to an amino acid sequence that provides for subcellular localization, i.e., the fusion partner is a subcellular localization sequence (e.g., one or more nuclear localization signals (NLSs) for targeting to the nucleus, two or more NLSs, three or more NLSs, etc.).

In general, a viral vector is produced by introducing a viral DNA or RNA construct into a "producer cell" or "packaging cell" line. Packaging cell lines include but are not limited to any easily-transfectable cell line. Packaging cell lines can be based on HEK291, 293T cells, NIH3T3, COS, HeLa or Sf9 cell lines. Examples of packaging cell lines include but are not limited to: Sf9 (ATCC® CRL-1711™). Exemplary packing cell lines and methods for generating rAAV virions are provided by Int'l Pat. Pub. Nos. WO2017075627, WO2015/031686, WO2013/063379, WO2011/020710, WO2009/104964, WO2008/024998, WO2003/042361, and WO1995/013392; U.S. Pat. Nos. 9,441,206B2, 8,679,837, and 7,091,029B2.

In some embodiments, the gene product is a functional cardiac protein. In some embodiments, the gene product is a genome-editing endonuclease (optionally with a guide RNA, single-guide RNA, and/or repair template) that replaces or repairs a non-functional cardiac protein into a functional cardiac protein. Functional cardiac proteins include, but are not limited to cardiac troponin T; a cardiac sarcomeric protein; β-myosin heavy chain; myosin ventricular essential light chain 1; myosin ventricular regulatory light chain 2; cardiac a-actin; a-tropomyosin; cardiac troponin I; cardiac myosin binding protein C; four-and-a-half LIM protein 1; titin; 5'-AMP-activated protein kinase subunit gamma-2; troponin I type 3, myosin light chain 2, actin alpha cardiac muscle 1; cardiac LIM protein; caveolin 3 (CAV3); galactosidase alpha (GLA); lysosomal-associated membrane protein 2 (LAMP2); mitochondrial transfer RNA glycine (MTTG); mitochondrial transfer RNA isoleucine (MTTI); mitochondrial transfer RNA lysine (MTTK); mitochondrial transfer RNA glutamine (MTTQ); myosin light chain 3 (MYL3); troponin C (TNNC1); transthyretin (TTR); sarcoendoplasmic reticulum calcium-ATPase 2a (SERCA2a); stromal-derived factor-1 (SDF-1); adenylate cyclase-6 (AC6); beta-ARKct (β-adrenergic receptor kinase C terminus); fibroblast growth factor (FGF); platelet-derived growth factor (PDGF); vascular endothelial growth factor (VEGF); hepatocyte growth factor; hypoxia inducible growth factor; thymosin beta 4 (TMSB4X); nitric oxide synthase-3 (NOS3); unocartin 3 (UCN3); melusin; apolipoprotein-E (ApoE); superoxide dismutase (SOD); and S100A1 (a small calcium binding protein; see, e.g., Ritterhoff and Most (2012) *Gene Ther.* 19:613; Kraus et al. (2009) *Mol. Cell. Cardiol.* 47:445).

In some embodiments, the gene product is a gene product whose expression complements a defect in a gene responsible for a genetic disorder. The disclosure provides rAAV virions comprising a polynucleotide encoding one or more of the following—e.g., for use, without limitation, in the disorder indicated in parentheses, or for other disorders caused by each: TAZ (Barth syndrome); FXN (Freidrich's Ataxia); CASQ2 (CPVT); FBN1 (Marfan); RAF1 and SOS1s (Noonan); SCN5A (Brugada); KCNQ1 and KCNH2s (Long QT Syndrome); DMPK (Myotonic Dystrophy 1); LMNA (Limb Girdle Dystrophy Type 1B); JUP (Naxos); TGFBR2 (Loeys-Dietz); EMD (X-Linked EDMD); and ELN (SV Aortic Stenosis). In some embodiments, the rAAV virion comprises a polynucleotide encoding one or more of cardiac troponin T (TNNT2); BAG family molecular chaperone regulator 3 (BAG3); myosin heavy chain (MYH7); tropomyosin 1 (TPM1); myosin binding protein C (MYBPC3); 5'-AMP-activated protein kinase subunit gamma-2 (PRKAG2); troponin I type 3 (TNNI3); titin (TTN); myosin, light chain 2 (MYL2); actin, alpha cardiac muscle 1 (ACTC1); potassium voltage-gated channel, KQT-like subfamily, member 1 (KCNQ1); plakophilin 2 (PKP2); myocyte enhancer factor 2c (MEF2C); and cardiac LIM protein (CSRP3).

In some embodiments, the gene products of the disclosure are polypeptide reprogramming factors. Reprogramming factors are desirable as means to convert one cell type into another. Non-cardiomyocytes cells can be differentiated into cardiomyocytes cells in vitro or in vivo using any method available to one of skill in the art. For example, see methods described in Ieda et al. (2010) *Cell* 142:375-386; Christoforou et al. (2013) *PLoS ONE* 8:e63577; Addis et al. (2013) *J. Mol. Cell Cardiol.* 60:97-106; Jayawardena et al. (2012) *Circ. Res.* 110: 1465-1473; Nam Y et al. (2003) *PNAS USA* 110:5588-5593; Wada R et al. (2013) *PNAS USA* 110: 12667-12672; and Fu J et al. (2013) *Stem Cell Reports* 1:235-247.

In cardiac context, the reprogramming factors may be capable of converting a cardiac fibroblast to a cardiac myocyte either directly or through an intermediate cell type. In particular, direct reprogramming is possible, or reprogramming by first converting the fibroblast to a pluripotent or totipotent stem cell. Such a pluripotent stem cell is termed an induced pluripotent stem (iPS) cell. An iPS cell that is subsequently converted to a cardiac myocyte (CM) cell is termed an iPS-CM cell. In the examples, iPS-CM derived in vitro from cardiac fibroblasts are used in vivo to select capsid proteins of interest. The disclosure also envisions using the capsid proteins disclosure to in turn generate iPS-CM cells in vitro but, particular, in vivo, as part of a therapeutic gene therapy regimen. Induced cardiomyocyte-like (iCM) cells refer to cells directly reprogrammed into cardiomyocytes.

Induced cardiomyocytes express one or more cardiomyocyte-specific markers, where cardiomyocyte-specific markers include, but are not limited to, cardiac troponin I, cardiac troponin-C, tropomyosin, caveolin-3, myosin heavy chain, myosin light chain-2a, myosin light chain-2v, ryanodine receptor, sarcomeric a-actinin, Nkx2.5, connexin 43, and atrial natriuretic factor. Induced cardiomyocytes can also exhibit sarcomeric structures. Induced cardiomyocytes exhibit increased expression of cardiomyocyte-specific genes ACTC1 (cardiac a-actin), ACTN2 (actinin a2), MYH6 (a-myosin heavy chain), RYR2 (ryanodine receptor 2), MYL2 (myosin regulatory light chain 2, ventricular isoform), MYL7 (myosin regulatory light chain, atrial isoform), TNNT2 (troponin T type 2, cardiac), and NPPA (natriuretic peptide precursor type A), PLN (phospholamban). Expression of fibroblasts markers such as Colla2 (collagen la2) is downregulated in induced cardiomyocytes, compared to fibroblasts from which the iCM is derived.

Reprogramming methods involving polypeptide reprogramming factors (in some cases supplemented by small-molecule reprogramming factors supplied in conjunction with the rAAV) include those described in US2018/0112282A1, WO2018/005546, WO2017/173137, US2016/0186141, US2016/0251624, US2014/0301991, and US2013/0216503A1, which are incorporated in their entirety, particularly for the reprogramming methods and factors disclosed.

In some embodiments, cardiac cells are reprogrammed into induced cardiomyocyte-like (iCM) cells using one or more reprogramming factors that modulate the expression of one or more polynucleotides or proteins of interest, such as Achaete-scute homolog 1 (ASCL1), Myocardin (MYOCD), myocyte-specific enhancer factor 2C (MEF2C), and/or T-box transcription factor 5 (TBX5). In some embodiments, the one or more reprogramming factors are provided as a polynucleotide (e.g., an RNA, an mRNA, or a DNA polynucleotide) that encode one or more polynucleotides or proteins of interest. In some embodiments, the one or more reprogramming factors are provided as a protein.

In some embodiments, the reprogramming factors are microRNAs or microRNA antagonists, siRNAs, or small molecules that are capable of increasing the expression of one or more polynucleotides or proteins of interest. In some embodiments, expression of a polynucleotides or proteins of interest is increased by expression of a microRNA or a microRNA antagonist. For example, endogenous expression of an Oct polypeptide can be increased by introduction of microRNA-302 (miR-302), or by increased expression of miR-302. See, e.g., Hu et al., *Stem Cells* 31(2): 259-68 (2013), which is incorporated herein by reference in its entirety. Hence, miRNA-302 can be an inducer of endogenous Oct polypeptide expression. The miRNA-302 can be introduced alone or with a nucleic acid that encodes the Oct polypeptide. In some embodiments, a suitable nucleic acid gene product is a microRNA. Suitable micrRNAs include, e.g., mir-1, mir-133, mir-208, mir-143, mir-145, and mir-499.

In some embodiments, the methods of the disclosure comprise administering an rAAV virion of the disclosure before, during, or after administration of the small-molecule reprogramming factor. In some embodiments, the small-molecule reprogramming factor is a small molecule selected from the group consisting of SB431542, LDN-193189, dexamethasone, LY364947, D4476, myricetin, IWR1, XAV939, docosahexaenoic acid (DHA), S-Nitroso-TV-acetylpenicillamine (SNAP), Hh-Ag1.5, alprostadil, cromakalim, MNITMT, A769662, retinoic acid p-hydoxyanlide, decamethonium dibromide, nifedipine, piroxicam, bacitracin, aztreonam, harmalol hydrochloride, amide-C2 (A7), Ph-C12 (CIO), mCF3-C-7 (J5), G856-7272 (A473), 5475707, or any combination thereof.

In some embodiments, the gene products comprise reprogramming factors that modulate the expression of one or more proteins of interest selected from ASCL1, MYOCD, MEF2C, and TBX5. In some embodiments, the gene products comprise one or more reprogramming factors selected from ASCL1, MYOCD, MEF2C, AND TBX5, CCNB1, CCND1, CDK1, CDK4, AURKB, OCT4, BAF60C, ESRRG, GATA4, GATA6, HAND2, IRX4, ISLL, MESP1, MESP2, NKX2.5, SRF, TBX20, ZFPM2, and miR-133.

In some embodiments, the gene products comprise GATA4, MEF2C, and TBX5 (i.e., GMT). In some embodiments, the gene products comprise MYOCD, MEF2C, and TBX5 (i.e., MyMT). In some embodiments, the gene products comprise MYOCD, ASCL1, MEF2C, and TBX5 (i.e., MyAMT). In some embodiments, the gene products comprise MYOCD and ASCL1 (i.e., MyA). In some embodiments, the gene products comprise GATA4, MEF2C, TBX5, and MYOCD (i.e., 4F). In other embodiments, the gene products comprise GATA4, MEF2C, TBX5, ESSRG, MYOCD, ZFPM2, and MESP1 (i.e., 7F). In some embodiments, the gene products comprise one or more of ASCL1, MEF2C, GATA4, TBX5, MYOCD, ESRRG, AND MESPL.

In some embodiments, the rAAV virions generate cardiac myocytes in vitro or in vivo. Cardiomyocytes or cardiac myocytes are the muscle cells that make up the cardiac muscle. Each myocardial cell contains myofibrils, which are long chains of sarcomeres, the contractile units of muscle cells. Cardiomyocytes show striations similar to those on skeletal muscle cells, but unlike multinucleated skeletal cells, they contain only one nucleus. Cardiomyocytes have a high mitochondrial density, which allows them to produce ATP quickly, making them highly resistant to fatigue. Mature cardiomyocytes can express one or more of the following cardiac markers: α-Actinin, MLC2v, MY20, cMHC, NKX2-5, GATA4, cTNT, cTNI, MEF2C, MLC2a, or any combination thereof. In some embodiments, the mature cardiomyocytes express NKX2-5, MEF2C or a combination thereof. In some embodiments, cardiac progenitor cells express early stage cardiac progenitor markers such as GATA4, ISL1 or a combination thereof.

In some embodiments, the gene product is a polynucleotide. In some embodiments, as described below, the gene product is a guide RNA capable of binding to an RNA-guided endonuclease. In some embodiments, the gene product is an inhibitory nucleic acid capable of reducing the level of an mRNA and/or a polypeptide gene product, e.g., in a cardiac cell. For example, in some embodiments, the polynucleotide gene product is an interfering RNA capable of selectively inactivating a transcript encoded by an allele that causes a cardiac disease or disorder. As an example, the allele is a myosin heavy chain 7, cardiac muscle, beta (MYH7) allele that comprises a hypertrophic cardiomyopathy-causing mutation. Other examples include, e.g., interfering RNAs that selectively inactivate a transcript encoded by an allele that causes hypertrophic cardiomyopathy (HCM), dilated cardiomyopathy (DCM) or Left Ventricular Non-Compaction (LVNC), where the allele is a MYL3 (myosin light chain 3, alkali, ventricular, skeletal slow), MYH7, TNNI3 (troponin I type 3 (cardiac)), TNNT2 (troponin T type 2 (cardiac)), TPM1 (tropomyosin 1 (alpha)) or ACTC1 allele comprising an HCM-causing, a DCM-causing or a LVNC-causing mutation. See, e.g., U.S. Pat. Pub. No. 2016/0237430 for examples of cardiac disease-causing mutations.

In some embodiments, the gene product is a polypeptide-encoding RNA. In some embodiments, the gene product is an interfering RNA. In some embodiments, the gene product is an aptamer. In some embodiments, the gene product is a polypeptide. In some embodiments, the gene product is a therapeutic polypeptide, e.g., a polypeptide that provides clinical benefit. In some embodiments, the gene product is a site-specific nuclease that provide for site-specific knock-down of gene function. In some embodiments, the gene product is an RNA-guided endonuclease that provides for modification of a target nucleic acid. In some embodiments, the gene products are: i) an RNA-guided endonuclease that provides for modification of a target nucleic acid; and ii) a guide RNA that comprises a first segment that binds to a target sequence in a target nucleic acid and a second segment that binds to the RNA-guided endonuclease. In some embodiments, the gene products are: i) an RNA-guided endonuclease that provides for modification of a target nucleic acid; ii) a first guide RNA that comprises a first segment that binds to a first target sequence in a target nucleic acid and a second segment that binds to the RNA-guided endonuclease; and iii) a first guide RNA that comprises a first segment that binds to a second target sequence in the target nucleic acid and a second segment that binds to the RNA-guided endonuclease.

A nucleotide sequence encoding a heterologous gene product in an rAAV virion of the present disclosure can be operably linked to a promoter. For example, a nucleotide sequence encoding a heterologous gene product in an rAAV virion of the present disclosure can be operably linked to a constitutive promoter, a regulatable promoter, or a cardiac cell-specific promoter. Suitable constitutive promoters include a human elongation factor 1 α subunit (EF1α) promoter, a β-actin promoter, an α-actin promoter, a β-glucuronidase promoter, CAG promoter, super core promoter, and a ubiquitin promoter. In some embodiments, a nucleotide sequence encoding a heterologous gene product in an rAAV virion of the present disclosure is operably linked to a cardiac-specific transcriptional regulator element (TRE), where cardiac-specific TREs include promoters and enhancers. Suitable cardiac-specific TREs include, but are not limited to, TREs derived from the following genes: myosin light chain-2 (MLC-2), a-myosin heavy chain (a-MHC), desmin, AE3, cardiac troponin C (cTnC), and cardiac actin. Franz et al. (1997) *Cardiovasc. Res.* 35:560-566; Robbins et al. (1995) *Ann. NY. Acad. Sci.* 752:492-505; Linn et al. (1995) *Circ. Res.* 76:584-591; Parmacek et al. (1994) *Mol. Cell. Biol.* 14: 1870-1885; Hunter et al. (1993) *Hypertension* 22:608-617; and Sartorelli et al. (1992) *Proc. Natl. Acad. Sci. USA* 89:4047-4051. See also, Pacak et al. (2008) *Genet Vaccines Ther.* 6:13. In some embodiments, the promoter is an α-MHC promoter, an MLC-2 promoter, or cTnT promoter.

The polynucleotide encoding a gene product is operably linked to a promoter and/or enhancer to facilitate expression of the gene product. Depending on the host/vector system utilized, any of a number of suitable transcription and translation control elements, including constitutive and inducible promoters, transcription enhancer elements, transcription terminators, etc. may be used in the rAAV virion (e.g., Bitter et al. (1987) *Methods in Enzymology,* 153:516-544).

Separate promoters and/or enhancers can be employed for each of the polynucleotides. In some embodiments, the same promoter and/or enhance is used for two or more polynucleotides in a single open reading frame. Vectors employing this configuration of genetic elements are termed "polycistronic." An illustrative example of a polycistronic vector comprises an enhancer and a promoter operatively linked to a single open-reading frame comprising two or more polynucleotides linked by 2A region(s), whereby expression of the open-reading frame result in multiple polypeptides being generated co-translationally. The 2A region is believed to mediate generation of multiple polypeptide sequences through codon skipping; however, the present disclosure relates also to polycistronic vectors that employ post-translational cleavage to generate two or more proteins of interest from the same polynucleotide. Illustrative 2A sequences, vectors, and associated methods are provided in US20040265955A1, which is incorporated herein by reference.

Non-limiting examples of suitable eukaryotic promoters (promoters functional in a eukaryotic cell) include CMV, CMV immediate early, HSV thymidine kinase, early and late SV40, long terminal repeats (LTRs) from retrovirus, and mouse metallothionein-I. In some embodiments, promoters that are capable of conferring cardiac specific expression will be used. Non-limiting examples of suitable cardiac specific promoters include desmin (Des), alpha-myosin heavy chain (a-MHC), myosin light chain 2 (MLC-2), cardiac troponin T (cTnT) and cardiac troponin C (cTnC). Non-limiting examples of suitable neuron specific promoters include synapsin I (SYN), calcium/calmodulin-dependent protein kinase II, tubulin alpha I, neuron-specific enolase and platelet-derived growth factor beta chain promoters and hybrid promoters by fusing cytomegalovirus enhancer (E) to those neuron-specific promoters.

Examples of suitable promoters for driving expression reprogramming factors include, but are not limited to, retroviral long terminal repeat (LTR) elements; constitutive promoters such as CMV, HSV1-TK, SV40, EF-1α, β-actin, phosphoglycerol kinase (PGK); inducible promoters, such as those containing Tet-operator elements; cardiac specific promoters, such as desmin (DES), alpha-myosin heavy chain (a-MHC), myosin light chain 2 (MLC-2), cardiac troponin T (cTnT) and cardiac troponin C (cTnC); neural specific promoters, such as nestin, neuronal nuclei (NeuN), microtubule-associate protein 2 (MAP2), beta III tubulin, neuron specific enolase (NSE), oligodendrocyte lineage (Oligl/2), and glial fibrillary acidic protein (GFAP); and pancreatic specific promoters, such as Pax4, Nkx2.2, Ngn3, insulin, glucagon, and somatostatin.

In some embodiments, a polynucleotide is operably linked to a cell type-specific transcriptional regulator element (TRE), where TREs include promoters and enhancers. Suitable TREs include, but are not limited to, TREs derived from the following genes: myosin light chain-2, a-myosin heavy chain, AE3, cardiac troponin C, and cardiac actin. Franz et al. (1997) *Cardiovasc. Res.* 35:560-566; Robbins et al. (1995) *Ann. N Y. Acad. Sci.* 752:492-505; Linn et al. (1995) *Circ. Res.* 76:584-591; Parmacek et al. (1994) *Cell. Biol.* 14:1870-1885; Hunter et al. (1993) *Hypertension* 22:608-617; and Sartorelli et al. (1992) *PNAS USA* 89:4047-4051.

The promoter can be one naturally associated with a gene or nucleic acid segment. Similarly, for RNAs (e.g., microRNAs), the promoter can be one naturally associated with a microRNA gene (e.g., an miRNA-302 gene). Such a naturally associated promoter can be referred to as the "natural promoter" and may be obtained by isolating the 5' non-coding sequences located upstream of the coding segment and/or exon. Similarly, an enhancer may be one naturally associated with a nucleic acid sequence. However, the enhancer can be located either downstream or upstream of that sequence.

Alternatively, certain advantages will be gained by positioning the coding nucleic acid segment under the control of a recombinant or heterologous promoter, which refers to a promoter that is not normally associated with a nucleic acid in its natural environment. A recombinant or heterologous enhancer refers also to an enhancer not normally associated with a nucleic acid sequence in its natural environment. Such promoters or enhancers can include promoters or enhancers of other genes, and promoters or enhancers isolated from any other prokaryotic, viral, or eukaryotic cell, and promoters or enhancers not "naturally occurring," i.e., containing different elements of different transcriptional regulatory regions, and/or mutations that alter expression. In addition to producing nucleic acid sequences of promoters and enhancers synthetically, sequences may be produced using recombinant cloning and/or nucleic acid amplification technology, including PCR™, in connection with the compositions disclosed herein (see U.S. Pat. Nos. 4,683,202, 5,928,906, each incorporated herein by reference).

The promoters employed may be constitutive, inducible, developmentally-specific, tissue-specific, and/or useful under the appropriate conditions to direct high level expression of the nucleic acid segment. For example, the promoter can be a constitutive promoter such as, a CMV promoter, a CMV cytomegalovirus immediate early promoter, a CAG promoter, an EF-1α promoter, a HSV1-TK promoter, an SV40 promoter, a β-actin promoter, a PGK promoter, or a combination thereof. Examples of eukaryotic promoters that can be used include, but are not limited to, constitutive promoters, e.g., viral promoters such as CMV, SV40 and RSV promoters, as well as regulatable promoters, e.g., an inducible or repressible promoter such as the tet promoter, the hsp70 promoter and a synthetic promoter regulated by CRE. In certain embodiments, cell type-specific promoters are used to drive expression of reprogramming factors in specific cell types. Examples of suitable cell type-specific promoters useful for the methods described herein include, but are not limited to, the synthetic macrophage-specific promoter described in He et al (2006), *Human Gene Therapy* 17:949-959; the granulocyte and macrophage-specific lysozyme M promoter (see, e.g., Faust et al (2000), *Blood* 96(2):719-726); and the myeloid-specific CD11b promoter (see, e.g., Dziennis et al (1995), *Blood* 85(2):319-329). Other examples of promoters that can be employed include a human EF1α elongation factor promoter, a CMV cytomegalovirus immediate early promoter, a CAG chicken albumin promoter, a viral promoter associated with any of the viral vectors described herein, or a promoter that is homologous to any of the promoters described herein (e.g., from another species). Examples of prokaryotic promoters that can be used include, but are not limited to, SP6, T7, T5, tac, bla, trp, gal, lac, or maltose promoters.

In some embodiments, an internal ribosome entry sites (IRES) element can be used to create multigene, or polycistronic, messages. IRES elements are able to bypass the ribosome scanning model of 5'-methylated Cap dependent translation and begin translation at internal sites (Pelletier and Sonenberg, *Nature* 334(6180):320-325 (1988)). IRES elements from two members of the picornavirus family (polio and encephalomyocarditis) have been described (Pelletier and Sonenberg, *Nature* 334(6180):320-325 (1988)), as well an IRES from a mammalian message (Macejak & Samow, *Nature* 353:90-94 (1991)). IRES elements can be linked to heterologous open reading frames. Multiple open reading frames can be transcribed together, each separated by an IRES, creating polycistronic messages. By virtue of the IRES element, each open reading frame is accessible to ribosomes for efficient translation. Multiple genes can be efficiently expressed using a single promoter/enhancer to transcribe a single message (see U.S. Pat. Nos. 5,925,565 and 5,935,819, herein incorporated by reference).

In some embodiments, a nucleotide sequence is operably linked to a polyadenylation sequence. Suitable polyadenylation sequences include bovine growth hormone polyA signal (bGHpolyA) and short poly A signal. Optionally the rAAV vectors of the disclosure comprises the Woodchuck Post-transcriptional Regulatory Element (WPRE). In some embodiments, the polynucleotide encoding gene products are join by sequences include so-called self-cleaving peptide, e.g. P2A peptides.

In some embodiments, the gene product comprises a site-specific endonuclease that provides for site-specific knock-down of gene function, e.g., where the endonuclease knocks out an allele associated with a cardiac disease or disorder. For example, where a dominant allele encodes a defective copy of a gene that, when wild-type, is a cardiac structural protein and/or provides for normal cardiac function, a site-specific endonuclease can be targeted to the defective allele and knock out the defective allele. In some embodiments, a site-specific endonuclease is an RNA-guided endonuclease.

In addition to knocking out a defective allele, a site-specific nuclease can also be used to stimulate homologous recombination with a donor DNA that encodes a functional copy of the protein encoded by the defective allele. For example, a subject rAAV virion can be used to deliver both a site-specific endonuclease that knocks out a defective allele a functional copy of the defective allele (or fragment thereof), resulting in repair of the defective allele, thereby providing for production of a functional cardiac protein (e.g., functional troponin, etc.). In some embodiments, a subject rAAV virion comprises a heterologous nucleotide sequence that encodes a site-specific endonuclease and a heterologous nucleotide sequence that encodes a functional copy of a defective allele, where the functional copy encodes a functional cardiac protein. Functional cardiac proteins include, e.g., troponin, a chloride ion channel, and the like.

Site-specific endonucleases that are suitable for use include, e.g., zinc finger nucleases (ZFNs); meganucleases; and transcription activator-like effector nucleases (TALENs), where such site-specific endonucleases are non-naturally occurring and are modified to target a specific gene. Such site-specific nucleases can be engineered to cut specific locations within a genome, and non-homologous end joining can then repair the break while inserting or deleting several nucleotides. Such site-specific endonucleases (also referred to as "INDELs") then throw the protein out of frame and effectively knock out the gene. See, e.g., U.S. Pat. Pub. No. 2011/0301073. Suitable site-specific endonucleases include engineered meganuclease re-engineered homing endonucleases. Suitable endonucleases include an I-Tev1 nuclease. Suitable meganucleases include I-Sce1 (see, e.g., Bellaiche et al. (1999) *Genetics* 152: 1037); and I-Cre1 (see, e.g., Heath et al. (1997) *Nature Structural Biology* 4:468). Site-specific endonucleases that are suitable for use include CRISPRi systems and the Cas9-based SAM system.

In some embodiments, the gene product is an RNA-guided endonuclease. In some embodiments, the gene product comprises an RNA comprising a nucleotide sequence encoding an RNA-guided endonuclease. In some embodiments, the gene product is a guide RNA, e.g., a single-guide RNA. In some embodiments, the gene products are: 1) a guide RNA; and 2) an RNA-guided endonuclease. The guide RNA can comprise: a) a protein-binding region that binds to the RNA-guided endonuclease; and b) a region that binds to a target nucleic acid. An RNA-guided endonuclease is also referred to herein as a "genome editing nuclease."

Examples of suitable genome editing nucleases are CRISPR/Cas endonucleases (e.g., class 2 CRISPR/Cas endonucleases such as a type II, type V, or type VI CRISPR/Cas endonucleases). A suitable genome editing nuclease is a CRISPR/Cas endonuclease (e.g., a class 2 CRISPR/Cas endonuclease such as a type II, type V, or type VI CRISPR/Cas endonuclease). In some embodiments, the gene product comprises a class 2 CRISPR/Cas endonuclease. In some embodiments, the gene product comprises a class 2 type II CRISPR/Cas endonuclease (e.g., a Cas9 protein). In some embodiments, the gene product comprises a class 2 type V CRISPR/Cas endonuclease (e.g., a Cpf1 protein, a C2c1 protein, or a C2c3 protein). In some embodiments, the gene product comprises a class 2 type VI CRISPR/Cas endonuclease (e.g., a C2c2 protein; also referred to as a "Cas13a" protein). In some embodiments, the gene product comprises a CasX protein. In some embodiments, the gene product comprises a CasY protein.

Methods of Use

In some embodiments, the disclosure provides methods of identifying AAV capsid proteins that confer on rAAV virions increased transduction efficiency in target cells. The methods comprise providing a population of rAAV virions whose rAAV genomes comprise a library of cap polynucleotides encoding variant AAV capsid proteins; optionally contacting the population with non-target cells for a time sufficient to permit attachment of undesired rAAV virions to the non-target cells; contacting the population with target cells for a time sufficient to permit transduction of the cap polynucleotide into the target cells by the rAAV virions; and sequencing the cap polynucleotides from the target cells, thereby identifying AAV capsid proteins that confer increased transduction efficiency in the target cells. In some embodiments, the method further comprises depleting the population of rAAV virions by contacting the population with non-target cells for time sufficient to permit attachment of the rAAV virions to the non-target cells. Non-limiting examples of such identifications methods are provided in the Examples.

The disclosure provides methods for generating cardiomyocytes and/or cardiomyocyte-like cells in vitro using an rAAV virion. Selected starting cells are transduced with an rAAV and optionally exposed to small-molecule reprogramming factors (before, during, or after transduction) for a time and under conditions sufficient to convert the starting cells across lineage and/or differentiation boundaries to form cardiac progenitor cells and/or cardiomyocytes. In some embodiments, the starting cells are fibroblast cells. In some embodiments, the starting cells express one or more markers indicative of a differentiated phenotype. The time for conversion of starting cells into cardiac progenitor and cardiomyocyte cells can vary. For example, the starting cells can be incubated after treatment with one or more polynucleotides or proteins of interest until cardiac or cardiomyocyte cell markers are expressed. Such cardiac or cardiomyocyte cell markers can include any of the following markers: α-GATA4, TNNT2, MYH6, RYR2, NKX2-5, MEF2C, ANP, Actinin, MLC2v, MY20, cMHC, ISL1, cTNT, cTNI, and MLC2a, or any combination thereof. In some embodiments, the induced cardiomyocyte cells are negative for one or more neuronal cells markers. Such neuronal cell markers can include any of the following markers: DCX, TUBB3, MAP2, and ENO2.

Incubation can proceed until cardiac progenitor markers are expressed by the starting cells. Such cardiac progenitor markers include GATA4, TNNT2, MYH6, RYR2, or a combination thereof. The cardiac progenitor markers such as GATA4, TNNT2, MYH6, RYR2, or a combination thereof can be expressed by about 8 days, or by about 9 days, or by about 10 days, or by about 11 days, or by about 12 days, or by about 14 days, or by about 15 days, or by about 16 days, or by about 17 days, or by about 18 days, or by about 19 days, or by about 20 days after starting incubation of cells in the compositions described herein. Further incubation of the cells can be performed until expression of late stage cardiac progenitor markers such as NKX2-5, MEF2C or a combination thereof occurs.

Reprogramming efficiency may be measured as a function of cardiomyocyte markers. Such pluripotency markers include, but are not limited to, the expression of cardiomyocyte marker proteins and mRNA, cardiomyocyte morphology and electrophysiological phenotype. Non-limiting examples of cardiomyocyte markers include, a-sarcoglycan, atrial natriuretic peptide (ANP), bone morphogenetic protein 4 (BMP4), connexin 37, connexin 40, crypto, desmin, GATA4, GATA6, MEF2C, MYH6, myosin heavy chain, NKX2.5, TBX5, and Troponin T.

The expression of various markers specific to cardiomyocytes may be detected by conventional biochemical or immunochemical methods (e.g., enzyme-linked immunosorbent assay, immunohistochemical assay, and the like). Alternatively, expression of a nucleic acid encoding a cardiomyocyte-specific marker can be assessed. Expression of cardiomyocyte-specific marker-encoding nucleic acids in a cell can be confirmed by reverse transcriptase polymerase chain reaction (RT-PCR) or hybridization analysis, molecular biological methods which have been commonly used in the past for amplifying, detecting and analyzing mRNA coding for any marker proteins. Nucleic acid sequences coding for markers specific to cardiomyocytes are known and are available through public databases such as GenBank. Thus, marker-specific sequences needed for use as primers or probes are easily determined.

Cardiomyocytes exhibit some cardiac-specific electrophysiological properties. One electrical characteristic is an action potential, which is a short-lasting event in which the difference of potential between the interior and the exterior of each cardiac cell rises and falls following a consistent trajectory. Another electrophysiological characteristic of cardiomyocytes is the cyclic variations in the cytosolic-free $Ca^{2+}$ concentration, named as $Ca^{2+}$ transients, which are employed in the regulation of the contraction and relaxation of cardiomyocytes. These characteristics can be detected and evaluated to assess whether a population of cells has been reprogrammed into cardiomyocytes.

The present disclosure provides a method of delivering a gene product to a cardiac cell, e.g., a cardiac fibroblast. The methods generally involve infecting a cardiac cell (e.g., a cardiac fibroblast) with an rAAV virion, where the gene product(s) encoded by the heterologous nucleic acid present in the rAAV virion is/are produced in the cardiac cell (e.g., cardiac fibroblast). Delivery of gene product(s) to a cardiac cell (e.g., cardiac fibroblast) can provide for treatment of a cardiac disease or disorder. Delivery of gene product(s) to a cardiac cell (e.g., cardiac fibroblast) can provide for generation of an induced cardiomyocyte-like (iCM) cell from the cardiac fibroblast. Delivery of gene product(s) to a cardiac cell (e.g., cardiac fibroblast) can provide for editing of the genome of the cardiac cell (e.g., cardiac fibroblast).

In some embodiments, infecting or transducing a cardiac cell (e.g., cardiac fibroblast) is carried out in vitro. In some embodiments, infecting or transducing a cardiac cell (e.g., cardiac fibroblast) is carried out in vitro; and the infected/transduced cardiac cell (e.g., cardiac fibroblast) is introduced into (e.g., transfused into or implanted into) an individual in need thereof, e.g., directly into cardiac tissue of an individual in need thereof. For in vitro transduction, an effective amount of rAAV virions to be delivered to cells is from about $10^5$ to about $10^{13}$ of the rAAV virions. Other effective dosages can be readily established by one of ordinary skill in the art through routine trials establishing dose response curves.

In some embodiments, infecting a cardiac cell (e.g., cardiac fibroblast) is carried out in vivo. For example, in some embodiments, an effective amount of an rAAV virion of the present disclosure is administered directly into cardiac tissue of an individual in need thereof. An "effective amount" will fall in a relatively broad range that can be determined through experimentation and/or clinical trials. For example, for in vivo injection, i.e., injection directly into cardiac tissue, a therapeutically effective dose will be on the order of from about $10^6$ to about $10^{15}$ of the rAAV virions, e.g., from about $10^5$ to $10^{12}$ rAAV virions, of the present disclosure. In some embodiments, an effective amount of an rAAV virion of the present disclosure is administered via intramyocardial injection through the epicardium. In some embodiments, an effective amount of an rAAV virion of the present disclosure is administered via vascular delivery through the coronary artery. In some embodiments, an effective amount of an rAAV virion of the present disclosure is administered via systemic delivery through the superior vena cava. In some embodiments, an effective amount of an rAAV virion of the present disclosure is administered via systemic delivery through a peripheral vein.

For example, from about $10^4$ to about $10^5$, from about $10^5$ to about $10^6$, from about $10^6$ to about $10^7$, from about $10^6$ to about $10^7$, from about $10^7$ to about $10^8$, from about $10^8$ to about $10^9$, from about $10^9$ to about $10^{10}$, from about $10^{10}$ to about $10^{11}$, to about $10^{11}$, from about $10^{11}$ to about $10^{12}$, from about $10^{12}$ to about $10^{13}$, from about $10^{13}$ to about $10^{14}$, from about $10^{14}$ to about $10^{15}$ genome copies, or more than $10^{15}$ genome copies, of an rAAV virion of the present disclosure are administered to an individual, e.g., are administered directly into cardiac tissue in the individual, or are administered via another route. The number of rAAV virions administered to an individual can be expressed in viral genomes (vg) per kilogram (kg) body weight of the individual. In some embodiments, and effective amount of an rAAV virion of the present disclosure is from about $10^2$ vg/kg to $10^4$ vg/kg, from about $10^4$ vg/kg to about $10^6$ vg/kg, from about $10^6$ vg/kg to about $10^8$ vg/kg, from about $10^8$ vg/kg to about $10^{10}$ vg/kg, from about $10^{10}$ vg/kg to about $10^{12}$ vg/kg, from about $10^{12}$ vg/kg to about $10^{14}$ vg/kg, from about $10^{14}$ vg/kg to about $10^{16}$ vg/kg, from about $10^{16}$ vg/kg to about $10^{18}$ vg/kg, or more than $10^{18}$ vg/kg.

In some embodiments, an effective amount of an rAAV virion of the present disclosure is administered via intramyocardial injection through the epicardium. In some embodiments, an effective amount of an rAAV virion of the present disclosure is administered via vascular delivery through the coronary artery. In some embodiments, an effective amount of an rAAV virion of the present disclosure is administered via systemic delivery through the superior vena cava. In some embodiments, an effective amount of an rAAV virion of the present disclosure is administered via systemic delivery through a peripheral vein.

In some embodiments, more than one administration (e.g., two, three, four or more administrations) may be employed to achieve the desired level of gene expression. In some embodiments, the more than one administration is administered at various intervals, e.g., daily, weekly, twice monthly, monthly, every 3 months, every 6 months, yearly, etc. In some embodiments, multiple administrations are administered over a period of time of from 1 month to 2 months, from 2 months to 4 months, from 4 months to 8 months, from 8 months to 12 months, from 1 year to 2 years, from 2 years to 5 years, or more than 5 years.

The present disclosure provides a method of reprogramming a cardiac fibroblast to generate an induced cardiomyocyte-like cell (iCM). The method generally involves infecting a cardiac fibroblast with an rAAV virion of the present disclosure, where the rAAV virion comprises a heterologous nucleic acid comprising a nucleotide sequence encoding one or more reprogramming factors.

The expression of various markers specific to cardiomyocytes is detected by conventional biochemical or immunochemical methods (e.g., enzyme-linked immunosorbent assay; immunohistochemical assay; and the like). Alternatively, expression of nucleic acid encoding a cardiomyocyte-specific marker can be assessed. Expression of cardiomyocyte-specific marker-encoding nucleic acids in a cell can be confirmed by reverse transcriptase polymerase chain reaction (RT-PCR) or hybridization analysis, molecular biological methods which have been commonly used in the past for amplifying, detecting and analyzing mRNA coding for any marker proteins. Nucleic acid sequences coding for markers specific to cardiomyocytes are known and are available through public data bases such as GenBank; thus, marker-specific sequences needed for use as primers or probes is easily determined.

Induced cardiomyocytes can also exhibit spontaneous contraction. Whether an induced cardiomyocyte exhibits spontaneous contraction can be determined using standard electrophysiological methods (e.g., patch clamp).

In some embodiments, induced cardiomyocytes can exhibit spontaneous $Ca^{2+}$ oscillations. $Ca^{2+}$ oscillations can be detected using standard methods, e.g., using any of a variety of calcium-sensitive dyes, intracellular $Ca^{2+}$ ion-detecting dyes include, but are not limited to, fura-2, bis-fura 2, indo-1, Quin-2, Quin-2 AM, Benzothiaza-1, Benzothiaza-2, indo-5F, Fura-FF, BTC, Mag-Fura-2, Mag-Fura-5, Mag-Indo-1, fluo-3, rhod-2, rhod-3, fura-4F, fura-5F, fora-6F, fluo-4, fluo-5F, fluo-5N, Oregon Green 488 BAPTA, Calcium Green, Calcein, Fura-C18, Calcium Green-C18, Calcium Orange, Calcium Crimson, Calcium Green-5N, Magnesium Green, Oregon Green 488 BAPTA-1, Oregon Green 488 BAPTA-2, X-rhod-1, Fura Red, Rhod-5F, Rhod-5N, X-Rhod-5N, Mag-Rhod-2, Mag-X-Rhod-1, Fluo-5N, Fluo-5F, Fluo-4FF, Mag-Fluo-4, Aequorin, dextran conjugates or any other derivatives of any of these dyes, and others (see, e.g., the catalog or Internet site for Molecular Probes, Eugene, see, also, Nuccitelli, ed., Methods in Cell Biology, Volume 40: A Practical Guide to the Study of Calcium in Living Cells, Academic Press (1994); Lambert, ed., Calcium Signaling Protocols (Methods in Molecular Biology Volume 114), Humana Press (1999); W. T. Mason, ed., Fluorescent and Luminescent Probes for Biological Activity. A Practical Guide to Technology for Quantitative Real-Time Analysis, Second Ed, Academic Press (1999); Calcium Signaling Protocols (Methods in Molecular Biology), 2005, D. G. Lamber, ed., Humana Press.).

In some embodiments, an iCM is generated in vitro; and the iCM is introduced into an individual, e.g., the iCM is implanted into a cardiac tissue of an individual in need thereof. A method of the present disclosure can comprise infecting a population of cardiac fibroblasts in vitro, to generate a population of iCMs; and the population of iCMs is implanted into a cardiac tissue of an individual in need thereof.

In some embodiments, an iCM is generated in vivo. For example, in some embodiments, an rAAV virion of the present disclosure that comprises a heterologous nucleic acid comprising a nucleotide sequence encoding one or more reprogramming factors is administered to an individual. In some embodiments, the rAAV virion is administered directly into cardiac tissue of an individual in need thereof. In some embodiments, from about $10^6$ to about $10^5$, from about $10^5$ to about $10^9$, from about $10^9$ to about $10^{10}$, from about $10^{10}$ to about $10^{11}$, from about $10^{11}$ to about $10^{12}$, from about $10^{12}$ to about $10^{13}$, from about $10^{13}$ to about $10^{14}$, from about $10^{14}$ to about $10^{15}$ genome copies, or more than $10^{15}$ genome copies, of an rAAV virion of the present disclosure that comprises a heterologous nucleic acid that comprises a nucleotide sequence encoding one or more reprogramming factors are administered to an individual, e.g., are administered directly into cardiac tissue in the individual or via another route of administration. The number of rAAV virions administered to an individual can be expressed in viral genomes (vg) per kilogram (kg) body weight of the individual. In some embodiments, and effective amount of an rAAV virion of the present disclosure is from about $10^2$ vg/kg to $10^4$ vg/kg, from about $10^4$ vg/kg to about $10^6$ vg/kg, from about $10^6$ vg/kg to about $10^8$ vg/kg, from about $10^8$ vg/kg to about $10^{10}$ vg/kg, from about $10^{10}$ vg/kg to about $10^{12}$ vg/kg, from about $10^{12}$ vg/kg to about $10^{14}$ vg/kg, from about $10^{14}$ vg/kg to about $10^{14}$ vg/kg, from about $10^{14}$ vg/kg to about $10^{16}$ vg/kg, or more than $10^{16}$ vg/kg. In some embodiments, an effective amount of an rAAV virion of the present disclosure is administered via intramyocardial injection through the epicardium. In some embodiments, an effective amount of an rAAV virion of the present disclosure is administered via vascular delivery through the coronary artery. In some embodiments, an effective amount of an rAAV virion of the present disclosure is administered via systemic delivery through the superior vena cava. In some embodiments, an effective amount of an rAAV virion of the present disclosure is administered via systemic delivery through a peripheral vein.

The present disclosure provides a method of modifying ("editing") the genome of a cardiac cell. The present disclosure provides a method of modifying ("editing") the genome of a cardiac fibroblast. The present disclosure provides a method of modifying ("editing") the genome of a cardiomyocyte. The methods generally involve infecting a cardiac cell (e.g., a cardiac fibroblast or a cardiomyocyte) with an rAAV virion of the present disclosure, where the rAAV virion comprises a heterologous nucleic acid comprising a nucleotide sequence encoding a genome-editing endonuclease. In some embodiments, the method comprises infecting a cardiac fibroblast or a cardiomyocyte with an rAAV virion of the present disclosure, where the rAAV virion comprises a heterologous nucleic acid comprising a nucleotide sequence encoding an RNA-guided genome-editing endonuclease. In some embodiments, the method comprises infecting a cardiac fibroblast or a cardiomyocyte with an rAAV virion of the present disclosure, where the rAAV virion comprises a heterologous nucleic acid comprising a nucleotide sequence encoding: i) an RNA-guided genome-editing endonuclease; and ii) one or more guide RNAs. In some embodiments, the method comprises infecting a cardiac fibroblast or a cardiomyocyte with an rAAV virion of the present disclosure, where the rAAV virion comprises a heterologous nucleic acid comprising a nucleotide sequence encoding: i) an RNA-guided genome-editing endonuclease; ii) a guide RNAs; and iii) a donor template DNA. Suitable RNA-guided genome-editing endonucleases are described above.

In some embodiments, infecting a cardiac cell (e.g., cardiac fibroblast; a cardiomyocyte) is carried out in vitro. In some embodiments, infecting a cardiac cell (e.g., cardiac fibroblast; a cardiomyocyte) is carried out in vitro; and the infected cardiac cell (e.g., cardiac fibroblast) is introduced into (e.g., implanted into) an individual in need thereof, e.g., directly into cardiac tissue of an individual in need thereof. For in vitro transduction, an effective amount of rAAV virions to be delivered to cells will be on the order of from about $10^s$ to about $10^{13}$ of the rAAV virions. Other effective dosages can be readily established by one of ordinary skill in the art through routine trials establishing dose response curves.

In some embodiments, infecting a cardiac cell (e.g., cardiac fibroblast; a cardiomyocyte) is carried out in vivo. For example, in some embodiments, an effective amount of an rAAV virion of the present disclosure is administered directly into cardiac tissue of an individual in need thereof. An "effective amount" will fall in a relatively broad range that can be determined through experimentation and/or clinical trials. For example, for in vivo injection, i.e., injection directly into cardiac tissue, a therapeutically effective dose will be on the order of from about $10^6$ to about $10^{15}$ of the rAAV virions, e.g., from about $10^{11}$ to $10^{12}$ rAAV virions, of the present disclosure. In some embodiments, an effective amount of an rAAV virion of the present disclosure is administered via intramyocardial injection through the epicardium. In some embodiments, an effective amount of an rAAV virion of the present disclosure is administered via vascular delivery through the coronary artery. In some embodiments, an effective amount of an rAAV virion of the present disclosure is administered via systemic delivery through the superior vena cava. In some embodiments, an effective amount of an rAAV virion of the present disclosure is administered via systemic delivery through a peripheral vein.

For example, from about $10^6$ to about $10^7$, from about $10^7$ to about $10^8$, from about $10^8$ to about $10^9$, from about $10^9$ to about $10^{10}$, from about $10^{10}$ to about $10^{11}$, from about $10^{11}$ to about $10^{12}$, from about $10^{12}$ to about $10^{13}$, from about $10^{13}$ to about $10^{14}$, from about $10^{14}$ to about $10^{15}$ genome copies, or more than $10^{15}$ genome copies, of an rAAV virion of the present disclosure are administered to an individual, e.g., are administered directly into cardiac tissue in the individual. The number of rAAV virions administered to an individual can be expressed in viral genomes (vg) per kilogram (kg) body weight of the individual. In some embodiments, and effective amount of an rAAV virion of the present disclosure is from about $10^2$ vg/kg to $10^4$ vg/kg, from about $10^4$ vg/kg to about $10^6$ vg/kg, from about $10^6$ vg/kg to about $10^8$ vg/kg, from about $10^8$ vg/kg to about $10^{10}$ vg/kg, from about $10^{10}$ vg/kg to about $10^{12}$ vg/kg, from about $10^{12}$ vg/kg to about $10^{14}$ vg/kg, from about $10^{14}$ vg/kg to about $10^{16}$ vg/kg, from about $10^{16}$ vg/kg to about $10^{18}$ vg/kg, or more than $10^{18}$ vg/kg. In some embodiments, an effective amount of an rAAV virion of the present disclosure is administered via intramyocardial injection through the epicardium. In some embodiments, an effective amount of an rAAV virion of the present disclosure is administered via vascular delivery through the coronary artery. In some embodiments, an effective amount of an rAAV virion of the present disclosure is administered via systemic delivery through the superior vena cava. In some embodiments, an effective amount of an rAAV virion of the present disclosure is administered via systemic delivery through a peripheral vein.

In some embodiments, the genome editing comprises homology-directed repair (HDR). In some embodiments, the HDR corrects a defect in an endogenous target nucleic acid in the cardiac fibroblast or the cardiomyocyte, where the defect is associated with, or leads to, a defect in structure and/or function of the cardiac fibroblast or the cardiomyocyte, or a component of the cardiac fibroblast or the cardiomyocyte.

In some embodiments, the genome editing comprises non-homologous end joining (NHEJ). In some embodiments, the NHEJ deletes a defect in an endogenous target nucleic acid in the cardiac fibroblast or the cardiomyocyte, where the defect is associated with, or leads to, a defect in structure and/or function of the cardiac fibroblast or the cardiomyocyte, or a component of the cardiac fibroblast or the cardiomyocyte.

A method of the present disclosure for editing the genome of a cardiac cell can be used to correct any of a variety of genetic defects that give rise to a cardiac disease or disorder. Mutations of interest include mutations in one or more of the following genes: cardiac troponin T (TNNT2); myosin heavy chain (MYH7); tropomyosin 1 (TPM1); myosin binding protein C (MYBPC3); 5'-AMP-activated protein kinase subunit gamma-2 (PRKAG2); troponin I type 3 (TNNI3); titin (TTN); myosin, light chain 2 (MYL2); actin, alpha cardiac muscle 1 (ACTC1); potassium voltage-gated channel, KQT-like subfamily, member 1 (KCNQ1); plakophilin 2 (PKP2); myocyte enhancer factor 2c (MEF2C); and cardiac LIM protein (CSRP3). Specific mutations of interest include, without limitation, MYH7 R663H mutation; TNNT2 R173W; PKP2 2013delC mutation; PKP2 Q617X mutation; and KCNQ1 G269S missense mutation. Mutations of interest include mutations in one or more of the following genes: MYH6, ACTN2, SERCA2, GATA4, TBX5, MYOCD, NKX2-5, NOTCH1, MEF2C, HAND2, and HAND1. In some embodiments, the mutations of interest include mutations in the following genes: MEF2C, TBX5, and MYOCD. Cardiac diseases and disorders that can be treated with a method of the present disclosure include coronary heart disease, cardiomyopathy, endocarditis, congenital cardiovascular defects, and congestive heart failure. Cardiac diseases and disorders that can be treated with a method of the present disclosure include hypertrophic cardiomyopathy; a valvular heart disease; myocardial infarction; congestive heart failure; long QT syndrome; atrial arrhythmia; ventricular arrhythmia; diastolic heart failure; systolic heart failure; cardiac valve disease; cardiac valve calcification; left ventricular non-compaction; ventricular septal defect; and ischemia.

Methods of Treatment

The disclosure provides a methods of treating a cardiac pathology in a subject in need thereof, comprising administering a therapeutically effective amount of a pharmaceutical composition comprising an rAAV virion to the subject, wherein the rAAV virion transduces cardiac tissue.

Subjects in need of treatment using compositions and methods of the present disclosure include, but are not limited to, individuals having a congenital heart defect, individuals suffering from a degenerative muscle disease, individuals suffering from a condition that results in ischemic heart tissue (e.g., individuals with coronary artery disease), and the like. In some examples, a method is useful to treat a degenerative muscle disease or condition (e.g., familial cardiomyopathy, dilated cardiomyopathy, hypertrophic cardiomyopathy, restrictive cardiomyopathy, or coronary artery disease with resultant ischemic cardiomyopathy). In some examples, a subject method is useful to treat individuals having a cardiac or cardiovascular disease or disorder, for example, cardiovascular disease, aneurysm, angina, arrhythmia, atherosclerosis, cerebrovascular accident (stroke), cerebrovascular disease, congenital heart disease, congestive heart failure, myocarditis, valve disease coronary, artery disease dilated, diastolic dysfunction, endocarditis, high blood pressure (hypertension), cardiomyopathy, hypertrophic cardiomyopathy, restrictive cardiomyopathy, coronary artery disease with resultant ischemic cardiomyopathy, mitral valve prolapse, myocardial infarction (heart attack), or venous thromboembolism.

Subjects suitable for treatment using the compositions, cells and methods of the present disclosure include individuals (e.g., mammalian subjects, such as humans, non-human primates, domestic mammals, experimental non-human mammalian subjects such as mice, rats, etc.) having a cardiac condition including but limited to a condition that results in ischemic heart tissue (e.g., individuals with coronary artery disease) and the like.

In some examples, an individual suitable for treatment suffers from a cardiac or cardiovascular disease or condition, e.g., cardiovascular disease, aneurysm, angina, arrhythmia, atherosclerosis, cerebrovascular accident (stroke), cerebrovascular disease, congenital heart disease, congestive heart failure, myocarditis, valve disease coronary, artery disease dilated, diastolic dysfunction, endocarditis, high blood pressure (hypertension), cardiomyopathy, hypertrophic cardiomyopathy, restrictive cardiomyopathy, coronary artery disease with resultant ischemic cardiomyopathy, mitral valve prolapse, myocardial infarction (heart attack), or venous thromboembolism. In some examples, individuals suitable for treatment with a subject method include individuals who have a degenerative muscle disease, e.g., familial cardiomyopathy, dilated cardiomyopathy, hypertrophic cardiomyopathy, restrictive cardiomyopathy, or coronary artery disease with resultant ischemic cardiomyopathy.

For example, the cardiac pathology can be selected from the group consisting of congestive heart failure, myocardial infarction, cardiac ischemia, myocarditis and arrhythmia. In some embodiments, the subject is diabetic. In some embodiments, the subject is non-diabetic. In some embodiments, the subject suffers from diabetic cardiomyopathy.

For therapy, the rAAV virions of the disclosure and/or pharmaceutical compositions thereof can be administered locally or systemically. An rAAV virion can be introduced by injection, catheter, implantable device, or the like. An rAAV virion can be administered in any physiologically acceptable excipient or carrier that does not adversely affect the cells. For example, rAAV virions of the disclosure and/or pharmaceutical compositions thereof can be administered intravenously or through an intracardiac route (e.g., epicardially or intramyocardially). Methods of administering rAAV virions of the disclosure and/or pharmaceutical compositions thereof to subjects, particularly human subjects include injection or infusion of the pharmaceutical compositions (e.g., compositions comprising rAAV virions). Injection may include direct muscle injection and infusion may include intravascular infusion. The rAAV virions or pharmaceutical compositions can be inserted into a delivery device which facilitates introduction by injection into the subjects. Such delivery devices include tubes, e.g., catheters, for injecting cells and fluids into the body of a recipient subject. The tubes can additionally include a needle, e.g., a syringe, through which the cells of the invention can be introduced into the subject at a desired location.

In some embodiments, the rAAV virion is administered by subcutaneous, intravenous, intramuscular, intraperitoneal, or intracardiac injection or by intracardiac catheterization. In some embodiments, the rAAV virion is administered by direct intramyocardial injection or transvascular administration. In some embodiments, the rAAV virion is administered by direct intramyocardial injection, antegrade intracoronary injection, retrograde injection, transendomyocardial injection, or molecular cardiac surgery with recirculating delivery (MCARD).

The rAAV virions can be inserted into such a delivery device, e.g., a syringe, in different forms. The rAAV virion can be supplied in the form of a pharmaceutical composition. Such a composition can include an isotonic excipient prepared under sufficiently sterile conditions for human administration. For general principles in medicinal formulation, the reader is referred to *Cell Therapy: Stem Cell Transplantation, Gene Therapy, and Cellular Immunotherapy*, by G. Morstyn & W. Sheridan eds, Cambridge University Press, 1996; and *Hematopoietic Stem Cell Therapy*, E. D. Ball, J. Lister & P. Law, Churchill Livingstone, 2000. The choice of the excipient and any accompanying constituents of the composition can be adapted to optimize administration by the route and/or device employed.

Recombinant AAV may be administered locally or systemically. Recombinant AAV may be engineered to target specific cell types by selecting the appropriate capsid protein of the disclosure. To determine the suitability of various therapeutic administration regimens and dosages of AAV virion compositions, the rAAV virions can first be tested in a suitable animal model. At one level, recombinant AAV are assessed for their ability to infect target cells in vivo. Recombinant AAV can also be assessed to ascertain whether it migrates to target tissues, whether they induce an immune response in the host, or to determine an appropriate number, or dosage, of rAAV virions to be administered. It may be desirable or undesirable for the recombinant AAV to generate an immune response, depending on the disease to be treated. Generally, if repeated administration of a virion is required, it will be advantageous if the virion is not immunogenic. For testing purposes, rAAV virion compositions can be administered to immunodeficient animals (such as nude mice, or animals rendered immunodeficient chemically or by irradiation). Target tissues or cells can be harvested after a period of infection and assessed to determine if the tissues or cells have been infected and if the desired phenotype (e.g. induced cardiomyocyte) has been induced in the target tissue or cells.

Recombinant AAV virions can be administered by various routes, including without limitation direct injection into the heart or cardiac catheterization. Alternatively, the rAAV virions can be administered systemically such as by intravenous infusion. When direct injection is used, it may be performed either by open-heart surgery or by minimally invasive surgery. In some embodiments, the recombinant viruses are delivered to the pericardial space by injection or infusion. Injected or infused recombinant viruses can be traced by a variety of methods. For example, recombinant AAV labeled with or expressing a detectable label (such as green fluorescent protein, or beta-galactosidase) can readily be detected. The recombinant AAV may be engineered to cause the target cell to express a marker protein, such as a surface-expressed protein or a fluorescent protein. Alternatively, the infection of target cells with recombinant AAV can be detected by their expression of a cell marker that is not expressed by the animal employed for testing (for example, a human-specific antigen when injecting cells into an experimental animal). The presence and phenotype of the target cells can be assessed by fluorescence microscopy (e.g., for green fluorescent protein, or beta-galactosidase), by immunohistochemistry (e.g., using an antibody against a human antigen), by ELISA (using an antibody against a human antigen), or by RT-PCR analysis using primers and hybridization conditions that cause amplification to be specific for RNA indicative of a cardiac phenotype.

Pharmaceutical Compositions

The present disclosure provides pharmaceutical composition comprising an rAAV virion of the disclosure. The pharmaceutical composition may include one or more of a pharmaceutically acceptable carrier, diluent, excipient, and buffer. In some embodiments, the pharmaceutically acceptable carrier, diluent, excipient, or buffer is suitable for use in a human. Such excipients, carriers, diluents, and buffers include any pharmaceutical agent that can be administered without undue toxicity. Pharmaceutically acceptable excipients include, but are not limited to, liquids such as water, saline, glycerol and ethanol. Pharmaceutically acceptable salts can be included therein, for example, mineral acid salts such as hydrochlorides, hydrobromides, phosphates, sulfates, and the like; and the salts of organic acids such as acetates, propionates, malonates, benzoates, and the like. Additionally, auxiliary substances, such as pH buffering substances may be present in such vehicles. A wide variety of pharmaceutically acceptable excipients are known in the art and need not be discussed in detail herein. Pharmaceutically acceptable excipients have been amply described in a variety of publications, including, for example, A. Gennaro (2000) *Remington: The Science and Practice of Pharmacy*, 20th edition, Lippincott, Williams, & Wilkins; *Pharmaceutical Dosage Forms and Drug Delivery Systems* (1999) H. C. Ansel et al., eds., $7^{th}$ ed., Lippincott, Williams, & Wilkins; and *Handbook of Pharmaceutical Excipients* (2000) A. H. Kibbe et al., eds., $3^{rd}$ ed. Amer. Pharmaceutical Assoc.

To prepare the composition, rAAV virion is generated and purified as necessary or desired. The rAAV can be mixed with or suspended in a pharmaceutically acceptable carrier. These rAAV can be adjusted to an appropriate concentration, and optionally combined with other agents. The concentration of rAAV virion and/or other agent included in a unit dose can vary widely. The dose and the number of administrations can be optimized by those skilled in the art. For example, about $10^2$-$10^{10}$ vector genomes (vg) may be administered. In some embodiments, the dose be at least about $10^2$ vg, about $10^3$ vg, about $10^4$ vg, about $10^5$ vg, about $10^6$ vg, about $10^7$ vg, about $10^8$ vg, about $10^9$ vg, about $10^{10}$ vg, or more vector genomes. Daily doses of the compounds can vary as well. Such daily doses can range, for example, from at least about $10^2$ vg/day, about $10^3$ vg/day, about $10^4$ vg/day, to about $10^5$ vg/day, about $10^6$ vg/day, about $10^7$ vg/day, about $10^8$ vg/day, about $10^9$ vg/day, about $10^{10}$ vg/day, or more vector genomes per day.

In certain embodiments, the method of treatment is enhanced by the administration of one or more anti-inflammatory agents, e.g., an anti-inflammatory steroid or a non-steroidal antiinflammatory drug (NSAID).

Anti-inflammatory steroids for use in the invention include the corticosteroids, and in particular those with glucocorticoid activity, e.g., dexamethasone and prednisone. Nonsteroidal anti-inflammatory drugs (NSAIDs) for use in the invention generally act by blocking the production of prostaglandins that cause inflammation and pain, cyclooxygenase-1 (COX-1) and/or cyclooxygenase-2 (COX-2). Traditional NSAIDs work by blocking both COX-1 and COX-2. The COX-2 selective inhibitors block only the COX-2 enzyme. In certain embodiment, the NSAID is a COX-2 selective inhibitor, e.g., celecoxib (Celebrex®), rofecoxib (Vioxx), and valdecoxib (B extra). In certain embodiments, the anti-inflammatory is an NSAID prostaglandin inhibitor, e.g., Piroxicam.

The amount of rAAV virion for use in treatment will vary not only with the particular carrier selected but also with the route of administration, the nature of the condition being treated and the age and condition of the patient. Ultimately, the attendant health care provider may determine proper dosage. A pharmaceutical composition may be formulated with the appropriate ratio of each compound in a single unit dosage form for administration with or without cells. Cells or vectors can be separately provided and either mixed with a liquid solution of the compound composition, or administered separately.

Recombinant AAV can be formulated for parenteral administration (e.g., by injection, for example, bolus injection or continuous infusion) and may be presented in unit dosage form in ampoules, prefilled syringes, small volume infusion containers or multi-dose containers with an added preservative. The pharmaceutical compositions can take the form of suspensions, solutions, or emulsions in oily or aqueous vehicles, and can contain formulatory agents such as suspending, stabilizing and/or dispersing agents. Suitable carriers include saline solution, phosphate buffered saline, and other materials commonly used in the art.

The compositions can also contain other ingredients such as agents useful for treatment of cardiac diseases, conditions and injuries, such as, for example, an anticoagulant (e.g., dalteparin (fragmin), danaparoid (organan), enoxaparin (lovenox), heparin, tinzaparin (innohep), and/or warfarin (coumadin)), an antiplatelet agent (e.g., aspirin, ticlopidine, clopidogrel, or dipyridamole), an angiotensin-converting enzyme inhibitor (e.g., Benazepril (Lotensin), Captopril (Capoten), Enalapril (Vasotec), Fosinopril (Monopril), Lisinopril (Prinivil, Zestril), Moexipril (Univasc), Perindopril (Aceon), Quinapril (Accupril), Ramipril (Altace), and/or Trandolapril (Mavik)), angiotensin II receptor blockers (e.g., Candesartan (Atacand), Eprosartan (Teveten), Irbesartan (Avapro), Losartan (Cozaar), Telmisartan (Micardis), and/or Valsartan (Diovan)), a beta blocker (e.g., Acebutolol (Sectral), Atenolol (Tenormin), Betaxolol (Kerlone), Bisoprolol/hydrochlorothiazide (Ziac), Bisoprolol (Zebeta), Carteolol (Cartrol), Metoprolol (Lopressor, Toprol XL), Nadolol (Corgard), Propranolol (Inderal), Sotalol (Betapace), and/or Timolol (Blocadren)), Calcium Channel Blockers (e.g., Amlodipine (Norvasc, Lotrel), Bepridil (Vascor), Diltiazem (Cardizem, Tiazac), Felodipine (Plendil), Nifedipine (Adalat, Procardia), Nimodipine (Nimotop), Nisoldipine (Sular), Verapamil (Calan, Isoptin, Verelan), diuretics (e.g, Amiloride (Midamor), Bumetanide (Bumex), Chlorothiazide (Diuril), Chlorthalidone (Hygroton), Furosemide (Lasix), Hydrochlorothiazide (Esidrix, Hydrodiuril), Indapamide (Lozol) and/or Spironolactone (Aldactone)), vasodilators (e.g., Isosorbide dinitrate (Isordil), Nesiritide (Natrecor), Hydralazine (Apresoline), Nitrates and/or Minoxidil), statins, nicotinic acid, gemfibrozil, clofibrate, Digoxin, Digitoxin, Lanoxin, or any combination thereof.

Additional agents can also be included such as antibacterial agents, antimicrobial agents, anti-viral agents, biological response modifiers, growth factors; immune modulators, monoclonal antibodies and/or preservatives. The compositions of the invention may also be used in conjunction with other forms of therapy.

The rAAV virions described herein can be administered to a subject to treat a disease or disorder. Such a composition may be in a single dose, in multiple doses, in a continuous or intermittent manner, depending, for example, upon the recipient's physiological condition, whether the purpose of the administration is in response to traumatic injury or for more sustained therapeutic purposes, and other factors known to skilled practitioners. The administration of the compounds and compositions of the invention may be essentially continuous over a preselected period of time or may be in a series of spaced doses. Both local and systemic administration is contemplated. In some embodiments, localized delivery of rAAV virion is achieved. In some embodiments, localized delivery of rAAV virions is used to generate a population of cells within the heart. In some embodiments, such a localized population operates as "pacemaker cells" for the heart. In some embodiments, the rAAV virions are used to generate, regenerate, repair, replace, and/or rejuvenate one or more of a sinoatrial (SA) node, an atrioventricular (AV) node, a bindle of His, and/or Purkinje fibres.

To control tonicity, an aqueous pharmaceutical composition can comprise a physiological salt, such as a sodium salt. Sodium chloride (NaCl) is preferred, which may be present at between 1 and 20 mg/ml. Other salts that may be present include potassium chloride, potassium dihydrogen phosphate, disodium phosphate dehydrate, magnesium chloride and calcium chloride.

Compositions may include one or more buffers. Typical buffers include: a phosphate buffer; a Tris buffer; a borate buffer; a succinate buffer; a histidine buffer; or a citrate buffer. Buffers will typically be included at a concentration in the 5-20 mM range. The pH of a composition will generally be between 5 and 8, and more typically between 6 and 8 e.g. between 6.5 and 7.5, or between 7.0 and 7.8.

The composition is preferably sterile. The composition is preferably gluten free. The composition is preferably non-pyrogenic.

In some embodiments, a composition comprising cells may include a cryoprotectant agent. Non-limiting examples of cryoprotectant agents include a glycol (e.g., ethylene glycol, propylene glycol, and glycerol), dimethyl sulfoxide (DMSO), formamide, sucrose, trehalose, dextrose, and any combinations thereof.

One or more of the following types of compounds can also be present in the composition with the rAAV virions: a WNT agonist, a GSK3 inhibitor, a TGF-beta signaling inhibitor, an epigenetic modifier, LSD1 inhibitor, an adenylyl cyclase agonist, or any combination thereof.

Kits

A variety of kits are described herein that include any of composition (e.g. rAAV virions) described herein. The kit can include any of compositions described herein, either mixed together or individually packaged, and in dry or hydrated form. The rAAV virions and/or other agents described herein can be packaged separately into discrete vials, bottles or other containers. Alternatively, any of the rAAV virions and/or agents described herein can be packaged together as a single composition, or as two or more compositions that can be used together or separately. The compounds and/or agents described herein can be packaged in appropriate ratios and/or amounts to facilitate conversion of selected cells across differentiation boundaries to form cardiac progenitor cells and/or cardiomyocytes.

The kit can include instructions for administering those compositions, compounds and/or agents. Such instructions can provide the information described throughout this application. The rAAV virion or pharmaceutical composition can be provided within any of the kits in the form of a delivery device. Alternatively a delivery device can be separately included in the kits, and the instructions can describe how to assemble the delivery device prior to administration to a subject.

Any of the kits can also include syringes, catheters, scalpels, sterile containers for sample or cell collection, diluents, pharmaceutically acceptable carriers, and the like. The kits can provide other factors such as any of the supplementary factors or drugs described herein for the compositions in the preceding section or other parts of the application.

The following non-limiting Examples illustrate some of the experimental work involved in developing the invention.

EXAMPLES

Example 1

Identification of Variable Region Modified AAV9 Capsid

Library Generation and AAV Selection

Figure 2:
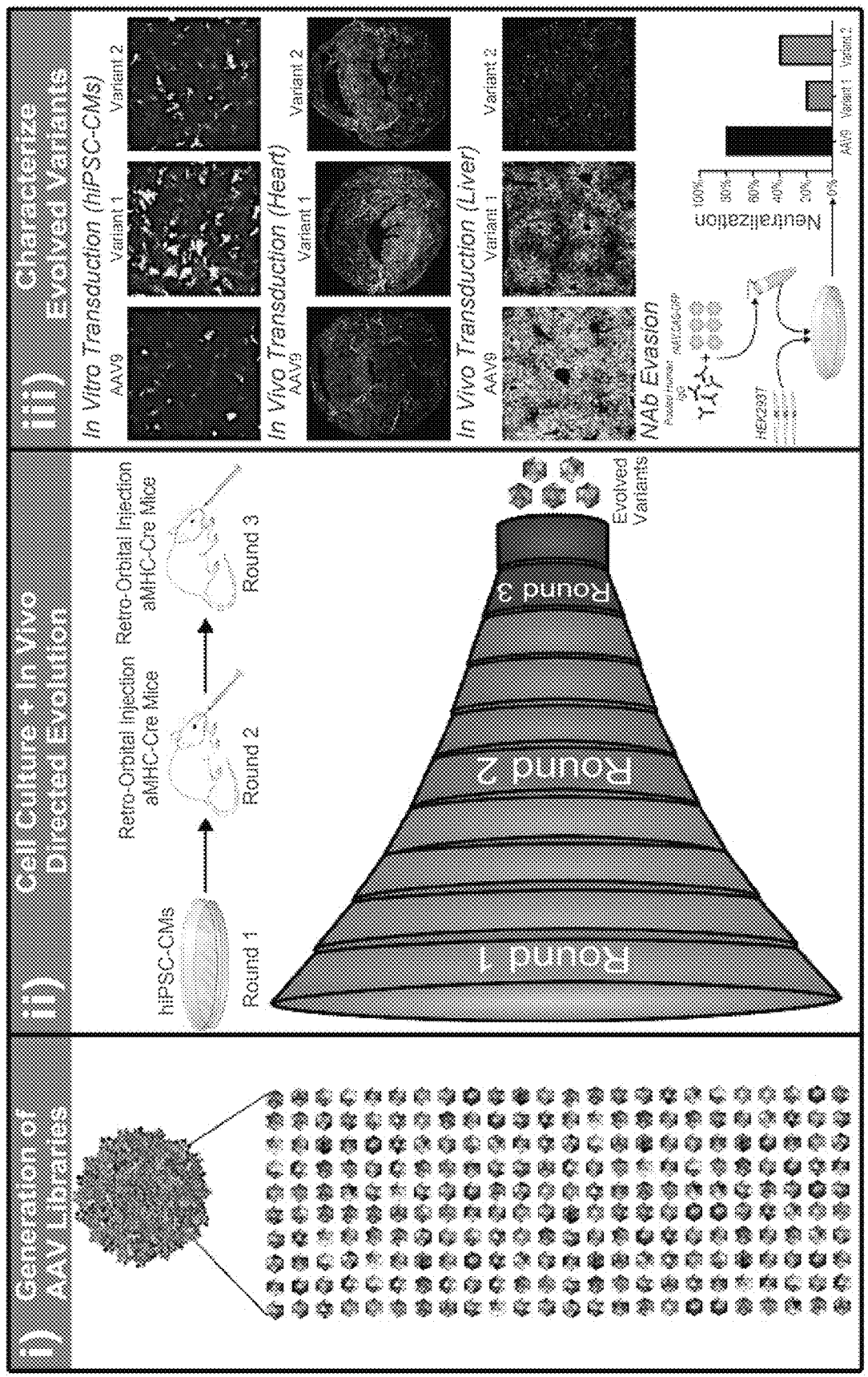
FIG. 2 shows a schematic of directed evolution selection strategy and variant characterization. Following library generation, each library was subjected to one round of selection in hiPSC-CMs and two rounds of selection in a mouse model. Top variants from each library were characterized through evaluation of in vitro transduction (hiPSC-CMs) and in vivo transduction (heart and liver) following systemic delivery of virus. Top variants were screened for the ability to escape human NAb inhibition.
Figure 3A:
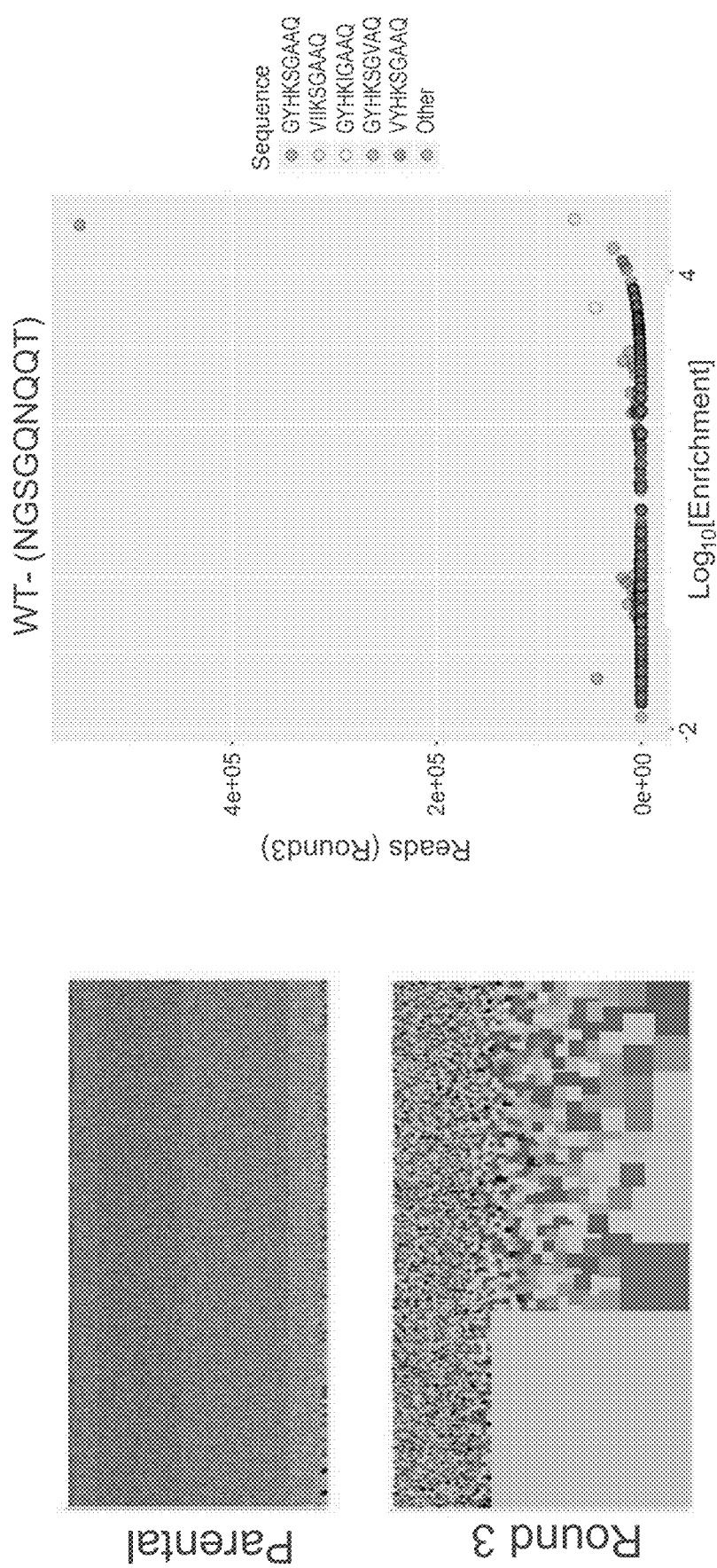
FIG. 3 shows graphic representation of VR-modified libraries following three rounds of library screening. Graphical representation of library complexity for VR-IV (FIG. 3A), VR-V (FIG. 3B), VR-VII (FIG. 3C) and VR-VIII (FIG. 3D) in the parental viral library and after three rounds of selection are shown, where each read in the image correlates to one pixel in the image. Protein sequences are given a unique color based on the hydrophobicity of the sequence and reads of the same sequence are clustered together.
Figure 3B:
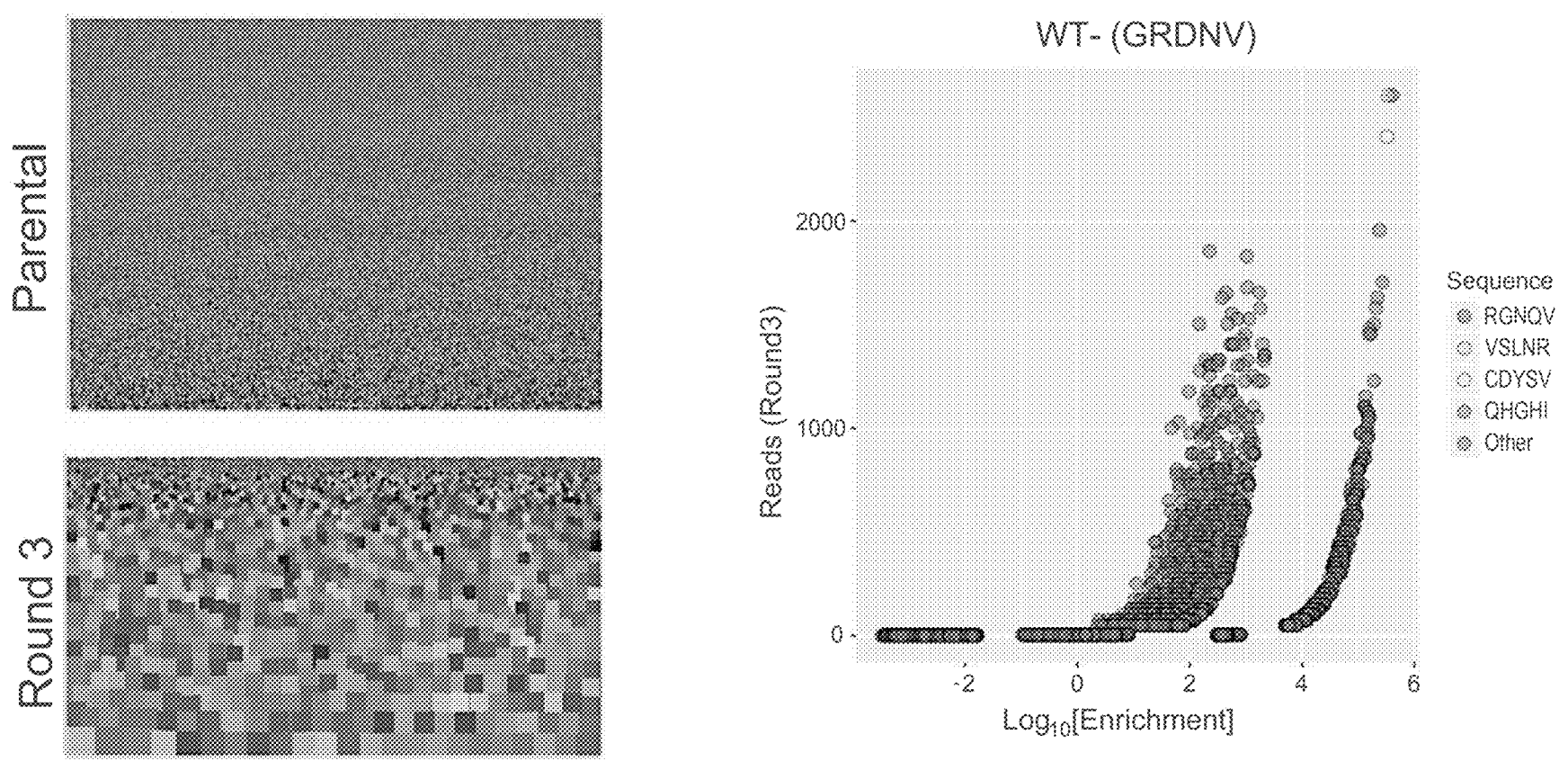
Figure 3C:
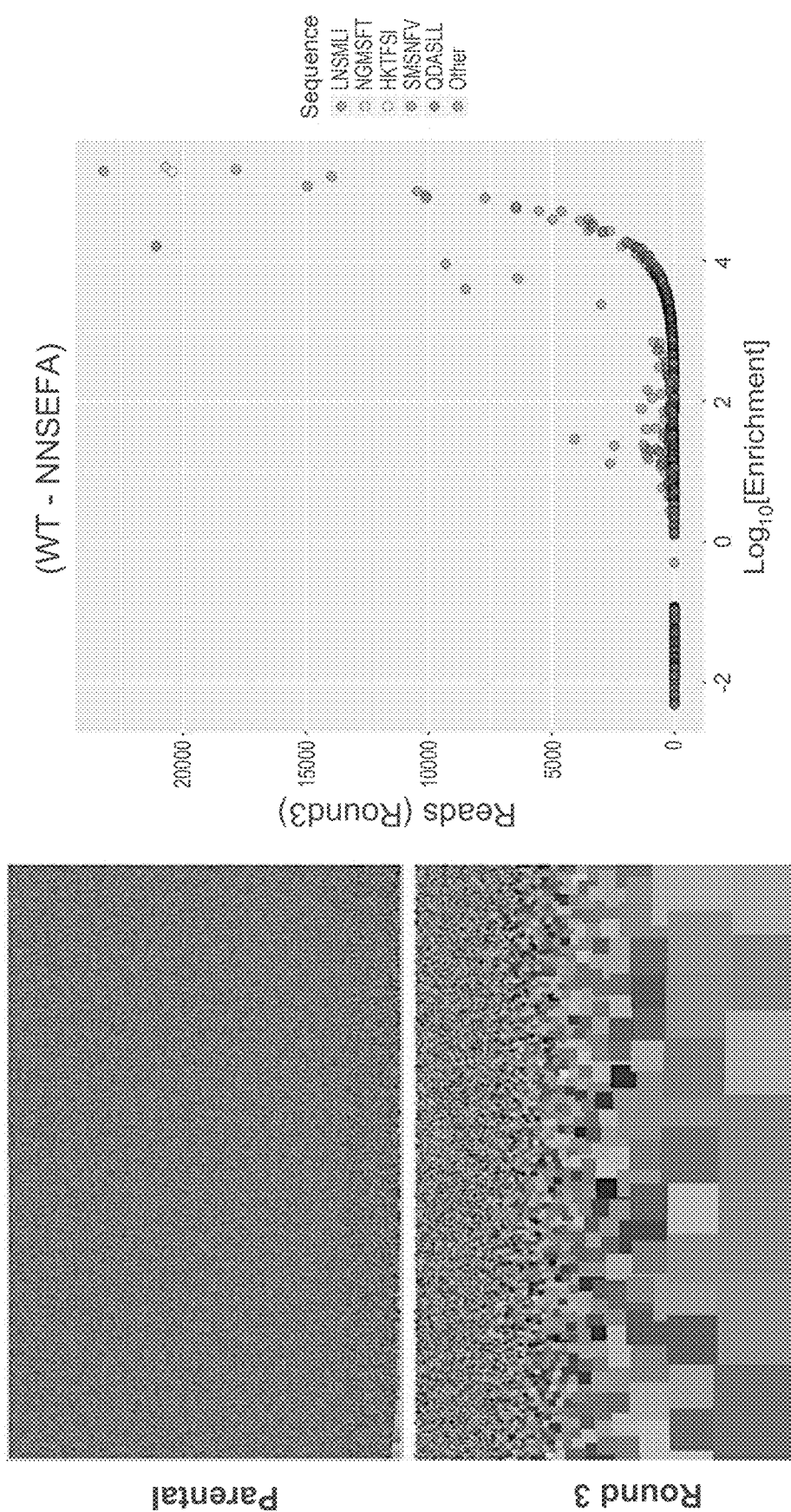
Figure 3D:
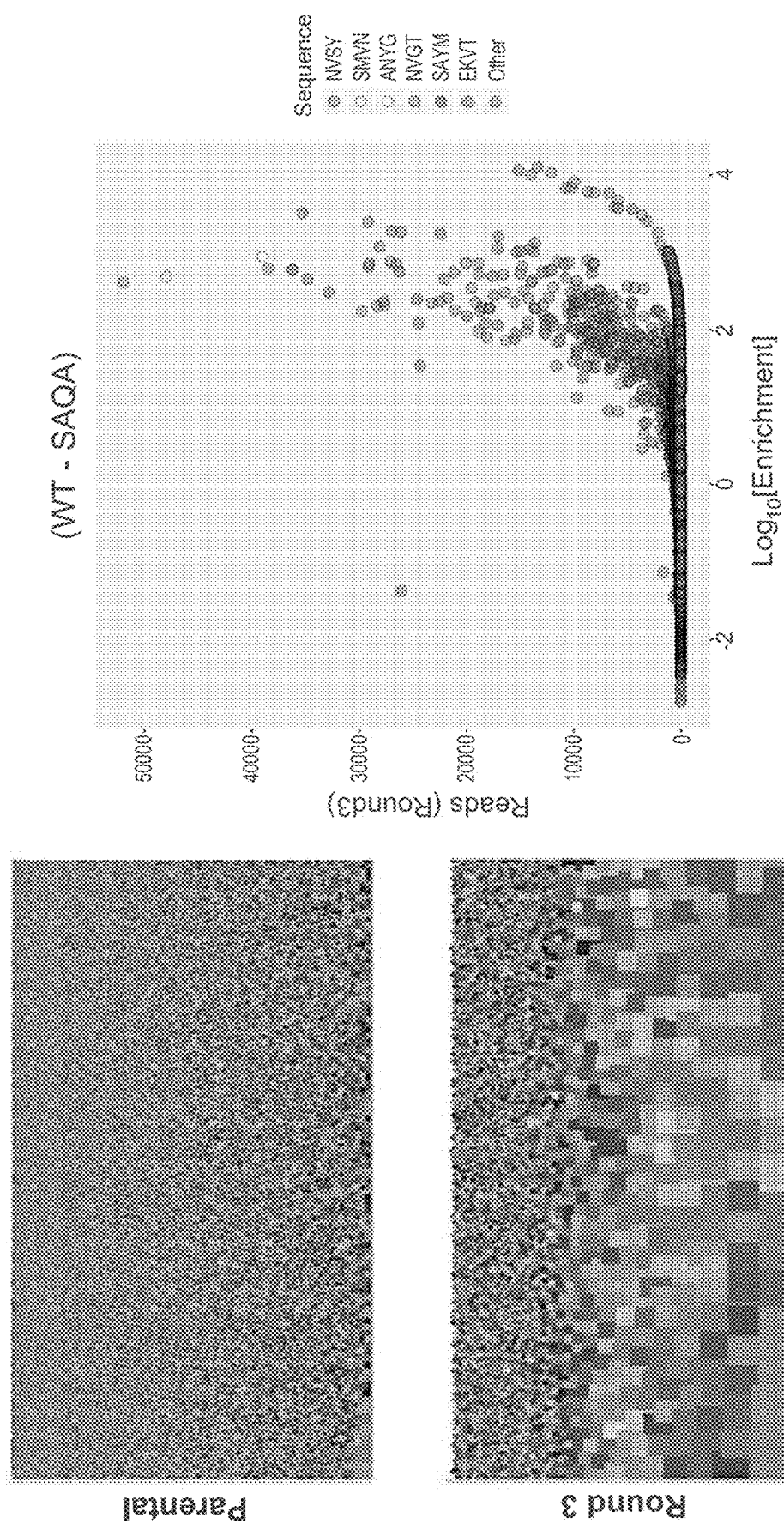
Figure 4A:
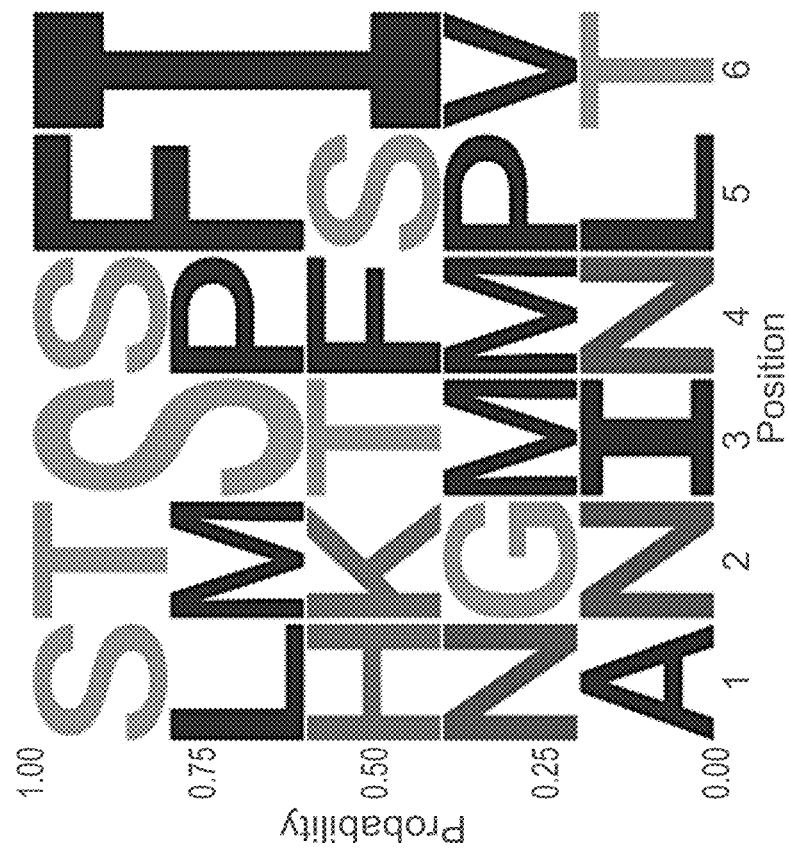
FIG. 4 depicts protein motifs identified in VR-IV (FIG. 4A), VR-V (FIG. 4B), VR-VII (FIG. 4C) and VR-VIII (FIG. 4D) site following the directed evolution.
Figure 4B:
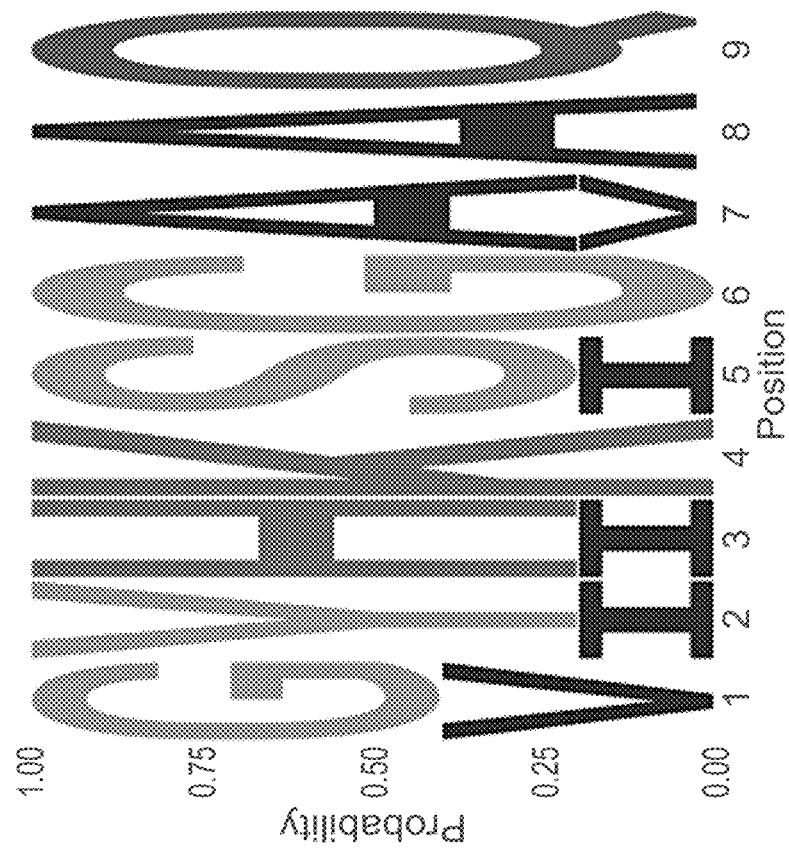
Figure 4C:
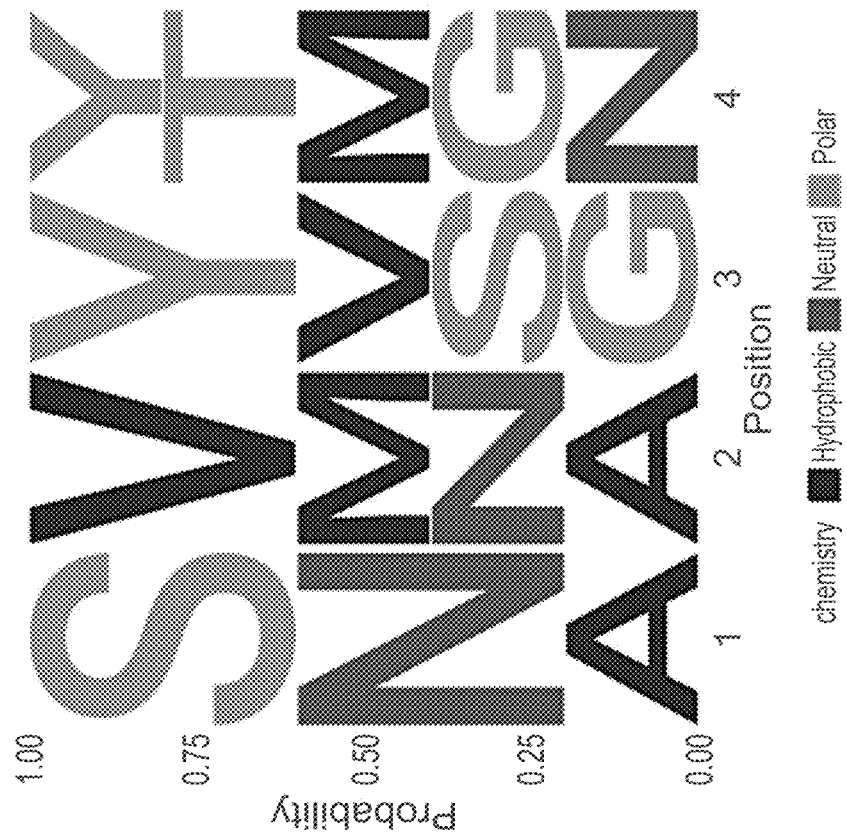
Figure 4D:
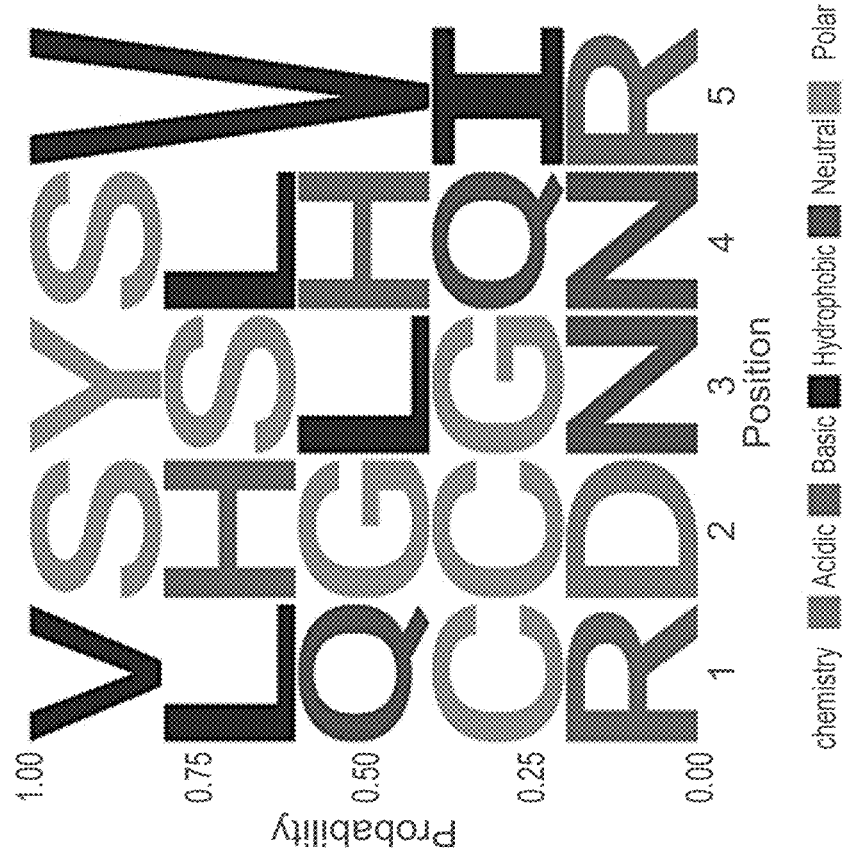

Variable regions (VR-IV, VR-V, VR-VII and VR-VIII sites) on the AAV9 capsid are shown in FIG. 1. A library screening strategy was employed to generate highly diverse libraries through randomly altering residues within each site of AAV9 capsid to identify AAV variants with improved transduction efficiency and/or selectivity towards cardiac tissue, as shown in FIG. 2. Briefly, individual libraries were generated for each variable region along with a library consisting of combinations of all VR-modified libraries. These libraries were independently subjected to three rounds of directed evolution. The first round of evolution was performed in hiPSC-CMs in order to select for human trophic variants. The remaining two rounds of directed evolution were carried through systemic delivery of the libraries in αMHC-Cre mice in order to select for cardiotrophic variants that can transcytose through the endothelial barrier of the heart and transduce cardiomyocytes following systemic delivery. Following three rounds of directed evolution, each library exhibited varying levels of convergence, as shown in FIGS. 3A-3D and 4A-4D.

Confirmation of Increased Transduction Efficiency In Vitro and In Vivo

The top variants from each library were first assessed for their ability to transduce human iPSC-CMs in vitro. Cells were infected with each variant packaging a ubiquitously expressing GFP reporter at a MOI of 100,000. VR-IV modified AAV capsids exhibited significantly enhanced hiPSC-CM transduction compared to AAV9, with CR9-01 displaying a 129-fold increase in transduction efficiency (FIG. 5). Subsequently, variants were assessed in vivo for their ability to transduce the heart following systemic delivery. To this end, C57BL/6J mice were injected with 2.5E+11 vg/mouse of either AAV9:CAG-GFP or CAG-GFP encapsulated by a novel capsid variant. Seven days following injection, animals were sacrificed, and the heart and liver were recovered for GFP expression analysis by ELISA. Variants from each library displayed increased cardiac transduction compared to AAV9 (FIGS. 6A-6B). Most variants with increased cardiac transduction also exhibited reduced liver tropism (FIGS. 6C-6D) leading to the identification of capsids with improved cardiac specificity. Finally, the top performing AAV capsid variants were assessed for their ability to evade human NAbs. Variants packaging CAG-GFP were incubated with increasing concentrations of pooled human IgG for 30 minutes before treating HEK293T cells at a MOI of 100,000. Forty-eight hours post-infection, GFP expression was assessed by flow cytometry (FIG. 7A). Two variants, CR9-07 and CR9-13 displayed improved NAb evasion compared to unmodified AAV9 (FIG. 7B-7C).

Example 2

Identification of AAV5/9 Chimeric Capsid

Capsid shuffling was used to identify AAV5/9 chimeric protein variants with improved cardiomyocyte tropism. An AAV5/9 chimeric library was generated in order to identify chimeras with the favorable properties of AAV5 and AAV9 (decreased liver tropism, low NAb susceptibility, transcytosis and/or cardiac transduction), as shown in FIG. 8. Following one round of in vivo selection, the library complexity was dramatically reduced, resulting in less than 100 variants that were capable of transducing the heart following systemic delivery of the parental library (FIG. 9). The majority of crossover events occurred within the VP1 region of the capsid, with the majority of variants having AAV9 dominated VP3 regions. hiPSC-CMs were then infected at a MOI of 75,000 either by AAV9:CAG-GFP or CAG-GFP encapsulated by a chimeric AAV5/9 capsid. Seventy-two hours after infection, cells were harvested, and the transduction efficiency of each capsid was evaluated using flow cytometry (FIG. 10A). ZC44 exhibited a improvement in transduction efficiency in hiPSC-CM cells compared to AAV9.

AAV5/9 chimeric capsids were assessed for their ability to evade human NAbs. Here, variants packaging CAG-GFP were incubated with 1 mg/mL of pooled human IgG for 30 minutes before treating HEK293T cells at a MOI of 100,000. 48 post-infection, GFP expression was assessed by flow cytometry. In addition to increased transduction efficiency, ZC44 showed decreased susceptibility to NAbs compared to AAV9 (FIG. 10B).

The top chimeric variants were assessed in vivo for their ability to transduce heart and liver following systemic delivery. C57BL/6J mice were injected with 2E+11 vg/mouse of either AAV9:CAG-GFP or CAG-GFP encapsulated by a novel capsid variant. Fourteen days following injection, animals were sacrificed, and the heart and the liver were recovered for GFP expression analysis by ELISA. ZC47 displayed increased heart transduction compared to AAV9; ZC40, ZC44, and ZC49 retained an ability to transduce heart tissue in vivo equivalent to parental AAV9 (FIG. 11A). Z40, Z41, Z46, and Z47 each exhibited liver de-targeting as evidenced by the pronounced reduction in liver transduction following systemic delivery (FIG. 11B).

Example 3

Identification of Combinatory Capsid

Modifications within the variable region modified capsids and the chimeric capsids were combined to generate additional combinatory capsid variants. A total of 18 combinatory variants containing AAV5-derived VP1 sequences and modified variable regions were generated (FIG. 12). Midi-scale vector production was produced to assess the manufacturability of the AAV capsid variants (FIG. 13). The transduction efficiency of the combinatory variants in hiPSC-CMs were then evaluated as follows: Cells were infected at a MOI of 75,000 either by AAV9:CAG-GFP or a combinatory AAV capsid packaging CAG-GFP. 5 days following infection, cells were harvested, and the transduction efficiency of each capsid was evaluated using Cytation 5 cell imaging reader. TN44-07 and TN47-07 displayed transduction superior to AAV9 (>15-fold) (FIG. 14).

Combinatory variants were assessed in vivo for their ability to transduce the heart following systemic delivery. C57BL/6J mice were injected with 1E+11 vg/mouse of either AAV9:CAG-GFP or a combinatory capsid variant packaging the same transgene cassette. Fourteen days following injection, animals were sacrificed, and the heart and liver were recovered for GFP expression analysis by ELISA. TN44-07 and TN47-10, showed improvement in cardiac transduction compared to AAV9; TN47-14 transduced the heart at a similar level as AAV9 (FIG. 15A). Remarkably, TN47-14 lost almost all tropism for the liver, as evidenced by the highly significant reduction in GFP expression in the liver (FIG. 15B). Both TN47-10 and TN47-14 have an improved ratio of heart to liver transduction compared to AAV9 following systemic delivery (FIG. 15C). Selected combinatory capsid variants were also evaluated for human NAb evasion. AAV9 or a capsid variant packaging CAG-GFP was incubated for 30 minutes at 37° C. in the absence or presence (600 ug/mL) of pooled human IgG from ~2500 patients. Following the incubation, virus was incubated with HEK293T cells at an MOI of 100,000. The following day, media was replenished, and the cells were incubated for an additional 24 hours to allow for adequate GFP expression. GFP expression was quantified by flow cytometry and transduction was normalized to the no IgG control. All these combinatory AAV capsid variants (TN44-07, TN47-07, TN47-10, TN47-13 and TN47-14) demonstrated improved evasion from neutralizing antibodies in pooled human IgG. Among them, virions containing TN44-07 combinatory capsid were the most stealth, having a highly significant reduction of NAb neutralization (p=0.0002, t-test, Welch's correction) compared to AAV9 (FIG. 16).

Example 4

Testing in Non-Human Primates

Transduction of recombinant AAV mediated by a panel of engineered capsids was assessed in male cynomolgus macaques (*Macaca fascicularis*) following intravenous delivery of each capsid packaging CAG-GFP at a dose of $1 \times 10^{12}$ vg/kg (n=3/group). Thirty days following dosing, animals were euthanized and organs harvested for analysis of specific transduction.

In order to evaluate the organ-specific transduction profile of novel engineered capsid variants in a high throughput manner, an approach using RNA barcode sequencing was employed. Each capsid (two parental & 12 novel variants) was assigned a unique barcode that was placed in the 3'-UTR of a ubiquitously expressing GFP cassette (CAG-GFP). Each barcode selected was experimentally determined to have no effect on protein expression/RNA stability. rAAV was individually manufactured for each capsid in order to link the barcode to the capsid and all rAAV preparations were pooled together at equal concentrations. Male cynomolgus macaques (2-5 years in age) were dosed with either $1 \times 10^{13}$ vg/kg of the pooled viral library (n=3) or sham treated with HBSS (n=1). Thirty days following the injection date, animals were sacrificed, and tissue collected for RNA analysis. The relative abundance of each barcode was determined through next-generation sequencing of GFP-barcode transcripts using the Illumina NextSeq550 and a custom python script. Relative expression of the barcodes for each tissue was normalized to AAV9. The results are shown in FIG. 17.

Transduction of rAAV containing engineered capsid was assessed in the left ventricle and liver of the animals. The TN3 and TN6 engineered capsids showed the highest transduction in the left ventricle compared to AAV9 (FIG. 17A). While TN6 engineered capsid showed liver transduction comparable to AAV9, TN3 showed substantially less transduction in liver relative to AAV9 (FIG. 17B). The left ventricle (LV) to liver transduction ratio for each engineered capsid is shown in FIG. 17C. The TN3 engineered capsid shows the most favorable transduction profile. It has high LV transduction while maintaining low transduction in the liver. rAAV-induced toxicity due to off-target transduction in the liver can be a challenge in clinical applications, and the transduction profile shown by the TN3 engineered capsid may overcome this limitation. A broader transduction profile was generated by analyzing rAAV transduction mediated by the panel of engineered capsids in a range of tissues (FIG. 17D).

What is claimed is:

1. A recombinant adeno-associated virus (rAAV) capsid protein, comprising a variant polypeptide sequence at one or more of a VR-IV site, a VR-V site, a VR-VII site, and a VR-VIII site of a parental sequence, wherein the parental sequence comprises a sequence at least 95%, at least 98%, at least 99%, or 100% identical to SEQ ID NO: 463.

2. The capsid protein of claim 1, wherein (i) the variant polypeptide sequence is a cardiotrophic variant polypeptide sequence; (ii) a recombinant adeno-associated virus (rAAV) comprising the capsid protein exhibits increased transduction efficiency in cardiac cells compared to an AAV comprising the parental sequence; (iii) an rAAV comprising the capsid protein exhibits decreased transduction efficiency in liver cells compared to an AAV comprising the parental sequence; or (iv) an rAAV comprising the capsid protein exhibits increased selectivity for cardiac cells over liver cells compared to an AAV comprising the parental sequence.

3. The capsid protein of claim 1, wherein the capsid protein comprises a variant polypeptide at the VR-IV site of the parental sequence, wherein the amino acid sequence NGSGONQQT (SEQ ID NO:2) at the VR-IV site is substituted by a peptide of formula —$(X)_n$—, wherein n is 7-11, and X represents any of the 20 standard amino acids (SEQ ID NO:478).

4. The capsid protein of claim 3, wherein the variant polypeptide at the VR-IV site has a sequence:

$$-X_1-X_2-X_3-X_4-X_5-X_6-X_7-X_8-X_9-$$

wherein:
a) $X_1$ is G, S or V;
b) $X_2$ is Y, Q or I;
c) $X_3$ is H, W, V or I;
d) $X_4$ is K or N;
e) $X_5$ is S, G or I;
f) $X_6$ is G or R;
g) $X_7$ is A, P or V;
h) $X_8$ is A or R; and
i) $X_9$ is Q or D (SEQ ID NO: 477), or
wherein the variant polypeptide at the VR-IV site comprises an amino acid sequence selected from the group consisting of SEQ ID NOs: 6-104, or
wherein the variant polypeptide at the VR-IV site comprises an amino acid sequence selected from the group consisting of: GYHKSGAAQ (SEQ ID NO: 6), VIIKSGAAQ (SEQ ID NO: 7), GYHKIGAAQ (SEQ ID NO: 8), GYHKSGVAQ (SEQ ID NO: 9), SQVNGRPRD (SEQ ID NO: 33), and a sequence comprising at most 1, 2, 3, or 4 amino-acid substitutions relative to GYHKSGAAQ (SEQ ID NO: 6).

5. The capsid protein of claim 1, wherein the capsid protein comprises a variant polypeptide at the VR-V site of the parental sequence, wherein the amino acid sequence NNSEFA (SEQ ID NO:3) at the VR-V site is substituted by a peptide of formula —$(X)_n$—, wherein n is 4-8, and X represents any of the 20 standard amino acids (SEQ ID NO: 479).

6. The capsid protein of claim 5, wherein the variant polypeptide at the VR-V site has a sequence:

$$-X_1-X_2-X_3-X_4-X_5-X_6-$$

wherein:
a) $X_1$ is S, L, H, N, or A;
b) $X_2$ is T, M, K, G, or N;
c) $X_3$ is S, T, M or I;
d) $X_4$ is S, P, F, M, or N;
e) $X_5$ is F, S, P or L; and
f) $X_6$ is I, V, or T (SEQ ID NO: 474), or
wherein the variant polypeptide at the VR-V site comprises an amino acid sequence selected from the group consisting of SEQ ID NOs: 105-203, or
wherein the variant polypeptide at the VR-V site comprises an amino acid sequence selected from the group consisting of: LNSMLI (SEQ ID NO: 105), NGMSFT (SEQ ID NO: 106), HKTFSI (SEQ ID NO: 107), SMSNFV (SEQ ID NO: 108), and a sequence comprising at most 1, 2, 3, or 4 amino-acid substitutions relative to LNSMLI (SEQ ID NO: 105).

7. The capsid protein of claim 1, wherein the capsid protein comprises a variant polypeptide at the VR-VII site of the parental sequence, wherein the amino acid sequence GRDNV (SEQ ID NO:4) at the VR-VII site is substituted by a peptide of formula —$(X)_n$—, wherein n is 3-7, and X represents any of the 20 standard amino acids (SEQ ID NO: 480).

8. The capsid protein of claim 7, wherein the variant polypeptide at the VR-VII site has a sequence:

$$-X_1-X_2-X_3-X_4-X_5-$$

wherein:
a) $X_1$ is V, L, Q, C, or R;
b) $X_2$ is S, H, G, C, or D;
c) $X_3$ is Y, S, L, G, or N;
d) $X_4$ is S, L, H, Q, or N; and
e) $X_5$ is V, I, or R (SEQ ID NO: 475), or
wherein the variant polypeptide at the VR-VII site comprises an amino acid sequence selected from the group consisting of SEQ ID NOs: 204-302, or
wherein the variant polypeptide at the VR-VII site comprises an amino acid sequence selected from the group consisting of: RGNQV (SEQ ID NO: 204), VSLNR (SEQ ID NO: 205), CDYSV (SEQ ID NO: 206), QHGHI (SEQ ID NO: 207), and a sequence comprising at most 1, 2, or 3 amino-acid substitutions relative to RGNQV (SEQ ID NO: 204).

9. The capsid protein of claim 1, wherein the capsid protein comprises a variant polypeptide at the VR-VIII site of the parental sequence, wherein the amino acid sequence SAQA (SEQ ID NO:5) at the VR-VIII site is substituted by a peptide of formula-(X) n-, wherein n is 2-6, and X represents any of the 20 standard amino acids (SEQ ID NO:481).

10. The capsid protein of claim 9, wherein the variant polypeptide at the VR-VIII site has a sequence:

$$-X_1-X_2-X_3-X_4-$$

wherein:
a) $X_1$ is S, N, or A;
b) $X_2$ is V, M, N, or A;
c) $X_3$ is Y, V, S, or G; and
d) $X_4$ is Y, T, M, G, or N (SEQ ID NO: 476).

11. The capsid protein of claim 9, wherein the variant polypeptide at the VR-VIII site comprises an amino acid sequence selected from the group consisting of SEQ ID NOs: 303-401, or
wherein the variant polypeptide at the VR-VIII site comprises an amino acid sequence selected from the group consisting of: NVSY (SEQ ID NO: 303), SMVN (SEQ ID NO: 304), ANYG (SEQ ID NO: 305), NVGT (SEQ ID NO: 306), a sequence comprising at most 1, 2 or 3 amino-acid substitutions relative to NVSY (SEQ ID NO: 303), and a sequence comprising at most 1, 2 or 3 amino-acid substitutions relative to ANYG (SEQ ID NO: 305).

12. The capsid protein of claim 9, wherein the variant polypeptide at the VR-VIII site comprises the amino acid sequence ANYG (SEQ ID NO: 305) or a sequence comprising at most 1 or 2 amino-acid substitutions relative to ANYG (SEQ ID NO: 305).

13. The capsid protein of claim 9, wherein the variant polypeptide at the VR-VIII site comprises the amino acid sequence NVSY (SEQ ID NO: 303) or a sequence comprising at most 1 or 2 amino-acid substitutions relative to NVSY (SEQ ID NO: 303).

14. The capsid protein of claim 1, wherein the capsid protein comprises an amino acid sequence at least 95%, at least 98%, at least 99%, or 100% identical to a sequence selected from the group consisting of SEQ ID NOs: 402-410 and SEQ ID NO: 483.

15. The capsid protein of claim 1, wherein the capsid protein comprises an amino acid sequence SEQ ID NO: 402 or SEQ ID NO:404.

16. The capsid protein of claim 1, wherein the capsid protein is a AAV5/AAV9 chimeric capsid protein comprising at least one segment from an AAV5 capsid protein and at least one segment from an AAV9 capsid protein.

17. The capsid protein of claim 16, wherein the chimeric capsid protein comprises:
a) a first segment comprising a sequence at least 95% identical to SEQ ID NO: 411 or SEQ ID NO: 412;
b) a second segment comprising a sequence at least 95% identical to SEQ ID NO: 413 or SEQ ID NO: 414;
c) a third segment comprising a sequence at least 95% identical to SEQ ID NO: 415 or SEQ ID NO: 416;
d) a fourth segment comprising a sequence at least 95% identical to SEQ ID NO: 417 or SEQ ID NO: 418; and
e) a fifth segment comprising a sequence at least 95% identical to SEQ ID NO: 419 or SEQ ID NO: 420; or
wherein the chimeric capsid protein comprises an amino acid sequence at least 95%, at least 98%, at least 99%, or at least 100% identical to a sequence selected from SEQ ID NOs: 445-462, or
wherein the chimeric capsid protein comprises an amino acid sequence at least 95%, at least 98%, at least 99%, or at least 100% identical to a sequence selected from SEQ ID NOs: 421-444.

18. A recombinant adeno-associated virus (rAAV) virion, comprising:
a) the capsid protein of claim 1; and
b) a heterologous nucleic acid comprising a nucleotide sequence encoding one or more gene products.

19. The rAAV virion of claim 18, wherein the rAAV virion exhibits increased transduction efficiency in cardiac cells compared to an AAV virion comprising the parental sequence;
wherein the rAAV virion exhibits at least 2-fold increased transduction efficiency in induced pluripotent stem cell-derived cardiomyocyte (iPS-CM) cells compared to an rAAV virion comprising the parental sequence at a multiplicity of infection (MOI) of 100,000 or 75,000; and/or
wherein the rAAV virion exhibits increased transduction efficiency in human cardiac fibroblast (hCF) cells compared to an AAV virion comprising the parental sequence, wherein the human cardiac fibroblasts are located in the left ventricle of the heart.

20. The rAAV virion of claim 18, wherein the rAAV virion exhibits at least 2-fold increased cardiac transduction efficiency in a C57BL/6J mouse, wherein the mouse is injected with a virion dosage of $2.5 \times 10^{11}$ vg/mouse;
wherein the rAAV virion exhibits at least 1.5-fold increased cardiac transduction efficiency in a C57BL/6J mouse, wherein the mouse is injected with a virion dosage of $2 \times 10^{11}$ vg/mouse; or
wherein the rAAV virion exhibits at least 2-fold increased cardiac transduction efficiency in a C57BL/6J mouse, wherein the mouse is injected with a virion dosage of $1 \times 10^{11}$ vg/mouse.

21. The rAAV virion of claim 18, wherein the rAAV virion exhibits decreased transduction efficiency in liver cells compared to an AAV virion comprising the parental sequence; and/or
wherein the rAAV virion exhibits increased selectivity of the rAAV virion for cardiac cells or iPS CM cells over liver cells.

22. The rAAV virion of claim 18, wherein the rAAV virion exhibits improved NAb evasion compared to an AAV virion comprising the parental sequence.

23. The rAAV virion of claim 18, wherein the capsid protein comprises a sequence at least 95%, at least 98%, at least 99%, or 100% identical to SEQ ID NO:402 or SEQ ID NO: 404.

24. A pharmaceutical composition comprising the rAAV virion of claim 18 and a pharmaceutically acceptable carrier.

25. A polynucleotide encoding the capsid protein of claim 1.

26. A method of transducing, or delivering one or more gene products to a cardiac cell or a cardiomyocyte, comprising contacting the cardiac cell or the cardiomyocyte with the rAAV virion of claim 18.

27. The method of claim 26, wherein the rAAV virion exhibits at least 2-fold increased transduction efficiency in the cell compared to an AAV virion comprising AAV9 capsid protein sequence at a multiplicity of infection (MOI) of 75,000.

28. A method of treating a cardiac pathology in a subject in need thereof, comprising administering a therapeutically effective amount of the rAAV virion of claim 18 or a pharmaceutical composition thereof to the subject, wherein the rAAV virion transduces cardiac tissue.

29. The method of claim 28, wherein the one or more gene products comprise MYBPC3, DWORF, KCNH2, TRPM4, DSG2, PKP2 and/or ATP2A2;
  wherein the one or more gene products comprise CACNA1C, DMD, DMPK, EPG5, EVC, EVC2, FBN1, NF1, SCN5A, SOS1, NPR1, ERBB4, VIP, MYH7, and/or Cas9; or
  wherein the one or more gene products comprise MYOCD, ASCL1, GATA4, MEF2C, TBX5, miR-133, and/or MESP1.

* * * * *

SEQUENCE LISTING

<160> NUMBER OF SEQ ID NOS: 485

<210> SEQ ID NO 1
<211> LENGTH: 736
<212> TYPE: PRT
<213> ORGANISM: Dependoparvovirus Adeno-associated virus serotype 9

<400> SEQUENCE: 1

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro

-continued

```
             35                  40                  45
Gly Tyr Lys Tyr Leu Gly Pro Gly Asn Gly Leu Asp Lys Gly Glu Pro
 50                  55                  60

Val Asn Ala Ala Asp Ala Ala Leu Glu His Asp Lys Ala Tyr Asp
 65                  70                  75                  80

Gln Gln Leu Lys Ala Gly Asp Asn Pro Tyr Leu Lys Tyr Asn His Ala
                 85                  90                  95

Asp Ala Glu Phe Gln Glu Arg Leu Lys Glu Asp Thr Ser Phe Gly Gly
                100                 105                 110

Asn Leu Gly Arg Ala Val Phe Gln Ala Lys Lys Arg Leu Leu Glu Pro
            115                 120                 125

Leu Gly Leu Val Glu Glu Ala Ala Lys Thr Ala Pro Gly Lys Lys Arg
        130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
    290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
    370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
        435                 440                 445

Lys Thr Ile Asn Gly Ser Gly Gln Asn Gln Gln Thr Leu Lys Phe Ser
    450                 455                 460
```

```
Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
            485                 490                 495

Asn Asn Ser Glu Phe Ala Trp Pro Gly Ala Ser Ser Trp Ala Leu Asn
        500                 505                 510

Gly Arg Asn Ser Leu Met Asn Pro Gly Pro Ala Met Ala Ser His Lys
    515                 520                 525

Glu Gly Glu Asp Arg Phe Phe Pro Leu Ser Gly Ser Leu Ile Phe Gly
530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
    610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
    690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 2
<211> LENGTH: 9
<212> TYPE: PRT
<213> ORGANISM: Dependoparvovirus Adeno-associated virus serotype 9

<400> SEQUENCE: 2

Asn Gly Ser Gly Gln Asn Gln Gln Thr
1               5

<210> SEQ ID NO 3
<211> LENGTH: 6
<212> TYPE: PRT
<213> ORGANISM: Dependoparvovirus Adeno-associated virus serotype 9

<400> SEQUENCE: 3

Asn Asn Ser Glu Phe Ala
1               5

<210> SEQ ID NO 4
<211> LENGTH: 5
<212> TYPE: PRT
<213> ORGANISM: Dependoparvovirus Adeno-associated virus serotype 9
```

```
<400> SEQUENCE: 4

Gly Arg Asp Asn Val
1               5

<210> SEQ ID NO 5
<211> LENGTH: 4
<212> TYPE: PRT
<213> ORGANISM: Dependoparvovirus Adeno-associated virus serotype 9

<400> SEQUENCE: 5

Ser Ala Gln Ala
1

<210> SEQ ID NO 6
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 6

Gly Tyr His Lys Ser Gly Ala Ala Gln
1               5

<210> SEQ ID NO 7
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 7

Val Ile Ile Lys Ser Gly Ala Ala Gln
1               5

<210> SEQ ID NO 8
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 8

Gly Tyr His Lys Ile Gly Ala Ala Gln
1               5

<210> SEQ ID NO 9
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 9

Gly Tyr His Lys Ser Gly Val Ala Gln
1               5

<210> SEQ ID NO 10
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 10
```

Val Tyr His Lys Ser Gly Ala Ala Gln
1               5

<210> SEQ ID NO 11
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 11

Gly Tyr His Lys Ile Ser Ala Ala Gln
1               5

<210> SEQ ID NO 12
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 12

Thr Thr Val Pro Ser Ser Ser Arg Tyr
1               5

<210> SEQ ID NO 13
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 13

Val Ile Ile Arg Val Val Arg Leu Ser
1               5

<210> SEQ ID NO 14
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 14

Thr Val Leu Gly Gln Asn Gln Gln Thr
1               5

<210> SEQ ID NO 15
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 15

Ile Tyr His Lys Ser Gly Ala Ala Gln
1               5

<210> SEQ ID NO 16
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 16

Thr Val Leu Asp Lys Asn Gln Gln Thr

```
1               5
```

```
<210> SEQ ID NO 17
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 17

Tyr Ser Gly Thr Asp Val Arg Tyr Lys
1               5

<210> SEQ ID NO 18
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 18

Val Thr Ala Ser Gly Lys Glu His Arg
1               5

<210> SEQ ID NO 19
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 19

Gly Tyr Arg Lys Ser Gly Ala Ala Gln
1               5

<210> SEQ ID NO 20
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 20

Asn Arg Thr Val Ser Asn Gly Ser Glu
1               5

<210> SEQ ID NO 21
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 21

Thr Val Leu Asp Arg Ile Asn Lys Thr
1               5

<210> SEQ ID NO 22
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 22

Thr Gly Val Gly His Leu Thr Ser Ala
1               5
```

```
<210> SEQ ID NO 23
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 23

Gly Tyr His Lys Gly Gly Ala Ala Gln
1               5

<210> SEQ ID NO 24
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 24

Val Ile Ala Lys Ser Gly Ala Ala Gln
1               5

<210> SEQ ID NO 25
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 25

Gly Tyr His Lys Ser Gly Ala Ala His
1               5

<210> SEQ ID NO 26
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 26

Phe Ile Ile Lys Ser Gly Ala Ala Gln
1               5

<210> SEQ ID NO 27
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 27

Gly Tyr His Lys Val Val Arg Leu Ser
1               5

<210> SEQ ID NO 28
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 28

Gly Ala Thr Arg Ser Ala Val Glu Ser
1               5
```

```
<210> SEQ ID NO 29
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 29

Thr Val Ser Gly Gln Asn Gln Gln Thr
1               5

<210> SEQ ID NO 30
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 30

Leu Ser His Lys Ser Gly Ala Ala Gln
1               5

<210> SEQ ID NO 31
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 31

Ser Ser Ser Gly Gln Asn Gln Gln Thr
1               5

<210> SEQ ID NO 32
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 32

Ser Gly Ser Gly Gln Asn Gln Gln Thr
1               5

<210> SEQ ID NO 33
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 33

Ser Gln Val Asn Gly Arg Pro Arg Asp
1               5

<210> SEQ ID NO 34
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 34

Gly Tyr His Lys Glu Trp Cys Gly Ser
1               5
```

```
<210> SEQ ID NO 35
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 35

Val Val Ser Ser Lys Ser Leu Asn Ser
1               5

<210> SEQ ID NO 36
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 36

Gly Tyr His Lys Ser Gly Ala Ala Pro
1               5

<210> SEQ ID NO 37
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 37

Asp Ala Ser Ser Arg Glu Lys Val Arg
1               5

<210> SEQ ID NO 38
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 38

Ser Tyr His Lys Ser Gly Ala Ala Gln
1               5

<210> SEQ ID NO 39
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 39

Thr Ala Asn Gly Ser Gln Lys Tyr Leu
1               5

<210> SEQ ID NO 40
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 40

Val Ile Ile Arg Val Gly Ala Ala Gln
1               5

<210> SEQ ID NO 41
```

```
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 41

Ser Ser Thr Asn Lys Ile Ser Thr Ala
1               5

<210> SEQ ID NO 42
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 42

Thr Val Leu Asp Arg Ile Gln Gln Thr
1               5

<210> SEQ ID NO 43
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 43

Gly Tyr His Lys Ser Gly Ala Val Gln
1               5

<210> SEQ ID NO 44
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 44

Thr Val Leu Asp Gln Asn Gln Gln Thr
1               5

<210> SEQ ID NO 45
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 45

Val Asn Met Ser Ser Pro Ile Lys Thr
1               5

<210> SEQ ID NO 46
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 46

Ala Ala Tyr Asn Ser Asn Ser Ala Phe
1               5

<210> SEQ ID NO 47
<211> LENGTH: 9
```

```
<212> TYPE: PRT
<213> ORGANISM: Artificial Sequence
<220> FEATURE:
<223> OTHER INFORMATION: computer generated peptide library sequence

<400> SEQUENCE: 47

Gly Tyr His Lys Ser Gly Ala Ala Arg
1               5

<210> SEQ ID NO 48
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 48

Val Ile Ile Arg Val Val Arg Leu Gln
1               5

<210> SEQ ID NO 49
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 49

Arg Phe Trp Thr Gln Asn Gln Gln Thr
1               5

<210> SEQ ID NO 50
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 50

Ser Ser Pro Arg Ala Ser Ser Ala Leu
1               5

<210> SEQ ID NO 51
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 51

Ile Ile Ile Arg Val Val Arg Leu Ser
1               5

<210> SEQ ID NO 52
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 52

Lys Ser Ser Asn Leu Thr Ala Met Pro
1               5

<210> SEQ ID NO 53
<211> LENGTH: 9
<212> TYPE: PRT
```

```
<213> ORGANISM: Artificial Sequence
<220> FEATURE:
<223> OTHER INFORMATION: computer generated peptide library sequence

<400> SEQUENCE: 53

Asn Leu Asn Ser Asp Arg His Ser Ala
1               5

<210> SEQ ID NO 54
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 54

Leu Ser Leu Lys Ser Gly Ala Ala Gln
1               5

<210> SEQ ID NO 55
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 55

Thr Val Leu Asp Arg Asn Gln Gln Thr
1               5

<210> SEQ ID NO 56
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 56

Gly Ser Glu Arg Val Ser Asn Ser Gly
1               5

<210> SEQ ID NO 57
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 57

Val Ile Ala Lys Ile Gly Ala Ala Gln
1               5

<210> SEQ ID NO 58
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 58

Val Tyr His Lys Ile Gly Ala Ala Gln
1               5

<210> SEQ ID NO 59
<211> LENGTH: 9
<212> TYPE: PRT
<213> ORGANISM: Artificial Sequence
```

```
<220> FEATURE:
<223> OTHER INFORMATION: computer generated peptide library sequence

<400> SEQUENCE: 59

Leu Ser Tyr Lys Ser Gly Ala Ala Gln
1               5

<210> SEQ ID NO 60
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 60

Ser Thr Val Ser Gln Pro Val Arg Thr
1               5

<210> SEQ ID NO 61
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 61

Gly His His Lys Ser Gly Ala Ala Gln
1               5

<210> SEQ ID NO 62
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 62

Tyr Ala Gly Ile Asp Pro Arg Tyr His
1               5

<210> SEQ ID NO 63
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 63

Asp Arg Ser Arg Lys Ser Met Cys Asp
1               5

<210> SEQ ID NO 64
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 64

Val Ile Ile Arg Ser Gly Ala Ala Gln
1               5

<210> SEQ ID NO 65
<211> LENGTH: 9
<212> TYPE: PRT
<213> ORGANISM: Artificial Sequence
<220> FEATURE:
```

<223> OTHER INFORMATION: computer generated peptide library sequence

<400> SEQUENCE: 65

Gly Tyr His Lys Ser Gly Gly Ser Ala
1               5

<210> SEQ ID NO 66
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 66

Val Ile Ile Lys Ile Gly Ala Ala Gln
1               5

<210> SEQ ID NO 67
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 67

Gly Tyr His Lys Val Val Gln Leu Ser
1               5

<210> SEQ ID NO 68
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 68

Val Ile Ile Lys Leu Val Ala Ala Gln
1               5

<210> SEQ ID NO 69
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 69

Lys Val Ser Ser His Ser Val Cys Asp
1               5

<210> SEQ ID NO 70
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 70

Gly Tyr His Lys Arg Val Arg Leu Ser
1               5

<210> SEQ ID NO 71
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 71

Gly Tyr His Lys Ser Ser Ala Ala Gln
1               5

<210> SEQ ID NO 72
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 72

Gly Tyr Arg Lys Ile Gly Ala Ala Gln
1               5

<210> SEQ ID NO 73
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 73

Gly Tyr His Lys Ser Gly Ala Ala Cys
1               5

<210> SEQ ID NO 74
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 74

Gly Tyr Arg Gln Ser Gly Ala Ala Gln
1               5

<210> SEQ ID NO 75
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 75

Val Ile Ile Lys Leu Ile Ala Ala Gln
1               5

<210> SEQ ID NO 76
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 76

Val Ile Ile Arg Val Val Arg Ala Gln
1               5

<210> SEQ ID NO 77
<211> LENGTH: 9
<212> TYPE: PRT
<213> ORGANISM: Artificial Sequence
<220> FEATURE:
<223> OTHER INFORMATION: computer generated peptide library sequence

```
<400> SEQUENCE: 77

Gly Tyr His Lys Ser Gly Ala Ala Trp
1               5

<210> SEQ ID NO 78
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 78

Gly Tyr His Lys Ser Gly Ala Val Ser
1               5

<210> SEQ ID NO 79
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 79

Gly Tyr His Lys Glu Trp Cys Ser Ser
1               5

<210> SEQ ID NO 80
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 80

Ser Ser Ser Ser Asn Arg Leu Ala Asp
1               5

<210> SEQ ID NO 81
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 81

Ser Asn Asn Ser Ser Ser Ala Lys Phe
1               5

<210> SEQ ID NO 82
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 82

Val Lys Leu Ser Ser Thr Ser Ser Ser
1               5

<210> SEQ ID NO 83
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 83
```

```
Gly Tyr His Lys Glu Trp Cys Ala Gln
1               5

<210> SEQ ID NO 84
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 84

Ala Gly Ser Gly Gln Asn Gln Gln Thr
1               5

<210> SEQ ID NO 85
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 85

Asn Pro His Gly Thr Ala Thr Tyr Leu
1               5

<210> SEQ ID NO 86
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 86

Asn Gly Ser Gly Gln Asn Gln His Thr
1               5

<210> SEQ ID NO 87
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 87

Gly Tyr His Lys Val Gly Ala Ala Gln
1               5

<210> SEQ ID NO 88
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 88

Val Ile Ile Arg Val Val Arg Leu Lys
1               5

<210> SEQ ID NO 89
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 89
```

```
Asn Ser Ile Pro Ser Thr Ser Lys Trp
1               5
```

<210> SEQ ID NO 90
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 90

```
Val Ile Ile Arg Val Val Gln Leu Gln
1               5
```

<210> SEQ ID NO 91
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 91

```
Ser Gln Val Asn Gly Arg Pro Gln Asp
1               5
```

<210> SEQ ID NO 92
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 92

```
Asn Gly Ser Gly Gln Asp Gln Gln Thr
1               5
```

<210> SEQ ID NO 93
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 93

```
Gly Leu Asn Ser Ser Asp Arg Arg Leu
1               5
```

<210> SEQ ID NO 94
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 94

```
Ile Tyr His Lys Ile Gly Ala Ala Gln
1               5
```

<210> SEQ ID NO 95
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 95

```
Tyr His Lys Ser Gly Ala Ala Gln Leu
```

```
<210> SEQ ID NO 96
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 96

Tyr Ser Gly Thr Asp Val Gln Tyr Lys
1               5

<210> SEQ ID NO 97
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 97

Leu Gly Ser Gly Gln Asn Gln Gln Thr
1               5

<210> SEQ ID NO 98
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 98

Pro Val Ser Ser Gly Ala Asp Arg Arg
1               5

<210> SEQ ID NO 99
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 99

Glu His Ser Thr Lys Leu Asn Ala Cys
1               5

<210> SEQ ID NO 100
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 100

Asn Gly Ser Asp Arg Ile Asn Lys Arg
1               5

<210> SEQ ID NO 101
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 101

Val Ile Ile Lys Gly Gly Ala Ala Gln
1               5
```

```
<210> SEQ ID NO 102
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 102

Gly Tyr His Arg Val Val Arg Leu Ser
1               5

<210> SEQ ID NO 103
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 103

Val Ile Ile Arg Val Val Arg Leu Leu
1               5

<210> SEQ ID NO 104
<211> LENGTH: 9
<212> TYPE: PRT
<213> ORGANISM: Artificial Sequence
<220> FEATURE:
<223> OTHER INFORMATION: computer generated peptide library sequence

<400> SEQUENCE: 104

Val Ile Leu Lys Ser Gly Ala Ala Gln
1               5

<210> SEQ ID NO 105
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 105

Leu Asn Ser Met Leu Ile
1               5

<210> SEQ ID NO 106
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 106

Asn Gly Met Ser Phe Thr
1               5

<210> SEQ ID NO 107
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 107

His Lys Thr Phe Ser Ile
1               5
```

```
<210> SEQ ID NO 108
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 108

Ser Met Ser Asn Phe Val
1               5

<210> SEQ ID NO 109
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 109

Ala Thr Ile Pro Pro Ile
1               5

<210> SEQ ID NO 110
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 110

Ser Ser Thr His Phe Asp
1               5

<210> SEQ ID NO 111
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 111

Asn Asn Gln Phe Ser Tyr
1               5

<210> SEQ ID NO 112
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 112

Asn Met Gly His Tyr Ser
1               5

<210> SEQ ID NO 113
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 113

Ser Lys Gln Met Phe Gln
1               5
```

```
<210> SEQ ID NO 114
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 114

Trp Pro Ser Ala Gly Val
1               5

<210> SEQ ID NO 115
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 115

Asn Gly Gly Tyr Gln Cys
1               5

<210> SEQ ID NO 116
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 116

Ser Thr Ser Pro Ile Val
1               5

<210> SEQ ID NO 117
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 117

Ser Gln Ser Gly Leu Trp
1               5

<210> SEQ ID NO 118
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 118

Val Asn Ser Gln Phe Ser
1               5

<210> SEQ ID NO 119
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 119

Ser Gly Ile Glu Phe Arg
1               5

<210> SEQ ID NO 120
```

```
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 120

Ser Ala Ser Lys Phe Thr
1               5

<210> SEQ ID NO 121
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 121

Gln Leu Asn Trp Thr Ser
1               5

<210> SEQ ID NO 122
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 122

Ser Met Gly Phe Pro Val
1               5

<210> SEQ ID NO 123
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 123

Ser Ser Phe Met Gly Leu
1               5

<210> SEQ ID NO 124
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 124

Gly Ser Asn Phe His Val
1               5

<210> SEQ ID NO 125
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 125

Asp Met Thr Leu Tyr Ala
1               5

<210> SEQ ID NO 126
<211> LENGTH: 6
```

```
<212> TYPE: PRT
<213> ORGANISM: Artificial Sequence
<220> FEATURE:
<223> OTHER INFORMATION: computer generated peptide library sequence

<400> SEQUENCE: 126

Met Gly Cys Leu Phe Thr
1               5

<210> SEQ ID NO 127
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 127

Ala Leu Ala Phe Asn Ser
1               5

<210> SEQ ID NO 128
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 128

Ser Lys Phe Leu Phe Ala
1               5

<210> SEQ ID NO 129
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 129

Gln Asp Ala Gly Leu Leu
1               5

<210> SEQ ID NO 130
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 130

Gln Asp Ala Ser Leu Leu
1               5

<210> SEQ ID NO 131
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 131

Arg Asp Asp Met Phe Ser
1               5

<210> SEQ ID NO 132
<211> LENGTH: 6
<212> TYPE: PRT
```

```
<213> ORGANISM: Artificial Sequence
<220> FEATURE:
<223> OTHER INFORMATION: computer generated peptide library sequence

<400> SEQUENCE: 132

Leu Ser Arg Cys Phe Gln
1               5

<210> SEQ ID NO 133
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 133

Leu Ser Arg Asp Phe Gln
1               5

<210> SEQ ID NO 134
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 134

Gln Gly Leu Thr Pro Val
1               5

<210> SEQ ID NO 135
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 135

Gln Trp Asp Val Phe Thr
1               5

<210> SEQ ID NO 136
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 136

Pro Arg Val Ser Phe Ala
1               5

<210> SEQ ID NO 137
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 137

Gln Ser Tyr Tyr Asn Pro
1               5

<210> SEQ ID NO 138
<211> LENGTH: 6
<212> TYPE: PRT
<213> ORGANISM: Artificial Sequence
```

```
<220> FEATURE:
<223> OTHER INFORMATION: computer generated peptide library sequence

<400> SEQUENCE: 138

Arg Ala Ser His Leu Gly
1               5

<210> SEQ ID NO 139
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 139

Ile Ile Leu Phe Val Pro
1               5

<210> SEQ ID NO 140
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 140

Ile Ile Ser Phe Ser Tyr
1               5

<210> SEQ ID NO 141
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 141

Leu Asp Ser Met Leu Ile
1               5

<210> SEQ ID NO 142
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 142

Asn Ile Gly His Tyr Ser
1               5

<210> SEQ ID NO 143
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 143

Asn Arg Met Ser Phe Thr
1               5

<210> SEQ ID NO 144
<211> LENGTH: 6
<212> TYPE: PRT
<213> ORGANISM: Artificial Sequence
<220> FEATURE:
```

```
<223> OTHER INFORMATION: computer generated peptide library sequence

<400> SEQUENCE: 144

Asn Gly Met Ser Phe Ala
1               5

<210> SEQ ID NO 145
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 145

Ile Ile Leu Leu Leu Pro
1               5

<210> SEQ ID NO 146
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 146

Arg Met Arg Ser Leu Leu
1               5

<210> SEQ ID NO 147
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 147

Arg Arg Arg Cys Arg Phe
1               5

<210> SEQ ID NO 148
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 148

Pro Lys Gln Met Phe Gln
1               5

<210> SEQ ID NO 149
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 149

Leu Met Ser Asn Phe Val
1               5

<210> SEQ ID NO 150
<211> LENGTH: 6
<212> TYPE: PRT
<213> ORGANISM: Artificial Sequence
<220> FEATURE:
<223> OTHER INFORMATION: computer generated peptide library sequence
```

```
<400> SEQUENCE: 150

Gly Ala Ser His Leu Gly
1               5

<210> SEQ ID NO 151
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 151

Cys Ala Ser Ile Ser Trp
1               5

<210> SEQ ID NO 152
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 152

Ser Met Thr Thr Phe Arg
1               5

<210> SEQ ID NO 153
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 153

Ala Ala Ile Pro Pro Ile
1               5

<210> SEQ ID NO 154
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 154

Pro Gly Cys Glu Ser Leu
1               5

<210> SEQ ID NO 155
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 155

Ser Met Gly Phe Ala Cys
1               5

<210> SEQ ID NO 156
<211> LENGTH: 6
<212> TYPE: PRT
<213> ORGANISM: Artificial Sequence
<220> FEATURE:
<223> OTHER INFORMATION: computer generated peptide library sequence
```

```
<400> SEQUENCE: 156

Phe Leu Pro Ser Leu Met
1               5

<210> SEQ ID NO 157
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 157

Asn Gly Ile Ser Phe Thr
1               5

<210> SEQ ID NO 158
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 158

Glu Ser Ser Arg Trp Ala
1               5

<210> SEQ ID NO 159
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 159

Gln Leu Tyr Phe Val Pro
1               5

<210> SEQ ID NO 160
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 160

Ser Ser Asn Phe His Val
1               5

<210> SEQ ID NO 161
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 161

Leu Glu Phe Met Leu Ile
1               5

<210> SEQ ID NO 162
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 162
```

```
Gln Phe Asp Ser Phe Asp
1               5

<210> SEQ ID NO 163
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 163

Ser Pro Val Phe Ala Cys
1               5

<210> SEQ ID NO 164
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 164

Val Arg Leu Ile Phe Asp
1               5

<210> SEQ ID NO 165
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 165

Asn Gly Met Ser Phe Ile
1               5

<210> SEQ ID NO 166
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 166

Leu Leu Phe Pro Pro Ile
1               5

<210> SEQ ID NO 167
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 167

Gly Ala Gly Val Thr Gly
1               5

<210> SEQ ID NO 168
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 168
```

```
Gln Trp Met Ser Phe Thr
1               5

<210> SEQ ID NO 169
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 169

Ser Ile Gly Phe Pro Val
1               5

<210> SEQ ID NO 170
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 170

Arg Met Gln Ser Leu Leu
1               5

<210> SEQ ID NO 171
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 171

Thr Ser Ala Leu Gln Val
1               5

<210> SEQ ID NO 172
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 172

Ser Leu Thr His Phe Asp
1               5

<210> SEQ ID NO 173
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 173

Gln Glu Leu Pro Phe Leu
1               5

<210> SEQ ID NO 174
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 174

Leu Tyr Phe Leu Leu Pro
```

```
1               5

<210> SEQ ID NO 175
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 175

Leu Ser Phe Phe Phe Ala
1               5

<210> SEQ ID NO 176
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 176

Leu Ser Arg Ile Phe Gln
1               5

<210> SEQ ID NO 177
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 177

Asp Glu Val Ile Leu Phe
1               5

<210> SEQ ID NO 178
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 178

Arg Ala Gly Val Ala Gly
1               5

<210> SEQ ID NO 179
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 179

Asn Gly Met Ser Leu Pro
1               5

<210> SEQ ID NO 180
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 180

Pro Phe Glu Asp Phe Gln
1               5
```

<210> SEQ ID NO 181
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 181

Gln Tyr Gly Ser Leu Phe
1               5

<210> SEQ ID NO 182
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 182

Asn Tyr Thr Phe Val Leu
1               5

<210> SEQ ID NO 183
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 183

Met Ser Gly Tyr Gln Cys
1               5

<210> SEQ ID NO 184
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 184

Asn Tyr Ala Phe Val Pro
1               5

<210> SEQ ID NO 185
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 185

Arg Ala Gly Val Thr Gly
1               5

<210> SEQ ID NO 186
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 186

Trp Asn Ser Met Leu Ile
1               5

<210> SEQ ID NO 187
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 187

Ile Arg Arg Phe Ser Ile
1               5

<210> SEQ ID NO 188
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 188

Asn Gly Met Ser Phe Tyr
1               5

<210> SEQ ID NO 189
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 189

Ile Ile Gln Phe Ser Tyr
1               5

<210> SEQ ID NO 190
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 190

Asn Gly Cys Leu Phe Thr
1               5

<210> SEQ ID NO 191
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 191

Arg Asp Ala Ser Leu Leu
1               5

<210> SEQ ID NO 192
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 192

Ala Asp Ser Met Leu Ile
1               5

```
<210> SEQ ID NO 193
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 193

Val Asp Ser Gln Phe Ser
1               5

<210> SEQ ID NO 194
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 194

Ser Ile Gly Asn Phe Val
1               5

<210> SEQ ID NO 195
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 195

Asn Gly Met Ser Leu Leu
1               5

<210> SEQ ID NO 196
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 196

Asn Tyr Thr Phe Val Pro
1               5

<210> SEQ ID NO 197
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 197

Ile Arg Arg Leu Val Phe
1               5

<210> SEQ ID NO 198
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 198

Pro Met Ser Asn Phe Val
1               5

<210> SEQ ID NO 199
```

```
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 199

Leu Trp Val Phe Pro Val
1               5

<210> SEQ ID NO 200
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 200

Val Arg Leu His Phe Asp
1               5

<210> SEQ ID NO 201
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 201

Ser Met Ser Asn Leu Phe
1               5

<210> SEQ ID NO 202
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 202

Ser Thr Ser Leu Ile Val
1               5

<210> SEQ ID NO 203
<211> LENGTH: 6
<212> TYPE: PRT
<213> ORGANISM: Artificial Sequence
<220> FEATURE:
<223> OTHER INFORMATION: computer generated peptide library sequence

<400> SEQUENCE: 203

His Lys Thr Phe Gly Ile
1               5

<210> SEQ ID NO 204
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 204

Arg Gly Asn Gln Val
1               5

<210> SEQ ID NO 205
<211> LENGTH: 5
```

```
<212> TYPE: PRT
<213> ORGANISM: Artificial Sequence
<220> FEATURE:
<223> OTHER INFORMATION: computer generated peptide library sequence

<400> SEQUENCE: 205

Val Ser Leu Asn Arg
1               5

<210> SEQ ID NO 206
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 206

Cys Asp Tyr Ser Val
1               5

<210> SEQ ID NO 207
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 207

Gln His Gly His Ile
1               5

<210> SEQ ID NO 208
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 208

Leu Cys Ser Leu Val
1               5

<210> SEQ ID NO 209
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 209

Pro Thr Ile Tyr Val
1               5

<210> SEQ ID NO 210
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 210

Asp Val Ile His Ile
1               5

<210> SEQ ID NO 211
<211> LENGTH: 5
<212> TYPE: PRT
```

```
<213> ORGANISM: Artificial Sequence
<220> FEATURE:
<223> OTHER INFORMATION: computer generated peptide library sequence

<400> SEQUENCE: 211

Ala Glu Phe Tyr Ala
1               5

<210> SEQ ID NO 212
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 212

Asn Ser Val Val Cys
1               5

<210> SEQ ID NO 213
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 213

Val Arg Ser Asn Cys
1               5

<210> SEQ ID NO 214
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 214

Leu Ala Asn Asn Ile
1               5

<210> SEQ ID NO 215
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 215

Asn Leu Gln Phe Met
1               5

<210> SEQ ID NO 216
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 216

Glu Phe Arg Asp Leu
1               5

<210> SEQ ID NO 217
<211> LENGTH: 5
<212> TYPE: PRT
<213> ORGANISM: Artificial Sequence
```

```
<220> FEATURE:
<223> OTHER INFORMATION: computer generated peptide library sequence

<400> SEQUENCE: 217

Asp Phe Gly Ser Leu
1               5

<210> SEQ ID NO 218
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 218

Val Thr Asn Tyr Cys
1               5

<210> SEQ ID NO 219
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 219

Trp Asn Thr Asn Ala
1               5

<210> SEQ ID NO 220
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 220

Thr Glu Ser Thr Cys
1               5

<210> SEQ ID NO 221
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 221

Ser Gly Ala Ala Val
1               5

<210> SEQ ID NO 222
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 222

Gly Gly Cys Asp Ile
1               5

<210> SEQ ID NO 223
<211> LENGTH: 5
<212> TYPE: PRT
<213> ORGANISM: Artificial Sequence
<220> FEATURE:
```

<223> OTHER INFORMATION: computer generated peptide library sequence

<400> SEQUENCE: 223

Ser Gly Ser Val Val
1               5

<210> SEQ ID NO 224
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 224

Ser Ser Asn Ala Cys
1               5

<210> SEQ ID NO 225
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 225

Tyr Asn Thr Thr Val
1               5

<210> SEQ ID NO 226
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 226

Ser Lys Cys Leu Ala
1               5

<210> SEQ ID NO 227
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 227

Ser Ala Tyr Thr Val
1               5

<210> SEQ ID NO 228
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 228

Val Arg Asp Thr Val
1               5

<210> SEQ ID NO 229
<211> LENGTH: 5
<212> TYPE: PRT
<213> ORGANISM: Artificial Sequence
<220> FEATURE:
<223> OTHER INFORMATION: computer generated peptide library sequence

```
<400> SEQUENCE: 229

Trp Arg Ser Met Val
1               5

<210> SEQ ID NO 230
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 230

Ala Tyr His Gly Val
1               5

<210> SEQ ID NO 231
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 231

Gly Met Asn Thr Ile
1               5

<210> SEQ ID NO 232
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 232

Ala Glu Thr Ser Leu
1               5

<210> SEQ ID NO 233
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 233

Thr Leu Val Tyr Val
1               5

<210> SEQ ID NO 234
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 234

Asn His Asp Trp Ile
1               5

<210> SEQ ID NO 235
<211> LENGTH: 5
<212> TYPE: PRT
<213> ORGANISM: Artificial Sequence
<220> FEATURE:
<223> OTHER INFORMATION: computer generated peptide library sequence
```

```
<400> SEQUENCE: 235

Thr Val Gly Ile Val
1               5

<210> SEQ ID NO 236
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 236

Ser Leu Pro Thr Val
1               5

<210> SEQ ID NO 237
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 237

Thr Gly Ile Leu Cys
1               5

<210> SEQ ID NO 238
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 238

Thr Asp Thr Tyr Ile
1               5

<210> SEQ ID NO 239
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 239

Leu Pro Val Thr Tyr
1               5

<210> SEQ ID NO 240
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 240

Gly Asp Val Tyr Ile
1               5

<210> SEQ ID NO 241
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 241
```

```
Leu Tyr Gly Thr Val
1               5

<210> SEQ ID NO 242
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 242

Gly Cys Glu Phe Ile
1               5

<210> SEQ ID NO 243
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 243

Ser Ala Gly Leu Leu
1               5

<210> SEQ ID NO 244
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 244

Ile Lys Ser Asn Ile
1               5

<210> SEQ ID NO 245
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 245

Val Thr Thr Ser Leu
1               5

<210> SEQ ID NO 246
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 246

Ala Val Thr Ser Val
1               5

<210> SEQ ID NO 247
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 247
```

```
Arg Asp Ile His Ile
1               5

<210> SEQ ID NO 248
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 248

Ser Ala Ile Ser Leu
1               5

<210> SEQ ID NO 249
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 249

Val Ala Ser Thr Cys
1               5

<210> SEQ ID NO 250
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 250

Ile Lys Gly Leu Leu
1               5

<210> SEQ ID NO 251
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 251

Gly Ser Tyr His Thr
1               5

<210> SEQ ID NO 252
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 252

Arg Ile Gly Phe Val
1               5

<210> SEQ ID NO 253
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 253

Asn Asp Ile Tyr Ile
```

```
1               5
```

<210> SEQ ID NO 254
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 254

```
Ala Val Ser Cys Val
1               5
```

<210> SEQ ID NO 255
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 255

```
Gln His Asn Leu Leu
1               5
```

<210> SEQ ID NO 256
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 256

```
Val Ser Ser Cys Val
1               5
```

<210> SEQ ID NO 257
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 257

```
Leu Asn Leu Asp Val
1               5
```

<210> SEQ ID NO 258
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 258

```
Leu Gly Ala Thr Ile
1               5
```

<210> SEQ ID NO 259
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 259

```
Pro Val Leu Cys Val
1               5
```

```
<210> SEQ ID NO 260
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 260

Ser Ala Arg His Ile
1               5

<210> SEQ ID NO 261
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 261

Arg Ala Thr Leu Ile
1               5

<210> SEQ ID NO 262
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 262

Pro Tyr Asn His Ala
1               5

<210> SEQ ID NO 263
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 263

Ile Gly Asp Ser Ile
1               5

<210> SEQ ID NO 264
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 264

Ser Pro Met Leu Cys
1               5

<210> SEQ ID NO 265
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 265

Tyr Asp Ser Thr Leu
1               5
```

<210> SEQ ID NO 266
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 266

Ala Leu Lys His Val
1               5

<210> SEQ ID NO 267
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 267

Ala Asp Leu Leu Thr
1               5

<210> SEQ ID NO 268
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 268

Asn Asn Gly His Leu
1               5

<210> SEQ ID NO 269
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 269

Ile Asn Ser Glu Val
1               5

<210> SEQ ID NO 270
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 270

Ser Asn Lys Thr Thr
1               5

<210> SEQ ID NO 271
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 271

Gly Ser Thr Gly Leu
1               5

```
<210> SEQ ID NO 272
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 272

Asp Ser Asp Met Ile
1               5

<210> SEQ ID NO 273
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 273

Thr Ser Asn Phe Ile
1               5

<210> SEQ ID NO 274
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 274

Arg Asn Phe Thr Thr
1               5

<210> SEQ ID NO 275
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 275

Ser His Lys Tyr Ser
1               5

<210> SEQ ID NO 276
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 276

Val Ser Asp Ile Val
1               5

<210> SEQ ID NO 277
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 277

Arg Val Val Gln Ala
1               5

<210> SEQ ID NO 278
```

```
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 278

Ala Ala Cys Ala Val
1               5

<210> SEQ ID NO 279
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 279

Arg Gly Arg Gln Ile
1               5

<210> SEQ ID NO 280
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 280

Ala Val Ala Asn Ile
1               5

<210> SEQ ID NO 281
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 281

Ala Gly Tyr Asp Leu
1               5

<210> SEQ ID NO 282
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 282

Leu Ser Glu Ala Ala
1               5

<210> SEQ ID NO 283
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 283

Met Ser Asn Tyr Leu
1               5

<210> SEQ ID NO 284
<211> LENGTH: 5
```

```
<212> TYPE: PRT
<213> ORGANISM: Artificial Sequence
<220> FEATURE:
<223> OTHER INFORMATION: computer generated peptide library sequence

<400> SEQUENCE: 284

Asn Phe Ser Asp Asn
1               5

<210> SEQ ID NO 285
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 285

Ser Cys Cys Asp Val
1               5

<210> SEQ ID NO 286
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 286

Leu Ala Ser Ser Val
1               5

<210> SEQ ID NO 287
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 287

Pro Asp His Ala Val
1               5

<210> SEQ ID NO 288
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 288

Lys Phe Asp Ile Ile
1               5

<210> SEQ ID NO 289
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 289

Asn Ser Ser Ser Ala
1               5

<210> SEQ ID NO 290
<211> LENGTH: 5
<212> TYPE: PRT
```

```
<213> ORGANISM: Artificial Sequence
<220> FEATURE:
<223> OTHER INFORMATION: computer generated peptide library sequence

<400> SEQUENCE: 290

His Thr Met His Val
1               5

<210> SEQ ID NO 291
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 291

Thr Leu Ser Tyr Cys
1               5

<210> SEQ ID NO 292
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 292

Ala Asp Thr His Arg
1               5

<210> SEQ ID NO 293
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 293

Ser Met Tyr Ser Val
1               5

<210> SEQ ID NO 294
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 294

Ser Val Asn Leu Val
1               5

<210> SEQ ID NO 295
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 295

Met Ser Gly His Leu
1               5

<210> SEQ ID NO 296
<211> LENGTH: 5
<212> TYPE: PRT
<213> ORGANISM: Artificial Sequence
```

```
<220> FEATURE:
<223> OTHER INFORMATION: computer generated peptide library sequence

<400> SEQUENCE: 296

Lys Ile Ser Asp Thr
1               5

<210> SEQ ID NO 297
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 297

Thr Gly Leu Leu Ala
1               5

<210> SEQ ID NO 298
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 298

Ala Trp Thr Thr Ser
1               5

<210> SEQ ID NO 299
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 299

Gly Gly Ala Leu Ile
1               5

<210> SEQ ID NO 300
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 300

Ser Cys Ile Glu Val
1               5

<210> SEQ ID NO 301
<211> LENGTH: 5
<212> TYPE: PRT
<213> ORGANISM: Artificial Sequence
<220> FEATURE:
<223> OTHER INFORMATION: computer generated peptide library sequence

<400> SEQUENCE: 301

Pro Pro Val Ile Cys
1               5

<210> SEQ ID NO 302
<211> LENGTH: 5
<212> TYPE: PRT
<213> ORGANISM: Artificial Sequence
<220> FEATURE:
```

<223> OTHER INFORMATION: computer generated peptide library sequence

<400> SEQUENCE: 302

Gly Thr Tyr Asn Leu
1               5

<210> SEQ ID NO 303
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 303

Asn Val Ser Tyr
1

<210> SEQ ID NO 304
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 304

Ser Met Val Asn
1

<210> SEQ ID NO 305
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 305

Ala Asn Tyr Gly
1

<210> SEQ ID NO 306
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 306

Asn Val Gly Thr
1

<210> SEQ ID NO 307
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 307

Ser Ala Tyr Met
1

<210> SEQ ID NO 308
<211> LENGTH: 4
<212> TYPE: PRT
<213> ORGANISM: Artificial Sequence
<220> FEATURE:
<223> OTHER INFORMATION: computer generated peptide library sequence

```
<400> SEQUENCE: 308

Glu Lys Val Thr
1

<210> SEQ ID NO 309
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 309

Thr Thr Pro Gly
1

<210> SEQ ID NO 310
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 310

Gly Val Tyr Ser
1

<210> SEQ ID NO 311
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 311

Ser Tyr Val Gly
1

<210> SEQ ID NO 312
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 312

Leu Gln Tyr Asn
1

<210> SEQ ID NO 313
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 313

Asp Pro Ala Lys
1

<210> SEQ ID NO 314
<211> LENGTH: 4
<212> TYPE: PRT
<213> ORGANISM: Artificial Sequence
<220> FEATURE:
<223> OTHER INFORMATION: computer generated peptide library sequence
```

```
<400> SEQUENCE: 314

Thr His Phe Ser
1

<210> SEQ ID NO 315
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 315

Ile Gly Gly Val
1

<210> SEQ ID NO 316
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 316

Ser Ser Trp Asn
1

<210> SEQ ID NO 317
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 317

Ser Val Tyr Val
1

<210> SEQ ID NO 318
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 318

Thr Leu Asn Gly
1

<210> SEQ ID NO 319
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 319

Asn Thr Ser Asn
1

<210> SEQ ID NO 320
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 320
```

Val Gln Tyr Ala
1

<210> SEQ ID NO 321
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 321

Asp Gln Tyr Arg
1

<210> SEQ ID NO 322
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 322

Met Pro Val Ser
1

<210> SEQ ID NO 323
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 323

Ser Ala Gln Ala
1

<210> SEQ ID NO 324
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 324

Met Thr Val Ala
1

<210> SEQ ID NO 325
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 325

Thr Val Met Gly
1

<210> SEQ ID NO 326
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 326

Phe Ser Ser Ile
1

<210> SEQ ID NO 327
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 327

Ser Leu Arg Leu
1

<210> SEQ ID NO 328
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 328

Ser Ala Met Gly
1

<210> SEQ ID NO 329
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 329

Tyr Ile Lys Leu
1

<210> SEQ ID NO 330
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 330

Leu Met Thr Met
1

<210> SEQ ID NO 331
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 331

Gln Val His Leu
1

<210> SEQ ID NO 332
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 332

Tyr Asn Ser Val

```
<210> SEQ ID NO 333
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 333

Cys Val Ile Ser
1

<210> SEQ ID NO 334
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 334

Arg Leu Asp Gly
1

<210> SEQ ID NO 335
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 335

Ala Ile Met Val
1

<210> SEQ ID NO 336
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 336

Gly Thr Thr Gly
1

<210> SEQ ID NO 337
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 337

Ala Ser Tyr Thr
1

<210> SEQ ID NO 338
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 338

Leu His Val Gly
1
```

```
<210> SEQ ID NO 339
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 339

Leu Gln Phe Ala
1

<210> SEQ ID NO 340
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 340

Val Arg Gly Asp
1

<210> SEQ ID NO 341
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 341

Asn Val Met Ile
1

<210> SEQ ID NO 342
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 342

Ser Leu Tyr Gly
1

<210> SEQ ID NO 343
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 343

Gly Thr Val Gly
1

<210> SEQ ID NO 344
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 344

Phe Asn Ser Val
1
```

```
<210> SEQ ID NO 345
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 345

Thr Arg Leu Gly
1

<210> SEQ ID NO 346
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 346

Leu Lys Val Leu
1

<210> SEQ ID NO 347
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 347

Ser Ile Arg Val
1

<210> SEQ ID NO 348
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 348

Lys Ile Gln Gly
1

<210> SEQ ID NO 349
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 349

Gln Ile Leu Gly
1

<210> SEQ ID NO 350
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 350

Gln Arg Asp Ala
1
```

```
<210> SEQ ID NO 351
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 351

Glu Ala Val Arg
1

<210> SEQ ID NO 352
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 352

Ala Ile Thr Val
1

<210> SEQ ID NO 353
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 353

Lys Glu Ser Ile
1

<210> SEQ ID NO 354
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 354

Leu Met Val Asn
1

<210> SEQ ID NO 355
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 355

Ile Asn Leu Ser
1

<210> SEQ ID NO 356
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 356

Gly Gln Val Ser
1

<210> SEQ ID NO 357
```

```
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 357

Thr Ser Leu Leu
1

<210> SEQ ID NO 358
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 358

Ser Ser Thr Leu
1

<210> SEQ ID NO 359
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 359

Tyr Glu Lys Phe
1

<210> SEQ ID NO 360
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 360

Asp Gly Lys Leu
1

<210> SEQ ID NO 361
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 361

Gln Val Tyr Ser
1

<210> SEQ ID NO 362
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 362

Gln Lys Glu Gly
1

<210> SEQ ID NO 363
<211> LENGTH: 4
```

```
<212> TYPE: PRT
<213> ORGANISM: Artificial Sequence
<220> FEATURE:
<223> OTHER INFORMATION: computer generated peptide library sequence

<400> SEQUENCE: 363

Ala Arg Asp Met
1

<210> SEQ ID NO 364
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 364

Asp Asn Phe Arg
1

<210> SEQ ID NO 365
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 365

Ser His Gly Leu
1

<210> SEQ ID NO 366
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 366

Val Ser Val Asn
1

<210> SEQ ID NO 367
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 367

Gly Leu Lys Asp
1

<210> SEQ ID NO 368
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 368

Gln Pro Val Phe
1

<210> SEQ ID NO 369
<211> LENGTH: 4
<212> TYPE: PRT
```

```
<213> ORGANISM: Artificial Sequence
<220> FEATURE:
<223> OTHER INFORMATION: computer generated peptide library sequence

<400> SEQUENCE: 369

Val Tyr Ser Met
1

<210> SEQ ID NO 370
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 370

Val Met Ala Gln
1

<210> SEQ ID NO 371
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 371

Phe Val Gly Met
1

<210> SEQ ID NO 372
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 372

Trp Ser Thr Pro
1

<210> SEQ ID NO 373
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 373

Ser Tyr Pro Val
1

<210> SEQ ID NO 374
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 374

Thr Thr Tyr Ser
1

<210> SEQ ID NO 375
<211> LENGTH: 4
<212> TYPE: PRT
<213> ORGANISM: Artificial Sequence
```

```
<220> FEATURE:
<223> OTHER INFORMATION: computer generated peptide library sequence

<400> SEQUENCE: 375

Thr Val Thr Thr
1

<210> SEQ ID NO 376
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 376

Lys Asp Lys Thr
1

<210> SEQ ID NO 377
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 377

Tyr Arg Glu Leu
1

<210> SEQ ID NO 378
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 378

Leu Ser His Phe
1

<210> SEQ ID NO 379
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 379

Ser Pro Gly Thr
1

<210> SEQ ID NO 380
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 380

Leu Met Gly Thr
1

<210> SEQ ID NO 381
<211> LENGTH: 4
<212> TYPE: PRT
<213> ORGANISM: Artificial Sequence
<220> FEATURE:
```

<223> OTHER INFORMATION: computer generated peptide library sequence

<400> SEQUENCE: 381

Ala Ala Ser Leu
1

<210> SEQ ID NO 382
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 382

Phe Ser Asn Asn
1

<210> SEQ ID NO 383
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 383

Gln Ala Arg Leu
1

<210> SEQ ID NO 384
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 384

Tyr His Ile Ala
1

<210> SEQ ID NO 385
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 385

Ala Arg Gln Asp
1

<210> SEQ ID NO 386
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 386

Val Ala Tyr Thr
1

<210> SEQ ID NO 387
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 387

Thr Pro Ser Tyr
1

<210> SEQ ID NO 388
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 388

Met Ile Leu His
1

<210> SEQ ID NO 389
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 389

Leu Gly Asn Val
1

<210> SEQ ID NO 390
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 390

Thr Ser Ile Ser
1

<210> SEQ ID NO 391
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 391

Thr Met Val Tyr
1

<210> SEQ ID NO 392
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 392

Leu Val Val Gly
1

<210> SEQ ID NO 393
<211> LENGTH: 4
<212> TYPE: PRT
<213> ORGANISM: Artificial Sequence
<220> FEATURE:
<223> OTHER INFORMATION: computer generated peptide library sequence

```
<400> SEQUENCE: 393

Ser Pro Leu Tyr
1

<210> SEQ ID NO 394
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 394

Tyr Lys Ser Glu
1

<210> SEQ ID NO 395
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 395

Phe Thr Arg Leu
1

<210> SEQ ID NO 396
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 396

Val Ser Tyr Asn
1

<210> SEQ ID NO 397
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 397

Glu Arg Thr Pro
1

<210> SEQ ID NO 398
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 398

Phe Arg Ser Glu
1

<210> SEQ ID NO 399
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 399
```

Asn Tyr Thr Glu
1

<210> SEQ ID NO 400
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 400

Gln Thr Ile Asn
1

<210> SEQ ID NO 401
<211> LENGTH: 4
<212> TYPE: PRT
<213> ORGANISM: Artificial Sequence
<220> FEATURE:
<223> OTHER INFORMATION: computer generated peptide library sequence

<400> SEQUENCE: 401

Asp Val His Arg
1

<210> SEQ ID NO 402
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 402

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

```
Ala Pro Val Ala Asp Asn Asn Glu Gly Ala Asp Gly Val Gly Ser Ser
    210                 215                 220
Ser Gly Asn Trp His Cys Asp Ser Gln Trp Leu Gly Asp Arg Val Ile
225                 230                 235                 240
Thr Thr Ser Thr Arg Thr Trp Ala Leu Pro Thr Tyr Asn Asn His Leu
                245                 250                 255
Tyr Lys Gln Ile Ser Asn Ser Thr Ser Gly Ser Ser Asn Asp Asn
                260                 265                 270
Ala Tyr Phe Gly Tyr Ser Thr Pro Trp Gly Tyr Phe Asp Phe Asn Arg
            275                 280                 285
Phe His Cys His Phe Ser Pro Arg Asp Trp Gln Arg Leu Ile Asn Asn
    290                 295                 300
Asn Trp Gly Phe Arg Pro Lys Arg Leu Asn Phe Lys Leu Phe Asn Ile
305                 310                 315                 320
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
            340                 345                 350
Pro Tyr Val Leu Gly Ser Ala His Glu Gly Cys Leu Pro Pro Phe Pro
    355                 360                 365
Ala Asp Val Phe Met Ile Pro Gln Tyr Gly Tyr Leu Thr Leu Asn Asp
370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
            420                 425                 430
Asp Arg Leu Met Asn Pro Leu Ile Asp Gln Tyr Leu Tyr Tyr Leu Ser
        435                 440                 445
Lys Thr Ile Ser Gln Val Asn Gly Arg Pro Arg Asp Leu Lys Phe Ser
    450                 455                 460
Val Ala Gly Pro Ser Asn Met Ala Val Gln Gly Arg Asn Tyr Ile Pro
465                 470                 475                 480
Gly Pro Ser Tyr Arg Gln Gln Arg Val Ser Thr Thr Val Thr Gln Asn
                485                 490                 495
Asn Asn Ser Glu Phe Ala Trp Pro Gly Ala Ser Ser Trp Ala Leu Asn
            500                 505                 510
Gly Arg Asn Ser Leu Met Asn Pro Gly Pro Ala Met Ala Ser His Lys
        515                 520                 525
Glu Gly Glu Asp Arg Phe Phe Pro Leu Ser Gly Ser Leu Ile Phe Gly
    530                 535                 540
Lys Gln Gly Thr Gly Arg Asp Asn Val Asp Ala Asp Lys Val Met Ile
545                 550                 555                 560
Thr Asn Glu Glu Glu Ile Lys Thr Thr Asn Pro Val Ala Thr Glu Ser
                565                 570                 575
Tyr Gly Gln Val Ala Thr Asn His Gln Ser Ala Gln Ala Gln Ala Gln
            580                 585                 590
Thr Gly Trp Val Gln Asn Gln Gly Ile Leu Pro Gly Met Val Trp Gln
        595                 600                 605
Asp Arg Asp Val Tyr Leu Gln Gly Pro Ile Trp Ala Lys Ile Pro His
    610                 615                 620
Thr Asp Gly Asn Phe His Pro Ser Pro Leu Met Gly Gly Phe Gly Met
```

```
            625                 630                 635                 640
Lys His Pro Pro Gln Ile Leu Ile Lys Asn Thr Pro Val Pro Ala
                    645                 650                 655

Asp Pro Pro Thr Ala Phe Asn Lys Asp Lys Leu Asn Ser Phe Ile Thr
                660                 665                 670

Gln Tyr Ser Thr Gly Gln Val Ser Val Glu Ile Glu Trp Glu Leu Gln
                675                 680                 685

Lys Glu Asn Ser Lys Arg Trp Asn Pro Glu Ile Gln Tyr Thr Ser Asn
690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                    725                 730                 735

<210> SEQ ID NO 403
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 403

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
                20                  25                  30

Lys Ala Asn Gln Gln His Gln Asp Asn Ala Arg Gly Leu Val Leu Pro
            35                  40                  45

Gly Tyr Lys Tyr Leu Gly Pro Gly Asn Gly Leu Asp Lys Gly Glu Pro
        50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
                100                 105                 110

Asn Leu Gly Arg Ala Val Phe Gln Ala Lys Lys Arg Leu Leu Glu Pro
            115                 120                 125

Leu Gly Leu Val Glu Glu Ala Ala Lys Thr Ala Pro Gly Lys Lys Arg
130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
```

```
            260                 265                 270
Ala Tyr Phe Gly Tyr Ser Thr Pro Trp Gly Tyr Phe Asp Phe Asn Arg
                275                 280                 285

Phe His Cys His Phe Ser Pro Arg Asp Trp Gln Arg Leu Ile Asn Asn
        290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
    370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
        435                 440                 445

Lys Thr Ile Gly Tyr His Lys Ser Gly Ala Ala Gln Leu Lys Phe Ser
    450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
        515                 520                 525

Glu Gly Glu Asp Arg Phe Phe Pro Leu Ser Gly Ser Leu Ile Phe Gly
    530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
    610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685
```

```
Lys Glu Asn Ser Lys Arg Trp Asn Pro Glu Ile Gln Tyr Thr Ser Asn
            690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 404
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 404

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
    290                 295                 300

Asn Trp Gly Phe Arg Pro Lys Arg Leu Asn Phe Lys Leu Phe Asn Ile
305                 310                 315                 320
```

-continued

```
Gln Val Lys Glu Val Thr Asp Asn Asn Gly Val Lys Thr Ile Ala Asn
            325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
            355                 360                 365

Ala Asp Val Phe Met Ile Pro Gln Tyr Gly Tyr Leu Thr Leu Asn Asp
        370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
            405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
            435                 440                 445

Lys Thr Ile Asn Gly Ser Gly Gln Asn Gln Gln Thr Leu Lys Phe Ser
        450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
            485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
            515                 520                 525

Glu Gly Glu Asp Arg Phe Phe Pro Leu Ser Gly Ser Leu Ile Phe Gly
        530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
            565                 570                 575

Tyr Gly Gln Val Ala Thr Asn His Gln Ala Asn Tyr Gly Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
        610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
            645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
        690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
            725                 730                 735
```

```
<210> SEQ ID NO 405
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 405
```

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
                420                 425                 430

Asp Arg Leu Met Asn Pro Leu Ile Asp Gln Tyr Leu Tyr Tyr Leu Ser
                435                 440                 445

Lys Thr Ile Gly Tyr His Lys Ser Gly Ala Ala Gln Leu Lys Phe Ser
450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
                500                 505                 510

Gly Arg Asn Ser Leu Met Asn Pro Gly Pro Ala Met Ala Ser His Lys
                515                 520                 525

Glu Gly Glu Asp Arg Phe Phe Pro Leu Ser Gly Ser Leu Ile Phe Gly
530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Asn Val Ser Tyr Gln Ala Gln
                580                 585                 590

Thr Gly Trp Val Gln Asn Gln Gly Ile Leu Pro Gly Met Val Trp Gln
                595                 600                 605

Asp Arg Asp Val Tyr Leu Gln Gly Pro Ile Trp Ala Lys Ile Pro His
610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
                660                 665                 670

Gln Tyr Ser Thr Gly Gln Val Ser Val Glu Ile Glu Trp Glu Leu Gln
                675                 680                 685

Lys Glu Asn Ser Lys Arg Trp Asn Pro Glu Ile Gln Tyr Thr Ser Asn
                690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 406
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 406

```
Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
            35                  40                  45

Gly Tyr Lys Tyr Leu Gly Pro Gly Asn Gly Leu Asp Lys Gly Glu Pro
        50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
            115                 120                 125

Leu Gly Leu Val Glu Glu Ala Ala Lys Thr Ala Pro Gly Lys Lys Arg
        130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
            195                 200                 205

Ala Pro Val Ala Asp Asn Asn Glu Gly Ala Asp Gly Val Gly Ser Ser
        210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
        290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
```

```
                420             425             430
Asp Arg Leu Met Asn Pro Leu Ile Asp Gln Tyr Leu Tyr Tyr Leu Ser
            435                 440                 445

Lys Thr Ile Asn Gly Ser Gly Gln Asn Gln Gln Thr Leu Lys Phe Ser
450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Leu Asn Ser Met Leu Ile Trp Pro Gly Ala Ser Ser Trp Ala Leu Asn
            500                 505                 510

Gly Arg Asn Ser Leu Met Asn Pro Gly Pro Ala Met Ala Ser His Lys
            515                 520                 525

Glu Gly Glu Asp Arg Phe Phe Pro Leu Ser Gly Ser Leu Ile Phe Gly
            530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590

Thr Gly Trp Val Gln Asn Gln Gly Ile Leu Pro Gly Met Val Trp Gln
            595                 600                 605

Asp Arg Asp Val Tyr Leu Gln Gly Pro Ile Trp Ala Lys Ile Pro His
            610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
                660                 665                 670

Gln Tyr Ser Thr Gly Gln Val Ser Val Glu Ile Glu Trp Glu Leu Gln
            675                 680                 685

Lys Glu Asn Ser Lys Arg Trp Asn Pro Glu Ile Gln Tyr Thr Ser Asn
            690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 407
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 407

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
                20                  25                  30

Lys Ala Asn Gln Gln His Gln Asp Asn Ala Arg Gly Leu Val Leu Pro
            35                  40                  45

Gly Tyr Lys Tyr Leu Gly Pro Gly Asn Gly Leu Asp Lys Gly Glu Pro
```

```
            50                  55                  60
Val Asn Ala Ala Asp Ala Ala Leu Glu His Asp Lys Ala Tyr Asp
 65                  70                  75                  80

Gln Gln Leu Lys Ala Gly Asp Asn Pro Tyr Leu Lys Tyr Asn His Ala
                 85                  90                  95

Asp Ala Glu Phe Gln Glu Arg Leu Lys Glu Asp Thr Ser Phe Gly Gly
                100                 105                 110

Asn Leu Gly Arg Ala Val Phe Gln Ala Lys Lys Arg Leu Leu Glu Pro
                115                 120                 125

Leu Gly Leu Val Glu Glu Ala Ala Lys Thr Ala Pro Gly Lys Lys Arg
            130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
                180                 185                 190

Ala Ala Pro Ser Gly Val Gly Ser Leu Thr Met Ala Ser Gly Gly Gly
                195                 200                 205

Ala Pro Val Ala Asp Asn Asn Glu Gly Ala Asp Gly Val Gly Ser Ser
            210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
                260                 265                 270

Ala Tyr Phe Gly Tyr Ser Thr Pro Trp Gly Tyr Phe Asp Phe Asn Arg
                275                 280                 285

Phe His Cys His Phe Ser Pro Arg Asp Trp Gln Arg Leu Ile Asn Asn
            290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
                340                 345                 350

Pro Tyr Val Leu Gly Ser Ala His Glu Gly Cys Leu Pro Pro Phe Pro
                355                 360                 365

Ala Asp Val Phe Met Ile Pro Gln Tyr Gly Tyr Leu Thr Leu Asn Asp
370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
                420                 425                 430

Asp Arg Leu Met Asn Pro Leu Ile Asp Gln Tyr Leu Tyr Tyr Leu Ser
            435                 440                 445

Lys Thr Ile Gly Tyr His Lys Ser Gly Ala Ala Gln Leu Lys Phe Ser
            450                 455                 460

Val Ala Gly Pro Ser Asn Met Ala Val Gln Gly Arg Asn Tyr Ile Pro
465                 470                 475                 480
```

Gly Pro Ser Tyr Arg Gln Gln Arg Val Ser Thr Thr Val Thr Gln Asn
            485                 490                 495

Asn Asn Ser Glu Phe Ala Trp Pro Gly Ala Ser Ser Trp Ala Leu Asn
        500                 505                 510

Gly Arg Asn Ser Leu Met Asn Pro Gly Pro Ala Met Ala Ser His Lys
    515                 520                 525

Glu Gly Glu Asp Arg Phe Phe Pro Leu Ser Gly Ser Leu Ile Phe Gly
530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ala Asn Tyr Gly Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
    610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
    690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 408
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 408

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

-continued

```
Asn Leu Gly Arg Ala Val Phe Gln Ala Lys Lys Arg Leu Leu Glu Pro
        115                 120                 125
Leu Gly Leu Val Glu Glu Ala Lys Thr Ala Pro Gly Lys Lys Arg
130                 135                 140
Pro Val Glu Gln Ser Pro Gln Glu Pro Asp Ser Ser Ala Gly Ile Gly
145                 150                 155                 160
Lys Ser Gly Ala Gln Pro Ala Lys Lys Arg Leu Asn Phe Gly Gln Thr
                165                 170                 175
Gly Asp Thr Glu Ser Val Pro Asp Pro Gln Pro Ile Gly Glu Pro Pro
            180                 185                 190
Ala Ala Pro Ser Gly Val Gly Ser Leu Thr Met Ala Ser Gly Gly Gly
        195                 200                 205
Ala Pro Val Ala Asp Asn Asn Glu Gly Ala Asp Gly Val Gly Ser Ser
    210                 215                 220
Ser Gly Asn Trp His Cys Asp Ser Gln Trp Leu Gly Asp Arg Val Ile
225                 230                 235                 240
Thr Thr Ser Thr Arg Thr Trp Ala Leu Pro Thr Tyr Asn Asn His Leu
                245                 250                 255
Tyr Lys Gln Ile Ser Asn Ser Thr Ser Gly Gly Ser Ser Asn Asp Asn
            260                 265                 270
Ala Tyr Phe Gly Tyr Ser Thr Pro Trp Gly Tyr Phe Asp Phe Asn Arg
        275                 280                 285
Phe His Cys His Phe Ser Pro Arg Asp Trp Gln Arg Leu Ile Asn Asn
    290                 295                 300
Asn Trp Gly Phe Arg Pro Lys Arg Leu Asn Phe Lys Leu Phe Asn Ile
305                 310                 315                 320
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
            340                 345                 350
Pro Tyr Val Leu Gly Ser Ala His Glu Gly Cys Leu Pro Pro Phe Pro
        355                 360                 365
Ala Asp Val Phe Met Ile Pro Gln Tyr Gly Tyr Leu Thr Leu Asn Asp
    370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
            420                 425                 430
Asp Arg Leu Met Asn Pro Leu Ile Asp Gln Tyr Leu Tyr Tyr Leu Ser
        435                 440                 445
Lys Thr Ile Gly Tyr His Lys Ser Gly Ala Ala Gln Leu Lys Phe Ser
    450                 455                 460
Val Ala Gly Pro Ser Asn Met Ala Val Gln Gly Arg Asn Tyr Ile Pro
465                 470                 475                 480
Gly Pro Ser Tyr Arg Gln Gln Arg Val Ser Thr Thr Val Thr Gln Asn
                485                 490                 495
Gln Asp Ala Ser Leu Leu Trp Pro Gly Ala Ser Ser Trp Ala Leu Asn
            500                 505                 510
Gly Arg Asn Ser Leu Met Asn Pro Gly Pro Ala Met Ala Ser His Lys
        515                 520                 525
```

-continued

Glu Gly Glu Asp Arg Phe Phe Pro Leu Ser Gly Ser Leu Ile Phe Gly
    530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 409
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 409

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

```
Lys Ser Gly Ala Gln Pro Ala Lys Lys Arg Leu Asn Phe Gly Gln Thr
            165                 170                 175
Gly Asp Thr Glu Ser Val Pro Asp Pro Gln Pro Ile Gly Glu Pro Pro
        180                 185                 190
Ala Ala Pro Ser Gly Val Gly Ser Leu Thr Met Ala Ser Gly Gly Gly
        195                 200                 205
Ala Pro Val Ala Asp Asn Asn Glu Gly Ala Asp Gly Val Gly Ser Ser
    210                 215                 220
Ser Gly Asn Trp His Cys Asp Ser Gln Trp Leu Gly Asp Arg Val Ile
225                 230                 235                 240
Thr Thr Ser Thr Arg Thr Trp Ala Leu Pro Thr Tyr Asn Asn His Leu
                245                 250                 255
Tyr Lys Gln Ile Ser Asn Ser Thr Ser Gly Gly Ser Ser Asn Asp Asn
            260                 265                 270
Ala Tyr Phe Gly Tyr Ser Thr Pro Trp Gly Tyr Phe Asp Phe Asn Arg
        275                 280                 285
Phe His Cys His Phe Ser Pro Arg Asp Trp Gln Arg Leu Ile Asn Asn
        290                 295                 300
Asn Trp Gly Phe Arg Pro Lys Arg Leu Asn Phe Lys Leu Phe Asn Ile
305                 310                 315                 320
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
            340                 345                 350
Pro Tyr Val Leu Gly Ser Ala His Glu Gly Cys Leu Pro Pro Phe Pro
        355                 360                 365
Ala Asp Val Phe Met Ile Pro Gln Tyr Gly Tyr Leu Thr Leu Asn Asp
    370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
            420                 425                 430
Asp Arg Leu Met Asn Pro Leu Ile Asp Gln Tyr Leu Tyr Tyr Leu Ser
        435                 440                 445
Lys Thr Ile Gly Tyr His Lys Ser Gly Ala Ala Gln Leu Lys Phe Ser
    450                 455                 460
Val Ala Gly Pro Ser Asn Met Ala Val Gln Gly Arg Asn Tyr Ile Pro
465                 470                 475                 480
Gly Pro Ser Tyr Arg Gln Gln Arg Val Ser Thr Thr Val Thr Gln Asn
                485                 490                 495
Asn Gly Met Ser Phe Thr Trp Pro Gly Ala Ser Ser Trp Ala Leu Asn
            500                 505                 510
Gly Arg Asn Ser Leu Met Asn Pro Gly Pro Ala Met Ala Ser His Lys
        515                 520                 525
Glu Gly Glu Asp Arg Phe Phe Pro Leu Ser Gly Ser Leu Ile Phe Gly
    530                 535                 540
Lys Gln Gly Thr Gly Arg Asp Asn Val Asp Ala Asp Lys Val Met Ile
545                 550                 555                 560
Thr Asn Glu Glu Glu Ile Lys Thr Thr Asn Pro Val Ala Thr Glu Ser
                565                 570                 575
Tyr Gly Gln Val Ala Thr Asn His Gln Ser Ala Gln Ala Gln Ala Gln
```

```
                    580              585               590
Thr Gly Trp Val Gln Asn Gln Gly Ile Leu Pro Gly Met Val Trp Gln
            595              600              605
Asp Arg Asp Val Tyr Leu Gln Gly Pro Ile Trp Ala Lys Ile Pro His
            610              615              620
Thr Asp Gly Asn Phe His Pro Ser Pro Leu Met Gly Gly Phe Gly Met
625              630              635              640
Lys His Pro Pro Gln Ile Leu Ile Lys Asn Thr Pro Val Pro Ala
            645              650              655
Asp Pro Pro Thr Ala Phe Asn Lys Asp Lys Leu Asn Ser Phe Ile Thr
            660              665              670
Gln Tyr Ser Thr Gly Gln Val Ser Val Glu Ile Glu Trp Glu Leu Gln
            675              680              685
Lys Glu Asn Ser Lys Arg Trp Asn Pro Glu Ile Gln Tyr Thr Ser Asn
            690              695              700
Tyr Tyr Lys Ser Asn Asn Val Glu Phe Ala Val Asn Thr Glu Gly Val
705              710              715              720
Tyr Ser Glu Pro Arg Pro Ile Gly Thr Arg Tyr Leu Thr Arg Asn Leu
            725              730              735

<210> SEQ ID NO 410
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 410

Met Ala Ala Asp Gly Tyr Leu Pro Asp Trp Leu Glu Asp Asn Leu Ser
1               5                   10                  15
Glu Gly Ile Arg Glu Trp Trp Ala Leu Lys Pro Gly Ala Pro Gln Pro
            20                  25                  30
Lys Ala Asn Gln Gln His Gln Asp Asn Ala Arg Gly Leu Val Leu Pro
        35                  40                  45
Gly Tyr Lys Tyr Leu Gly Pro Gly Asn Gly Leu Asp Lys Gly Glu Pro
    50                  55                  60
Val Asn Ala Ala Asp Ala Ala Ala Leu Glu His Asp Lys Ala Tyr Asp
65                  70                  75                  80
Gln Gln Leu Lys Ala Gly Asp Asn Pro Tyr Leu Lys Tyr Asn His Ala
                85                  90                  95
Asp Ala Glu Phe Gln Glu Arg Leu Lys Glu Asp Thr Ser Phe Gly Gly
            100                 105                 110
Asn Leu Gly Arg Ala Val Phe Gln Ala Lys Lys Arg Leu Leu Glu Pro
        115                 120                 125
Leu Gly Leu Val Glu Glu Ala Ala Lys Thr Ala Pro Gly Lys Lys Arg
    130                 135                 140
Pro Val Glu Gln Ser Pro Gln Glu Pro Asp Ser Ser Ala Gly Ile Gly
145                 150                 155                 160
Lys Ser Gly Ala Gln Pro Ala Lys Lys Arg Leu Asn Phe Gly Gln Thr
                165                 170                 175
Gly Asp Thr Glu Ser Val Pro Asp Pro Gln Pro Ile Gly Glu Pro Pro
            180                 185                 190
Ala Ala Pro Ser Gly Val Gly Ser Leu Thr Met Ala Ser Gly Gly Gly
        195                 200                 205
Ala Pro Val Ala Asp Asn Asn Glu Gly Ala Asp Gly Val Gly Ser Ser
```

```
            210                 215                 220
Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
                    260                 265                 270

Ala Tyr Phe Gly Tyr Ser Thr Pro Trp Gly Tyr Phe Asp Phe Asn Arg
            275                 280                 285

Phe His Cys His Phe Ser Pro Arg Asp Trp Gln Arg Leu Ile Asn Asn
        290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
                    340                 345                 350

Pro Tyr Val Leu Gly Ser Ala His Glu Gly Cys Leu Pro Pro Phe Pro
            355                 360                 365

Ala Asp Val Phe Met Ile Pro Gln Tyr Gly Tyr Leu Thr Leu Asn Asp
        370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
                    420                 425                 430

Asp Arg Leu Met Asn Pro Leu Ile Asp Gln Tyr Leu Tyr Tyr Leu Ser
            435                 440                 445

Lys Thr Ile Asn Gly Ser Gly Gln Asn Gln Gln Thr Leu Lys Phe Ser
        450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Leu Asn Ser Met Leu Ile Trp Pro Gly Ala Ser Ser Trp Ala Leu Asn
                    500                 505                 510

Gly Arg Asn Ser Leu Met Asn Pro Gly Pro Ala Met Ala Ser His Lys
            515                 520                 525

Glu Gly Glu Asp Arg Phe Phe Pro Leu Ser Gly Ser Leu Ile Phe Gly
        530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ala Asn Tyr Gly Gln Ala Gln
                    580                 585                 590

Thr Gly Trp Val Gln Asn Gln Gly Ile Leu Pro Gly Met Val Trp Gln
            595                 600                 605

Asp Arg Asp Val Tyr Leu Gln Gly Pro Ile Trp Ala Lys Ile Pro His
        610                 615                 620

Thr Asp Gly Asn Phe His Pro Ser Pro Leu Met Gly Gly Phe Gly Met
625                 630                 635                 640
```

```
Lys His Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
            675                 680                 685

Lys Glu Asn Ser Lys Arg Trp Asn Pro Glu Ile Gln Tyr Thr Ser Asn
        690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 411
<211> LENGTH: 50
<212> TYPE: PRT
<213> ORGANISM: Artificial Sequence
<220> FEATURE:
<223> OTHER INFORMATION: Recombinant AAV capsid protein

<400> SEQUENCE: 411

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr
    50

<210> SEQ ID NO 412
<211> LENGTH: 49
<212> TYPE: PRT
<213> ORGANISM: Artificial Sequence
<220> FEATURE:
<223> OTHER INFORMATION: Recombinant AAV capsid protein

<400> SEQUENCE: 412

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
        35                  40                  45

Tyr

<210> SEQ ID NO 413
<211> LENGTH: 34
<212> TYPE: PRT
<213> ORGANISM: Artificial Sequence
<220> FEATURE:
<223> OTHER INFORMATION: Recombinant AAV capsid protein

<400> SEQUENCE: 413

Lys Tyr Leu Gly Pro Gly Asn Gly Leu Asp Lys Gly Glu Pro Val Asn
1               5                   10                  15

Ala Ala Asp Ala Ala Ala Leu Glu His Asp Lys Ala Tyr Asp Gln Gln
            20                  25                  30

Leu Lys
```

<210> SEQ ID NO 414
<211> LENGTH: 34
<212> TYPE: PRT
<213> ORGANISM: Artificial Sequence
<220> FEATURE:
<223> OTHER INFORMATION: Recombinant AAV capsid protein

<400> SEQUENCE: 414

Asn Tyr Leu Gly Pro Gly Asn Gly Leu Asp Arg Gly Glu Pro Val Asn
1               5                   10                  15

Arg Ala Asp Glu Val Ala Arg Glu His Asp Ile Ser Tyr Asn Glu Gln
            20                  25                  30

Leu Glu

<210> SEQ ID NO 415
<211> LENGTH: 44
<212> TYPE: PRT
<213> ORGANISM: Artificial Sequence
<220> FEATURE:
<223> OTHER INFORMATION: Recombinant AAV capsid protein

<400> SEQUENCE: 415

Ala Gly Asp Asn Pro Tyr Leu Lys Tyr Asn His Ala Asp Ala Glu Phe
1               5                   10                  15

Gln Glu Arg Leu Lys Glu Asp Thr Ser Phe Gly Gly Asn Leu Gly Arg
            20                  25                  30

Ala Val Phe Gln Ala Lys Lys Arg Leu Leu Glu Pro
        35                  40

<210> SEQ ID NO 416
<211> LENGTH: 44
<212> TYPE: PRT
<213> ORGANISM: Artificial Sequence
<220> FEATURE:
<223> OTHER INFORMATION: Recombinant AAV capsid protein

<400> SEQUENCE: 416

Ala Gly Asp Asn Pro Tyr Leu Lys Tyr Asn His Ala Asp Ala Glu Phe
1               5                   10                  15

Gln Glu Lys Leu Ala Asp Asp Thr Ser Phe Gly Gly Asn Leu Gly Lys
            20                  25                  30

Ala Val Phe Gln Ala Lys Lys Arg Val Leu Glu Pro
        35                  40

<210> SEQ ID NO 417
<211> LENGTH: 84
<212> TYPE: PRT
<213> ORGANISM: Artificial Sequence
<220> FEATURE:
<223> OTHER INFORMATION: Recombinant AAV capsid protein

<400> SEQUENCE: 417

Leu Gly Leu Val Glu Glu Ala Ala Lys Thr Ala Pro Gly Lys Lys Arg
1               5                   10                  15

Pro Val Glu Gln Ser Pro Gln Glu Pro Asp Ser Ser Ala Gly Ile Gly
            20                  25                  30

Lys Ser Gly Ala Gln Pro Ala Lys Lys Arg Leu Asn Phe Gly Gln Thr
        35                  40                  45

Gly Asp Thr Glu Ser Val Pro Asp Pro Gln Pro Ile Gly Glu Pro Pro
    50                  55                  60

```
Ala Ala Pro Ser Gly Val Gly Ser Leu Thr Met Ala Ser Gly Gly
 65                  70                  75                  80

Ala Pro Val Ala
```

<210> SEQ ID NO 418
<211> LENGTH: 75
<212> TYPE: PRT
<213> ORGANISM: Artificial Sequence
<220> FEATURE:
<223> OTHER INFORMATION: Recombinant AAV capsid protein

<400> SEQUENCE: 418

```
Phe Gly Leu Val Glu Glu Gly Ala Lys Thr Ala Pro Thr Gly Lys Arg
  1               5                  10                  15

Ile Asp Asp His Phe Pro Lys Arg Lys Ala Arg Thr Glu Glu Asp
                 20                  25                  30

Ser Lys Pro Ser Thr Ser Ser Asp Ala Glu Ala Gly Pro Ser Gly Ser
             35                  40                  45

Gln Gln Leu Gln Ile Pro Ala Gln Pro Ala Ser Ser Leu Gly Ala Asp
         50                  55                  60

Thr Met Ser Ala Gly Gly Gly Pro Leu Gly
 65                  70                  75
```

<210> SEQ ID NO 419
<211> LENGTH: 524
<212> TYPE: PRT
<213> ORGANISM: Artificial Sequence
<220> FEATURE:
<223> OTHER INFORMATION: Recombinant AAV capsid protein

<400> SEQUENCE: 419

```
Asp Asn Asn Glu Gly Ala Asp Gly Val Gly Ser Ser Ser Gly Asn Trp
  1               5                  10                  15

His Cys Asp Ser Gln Trp Leu Gly Asp Arg Val Ile Thr Thr Ser Thr
                 20                  25                  30

Arg Thr Trp Ala Leu Pro Thr Tyr Asn Asn His Leu Tyr Lys Gln Ile
             35                  40                  45

Ser Asn Ser Thr Ser Gly Gly Ser Ser Asn Asp Asn Ala Tyr Phe Gly
         50                  55                  60

Tyr Ser Thr Pro Trp Gly Tyr Phe Asp Phe Asn Arg Phe His Cys His
 65                  70                  75                  80

Phe Ser Pro Arg Asp Trp Gln Arg Leu Ile Asn Asn Asn Trp Gly Phe
                 85                  90                  95

Arg Pro Lys Arg Leu Asn Phe Lys Leu Phe Asn Ile Gln Val Lys Glu
            100                 105                 110

Val Thr Asp Asn Asn Gly Val Lys Thr Ile Ala Asn Asn Leu Thr Ser
            115                 120                 125

Thr Val Gln Val Phe Thr Asp Ser Asp Tyr Gln Leu Pro Tyr Val Leu
        130                 135                 140

Gly Ser Ala His Glu Gly Cys Leu Pro Pro Phe Pro Ala Asp Val Phe
145                 150                 155                 160

Met Ile Pro Gln Tyr Gly Tyr Leu Thr Leu Asn Asp Gly Ser Gln Ala
                165                 170                 175

Val Gly Arg Ser Ser Phe Tyr Cys Leu Glu Tyr Phe Pro Ser Gln Met
            180                 185                 190

Leu Arg Thr Gly Asn Asn Phe Gln Phe Ser Tyr Glu Phe Glu Asn Val
        195                 200                 205
```

```
Pro Phe His Ser Ser Tyr Ala His Ser Gln Ser Leu Asp Arg Leu Met
    210                 215                 220

Asn Pro Leu Ile Asp Gln Tyr Leu Tyr Leu Ser Lys Thr Ile Asn
225                 230                 235                 240

Gly Ser Gly Gln Asn Gln Gln Thr Leu Lys Phe Ser Val Ala Gly Pro
                245                 250                 255

Ser Asn Met Ala Val Gln Gly Arg Asn Tyr Ile Pro Gly Pro Ser Tyr
            260                 265                 270

Arg Gln Gln Arg Val Ser Thr Thr Val Thr Gln Asn Asn Asn Ser Glu
        275                 280                 285

Phe Ala Trp Pro Gly Ala Ser Ser Trp Ala Leu Asn Gly Arg Asn Ser
    290                 295                 300

Leu Met Asn Pro Gly Pro Ala Met Ala Ser His Lys Glu Gly Glu Asp
305                 310                 315                 320

Arg Phe Phe Pro Leu Ser Gly Ser Leu Ile Phe Gly Lys Gln Gly Thr
                325                 330                 335

Gly Arg Asp Asn Val Asp Ala Asp Lys Val Met Ile Thr Asn Glu Glu
            340                 345                 350

Glu Ile Lys Thr Thr Asn Pro Val Ala Thr Glu Ser Tyr Gly Gln Val
        355                 360                 365

Ala Thr Asn His Gln Ser Ala Gln Ala Gln Thr Gly Trp Val
    370                 375                 380

Gln Asn Gln Gly Ile Leu Pro Gly Met Val Trp Gln Asp Arg Asp Val
385                 390                 395                 400

Tyr Leu Gln Gly Pro Ile Trp Ala Lys Ile Pro His Thr Asp Gly Asn
                405                 410                 415

Phe His Pro Ser Pro Leu Met Gly Gly Phe Gly Met Lys His Pro Pro
            420                 425                 430

Pro Gln Ile Leu Ile Lys Asn Thr Pro Val Pro Ala Asp Pro Pro Thr
        435                 440                 445

Ala Phe Asn Lys Asp Lys Leu Asn Ser Phe Ile Thr Gln Tyr Ser Thr
    450                 455                 460

Gly Gln Val Ser Val Glu Ile Glu Trp Glu Leu Gln Lys Glu Asn Ser
465                 470                 475                 480

Lys Arg Trp Asn Pro Glu Ile Gln Tyr Thr Ser Asn Tyr Tyr Lys Ser
                485                 490                 495

Asn Asn Val Glu Phe Ala Val Asn Thr Glu Gly Val Tyr Ser Glu Pro
            500                 505                 510

Arg Pro Ile Gly Thr Arg Tyr Leu Thr Arg Asn Leu
        515                 520

<210> SEQ ID NO 420
<211> LENGTH: 524
<212> TYPE: PRT
<213> ORGANISM: Artificial Sequence
<220> FEATURE:
<223> OTHER INFORMATION: Recombinant AAV capsid protein

<400> SEQUENCE: 420

Asp Asn Asn Glu Gly Ala Asp Gly Val Gly Ser Ser Ser Gly Asn Trp
1               5                   10                  15

His Cys Asp Ser Gln Trp Leu Gly Asp Arg Val Ile Thr Thr Ser Thr
            20                  25                  30

Arg Thr Trp Ala Leu Pro Thr Tyr Asn Asn His Leu Tyr Lys Gln Ile
        35                  40                  45
```

```
Ser Asn Ser Thr Ser Gly Gly Ser Ser Asn Asp Asn Ala Tyr Phe Gly
    50              55                  60

Tyr Ser Thr Pro Trp Gly Tyr Phe Asp Phe Asn Arg Phe His Cys His
65              70                  75                      80

Phe Ser Pro Arg Asp Trp Gln Arg Leu Ile Asn Asn Asn Trp Gly Phe
                85                  90              95

Arg Pro Lys Arg Leu Asn Phe Lys Leu Phe Asn Ile Gln Val Lys Glu
            100             105             110

Val Thr Asp Asn Asn Gly Val Lys Thr Ile Ala Asn Asn Leu Thr Ser
            115             120             125

Thr Val Gln Val Phe Thr Asp Ser Asp Tyr Gln Leu Pro Tyr Val Leu
    130             135             140

Gly Ser Ala His Glu Gly Cys Leu Pro Pro Phe Pro Ala Asp Val Phe
145             150             155             160

Met Ile Pro Gln Tyr Gly Tyr Leu Thr Leu Asn Asp Gly Ser Gln Ala
                165             170             175

Val Gly Arg Ser Ser Phe Tyr Cys Leu Glu Tyr Phe Pro Ser Gln Met
            180             185             190

Leu Arg Thr Gly Asn Asn Phe Gln Phe Ser Tyr Glu Phe Glu Asn Val
            195             200             205

Pro Phe His Ser Ser Tyr Ala His Ser Gln Ser Leu Asp Arg Leu Met
    210             215             220

Asn Pro Leu Ile Asp Gln Tyr Leu Tyr Tyr Leu Ser Lys Thr Ile Asn
225             230             235             240

Gly Ser Gly Gln Asn Gln Gln Thr Leu Lys Phe Ser Val Ala Gly Pro
            245             250             255

Ser Asn Met Ala Val Gln Gly Arg Asn Tyr Ile Pro Gly Pro Ser Tyr
            260             265             270

Arg Gln Gln Arg Val Ser Thr Thr Val Thr Gln Asn Asn Asn Ser Glu
            275             280             285

Phe Ala Trp Pro Gly Ala Ser Ser Trp Ala Leu Asn Gly Arg Asn Ser
    290             295             300

Leu Met Asn Pro Gly Pro Ala Met Ala Ser His Lys Glu Gly Glu Asp
305             310             315             320

Arg Phe Phe Pro Leu Ser Gly Ser Leu Ile Phe Gly Lys Gln Gly Thr
                325             330             335

Gly Arg Asp Asn Val Asp Ala Asp Lys Val Met Ile Thr Asn Glu Glu
            340             345             350

Glu Ile Lys Thr Thr Asn Pro Val Ala Thr Glu Ser Tyr Gly Gln Val
            355             360             365

Ala Thr Asn His Gln Ser Ala Gln Ala Gln Thr Gly Trp Val
    370             375             380

Gln Asn Gln Gly Ile Leu Pro Gly Met Val Trp Gln Asp Arg Asp Val
385             390             395             400

Tyr Leu Gln Gly Pro Ile Trp Ala Lys Ile Pro His Thr Asp Gly Asn
                405             410             415

Phe His Pro Ser Pro Leu Met Gly Gly Phe Gly Met Lys His Pro Pro
            420             425             430

Pro Gln Ile Leu Ile Lys Asn Thr Pro Val Pro Ala Asp Pro Pro Thr
            435             440             445

Ala Phe Asn Lys Asp Lys Leu Asn Ser Phe Ile Thr Gln Tyr Ser Thr
    450             455             460

Gly Gln Val Ser Val Glu Ile Glu Trp Glu Leu Lys Lys Glu Asn Ser
```

```
                   465                 470                 475                 480
               Lys Arg Trp Asn Pro Glu Ile Gln Tyr Thr Ser Asn Tyr Tyr Lys Ser
                               485                 490                 495

Asn Asn Val Glu Phe Ala Val Asn Thr Glu Gly Val Tyr Ser Glu Pro
                               500                 505                 510

Arg Pro Ile Gly Thr Arg Tyr Leu Thr Arg Asn Leu
                               515                 520

<210> SEQ ID NO 421
<211> LENGTH: 726
<212> TYPE: PRT
<213> ORGANISM: Artificial Sequence
<220> FEATURE:
<223> OTHER INFORMATION: Recombinant AAV capsid protein

<400> SEQUENCE: 421

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
                20                  25                  30

Pro Asn Gln Gln His Gln Asp Gln Ala Arg Gly Leu Val Leu Pro Gly
            35                  40                  45

Tyr Asn Tyr Leu Gly Pro Gly Asn Gly Leu Asp Arg Gly Glu Pro Val
        50                  55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
                85                  90                  95

Ala Glu Phe Gln Glu Lys Leu Ala Asp Asp Thr Ser Phe Gly Gly Asn
            100                 105                 110

Leu Gly Lys Ala Val Phe Gln Ala Lys Lys Arg Val Leu Glu Pro Phe
        115                 120                 125

Gly Leu Val Glu Glu Gly Ala Lys Thr Ala Pro Thr Gly Lys Arg Ile
    130                 135                 140

Asp Asp His Phe Pro Lys Arg Lys Lys Ala Arg Thr Glu Glu Asp Ser
145                 150                 155                 160

Lys Pro Ser Thr Ser Ser Asp Ala Glu Ala Gly Pro Ser Gly Ser Gln
                165                 170                 175

Gln Leu Gln Ile Pro Ala Gln Pro Ala Ser Ser Leu Gly Ala Asp Thr
            180                 185                 190

Met Ser Ala Gly Gly Gly Gly Pro Leu Gly Asp Asn Asn Gln Gly Ala
        195                 200                 205

Asp Gly Val Gly Asn Ala Ser Gly Asp Trp His Cys Asp Ser Thr Trp
    210                 215                 220

Met Gly Asp Arg Val Val Thr Lys Ser Thr Arg Thr Trp Ala Leu Pro
225                 230                 235                 240

Thr Tyr Asn Asn His Leu Tyr Lys Gln Ile Ser Asn Ser Thr Ser Gly
                245                 250                 255

Gly Ser Ser Asn Asp Asn Ala Tyr Phe Gly Tyr Ser Thr Pro Trp Gly
            260                 265                 270

Tyr Phe Asp Phe Asn Arg Phe His Cys His Phe Ser Pro Arg Asp Trp
        275                 280                 285

Gln Arg Leu Ile Asn Asn Trp Gly Phe Arg Pro Lys Arg Leu Asn
    290                 295                 300

Phe Lys Leu Phe Asn Ile Gln Val Lys Glu Val Thr Asp Asn Asn Gly
```

```
            305                 310                 315                 320
Val Lys Thr Ile Ala Asn Asn Leu Thr Ser Thr Val Gln Val Phe Thr
                    325                 330                 335
Asp Ser Asp Tyr Gln Leu Pro Tyr Val Leu Gly Ser Ala His Glu Gly
                    340                 345                 350
Cys Leu Pro Pro Phe Pro Ala Asp Val Phe Met Ile Pro Gln Tyr Gly
                    355                 360                 365
Tyr Leu Thr Leu Asn Asp Gly Ser Gln Ala Val Gly Arg Ser Ser Phe
                    370                 375                 380
Tyr Cys Leu Glu Tyr Phe Pro Ser Gln Met Leu Arg Thr Gly Asn Asn
385                 390                 395                 400
Phe Gln Phe Ser Tyr Glu Phe Glu Asn Val Pro Phe His Ser Ser Tyr
                    405                 410                 415
Ala His Ser Gln Ser Leu Asp Arg Leu Met Asn Pro Leu Ile Asp Gln
                    420                 425                 430
Tyr Leu Tyr Tyr Leu Ser Lys Thr Ile Asn Gly Ser Gly Gln Asn Gln
                    435                 440                 445
Gln Thr Leu Lys Phe Ser Val Ala Gly Pro Ser Asn Met Ala Val Gln
    450                 455                 460
Gly Arg Asn Tyr Ile Pro Gly Pro Ser Tyr Arg Gln Gln Arg Val Ser
465                 470                 475                 480
Thr Thr Val Thr Gln Asn Asn Asn Ser Glu Phe Ala Trp Pro Gly Ala
                    485                 490                 495
Ser Ser Trp Ala Leu Asn Gly Arg Asn Ser Leu Met Asn Pro Gly Pro
                    500                 505                 510
Ala Met Ala Ser His Lys Glu Gly Glu Asp Arg Phe Phe Pro Leu Ser
                    515                 520                 525
Gly Ser Leu Ile Phe Gly Lys Gln Gly Thr Gly Arg Asp Asn Val Asp
                    530                 535                 540
Ala Asp Lys Val Met Ile Thr Asn Glu Glu Ile Lys Thr Thr Asn
545                 550                 555                 560
Pro Val Ala Thr Glu Ser Tyr Gly Gln Val Ala Thr Asn His Gln Ser
                    565                 570                 575
Ala Gln Ala Gln Ala Gln Thr Gly Trp Val Gln Asn Gln Gly Ile Leu
                    580                 585                 590
Pro Gly Met Val Trp Gln Asp Arg Asp Val Tyr Leu Gln Gly Pro Ile
                    595                 600                 605
Trp Ala Lys Ile Pro His Thr Asp Gly Asn Phe His Pro Ser Pro Leu
                    610                 615                 620
Met Gly Gly Phe Gly Met Lys His Pro Pro Gln Ile Leu Ile Lys
625                 630                 635                 640
Asn Thr Pro Val Pro Ala Asp Pro Pro Thr Ala Phe Asn Lys Asp Lys
                    645                 650                 655
Leu Asn Ser Phe Ile Thr Gln Tyr Ser Thr Gly Gln Val Ser Val Glu
                    660                 665                 670
Ile Glu Trp Glu Leu Gln Lys Glu Asn Ser Lys Arg Trp Asn Pro Glu
                    675                 680                 685
Ile Gln Tyr Thr Asn Asn Tyr Asn Asp Pro Gln Phe Val Asp Phe Ala
                    690                 695                 700
Pro Asp Ser Thr Gly Glu Tyr Arg Thr Thr Arg Pro Ile Gly Thr Arg
705                 710                 715                 720
Tyr Leu Thr Arg Pro Leu
                    725
```

<210> SEQ ID NO 422
<211> LENGTH: 725
<212> TYPE: PRT
<213> ORGANISM: Artificial Sequence
<220> FEATURE:
<223> OTHER INFORMATION: Recombinant AAV capsid protein

<400> SEQUENCE: 422

```
Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Asn Tyr Leu Gly Pro Gly Asn Gly Leu Asp Arg Gly Glu Pro
    50                  55                  60

Val Asn Arg Ala Asp Glu Val Ala Arg Glu His Asp Ile Ser Tyr Asn
65                  70                  75                  80

Glu Gln Leu Glu Ala Gly Asp Asn Pro Tyr Leu Lys Tyr Asn His Ala
                85                  90                  95

Asp Ala Glu Phe Gln Glu Lys Leu Ala Asp Asp Thr Ser Phe Gly Gly
            100                 105                 110

Asn Leu Gly Lys Ala Val Phe Gln Ala Lys Lys Arg Val Leu Glu Pro
        115                 120                 125

Phe Gly Leu Val Glu Glu Gly Ala Lys Thr Ala Pro Thr Gly Lys Arg
    130                 135                 140

Ile Asp Asp His Phe Pro Lys Arg Lys Lys Ala Arg Thr Glu Glu Asp
145                 150                 155                 160

Ser Lys Pro Ser Thr Ser Ser Asp Ala Glu Ala Gly Pro Ser Gly Ser
                165                 170                 175

Gln Gln Leu Gln Ile Pro Ala Gln Pro Ala Ser Ser Leu Gly Ala Asp
            180                 185                 190

Thr Met Ser Ala Gly Gly Gly Gly Pro Leu Gly Asp Asn Asn Gln Gly
        195                 200                 205

Ala Asp Gly Val Gly Asn Ala Ser Gly Asp Trp His Cys Asp Ser Thr
    210                 215                 220

Trp Met Gly Asp Arg Val Val Thr Lys Ser Thr Arg Thr Trp Val Leu
225                 230                 235                 240

Pro Ser Tyr Asn Asn His Gln Tyr Arg Glu Ile Lys Ser Gly Ser Val
                245                 250                 255

Asp Gly Ser Asn Ala Asn Ala Tyr Phe Gly Tyr Ser Thr Pro Trp Gly
            260                 265                 270

Tyr Phe Asp Phe Asn Arg Phe His Ser His Trp Ser Pro Arg Asp Trp
        275                 280                 285

Gln Arg Leu Ile Asn Asn Tyr Trp Gly Phe Arg Pro Arg Ser Leu Arg
    290                 295                 300

Val Lys Ile Phe Asn Ile Gln Val Lys Glu Val Thr Val Gln Asp Ser
305                 310                 315                 320

Thr Thr Thr Ile Ala Asn Asn Leu Thr Ser Thr Val Gln Val Phe Thr
                325                 330                 335

Asp Asp Asp Tyr Gln Leu Pro Tyr Val Val Gly Asn Gly Thr Glu Gly
            340                 345                 350

Cys Leu Pro Ala Phe Pro Pro Gln Val Phe Thr Leu Pro Gln Tyr Gly
        355                 360                 365
```

Tyr Ala Thr Leu Asn Arg Asp Asn Thr Glu Asn Pro Thr Glu Arg Ser
            370                 375                 380

Ser Phe Phe Cys Leu Glu Tyr Phe Pro Ser Lys Met Leu Arg Thr Gly
385                 390                 395                 400

Asn Asn Phe Glu Phe Thr Tyr Asn Phe Glu Glu Val Pro Phe His Ser
                405                 410                 415

Ser Phe Ala Pro Ser Gln Asn Leu Phe Lys Leu Ala Asn Pro Leu Val
            420                 425                 430

Asp Gln Tyr Leu Tyr Arg Phe Val Ser Thr Asn Asn Thr Gly Gly Val
            435                 440                 445

Gln Phe Asn Lys Asn Leu Ala Gly Arg Tyr Ala Asn Thr Tyr Lys Asn
450                 455                 460

Trp Phe Pro Gly Pro Met Gly Arg Thr Gln Gly Trp Asn Leu Gly Ser
465                 470                 475                 480

Gly Val Asn Arg Ala Ser Val Ser Ala Phe Ala Thr Thr Asn Arg Met
                485                 490                 495

Glu Leu Glu Gly Ala Ser Tyr Gln Val Pro Pro Gln Pro Asn Gly Met
            500                 505                 510

Thr Asn Asn Leu Gln Gly Ser Asn Thr Tyr Ala Leu Glu Asn Thr Met
            515                 520                 525

Ile Phe Asn Ser Gln Pro Ala Asn Pro Gly Thr Thr Ala Thr Tyr Leu
            530                 535                 540

Glu Gly Asn Met Leu Ile Thr Ser Glu Ser Glu Thr Gln Pro Val Asn
545                 550                 555                 560

Arg Val Ala Tyr Asn Val Gly Gly Gln Met Ala Thr Asn Asn Gln Ser
                565                 570                 575

Ser Thr Thr Ala Pro Ala Thr Gly Thr Tyr Asn Leu Gln Glu Ile Val
            580                 585                 590

Pro Gly Ser Val Trp Met Glu Arg Asp Val Tyr Leu Gln Gly Pro Ile
            595                 600                 605

Trp Ala Lys Ile Pro Glu Thr Gly Ala His Phe His Pro Ser Pro Ala
610                 615                 620

Met Gly Gly Phe Gly Leu Lys His Pro Pro Met Met Leu Ile Lys
625                 630                 635                 640

Asn Thr Pro Val Pro Gly Asn Ile Thr Ser Phe Ser Asp Val Pro Val
                645                 650                 655

Ser Ser Phe Ile Thr Gln Tyr Ser Thr Gly Gln Val Thr Val Glu Met
            660                 665                 670

Glu Trp Glu Leu Lys Lys Glu Asn Ser Lys Arg Trp Asn Pro Glu Ile
            675                 680                 685

Gln Tyr Thr Ser Asn Tyr Tyr Lys Ser Asn Asn Val Glu Phe Ala Val
            690                 695                 700

Asn Thr Glu Gly Val Tyr Ser Glu Pro Arg Pro Ile Gly Thr Arg Tyr
705                 710                 715                 720

Leu Thr Arg Asn Leu
            725

<210> SEQ ID NO 423
<211> LENGTH: 725
<212> TYPE: PRT
<213> ORGANISM: Artificial Sequence
<220> FEATURE:
<223> OTHER INFORMATION: Recombinant AAV capsid protein

<400> SEQUENCE: 423

```
Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
                35                  40                  45

Tyr Asn Tyr Leu Gly Pro Gly Asn Gly Leu Asp Arg Gly Glu Pro Val
    50                  55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
                85                  90                  95

Ala Glu Phe Gln Glu Lys Leu Ala Asp Asp Thr Ser Phe Gly Gly Asn
                100                 105                 110

Leu Gly Lys Ala Val Phe Gln Ala Lys Lys Arg Val Leu Glu Pro Phe
            115                 120                 125

Gly Leu Val Glu Glu Ala Ala Lys Thr Ala Pro Thr Gly Lys Arg Ile
    130                 135                 140

Asp Asp His Phe Pro Lys Arg Lys Lys Ala Arg Thr Glu Glu Asp Ser
145                 150                 155                 160

Lys Pro Ser Thr Ser Ser Asp Ala Glu Ala Gly Pro Ser Gly Ser Gln
                165                 170                 175

Gln Leu Gln Ile Pro Ala Gln Pro Ala Ser Ser Leu Gly Ala Asp Thr
                180                 185                 190

Met Ser Ala Gly Gly Gly Pro Leu Gly Asp Asn Asn Gln Gly Ala
            195                 200                 205

Asp Gly Val Gly Asn Ala Ser Gly Asp Trp His Cys Asp Ser Thr Trp
    210                 215                 220

Met Gly Asp Arg Val Val Thr Lys Ser Thr Arg Thr Trp Val Leu Pro
225                 230                 235                 240

Ser Tyr Asn Asn His Gln Tyr Arg Glu Ile Lys Ser Gly Ser Val Asp
                245                 250                 255

Gly Ser Asn Ala Asn Ala Tyr Phe Gly Tyr Ser Thr Pro Trp Gly Tyr
                260                 265                 270

Phe Asp Phe Asn Arg Phe His Ser His Trp Ser Pro Arg Asp Trp Gln
    275                 280                 285

Arg Leu Ile Asn Asn Tyr Trp Gly Phe Arg Pro Arg Ser Leu Arg Val
    290                 295                 300

Lys Ile Phe Asn Ile Gln Val Lys Glu Val Thr Asp Asn Asn Gly Val
305                 310                 315                 320

Lys Thr Ile Ala Asn Asn Leu Thr Ser Thr Val Gln Val Phe Thr Asp
                325                 330                 335

Ser Asp Tyr Gln Leu Pro Tyr Val Leu Gly Ser Ala His Glu Gly Cys
            340                 345                 350

Leu Pro Pro Phe Pro Ala Asp Val Phe Met Ile Pro Gln Tyr Gly Tyr
            355                 360                 365

Leu Thr Leu Asn Asp Gly Ser Gln Ala Val Gly Arg Ser Ser Phe Tyr
    370                 375                 380

Cys Leu Glu Tyr Phe Pro Ser Gln Met Leu Arg Thr Gly Asn Asn Phe
385                 390                 395                 400

Gln Phe Ser Tyr Glu Phe Glu Asn Val Pro Phe His Ser Ser Tyr Ala
                405                 410                 415
```

His Ser Gln Ser Leu Asp Arg Leu Met Asn Pro Leu Ile Asp Gln Tyr
                420                 425                 430

Leu Tyr Tyr Leu Ser Lys Thr Ile Asn Gly Ser Gly Gln Asn Gln Gln
            435                 440                 445

Thr Leu Lys Phe Ser Val Ala Gly Pro Ser Asn Met Ala Val Gln Gly
        450                 455                 460

Arg Asn Tyr Ile Pro Gly Pro Ser Tyr Arg Gln Gln Arg Val Ser Thr
465                 470                 475                 480

Thr Val Thr Gln Asn Asn Asn Ser Glu Phe Ala Trp Pro Gly Ala Ser
                485                 490                 495

Ser Trp Ala Leu Asn Gly Arg Asn Ser Leu Met Asn Pro Gly Pro Ala
            500                 505                 510

Met Ala Ser His Lys Glu Gly Glu Asp Arg Phe Phe Pro Leu Ser Gly
        515                 520                 525

Ser Leu Ile Phe Gly Lys Gln Gly Thr Gly Arg Asp Asn Val Asp Ala
        530                 535                 540

Asp Lys Val Met Ile Thr Asn Glu Glu Glu Ile Lys Thr Thr Asn Pro
545                 550                 555                 560

Val Ala Thr Glu Ser Tyr Gly Gln Val Ala Thr Asn His Gln Ser Ala
                565                 570                 575

Gln Ala Gln Ala Gln Thr Gly Trp Val Gln Asn Gln Gly Ile Leu Pro
            580                 585                 590

Gly Met Val Trp Gln Asp Arg Asp Val Tyr Leu Gln Gly Pro Ile Trp
        595                 600                 605

Ala Lys Ile Pro His Thr Asp Gly Asn Phe His Pro Ser Pro Leu Met
610                 615                 620

Gly Gly Phe Gly Met Lys His Pro Pro Gln Ile Leu Ile Lys Asn
625                 630                 635                 640

Thr Pro Val Pro Ala Asp Pro Pro Thr Ala Phe Asn Lys Asp Lys Leu
                645                 650                 655

Asn Ser Phe Ile Thr Gln Tyr Ser Thr Gly Gln Val Ser Val Glu Ile
            660                 665                 670

Glu Trp Glu Leu Gln Lys Glu Asn Ser Lys Arg Trp Asn Pro Glu Ile
        675                 680                 685

Gln Tyr Thr Ser Asn Tyr Tyr Lys Ser Asn Asn Val Glu Phe Ala Val
        690                 695                 700

Asn Thr Glu Gly Val Tyr Ser Glu Pro Arg Pro Ile Gly Thr Arg Tyr
705                 710                 715                 720

Leu Thr Arg Asn Leu
            725

<210> SEQ ID NO 424
<211> LENGTH: 727
<212> TYPE: PRT
<213> ORGANISM: Artificial Sequence
<220> FEATURE:
<223> OTHER INFORMATION: Recombinant AAV capsid protein

<400> SEQUENCE: 424

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

```
Gly Tyr Lys Tyr Leu Gly Pro Gly Asn Gly Leu Asp Lys Gly Glu Pro
        50                  55                  60

Val Asn Ala Ala Asp Ala Ala Leu Glu His Asp Lys Ala Tyr Asp
 65              70                  75                  80

Gln Gln Leu Lys Ala Gly Asp Pro Tyr Leu Lys Tyr Asn His Ala
                 85                  90                  95

Asp Ala Glu Phe Gln Glu Lys Leu Ala Asp Asp Thr Ser Phe Gly Gly
                100                 105                 110

Asn Leu Gly Lys Ala Val Phe Gln Ala Lys Lys Arg Val Leu Glu Pro
            115                 120                 125

Phe Gly Leu Val Glu Glu Gly Ala Lys Thr Ala Pro Thr Gly Lys Arg
130                 135                 140

Ile Asp Asp His Phe Pro Lys Arg Lys Ala Arg Thr Glu Glu Asp
145                 150                 155                 160

Ser Lys Pro Ser Thr Ser Ser Asp Ala Glu Ala Gly Pro Ser Gly Ser
                165                 170                 175

Gln Gln Leu Gln Ile Pro Ala Gln Pro Ala Ser Ser Leu Gly Ala Asp
                180                 185                 190

Thr Met Ser Ala Gly Gly Gly Pro Leu Gly Asp Asn Asn Gln Gly
            195                 200                 205

Ala Asp Gly Val Gly Asn Ala Ser Gly Asp Trp His Cys Asp Ser Thr
210                 215                 220

Trp Leu Gly Asp Arg Val Ile Thr Thr Ser Thr Arg Thr Trp Ala Leu
225                 230                 235                 240

Pro Thr Tyr Asn Asn His Leu Tyr Lys Gln Ile Ser Asn Ser Thr Ser
                245                 250                 255

Gly Gly Ser Ser Asn Asp Asn Ala Tyr Phe Gly Tyr Ser Thr Pro Trp
                260                 265                 270

Gly Tyr Phe Asp Phe Asn Arg Phe His Cys His Phe Ser Pro Arg Asp
            275                 280                 285

Trp Gln Arg Leu Ile Asn Asn Asn Trp Gly Phe Arg Pro Lys Arg Leu
            290                 295                 300

Asn Phe Lys Leu Phe Asn Ile Gln Val Lys Glu Val Thr Asp Asn Asn
305                 310                 315                 320

Gly Val Lys Thr Ile Ala Asn Asn Leu Thr Ser Thr Val Gln Val Phe
                325                 330                 335

Thr Asp Ser Asp Tyr Gln Leu Pro Tyr Val Leu Gly Ser Ala His Glu
                340                 345                 350

Gly Cys Leu Pro Pro Phe Pro Ala Asp Val Phe Met Ile Pro Gln Tyr
            355                 360                 365

Gly Tyr Leu Thr Leu Asn Asp Gly Ser Gln Ala Val Gly Arg Ser Ser
            370                 375                 380

Phe Tyr Cys Leu Glu Tyr Phe Pro Ser Gln Met Leu Arg Thr Gly Asn
385                 390                 395                 400

Asn Phe Gln Phe Ser Tyr Glu Phe Glu Asn Val Pro Phe His Ser Ser
                405                 410                 415

Tyr Ala His Ser Gln Ser Leu Asp Arg Leu Met Asn Pro Leu Ile Asp
                420                 425                 430

Gln Tyr Leu Tyr Tyr Leu Ser Lys Thr Ile Asn Gly Ser Gly Gln Asn
            435                 440                 445

Gln Gln Thr Leu Lys Phe Ser Val Ala Gly Pro Ser Asn Met Ala Val
450                 455                 460

Gln Gly Arg Asn Tyr Ile Pro Gly Pro Ser Tyr Arg Gln Gln Arg Val
```

-continued

```
             465                 470                 475                 480
Ser Thr Thr Val Thr Gln Asn Asn Ser Glu Phe Ala Trp Pro Gly
                    485                 490                 495

Ala Ser Ser Trp Ala Leu Asn Gly Arg Asn Ser Leu Met Asn Pro Gly
                500                 505                 510

Pro Ala Met Ala Ser His Lys Glu Gly Glu Asp Arg Phe Phe Pro Leu
            515                 520                 525

Ser Gly Ser Leu Ile Phe Gly Lys Gln Gly Thr Gly Arg Asp Asn Val
        530                 535                 540

Asp Ala Asp Lys Val Met Ile Thr Asn Glu Glu Glu Ile Lys Thr Thr
545                 550                 555                 560

Asn Pro Val Ala Thr Glu Ser Tyr Gly Gln Val Ala Thr Asn His Gln
                565                 570                 575

Ser Ala Gln Ala Gln Ala Gln Thr Gly Trp Val Gln Asn Gln Gly Ile
            580                 585                 590

Leu Pro Gly Met Val Trp Gln Asp Arg Asp Val Tyr Leu Gln Gly Pro
        595                 600                 605

Ile Trp Ala Lys Ile Pro His Thr Asp Gly Asn Phe His Pro Ser Pro
    610                 615                 620

Leu Met Gly Gly Phe Gly Met Lys His Pro Pro Gln Ile Leu Ile
625                 630                 635                 640

Lys Asn Thr Pro Val Pro Ala Asp Pro Pro Thr Ala Phe Asn Lys Asp
                645                 650                 655

Lys Leu Asn Ser Phe Ile Thr Gln Tyr Ser Thr Gly Gln Val Ser Val
            660                 665                 670

Glu Ile Glu Trp Glu Leu Gln Lys Glu Asn Ser Lys Arg Trp Asn Pro
        675                 680                 685

Glu Ile Gln Tyr Thr Ser Asn Tyr Tyr Lys Ser Asn Asn Val Glu Phe
    690                 695                 700

Ala Val Asn Thr Glu Gly Val Tyr Ser Glu Pro Arg Pro Ile Gly Thr
705                 710                 715                 720

Arg Tyr Leu Thr Arg Asn Leu
                725

<210> SEQ ID NO 425
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 425

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
```

```
                100             105             110
Asn Leu Gly Arg Ala Val Phe Gln Ala Lys Lys Arg Leu Leu Glu Pro
            115                 120                 125
Leu Gly Leu Val Glu Glu Ala Ala Lys Thr Ala Pro Gly Lys Lys Arg
            130                 135                 140
Pro Val Glu Gln Ser Pro Gln Glu Pro Asp Ser Ser Ala Gly Ile Gly
145                 150                 155                 160
Lys Ser Gly Ala Gln Pro Ala Lys Lys Arg Leu Asn Phe Gly Gln Thr
                165                 170                 175
Gly Asp Thr Glu Ser Val Pro Asp Pro Gln Pro Ile Gly Glu Pro Pro
            180                 185                 190
Ala Ala Pro Ser Gly Val Gly Ser Leu Thr Met Ala Ser Gly Gly Gly
            195                 200                 205
Ala Pro Val Ala Asp Asn Asn Glu Gly Ala Asp Gly Val Gly Ser Ser
            210                 215                 220
Ser Gly Asn Trp His Cys Asp Ser Gln Trp Leu Gly Asp Arg Val Ile
225                 230                 235                 240
Thr Thr Ser Thr Arg Thr Trp Ala Leu Pro Thr Tyr Asn Asn His Leu
                245                 250                 255
Tyr Lys Gln Ile Ser Asn Ser Thr Ser Gly Gly Ser Ser Asn Asp Asn
                260                 265                 270
Ala Tyr Phe Gly Tyr Ser Thr Pro Trp Gly Tyr Phe Asp Phe Asn Arg
            275                 280                 285
Phe His Cys His Phe Ser Pro Arg Asp Trp Gln Arg Leu Ile Asn Asn
            290                 295                 300
Asn Trp Gly Phe Arg Pro Lys Arg Leu Asn Phe Lys Leu Phe Asn Ile
305                 310                 315                 320
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
            340                 345                 350
Pro Tyr Val Leu Gly Ser Ala His Glu Gly Cys Leu Pro Pro Phe Pro
            355                 360                 365
Ala Asp Val Phe Met Ile Pro Gln Tyr Gly Tyr Leu Thr Leu Asn Asp
            370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
            420                 425                 430
Asp Arg Leu Met Asn Pro Leu Ile Asp Gln Tyr Leu Tyr Tyr Leu Ser
            435                 440                 445
Lys Thr Ile Asn Gly Ser Gly Gln Asn Gln Gln Thr Leu Lys Phe Ser
            450                 455                 460
Val Ala Gly Pro Ser Asn Met Ala Val Gln Gly Arg Asn Tyr Ile Pro
465                 470                 475                 480
Gly Pro Ser Tyr Arg Gln Gln Arg Val Ser Thr Thr Val Thr Gln Asn
                485                 490                 495
Asn Asn Ser Glu Phe Ala Trp Pro Gly Ala Ser Ser Trp Ala Leu Asn
            500                 505                 510
Gly Arg Asn Ser Leu Met Asn Pro Gly Pro Ala Met Ala Ser His Lys
            515                 520                 525
```

```
Glu Gly Glu Asp Arg Phe Phe Pro Leu Ser Gly Ser Leu Ile Phe Gly
            530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
        610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
                660                 665                 670

Gln Tyr Ser Thr Gly Gln Val Thr Val Glu Met Glu Trp Glu Leu Lys
            675                 680                 685

Lys Glu Asn Ser Lys Arg Trp Asn Pro Glu Ile Gln Tyr Thr Asn Asn
690                 695                 700

Tyr Asn Asp Pro Gln Phe Val Asp Phe Ala Pro Asp Ser Thr Gly Glu
705                 710                 715                 720

Tyr Arg Thr Thr Arg Pro Ile Gly Thr Arg Tyr Leu Thr Arg Pro Leu
                725                 730                 735

<210> SEQ ID NO 426
<211> LENGTH: 726
<212> TYPE: PRT
<213> ORGANISM: Artificial Sequence
<220> FEATURE:
<223> OTHER INFORMATION: Recombinant AAV capsid protein

<400> SEQUENCE: 426

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
        35                  40                  45

Tyr Asn Tyr Leu Gly Pro Gly Asn Gly Leu Asp Arg Gly Glu Pro Val
    50                  55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
                85                  90                  95

Ala Glu Phe Gln Glu Lys Leu Ala Asp Asp Thr Ser Phe Gly Gly Asn
            100                 105                 110

Leu Gly Lys Ala Val Phe Gln Ala Lys Lys Arg Val Leu Glu Pro Phe
        115                 120                 125

Gly Leu Val Glu Glu Gly Ala Lys Thr Ala Pro Thr Gly Lys Arg Ile
    130                 135                 140

Asp Asp His Phe Pro Lys Arg Lys Lys Ala Arg Thr Glu Glu Asp Ser
145                 150                 155                 160
```

Lys Pro Ser Thr Ser Ser Asp Ala Glu Ala Gly Pro Ser Gly Ser Gln
            165                 170                 175

Gln Leu Gln Ile Pro Ala Gln Pro Ala Ser Ser Leu Gly Ala Asp Thr
            180                 185                 190

Met Ser Ala Gly Gly Gly Pro Leu Gly Asp Asn Asn Gln Gly Ala
        195                 200                 205

Asp Gly Val Gly Asn Ala Ser Gly Asp Trp His Cys Asp Ser Thr Trp
        210                 215                 220

Met Gly Asp Arg Val Ile Thr Thr Ser Thr Arg Thr Trp Ala Leu Pro
225                 230                 235                 240

Thr Tyr Asn Asn His Leu Tyr Lys Gln Ile Ser Asn Ser Thr Ser Gly
            245                 250                 255

Gly Ser Ser Asn Asp Asn Ala Tyr Phe Gly Tyr Ser Thr Pro Trp Gly
            260                 265                 270

Tyr Phe Asp Phe Asn Arg Phe His Cys His Phe Ser Pro Arg Asp Trp
            275                 280                 285

Gln Arg Leu Ile Asn Asn Asn Trp Gly Phe Arg Pro Lys Arg Leu Asn
            290                 295                 300

Phe Lys Leu Phe Asn Ile Gln Val Lys Glu Val Thr Asp Asn Asn Gly
305                 310                 315                 320

Val Lys Thr Ile Ala Asn Asn Leu Thr Ser Thr Val Gln Val Phe Thr
            325                 330                 335

Asp Ser Asp Tyr Gln Leu Pro Tyr Val Leu Gly Ser Ala His Glu Gly
            340                 345                 350

Cys Leu Pro Pro Phe Pro Ala Asp Val Phe Met Ile Pro Gln Tyr Gly
            355                 360                 365

Tyr Leu Thr Leu Asn Asp Gly Ser Gln Ala Val Gly Arg Ser Ser Phe
            370                 375                 380

Tyr Cys Leu Glu Tyr Phe Pro Ser Gln Met Leu Arg Thr Gly Asn Asn
385                 390                 395                 400

Phe Gln Phe Ser Tyr Glu Phe Glu Asn Val Pro Phe His Ser Ser Phe
            405                 410                 415

Ala His Ser Gln Ser Leu Asp Arg Leu Met Asn Pro Leu Ile Asp Gln
            420                 425                 430

Tyr Leu Tyr Tyr Leu Ser Lys Thr Ile Asn Gly Ser Gly Gln Asn Gln
            435                 440                 445

Gln Thr Leu Lys Phe Ser Val Ala Gly Pro Ser Asn Met Ala Val Gln
            450                 455                 460

Gly Arg Asn Tyr Ile Pro Gly Pro Ser Tyr Arg Gln Gln Arg Val Ser
465                 470                 475                 480

Thr Thr Val Thr Gln Asn Asn Asn Ser Glu Phe Ala Trp Pro Gly Ala
            485                 490                 495

Ser Ser Trp Ala Leu Asn Gly Arg Asn Ser Leu Met Asn Pro Gly Pro
            500                 505                 510

Ala Met Ala Ser His Lys Glu Gly Glu Asp Arg Phe Phe Pro Leu Ser
            515                 520                 525

Gly Ser Leu Ile Phe Gly Lys Gln Gly Thr Gly Arg Asp Asn Val Asp
            530                 535                 540

Ala Asp Lys Val Met Ile Thr Asn Glu Glu Ile Lys Thr Thr Asn
545                 550                 555                 560

Pro Val Ala Thr Glu Ser Tyr Gly Gln Val Ala Thr Asn His Gln Ser
            565                 570                 575

```
Ala Gln Ala Gln Ala Gln Thr Gly Trp Val Gln Asn Gln Gly Ile Leu
            580                 585                 590

Pro Gly Met Val Trp Gln Asp Arg Asp Val Tyr Leu Gln Gly Pro Ile
        595                 600                 605

Trp Ala Lys Ile Pro His Thr Asp Gly Asn Phe His Pro Ser Pro Leu
    610                 615                 620

Met Gly Gly Phe Gly Met Lys His Pro Pro Gln Ile Leu Ile Lys
625                 630                 635                 640

Asn Thr Pro Val Pro Ala Asp Pro Pro Thr Ala Phe Asn Lys Asp Lys
                645                 650                 655

Leu Asn Ser Phe Ile Thr Gln Tyr Ser Thr Gly Gln Val Ser Val Glu
            660                 665                 670

Ile Glu Trp Glu Leu Gln Lys Glu Asn Ser Lys Arg Trp Asn Pro Glu
        675                 680                 685

Ile Gln Tyr Thr Ser Asn Tyr Tyr Lys Ser Asn Asn Val Glu Phe Ala
    690                 695                 700

Val Asn Thr Glu Gly Val Tyr Ser Glu Pro Arg Pro Ile Gly Thr Arg
705                 710                 715                 720

Tyr Leu Thr Arg Asn Leu
                725

<210> SEQ ID NO 427
<211> LENGTH: 726
<212> TYPE: PRT
<213> ORGANISM: Artificial Sequence
<220> FEATURE:
<223> OTHER INFORMATION: Recombinant AAV capsid protein

<400> SEQUENCE: 427

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
        35                  40                  45

Tyr Asn Tyr Leu Gly Pro Gly Asn Gly Leu Asp Arg Gly Glu Pro Val
    50                  55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
            85                  90                  95

Ala Glu Phe Gln Glu Lys Leu Ala Asp Asp Thr Ser Phe Gly Gly Asn
        100                 105                 110

Leu Gly Lys Ala Val Phe Gln Ala Lys Lys Arg Val Leu Glu Pro Phe
    115                 120                 125

Gly Leu Val Glu Glu Gly Ala Lys Thr Ala Pro Thr Gly Lys Arg Ile
130                 135                 140

Asp Asp His Phe Pro Lys Arg Lys Lys Ala Arg Thr Glu Glu Asp Ser
145                 150                 155                 160

Lys Pro Ser Thr Ser Ser Asp Ala Glu Ala Gly Pro Ser Gly Ser Gln
            165                 170                 175

Gln Leu Gln Ile Pro Ala Gln Pro Ala Ser Ser Leu Gly Ala Asp Thr
        180                 185                 190

Met Ser Ala Gly Gly Gly Gly Pro Leu Gly Asp Asn Asn Gln Gly Ala
    195                 200                 205
```

```
Asp Gly Val Gly Asn Ala Ser Gly Asp Trp His Cys Asp Ser Gln Trp
    210                 215                 220

Leu Gly Asp Arg Val Ile Thr Thr Ser Thr Arg Thr Trp Ala Leu Pro
225                 230                 235                 240

Thr Tyr Asn Asn His Leu Tyr Lys Gln Ile Ser Asn Ser Thr Ser Gly
                245                 250                 255

Gly Ser Ser Asn Asp Asn Ala Tyr Phe Gly Tyr Ser Thr Pro Trp Gly
            260                 265                 270

Tyr Phe Asp Phe Asn Arg Phe His Cys His Phe Ser Pro Arg Asp Trp
            275                 280                 285

Gln Arg Leu Ile Asn Asn Asn Trp Gly Phe Arg Pro Lys Arg Leu Asn
    290                 295                 300

Phe Lys Leu Phe Asn Ile Gln Val Lys Glu Val Thr Asp Asn Asn Gly
305                 310                 315                 320

Val Lys Thr Ile Ala Asn Asn Leu Thr Ser Thr Val Gln Val Phe Thr
                325                 330                 335

Asp Ser Asp Tyr Gln Leu Pro Tyr Val Leu Gly Ser Ala His Glu Gly
            340                 345                 350

Cys Leu Pro Pro Phe Pro Ala Asp Val Phe Met Ile Pro Gln Tyr Gly
            355                 360                 365

Tyr Leu Thr Leu Asn Asp Gly Ser Gln Ala Val Gly Arg Ser Ser Phe
370                 375                 380

Tyr Cys Leu Glu Tyr Phe Pro Ser Gln Met Leu Arg Thr Gly Asn Asn
385                 390                 395                 400

Phe Gln Phe Ser Tyr Glu Phe Glu Asn Val Pro Phe His Ser Ser Tyr
            405                 410                 415

Ala His Ser Gln Ser Leu Asp Arg Leu Met Asn Pro Leu Ile Asp Gln
            420                 425                 430

Tyr Leu Tyr Tyr Leu Ser Lys Thr Ile Asn Gly Ser Gly Gln Asn Gln
            435                 440                 445

Gln Thr Leu Lys Phe Ser Val Ala Gly Pro Ser Asn Met Ala Val Gln
    450                 455                 460

Gly Arg Asn Tyr Ile Pro Gly Pro Ser Tyr Arg Gln Gln Arg Val Ser
465                 470                 475                 480

Thr Thr Val Thr Gln Asn Asn Asn Ser Glu Phe Ala Trp Pro Gly Ala
                485                 490                 495

Ser Ser Trp Ala Leu Asn Gly Arg Asn Ser Leu Met Asn Pro Gly Pro
            500                 505                 510

Ala Met Ala Ser His Lys Glu Gly Glu Asp Arg Phe Phe Pro Leu Ser
            515                 520                 525

Gly Ser Leu Ile Phe Gly Lys Gln Gly Thr Gly Arg Asp Asn Val Asp
    530                 535                 540

Ala Asp Lys Val Met Ile Thr Asn Glu Glu Glu Ile Lys Thr Thr Asn
545                 550                 555                 560

Pro Val Ala Thr Glu Ser Tyr Gly Gln Val Ala Thr Asn His Gln Ser
                565                 570                 575

Ala Gln Ala Gln Ala Gln Thr Gly Trp Val Gln Asn Gln Gly Ile Leu
            580                 585                 590

Pro Gly Met Val Trp Gln Asp Arg Asp Val Tyr Leu Gln Gly Pro Ile
            595                 600                 605

Trp Ala Lys Ile Pro His Thr Asp Gly Asn Phe His Pro Ser Pro Leu
610                 615                 620

Met Gly Gly Phe Gly Met Lys His Pro Pro Pro Gln Ile Leu Ile Lys
```

-continued

```
                625                 630                 635                 640
Asn Thr Pro Val Pro Ala Asp Pro Pro Thr Ala Phe Asn Lys Asp Lys
                    645                 650                 655
Leu Asn Ser Phe Ile Thr Gln Tyr Ser Thr Gly Gln Val Ser Val Glu
                660                 665                 670
Ile Glu Trp Glu Leu Gln Lys Glu Asn Ser Lys Arg Trp Asn Pro Glu
                675                 680                 685
Ile Gln Tyr Thr Ser Asn Tyr Tyr Lys Ser Asn Asn Val Glu Phe Ala
                690                 695                 700
Val Asn Thr Glu Gly Val Tyr Ser Glu Pro Arg Pro Ile Gly Thr Arg
705                 710                 715                 720
Tyr Leu Thr Arg Asn Leu
                    725

<210> SEQ ID NO 428
<211> LENGTH: 726
<212> TYPE: PRT
<213> ORGANISM: Artificial Sequence
<220> FEATURE:
<223> OTHER INFORMATION: Recombinant AAV capsid protein

<400> SEQUENCE: 428

Met Ser Phe Val Asp His Pro Pro Asp Trp Leu Glu Glu Val Gly Glu
1               5                   10                  15
Gly Leu Arg Glu Phe Leu Gly Leu Glu Ala Gly Pro Pro Lys Pro Lys
                20                  25                  30
Pro Asn Gln Gln His Gln Asp Gln Ala Arg Gly Leu Val Leu Pro Gly
                35                  40                  45
Tyr Asn Tyr Leu Gly Pro Gly Asn Gly Leu Asp Arg Gly Glu Pro Val
            50                  55                  60
Asn Arg Ala Asp Glu Val Ala Arg Glu His Asp Ile Ser Tyr Asn Glu
65              70                  75                  80
Gln Leu Glu Ala Gly Asp Asn Pro Tyr Leu Lys Tyr Asn His Ala Asp
                85                  90                  95
Ala Glu Phe Gln Glu Lys Leu Ala Asp Asp Thr Ser Phe Gly Gly Asn
                100                 105                 110
Leu Gly Lys Ala Val Phe Gln Ala Lys Lys Arg Val Leu Glu Pro Phe
            115                 120                 125
Gly Leu Val Glu Glu Gly Ala Lys Thr Ala Pro Thr Gly Lys Arg Ile
            130                 135                 140
Asp Asp His Phe Pro Lys Arg Lys Lys Ala Arg Thr Glu Glu Asp Ser
145                 150                 155                 160
Lys Pro Ser Thr Ser Ser Asp Ala Glu Ala Gly Pro Ser Gly Ser Gln
                165                 170                 175
Gln Leu Gln Ile Pro Ala Gln Pro Ala Ser Ser Leu Gly Ala Asp Thr
                180                 185                 190
Met Ser Ala Gly Gly Gly Gly Pro Leu Gly Asp Asn Asn Gln Gly Ala
            195                 200                 205
Asp Gly Val Gly Asn Ala Ser Gly Asp Trp His Cys Asp Ser Gln Trp
            210                 215                 220
Leu Gly Asp Arg Val Ile Thr Thr Ser Thr Arg Thr Trp Ala Leu Pro
225                 230                 235                 240
Thr Tyr Asn Asn His Leu Tyr Lys Gln Ile Ser Asn Ser Thr Ser Gly
                245                 250                 255
Gly Ser Ser Asn Asp Asn Ala Tyr Phe Gly Tyr Ser Thr Pro Trp Gly
```

```
                260                 265                 270
Tyr Phe Asp Phe Asn Arg Phe His Cys His Phe Ser Pro Arg Asp Trp
            275                 280                 285

Gln Arg Leu Ile Asn Asn Asn Trp Gly Phe Arg Pro Lys Arg Leu Asn
            290                 295                 300

Phe Lys Leu Phe Asn Ile Gln Val Lys Glu Val Thr Asp Asn Asn Gly
305                 310                 315                 320

Val Lys Thr Ile Ala Asn Asn Leu Thr Ser Thr Val Gln Val Phe Thr
                325                 330                 335

Asp Ser Asp Tyr Gln Leu Pro Tyr Val Leu Gly Ser Ala His Glu Gly
            340                 345                 350

Cys Leu Pro Pro Phe Pro Ala Asp Val Phe Met Ile Pro Gln Tyr Gly
            355                 360                 365

Tyr Leu Thr Leu Asn Asp Gly Ser Gln Ala Val Gly Arg Ser Ser Phe
            370                 375                 380

Tyr Cys Leu Glu Tyr Phe Pro Ser Gln Met Leu Arg Thr Gly Asn Asn
385                 390                 395                 400

Phe Gln Phe Ser Tyr Glu Phe Glu Asn Val Pro Phe His Ser Ser Tyr
                405                 410                 415

Ala His Ser Gln Ser Leu Asp Arg Leu Met Asn Pro Leu Ile Asp Gln
            420                 425                 430

Tyr Leu Tyr Tyr Leu Ser Lys Thr Ile Asn Gly Ser Gly Gln Asn Gln
            435                 440                 445

Gln Thr Leu Lys Phe Ser Val Ala Gly Pro Ser Asn Met Ala Val Gln
450                 455                 460

Gly Arg Asn Tyr Ile Pro Gly Pro Ser Tyr Arg Gln Gln Arg Val Ser
465                 470                 475                 480

Thr Thr Val Thr Gln Asn Asn Asn Ser Glu Phe Ala Trp Pro Gly Ala
                485                 490                 495

Ser Ser Trp Ala Leu Asn Gly Arg Asn Ser Leu Met Asn Pro Gly Pro
            500                 505                 510

Ala Met Ala Ser His Lys Glu Gly Glu Asp Arg Phe Phe Pro Leu Ser
            515                 520                 525

Gly Ser Leu Ile Phe Gly Lys Gln Gly Thr Gly Arg Asp Asn Val Asp
            530                 535                 540

Ala Asp Lys Val Met Ile Thr Asn Glu Glu Ile Lys Thr Thr Asn
545                 550                 555                 560

Pro Val Ala Thr Glu Ser Tyr Gly Gln Val Ala Thr Asn His Gln Ser
                565                 570                 575

Ala Gln Ala Gln Ala Gln Thr Gly Trp Val Gln Asn Gln Gly Ile Leu
            580                 585                 590

Pro Gly Met Val Trp Gln Asp Arg Asp Val Tyr Leu Gln Gly Pro Ile
            595                 600                 605

Trp Ala Lys Ile Pro His Thr Asp Gly Asn Phe His Pro Ser Pro Leu
            610                 615                 620

Met Gly Gly Phe Gly Met Lys His Pro Pro Gln Ile Leu Ile Lys
625                 630                 635                 640

Asn Thr Pro Val Pro Ala Asp Pro Pro Thr Ala Phe Asn Lys Asp Lys
                645                 650                 655

Leu Asn Ser Phe Ile Thr Gln Tyr Ser Thr Gly Gln Val Ser Val Glu
            660                 665                 670

Ile Glu Trp Glu Leu Gln Lys Glu Asn Ser Lys Arg Trp Asn Pro Glu
            675                 680                 685
```

Ile Gln Tyr Thr Asn Asn Tyr Asn Asp Pro Gln Phe Val Asp Phe Ala
690               695                   700

Pro Asp Ser Thr Gly Glu Tyr Arg Thr Thr Arg Pro Ile Gly Thr Arg
705               710              715                   720

Tyr Leu Thr Arg Pro Leu
              725

<210> SEQ ID NO 429
<211> LENGTH: 727
<212> TYPE: PRT
<213> ORGANISM: Artificial Sequence
<220> FEATURE:
<223> OTHER INFORMATION: Recombinant AAV capsid protein

<400> SEQUENCE: 429

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Gly Ala Lys Thr Ala Pro Thr Gly Lys Arg
130                 135                 140

Ile Asp Asp His Phe Pro Lys Arg Lys Lys Ala Arg Thr Glu Glu Asp
145                 150                 155                 160

Ser Lys Pro Ser Thr Ser Ser Asp Ala Glu Ala Gly Pro Ser Gly Ser
                165                 170                 175

Gln Gln Leu Gln Ile Pro Ala Gln Pro Ala Ser Ser Leu Gly Ala Asp
            180                 185                 190

Thr Met Ser Ala Gly Gly Gly Pro Leu Gly Asp Asn Asn Gln Gly
        195                 200                 205

Ala Asp Gly Val Gly Asn Ala Ser Gly Asp Trp His Cys Asp Ser Thr
210                 215                 220

Trp Met Gly Asp Arg Val Ile Thr Thr Ser Thr Arg Thr Trp Ala Leu
225                 230                 235                 240

Pro Thr Tyr Asn Asn His Leu Tyr Lys Gln Ile Ser Asn Ser Thr Ser
                245                 250                 255

Gly Gly Ser Ser Asn Asp Asn Ala Tyr Phe Gly Tyr Ser Thr Pro Trp
            260                 265                 270

Gly Tyr Phe Asp Phe Asn Arg Phe His Cys His Phe Ser Pro Arg Asp
        275                 280                 285

Trp Gln Arg Leu Ile Asn Asn Asn Trp Gly Phe Arg Pro Lys Arg Leu
    290                 295                 300

Asn Phe Lys Leu Phe Asn Ile Gln Val Lys Glu Val Thr Asp Asn Asn
305                 310                 315                 320

-continued

Gly Val Lys Thr Ile Ala Asn Asn Leu Thr Ser Thr Val Gln Val Phe
            325                 330                 335

Thr Asp Ser Asp Tyr Gln Leu Pro Tyr Val Leu Gly Ser Ala His Glu
            340                 345                 350

Gly Cys Leu Pro Pro Phe Pro Ala Asp Val Phe Met Ile Pro Gln Tyr
            355                 360                 365

Gly Tyr Leu Thr Leu Asn Asp Gly Ser Gln Ala Val Gly Arg Ser Ser
    370                 375                 380

Phe Tyr Cys Leu Glu Tyr Phe Pro Ser Gln Met Leu Arg Thr Gly Asn
385                 390                 395                 400

Asn Phe Gln Phe Ser Tyr Glu Phe Glu Asn Val Pro Phe His Ser Ser
                405                 410                 415

Tyr Ala His Ser Gln Ser Leu Asp Arg Leu Met Asn Pro Leu Ile Asp
                420                 425                 430

Gln Tyr Leu Tyr Tyr Leu Ser Lys Thr Ile Asn Gly Ser Gly Gln Asn
            435                 440                 445

Gln Gln Thr Leu Lys Phe Ser Val Ala Gly Pro Ser Asn Met Ala Val
    450                 455                 460

Gln Gly Arg Asn Tyr Ile Pro Gly Pro Ser Tyr Arg Gln Gln Arg Val
465                 470                 475                 480

Ser Thr Thr Val Thr Gln Asn Asn Asn Ser Glu Phe Ala Trp Pro Gly
                485                 490                 495

Ala Ser Ser Trp Ala Leu Asn Gly Arg Asn Ser Leu Met Asn Pro Gly
                500                 505                 510

Pro Ala Met Ala Ser His Lys Glu Gly Glu Asp Arg Phe Phe Pro Leu
            515                 520                 525

Ser Gly Ser Leu Ile Phe Gly Lys Gln Gly Thr Gly Arg Asp Asn Val
            530                 535                 540

Asp Ala Asp Lys Val Met Ile Thr Asn Glu Glu Glu Ile Lys Thr Thr
545                 550                 555                 560

Asn Pro Val Ala Thr Glu Ser Tyr Gly Gln Val Ala Thr Asn His Gln
                565                 570                 575

Ser Ala Gln Ala Gln Ala Gln Thr Gly Trp Val Gln Asn Gln Gly Ile
            580                 585                 590

Leu Pro Gly Met Val Trp Gln Asp Arg Asp Val Tyr Leu Gln Gly Pro
            595                 600                 605

Ile Trp Ala Lys Ile Pro His Thr Asp Gly Asn Phe His Pro Ser Pro
610                 615                 620

Leu Met Gly Gly Phe Gly Met Lys His Pro Pro Gln Ile Leu Ile
625                 630                 635                 640

Lys Asn Thr Pro Val Pro Ala Asp Pro Pro Thr Ala Phe Asn Lys Asp
                645                 650                 655

Lys Leu Asn Ser Phe Ile Thr Gln Tyr Ser Thr Gly Gln Val Thr Val
                660                 665                 670

Glu Met Glu Trp Glu Leu Lys Lys Glu Asn Ser Lys Arg Trp Asn Pro
            675                 680                 685

Glu Ile Gln Tyr Thr Ser Asn Tyr Tyr Lys Ser Asn Asn Val Glu Phe
            690                 695                 700

Ala Val Asn Thr Glu Gly Val Tyr Ser Glu Pro Arg Pro Ile Gly Thr
705                 710                 715                 720

Arg Tyr Leu Thr Arg Asn Leu
            725

```
<210> SEQ ID NO 430
<211> LENGTH: 726
<212> TYPE: PRT
<213> ORGANISM: Artificial Sequence
<220> FEATURE:
<223> OTHER INFORMATION: Recombinant AAV capsid protein

<400> SEQUENCE: 430
```

| | | | | | | | | | | | | | | | |
|---|---|---|---|---|---|---|---|---|---|---|---|---|---|---|---|
| Met | Ala | Ala | Asp | Gly | Tyr | Leu | Pro | Asp | Trp | Leu | Glu | Asp | Asn | Leu | Ser |
| 1 | | | | 5 | | | | | 10 | | | | | 15 | |
| Glu | Gly | Ile | Arg | Glu | Trp | Trp | Ala | Leu | Lys | Pro | Gly | Ala | Pro | Gln | Pro |
| | | | 20 | | | | | 25 | | | | | 30 | | |
| Lys | Ala | Asn | Gln | Gln | His | Gln | Asp | Asn | Ala | Arg | Gly | Leu | Val | Leu | Pro |
| | | 35 | | | | | 40 | | | | | 45 | | | |
| Gly | Tyr | Lys | Tyr | Leu | Gly | Pro | Gly | Asn | Gly | Leu | Asp | Lys | Gly | Glu | Pro |
| | 50 | | | | | 55 | | | | | 60 | | | | |
| Val | Asn | Ala | Ala | Asp | Ala | Ala | Leu | Glu | His | Asp | Lys | Ala | Tyr | Asp |  |
| 65 | | | | | 70 | | | | | 75 | | | | | 80 |
| Gln | Gln | Leu | Lys | Ala | Gly | Asp | Asn | Pro | Tyr | Leu | Lys | Tyr | Asn | His | Ala |
| | | | | 85 | | | | | 90 | | | | | 95 | |
| Asp | Ala | Glu | Phe | Gln | Glu | Lys | Leu | Ala | Asp | Asp | Thr | Ser | Phe | Gly | Gly |
| | | | 100 | | | | | 105 | | | | | 110 | | |
| Asn | Leu | Gly | Lys | Ala | Val | Phe | Gln | Ala | Lys | Lys | Arg | Val | Leu | Glu | Pro |
| | | 115 | | | | | 120 | | | | | 125 | | | |
| Phe | Gly | Leu | Val | Glu | Glu | Gly | Ala | Lys | Thr | Ala | Pro | Thr | Gly | Lys | Arg |
| 130 | | | | | 135 | | | | | 140 | | | | | |
| Ile | Asp | Asp | His | Phe | Pro | Lys | Arg | Lys | Lys | Ala | Arg | Thr | Glu | Glu | Asp |
| 145 | | | | | 150 | | | | | 155 | | | | | 160 |
| Ser | Lys | Pro | Ser | Thr | Ser | Ser | Asp | Ala | Glu | Ala | Gly | Pro | Ser | Gly | Ser |
| | | | | 165 | | | | | 170 | | | | | 175 | |
| Gln | Gln | Leu | Gln | Ile | Pro | Ala | Gln | Pro | Ala | Ser | Ser | Leu | Gly | Ala | Asp |
| | | | 180 | | | | | 185 | | | | | 190 | | |
| Thr | Met | Ser | Ala | Gly | Gly | Gly | Pro | Leu | Gly | Asp | Asn | Asn | Gln | Gly |  |
| | | 195 | | | | | 200 | | | | | 205 | | | |
| Ala | Asp | Gly | Val | Gly | Asn | Ala | Ser | Gly | Asp | Trp | His | Cys | Asp | Ser | Thr |
| | 210 | | | | | 215 | | | | | 220 | | | | |
| Trp | Met | Gly | Asp | Arg | Val | Val | Thr | Lys | Ser | Thr | Arg | Thr | Trp | Val | Leu |
| 225 | | | | | 230 | | | | | 235 | | | | | 240 |
| Pro | Ser | Tyr | Asn | Asn | His | Gln | Tyr | Arg | Glu | Ile | Lys | Ser | Gly | Ser | Val |
| | | | | 245 | | | | | 250 | | | | | 255 | |
| Asp | Gly | Ser | Asn | Ala | Asn | Ala | Tyr | Phe | Gly | Tyr | Ser | Thr | Pro | Trp | Gly |
| | | | 260 | | | | | 265 | | | | | 270 | | |
| Tyr | Phe | Asp | Phe | Asn | Arg | Phe | His | Cys | His | Phe | Ser | Pro | Arg | Asp | Trp |
| | | 275 | | | | | 280 | | | | | 285 | | | |
| Gln | Arg | Leu | Ile | Asn | Asn | Asn | Trp | Gly | Phe | Arg | Pro | Lys | Arg | Leu | Asn |
| | 290 | | | | | 295 | | | | | 300 | | | | |
| Phe | Lys | Leu | Phe | Asn | Ile | Gln | Val | Lys | Glu | Val | Thr | Asp | Asn | Asn | Gly |
| 305 | | | | | 310 | | | | | 315 | | | | | 320 |
| Val | Lys | Thr | Ile | Ala | Asn | Asn | Leu | Thr | Ser | Thr | Val | Gln | Val | Phe | Thr |
| | | | | 325 | | | | | 330 | | | | | 335 | |
| Asp | Ser | Asp | Tyr | Gln | Leu | Pro | Tyr | Val | Leu | Gly | Ser | Ala | His | Glu | Gly |
| | | | 340 | | | | | 345 | | | | | 350 | | |
| Cys | Leu | Pro | Pro | Phe | Pro | Ala | Asp | Val | Phe | Met | Ile | Pro | Gln | Tyr | Gly |
| | | 355 | | | | | 360 | | | | | 365 | | | |

Tyr Leu Thr Leu Asn Asp Gly Ser Gln Ala Val Gly Arg Ser Ser Phe
370                 375                 380

Tyr Cys Leu Glu Tyr Phe Pro Ser Gln Met Leu Arg Thr Gly Asn Asn
385                 390                 395                 400

Phe Gln Phe Ser Tyr Glu Phe Glu Asn Val Pro Phe His Ser Ser Tyr
                405                 410                 415

Ala His Ser Gln Ser Leu Asp Arg Leu Met Asn Pro Leu Ile Asp Gln
                420                 425                 430

Tyr Leu Tyr Tyr Leu Ser Lys Thr Ile Asn Gly Ser Gly Gln Asn Gln
            435                 440                 445

Gln Thr Leu Lys Phe Ser Val Ala Gly Pro Ser Asn Met Ala Val Gln
450                 455                 460

Gly Arg Asn Tyr Ile Pro Gly Pro Ser Tyr Arg Gln Gln Arg Val Ser
465                 470                 475                 480

Thr Thr Val Thr Gln Asn Asn Asn Ser Glu Phe Ala Trp Pro Gly Ala
                485                 490                 495

Ser Ser Trp Ala Leu Asn Gly Arg Asn Ser Leu Met Asn Pro Gly Pro
            500                 505                 510

Ala Met Ala Ser His Lys Glu Gly Glu Asp Arg Phe Phe Pro Leu Ser
                515                 520                 525

Gly Ser Leu Ile Phe Gly Lys Gln Gly Thr Gly Arg Asp Asn Val Asp
530                 535                 540

Ala Asp Lys Val Met Ile Thr Asn Glu Glu Glu Ile Lys Thr Thr Asn
545                 550                 555                 560

Pro Val Ala Thr Glu Ser Tyr Gly Gln Val Ala Thr Asn His Gln Ser
                565                 570                 575

Ala Gln Ala Gln Ala Gln Thr Gly Trp Val Gln Asn Gln Gly Ile Leu
            580                 585                 590

Pro Gly Met Val Trp Gln Asp Arg Asp Val Tyr Leu Gln Gly Pro Ile
595                 600                 605

Trp Ala Lys Ile Pro His Thr Asp Gly Asn Phe His Pro Ser Pro Leu
610                 615                 620

Met Gly Gly Phe Gly Met Lys His Pro Pro Gln Ile Leu Ile Lys
625                 630                 635                 640

Asn Thr Pro Val Pro Ala Asp Pro Pro Thr Ala Phe Asn Lys Asp Lys
                645                 650                 655

Leu Asn Ser Phe Ile Thr Gln Tyr Ser Thr Gly Gln Val Ser Val Glu
            660                 665                 670

Ile Glu Trp Glu Leu Gln Lys Glu Asn Ser Lys Arg Trp Asn Pro Glu
            675                 680                 685

Ile Gln Tyr Thr Ser Asn Tyr Tyr Lys Ser Asn Asn Val Glu Phe Ala
690                 695                 700

Val Asn Thr Glu Gly Val Tyr Ser Glu Pro Arg Pro Ile Gly Thr Arg
705                 710                 715                 720

Tyr Leu Thr Arg Asn Leu
            725

<210> SEQ ID NO 431
<211> LENGTH: 726
<212> TYPE: PRT
<213> ORGANISM: Artificial Sequence
<220> FEATURE:
<223> OTHER INFORMATION: Recombinant AAV capsid protein

<400> SEQUENCE: 431

-continued

```
Met Ser Phe Val Asp His Pro Pro Asp Trp Leu Glu Glu Val Gly Glu
 1               5                  10                  15
Gly Leu Arg Glu Phe Leu Gly Leu Glu Ala Gly Pro Pro Lys Pro Lys
            20                  25                  30
Pro Asn Gln Gln His Gln Asp Gln Ala Arg Gly Leu Val Leu Pro Gly
            35                  40                  45
Tyr Asn Tyr Leu Gly Pro Gly Asn Gly Leu Asp Arg Gly Glu Pro Val
 50                  55                  60
Asn Arg Ala Asp Glu Val Ala Arg Glu His Asp Ile Ser Tyr Asn Glu
 65                  70                  75                  80
Gln Leu Glu Ala Gly Asp Asn Pro Tyr Leu Lys Tyr Asn His Ala Asp
                85                  90                  95
Ala Glu Phe Gln Glu Lys Leu Ala Asp Asp Thr Ser Phe Gly Gly Asn
            100                 105                 110
Leu Gly Lys Ala Val Phe Gln Ala Lys Lys Arg Val Leu Glu Pro Phe
            115                 120                 125
Gly Leu Val Glu Glu Gly Ala Lys Thr Ala Pro Thr Gly Lys Arg Ile
            130                 135                 140
Asp Asp His Phe Pro Lys Arg Lys Lys Ala Arg Thr Glu Glu Asp Ser
145                 150                 155                 160
Lys Pro Ser Thr Ser Ser Asp Ala Glu Ala Gly Pro Ser Gly Ser Gln
                165                 170                 175
Gln Leu Gln Ile Pro Ala Gln Pro Ala Ser Ser Leu Gly Ala Asp Thr
            180                 185                 190
Met Ser Ala Gly Gly Gly Pro Leu Gly Asp Asn Asn Gln Gly Ala
            195                 200                 205
Asp Gly Val Gly Asn Ala Ser Gly Asp Trp His Cys Asp Ser Thr Trp
    210                 215                 220
Met Gly Asp Arg Val Val Thr Lys Ser Thr Arg Thr Trp Ala Leu Pro
225                 230                 235                 240
Thr Tyr Asn Asn His Leu Tyr Lys Gln Ile Ser Asn Ser Thr Ser Gly
                245                 250                 255
Gly Ser Ser Asn Asp Asn Ala Tyr Phe Gly Tyr Ser Thr Pro Trp Gly
            260                 265                 270
Tyr Phe Asp Phe Asn Arg Phe His Cys His Phe Ser Pro Arg Asp Trp
    275                 280                 285
Gln Arg Leu Ile Asn Asn Asn Trp Gly Phe Arg Pro Lys Arg Leu Asn
            290                 295                 300
Phe Lys Leu Phe Asn Ile Gln Val Lys Glu Val Thr Asp Asn Asn Gly
305                 310                 315                 320
Val Lys Thr Ile Ala Asn Asn Leu Thr Ser Thr Val Gln Val Phe Thr
                325                 330                 335
Asp Ser Asp Tyr Gln Leu Pro Tyr Val Leu Gly Ser Ala His Glu Gly
            340                 345                 350
Cys Leu Pro Pro Phe Pro Ala Asp Val Phe Met Ile Pro Gln Tyr Gly
            355                 360                 365
Tyr Leu Thr Leu Asn Asp Gly Ser Gln Ala Val Gly Arg Ser Ser Phe
    370                 375                 380
Tyr Cys Leu Glu Tyr Phe Pro Ser Gln Met Leu Arg Thr Gly Asn Asn
385                 390                 395                 400
Phe Gln Phe Ser Tyr Glu Phe Glu Asn Val Pro Phe His Ser Ser Tyr
                405                 410                 415
Ala His Ser Gln Ser Leu Asp Arg Leu Met Asn Pro Leu Ile Asp Gln
```

```
                420             425             430
Tyr Leu Tyr Tyr Leu Ser Lys Thr Ile Asn Gly Ser Gly Gln Asn Gln
            435             440             445

Gln Thr Leu Lys Phe Ser Val Ala Gly Pro Ser Asn Met Ala Val Gln
        450             455             460

Gly Arg Asn Tyr Ile Pro Gly Pro Ser Tyr Arg Gln Gln Arg Val Ser
465             470             475             480

Thr Thr Val Thr Gln Asn Asn Asn Ser Glu Phe Ala Trp Pro Gly Ala
                485             490             495

Ser Ser Trp Ala Leu Asn Gly Arg Asn Ser Leu Met Asn Pro Gly Pro
            500             505             510

Ala Met Ala Ser His Lys Glu Gly Glu Asp Arg Phe Phe Pro Leu Ser
            515             520             525

Gly Ser Leu Ile Phe Gly Lys Gln Gly Thr Gly Arg Asp Asn Val Asp
        530             535             540

Ala Asp Lys Val Met Ile Thr Asn Glu Glu Ile Lys Thr Thr Asn
545             550             555             560

Pro Val Ala Thr Glu Ser Tyr Gly Gln Val Ala Thr Asn His Gln Ser
            565             570             575

Ala Gln Ala Gln Ala Gln Thr Gly Trp Val Gln Asn Gln Gly Ile Leu
            580             585             590

Pro Gly Met Val Trp Gln Asp Arg Asp Val Tyr Leu Gln Gly Pro Ile
            595             600             605

Trp Ala Lys Ile Pro His Thr Asp Gly Asn Phe His Pro Ser Pro Leu
        610             615             620

Met Gly Gly Phe Gly Met Lys His Pro Pro Gln Ile Leu Ile Lys
625             630             635             640

Asn Thr Pro Val Pro Ala Asp Pro Pro Thr Ala Phe Asn Lys Asp Lys
                645             650             655

Leu Asn Ser Phe Ile Thr Gln Tyr Ser Thr Gly Gln Val Ser Val Glu
            660             665             670

Ile Glu Trp Glu Leu Gln Lys Glu Asn Ser Lys Arg Trp Asn Pro Glu
        675             680             685

Ile Gln Tyr Thr Ser Asn Tyr Tyr Lys Ser Asn Asn Val Glu Phe Ala
        690             695             700

Val Asn Thr Glu Gly Val Tyr Ser Glu Pro Arg Pro Ile Gly Thr Arg
705             710             715             720

Tyr Leu Thr Arg Asn Leu
                725

<210> SEQ ID NO 432
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 432

Met Ala Ala Asp Gly Tyr Leu Pro Asp Trp Leu Glu Asp Asn Leu Ser
1               5               10              15

Glu Gly Ile Arg Glu Trp Trp Ala Leu Lys Pro Gly Ala Pro Gln Pro
            20              25              30

Lys Ala Asn Gln Gln His Gln Asp Asn Ala Arg Gly Leu Val Leu Pro
        35              40              45

Gly Tyr Asn Tyr Leu Gly Pro Gly Asn Gly Leu Asp Arg Gly Glu Pro
```

```
               50                  55                  60
Val Asn Arg Ala Asp Glu Val Ala Arg Glu His Asp Ile Ser Tyr Asn
 65                  70                  75                  80

Glu Gln Leu Glu Ala Gly Asp Asn Pro Tyr Leu Lys Tyr Asn His Ala
                 85                  90                  95

Asp Ala Glu Phe Gln Glu Arg Leu Lys Glu Asp Thr Ser Phe Gly Gly
                100                 105                 110

Asn Leu Gly Lys Ala Val Phe Gln Ala Lys Lys Arg Val Leu Glu Pro
                115                 120                 125

Leu Gly Leu Val Glu Glu Ala Ala Lys Thr Ala Pro Gly Lys Lys Arg
            130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
            195                 200                 205

Ala Pro Val Ala Asp Asn Asn Glu Gly Ala Asp Gly Val Gly Asn Ala
        210                 215                 220

Ser Gly Asp Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
                260                 265                 270

Ala Tyr Phe Gly Tyr Ser Thr Pro Trp Gly Tyr Phe Asp Phe Asn Arg
            275                 280                 285

Phe His Cys His Phe Ser Pro Arg Asp Trp Gln Arg Leu Ile Asn Asn
        290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
            355                 360                 365

Ala Asp Val Phe Met Ile Pro Gln Tyr Gly Tyr Leu Thr Leu Asn Asp
        370                 375                 380

Gly Ser Gln Ala Val Gly Arg Ser Ser Phe Tyr Cys Leu Glu Tyr Phe
385                 390                 395                 400

Pro Ser Lys Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
            435                 440                 445

Lys Thr Ile Asn Gly Ser Gly Gln Asn Gln Gln Thr Leu Lys Phe Ser
        450                 455                 460

Val Ala Gly Pro Ser Asn Met Ala Val Gln Gly Arg Asn Tyr Ile Pro
465                 470                 475                 480
```

```
Gly Pro Ser Tyr Arg Gln Gln Arg Val Ser Thr Thr Val Thr Gln Asn
            485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
            515                 520                 525

Glu Gly Glu Asp Arg Phe Phe Pro Leu Ser Gly Ser Leu Ile Phe Gly
            530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590

Thr Gly Trp Val Gln Asn Gln Gly Ile Leu Pro Gly Met Val Trp Gln
            595                 600                 605

Asp Arg Asp Val Tyr Leu Gln Gly Pro Ile Trp Ala Lys Ile Pro His
            610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Thr Val Glu Met Glu Trp Glu Leu Lys
            675                 680                 685

Lys Glu Asn Ser Lys Arg Trp Asn Pro Glu Ile Gln Tyr Thr Asn Asn
690                 695                 700

Tyr Asn Asp Pro Gln Phe Val Asp Phe Ala Pro Asp Ser Thr Gly Glu
705                 710                 715                 720

Tyr Arg Thr Thr Arg Pro Ile Gly Thr Arg Tyr Leu Thr Arg Asn Leu
                725                 730                 735

<210> SEQ ID NO 433
<211> LENGTH: 735
<212> TYPE: PRT
<213> ORGANISM: Artificial Sequence
<220> FEATURE:
<223> OTHER INFORMATION: Recombinant AAV capsid protein

<400> SEQUENCE: 433

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
        35                  40                  45

Tyr Asn Tyr Leu Gly Pro Gly Asn Gly Leu Asp Arg Gly Glu Pro Val
    50                  55                  60

Asn Ala Ala Asp Ala Ala Ala Leu Glu His Asp Lys Ala Tyr Asp Gln
65                  70                  75                  80

Gln Leu Lys Ala Gly Asp Asn Pro Tyr Leu Lys Tyr Asn His Ala Asp
                85                  90                  95

Ala Glu Phe Gln Glu Arg Leu Lys Glu Asp Thr Ser Phe Gly Gly Asn
            100                 105                 110
```

```
Leu Gly Arg Ala Val Phe Gln Ala Lys Lys Arg Leu Leu Glu Pro Leu
        115                 120                 125
Gly Leu Val Glu Glu Ala Ala Lys Thr Ala Pro Gly Lys Lys Arg Pro
    130                 135                 140
Val Glu Gln Ser Pro Gln Glu Pro Asp Ser Ser Ala Gly Ile Gly Lys
145                 150                 155                 160
Ser Gly Ala Gln Pro Ala Lys Lys Arg Leu Asn Phe Gly Gln Thr Gly
                165                 170                 175
Asp Thr Glu Ser Val Pro Asp Pro Gln Pro Ile Gly Glu Pro Pro Ala
                180                 185                 190
Ala Pro Ser Gly Val Gly Ser Leu Thr Met Ala Ser Gly Gly Gly Ala
        195                 200                 205
Pro Val Ala Asp Asn Asn Glu Gly Ala Asp Gly Val Gly Ser Ser Ser
    210                 215                 220
Gly Asn Trp His Cys Asp Ser Gln Trp Leu Gly Asp Arg Val Ile Thr
225                 230                 235                 240
Thr Ser Thr Arg Thr Trp Ala Leu Pro Thr Tyr Asn Asn His Leu Tyr
                245                 250                 255
Lys Gln Ile Ser Asn Ser Thr Ser Gly Gly Ser Ser Asn Asp Asn Ala
                260                 265                 270
Tyr Phe Gly Tyr Ser Thr Pro Trp Gly Tyr Phe Asp Phe Asn Arg Phe
        275                 280                 285
His Cys His Phe Ser Pro Arg Asp Trp Gln Arg Leu Ile Asn Asn Asn
    290                 295                 300
Trp Gly Phe Arg Pro Lys Arg Leu Asn Phe Lys Leu Phe Asn Ile Gln
305                 310                 315                 320
Val Lys Glu Val Thr Asp Asn Asn Gly Val Lys Thr Ile Ala Asn Asn
                325                 330                 335
Leu Thr Ser Thr Val Gln Val Phe Thr Asp Ser Asp Tyr Gln Leu Pro
                340                 345                 350
Tyr Val Leu Gly Ser Ala His Glu Gly Cys Leu Pro Pro Phe Pro Ala
        355                 360                 365
Asp Val Phe Met Ile Pro Gln Tyr Gly Tyr Leu Thr Leu Asn Asp Gly
    370                 375                 380
Ser Gln Ala Val Gly Arg Ser Ser Phe Tyr Cys Leu Glu Tyr Phe Pro
385                 390                 395                 400
Ser Gln Met Leu Arg Thr Gly Asn Asn Phe Gln Phe Ser Tyr Glu Phe
                405                 410                 415
Glu Asn Val Pro Phe His Ser Ser Tyr Ala His Ser Gln Ser Leu Asp
                420                 425                 430
Arg Leu Met Asn Pro Leu Ile Asp Gln Tyr Leu Tyr Tyr Leu Ser Lys
        435                 440                 445
Thr Ile Asn Gly Ser Gly Gln Asn Gln Gln Thr Leu Lys Phe Ser Val
    450                 455                 460
Ala Gly Pro Ser Asn Met Ala Val Gln Gly Arg Asn Tyr Ile Pro Gly
465                 470                 475                 480
Pro Ser Tyr Arg Gln Gln Arg Val Ser Thr Thr Val Thr Gln Asn Asn
                485                 490                 495
Asn Ser Glu Phe Ala Trp Pro Gly Ala Ser Ser Trp Ala Leu Asn Gly
                500                 505                 510
Arg Asn Ser Leu Met Asn Pro Gly Pro Ala Met Ala Ser His Lys Glu
        515                 520                 525
```

-continued

Gly Glu Asp Arg Phe Phe Pro Leu Ser Gly Ser Leu Ile Phe Gly Lys
530                 535                 540

Gln Gly Thr Gly Arg Asp Asn Val Asp Ala Asp Lys Val Met Ile Thr
545                 550                 555                 560

Asn Glu Glu Ile Lys Thr Thr Asn Pro Val Ala Thr Glu Ser Tyr
                565                 570                 575

Gly Gln Val Ala Thr Asn His Gln Ser Ala Gln Ala Gln Ala Gln Thr
                580                 585                 590

Gly Trp Val Gln Asn Gln Gly Ile Leu Pro Gly Met Val Trp Gln Asp
                595                 600                 605

Arg Asp Val Tyr Leu Gln Gly Pro Ile Trp Ala Lys Ile Pro His Thr
610                 615                 620

Asp Gly Asn Phe His Pro Ser Pro Leu Met Gly Gly Phe Gly Met Lys
625                 630                 635                 640

His Pro Pro Pro Gln Ile Leu Ile Lys Asn Thr Pro Val Pro Ala Asp
                645                 650                 655

Pro Pro Thr Ala Phe Asn Lys Asp Lys Leu Asn Ser Phe Ile Thr Gln
                660                 665                 670

Tyr Ser Thr Gly Gln Val Ser Val Glu Ile Glu Trp Glu Leu Gln Lys
                675                 680                 685

Glu Asn Ser Lys Arg Trp Asn Pro Glu Ile Gln Tyr Thr Asn Asn Tyr
690                 695                 700

Asn Asp Pro Gln Phe Val Asp Phe Ala Pro Asp Ser Thr Gly Glu Tyr
705                 710                 715                 720

Arg Thr Thr Arg Pro Ile Gly Thr Arg Tyr Leu Thr Arg Pro Leu
                725                 730                 735

<210> SEQ ID NO 434
<211> LENGTH: 735
<212> TYPE: PRT
<213> ORGANISM: Artificial Sequence
<220> FEATURE:
<223> OTHER INFORMATION: Recombinant AAV capsid protein

<400> SEQUENCE: 434

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
                20                  25                  30

Pro Asn Gln Gln His Gln Asp Gln Ala Arg Gly Leu Val Leu Pro Gly
            35                  40                  45

Tyr Asn Tyr Leu Gly Pro Gly Asn Gly Leu Asp Arg Gly Glu Pro Val
50                  55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
                85                  90                  95

Ala Glu Phe Gln Glu Lys Leu Ala Asp Asp Thr Ser Phe Gly Gly Asn
                100                 105                 110

Leu Gly Lys Ala Val Phe Gln Ala Lys Lys Arg Val Leu Glu Pro Leu
            115                 120                 125

Gly Leu Val Glu Glu Ala Ala Lys Thr Ala Pro Gly Lys Lys Arg Pro
130                 135                 140

Val Glu Gln Ser Pro Gln Glu Pro Asp Ser Ser Ala Gly Ile Gly Lys
145                 150                 155                 160

```
Ser Gly Ala Gln Pro Ala Lys Lys Arg Leu Asn Phe Gly Gln Thr Gly
            165                 170                 175

Asp Thr Glu Ser Val Pro Asp Pro Gln Pro Ile Gly Glu Pro Pro Ala
        180                 185                 190

Ala Pro Ser Gly Val Gly Ser Leu Thr Met Ala Ser Gly Gly Gly Ala
        195                 200                 205

Pro Val Ala Asp Asn Asn Glu Gly Ala Asp Gly Val Gly Ser Ser Ser
        210                 215                 220

Gly Asn Trp His Cys Asp Ser Gln Trp Leu Gly Asp Arg Val Ile Thr
225                 230                 235                 240

Thr Ser Thr Arg Thr Trp Ala Leu Pro Thr Tyr Asn Asn His Leu Tyr
            245                 250                 255

Lys Gln Ile Ser Asn Ser Thr Ser Gly Gly Ser Ser Asn Asp Asn Ala
            260                 265                 270

Tyr Phe Gly Tyr Ser Thr Pro Trp Gly Tyr Phe Asp Phe Asn Arg Phe
        275                 280                 285

His Cys His Phe Ser Pro Arg Asp Trp Gln Arg Leu Ile Asn Asn Asn
        290                 295                 300

Trp Gly Phe Arg Pro Lys Arg Leu Asn Phe Lys Leu Phe Asn Ile Gln
305                 310                 315                 320

Val Lys Glu Val Thr Asp Asn Asn Gly Val Lys Thr Ile Ala Asn Asn
            325                 330                 335

Leu Thr Ser Thr Val Gln Val Phe Thr Asp Ser Asp Tyr Gln Leu Pro
            340                 345                 350

Tyr Val Leu Gly Ser Ala His Glu Gly Cys Leu Pro Pro Phe Pro Ala
        355                 360                 365

Asp Val Phe Met Ile Pro Gln Tyr Gly Tyr Leu Thr Leu Asn Asp Gly
        370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Gln Phe Ser Tyr Glu Phe
            405                 410                 415

Glu Asn Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Ser Lys
        435                 440                 445

Thr Ile Asn Gly Ser Gly Gln Asn Gln Gln Thr Leu Lys Phe Ser Val
        450                 455                 460

Ala Gly Pro Ser Asn Met Ala Val Gln Gly Arg Asn Tyr Ile Pro Gly
465                 470                 475                 480

Pro Ser Tyr Arg Gln Gln Arg Val Ser Thr Thr Val Thr Gln Asn Asn
            485                 490                 495

Asn Ser Glu Phe Ala Trp Pro Gly Ala Ser Ser Trp Ala Leu Asn Gly
            500                 505                 510

Arg Asn Ser Leu Met Asn Pro Gly Pro Ala Met Ala Ser His Lys Glu
        515                 520                 525

Gly Glu Asp Arg Phe Phe Pro Leu Ser Gly Ser Leu Ile Phe Gly Lys
        530                 535                 540

Gln Gly Thr Gly Arg Asp Asn Val Asp Ala Asp Lys Val Met Ile Thr
545                 550                 555                 560

Asn Glu Glu Glu Ile Lys Thr Thr Asn Pro Val Ala Thr Glu Ser Tyr
            565                 570                 575

Gly Gln Val Ala Thr Asn His Gln Ser Ala Gln Ala Gln Ala Gln Thr
```

```
                      580                 585                 590
Gly Trp Val Gln Asn Gln Gly Ile Leu Pro Gly Met Val Trp Gln Asp
                595                 600                 605
Arg Asp Val Tyr Leu Gln Gly Pro Ile Trp Ala Lys Ile Pro His Thr
            610                 615                 620
Asp Gly Asn Phe His Pro Ser Pro Leu Met Gly Gly Phe Gly Met Lys
625                 630                 635                 640
His Pro Pro Pro Gln Ile Leu Ile Lys Asn Thr Pro Val Pro Ala Asp
                645                 650                 655
Pro Pro Thr Ala Phe Asn Lys Asp Lys Leu Asn Ser Phe Ile Thr Gln
            660                 665                 670
Tyr Ser Thr Gly Gln Val Ser Val Glu Ile Glu Trp Glu Leu Lys Lys
        675                 680                 685
Glu Asn Ser Lys Arg Trp Asn Pro Glu Ile Gln Tyr Thr Ser Asn Tyr
            690                 695                 700
Tyr Lys Ser Asn Asn Val Glu Phe Ala Val Asn Thr Glu Gly Val Tyr
705                 710                 715                 720
Ser Glu Pro Arg Pro Ile Gly Thr Arg Tyr Leu Thr Arg Asn Leu
                725                 730                 735

<210> SEQ ID NO 435
<211> LENGTH: 726
<212> TYPE: PRT
<213> ORGANISM: Artificial Sequence
<220> FEATURE:
<223> OTHER INFORMATION: Recombinant AAV capsid protein

<400> SEQUENCE: 435

Met Ser Phe Val Asp His Pro Pro Asp Trp Leu Glu Glu Val Gly Glu
1               5                   10                  15
Gly Leu Arg Glu Phe Leu Gly Leu Glu Ala Gly Pro Pro Lys Pro Lys
                20                  25                  30
Pro Asn Gln Gln His Gln Asp Gln Ala Arg Gly Leu Val Leu Pro Gly
            35                  40                  45
Tyr Asn Tyr Leu Gly Pro Gly Asn Gly Leu Asp Arg Gly Glu Pro Val
50                  55                  60
Asn Arg Ala Asp Glu Val Ala Arg Glu His Asp Ile Ser Tyr Asn Glu
65                  70                  75                  80
Gln Leu Glu Ala Gly Asp Asn Pro Tyr Leu Lys Tyr Asn His Ala Asp
                85                  90                  95
Ala Glu Phe Gln Glu Lys Leu Ala Asp Asp Thr Ser Phe Gly Gly Asn
            100                 105                 110
Leu Gly Lys Ala Val Phe Gln Ala Lys Lys Arg Val Leu Glu Pro Phe
        115                 120                 125
Gly Leu Val Glu Glu Gly Ala Lys Thr Ala Pro Thr Gly Lys Arg Ile
    130                 135                 140
Asp Asp His Phe Pro Lys Arg Lys Lys Ala Arg Thr Glu Glu Asp Ser
145                 150                 155                 160
Lys Pro Ser Thr Ser Ser Asp Ala Glu Ala Gly Pro Ser Gly Ser Gln
                165                 170                 175
Gln Leu Gln Ile Pro Ala Gln Pro Ala Ser Ser Leu Gly Ala Asp Thr
            180                 185                 190
Met Ser Ala Gly Gly Gly Gly Pro Leu Gly Asp Asn Asn Gln Gly Ala
        195                 200                 205
Asp Gly Val Gly Asn Ala Ser Gly Asp Trp His Cys Asp Ser Thr Trp
```

```
            210                 215                 220
Met Gly Asp Arg Val Val Thr Lys Ser Thr Arg Thr Trp Ala Leu Pro
225                 230                 235                 240

Thr Tyr Asn Asn His Leu Tyr Lys Gln Ile Ser Asn Ser Thr Ser Gly
                245                 250                 255

Gly Ser Ser Asn Asp Asn Ala Tyr Phe Gly Tyr Ser Thr Pro Trp Gly
                260                 265                 270

Tyr Phe Asp Phe Asn Arg Phe His Cys His Phe Ser Pro Arg Asp Trp
            275                 280                 285

Gln Arg Leu Ile Asn Asn Asn Trp Gly Phe Arg Pro Lys Arg Leu Asn
        290                 295                 300

Phe Lys Leu Phe Asn Ile Gln Val Lys Glu Val Thr Asp Asn Asn Gly
305                 310                 315                 320

Val Lys Thr Ile Ala Asn Asn Leu Thr Ser Thr Val Gln Val Phe Thr
                325                 330                 335

Asp Ser Asp Tyr Gln Leu Pro Tyr Val Leu Gly Ser Ala His Glu Gly
                340                 345                 350

Cys Leu Pro Pro Phe Pro Ala Asp Val Phe Met Ile Pro Gln Tyr Gly
                355                 360                 365

Tyr Leu Thr Leu Asn Asp Gly Ser Gln Ala Val Gly Arg Ser Ser Phe
                370                 375                 380

Tyr Cys Leu Glu Tyr Phe Pro Ser Gln Met Leu Arg Thr Gly Asn Asn
385                 390                 395                 400

Phe Gln Phe Ser Tyr Glu Phe Glu Asn Val Pro Phe His Ser Ser Tyr
                405                 410                 415

Ala His Ser Gln Ser Leu Asp Arg Leu Met Asn Pro Leu Ile Asp Gln
                420                 425                 430

Tyr Leu Tyr Tyr Leu Ser Lys Thr Ile Asn Gly Ser Gly Gln Asn Gln
                435                 440                 445

Gln Thr Leu Lys Phe Ser Val Ala Gly Pro Ser Asn Met Ala Val Gln
                450                 455                 460

Gly Arg Asn Tyr Ile Pro Gly Pro Ser Tyr Arg Gln Gln Arg Val Ser
465                 470                 475                 480

Thr Thr Val Thr Gln Asn Asn Asn Ser Glu Phe Ala Trp Pro Gly Ala
                485                 490                 495

Ser Ser Trp Ala Leu Asn Gly Arg Asn Ser Leu Met Asn Pro Gly Pro
                500                 505                 510

Ala Met Ala Ser His Lys Glu Gly Glu Asp Arg Phe Phe Pro Leu Ser
                515                 520                 525

Gly Ser Leu Ile Phe Gly Lys Gln Gly Thr Gly Arg Asp Asn Val Asp
                530                 535                 540

Ala Asp Lys Val Met Ile Thr Asn Glu Glu Ile Lys Thr Thr Asn
545                 550                 555                 560

Pro Val Ala Thr Glu Ser Tyr Gly Gln Val Ala Thr Asn His Gln Ser
                565                 570                 575

Ala Gln Ala Gln Ala Gln Thr Gly Trp Val Gln Asn Gln Gly Ile Leu
                580                 585                 590

Pro Gly Met Val Trp Gln Asp Arg Asp Val Tyr Leu Gln Gly Pro Ile
                595                 600                 605

Trp Ala Lys Ile Pro His Thr Asp Gly Asn Phe His Pro Ser Pro Leu
610                 615                 620

Met Gly Gly Phe Gly Met Lys His Pro Pro Gln Ile Leu Ile Lys
625                 630                 635                 640
```

```
Asn Thr Pro Val Pro Ala Asp Pro Thr Ala Phe Asn Lys Asp Lys
                645                 650                 655

Leu Asn Ser Phe Ile Thr Gln Tyr Ser Thr Gly Gln Val Ser Val Glu
            660                 665                 670

Ile Glu Trp Glu Leu Gln Lys Glu Asn Ser Lys Arg Trp Asn Pro Glu
        675                 680                 685

Ile Gln Tyr Thr Ser Asn Tyr Tyr Lys Ser Asn Asn Val Glu Phe Ala
    690                 695                 700

Val Asn Thr Glu Gly Val Tyr Ser Glu Pro Arg Pro Ile Gly Thr Arg
705                 710                 715                 720

Tyr Leu Thr Arg Asn Leu
                725

<210> SEQ ID NO 436
<211> LENGTH: 726
<212> TYPE: PRT
<213> ORGANISM: Artificial Sequence
<220> FEATURE:
<223> OTHER INFORMATION: Recombinant AAV capsid protein

<400> SEQUENCE: 436

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
        35                  40                  45

Tyr Asn Tyr Leu Gly Pro Gly Asn Gly Leu Asp Arg Gly Glu Pro Val
    50                  55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
            85                  90                  95

Ala Glu Phe Gln Glu Lys Leu Ala Asp Asp Thr Ser Phe Gly Gly Asn
        100                 105                 110

Leu Gly Lys Ala Val Phe Gln Ala Lys Lys Arg Val Leu Glu Pro Phe
    115                 120                 125

Gly Leu Val Glu Glu Gly Ala Lys Thr Ala Pro Thr Gly Lys Arg Ile
130                 135                 140

Asp Asp His Phe Pro Lys Arg Lys Lys Ala Arg Thr Glu Glu Asp Ser
145                 150                 155                 160

Lys Pro Ser Thr Ser Ser Asp Ala Glu Ala Gly Pro Ser Gly Ser Gln
            165                 170                 175

Gln Leu Gln Ile Pro Ala Gln Pro Ala Ser Ser Leu Gly Ala Asp Thr
        180                 185                 190

Met Ser Ala Gly Gly Gly Ala Pro Val Ala Asp Asn Asn Glu Gly Ala
    195                 200                 205

Asp Gly Val Gly Ser Ser Ser Gly Asn Trp His Cys Asp Ser Gln Trp
210                 215                 220

Leu Gly Asp Arg Val Ile Thr Thr Ser Thr Arg Thr Trp Ala Leu Pro
225                 230                 235                 240

Thr Tyr Asn Asn His Leu Tyr Lys Gln Ile Ser Asn Ser Thr Ser Gly
            245                 250                 255

Gly Ser Ser Asn Asp Asn Ala Tyr Phe Gly Tyr Ser Thr Pro Trp Gly
        260                 265                 270
```

```
Tyr Phe Asp Phe Asn Arg Phe His Cys His Phe Ser Pro Arg Asp Trp
        275                 280                 285

Gln Arg Leu Ile Asn Asn Asn Trp Gly Phe Arg Pro Lys Arg Leu Asn
    290                 295                 300

Phe Lys Leu Phe Asn Ile Gln Val Lys Glu Val Thr Asp Asn Asn Gly
305                 310                 315                 320

Val Lys Thr Ile Ala Asn Asn Leu Thr Ser Thr Val Gln Val Phe Thr
                325                 330                 335

Asp Ser Asp Tyr Gln Leu Pro Tyr Val Leu Gly Ser Ala His Glu Gly
            340                 345                 350

Cys Leu Pro Pro Phe Pro Ala Asp Val Phe Met Ile Pro Gln Tyr Gly
            355                 360                 365

Tyr Leu Thr Leu Asn Asp Gly Ser Gln Ala Val Gly Arg Ser Ser Phe
    370                 375                 380

Tyr Cys Leu Glu Tyr Phe Pro Ser Gln Met Leu Arg Thr Gly Asn Asn
385                 390                 395                 400

Phe Gln Phe Ser Tyr Glu Phe Glu Asn Val Pro Phe His Ser Ser Tyr
                405                 410                 415

Ala His Ser Gln Ser Leu Asp Arg Leu Met Asn Pro Leu Ile Asp Gln
            420                 425                 430

Tyr Leu Tyr Tyr Leu Ser Lys Thr Ile Asn Gly Ser Gly Gln Asn Gln
    435                 440                 445

Gln Thr Leu Lys Phe Ser Val Ala Gly Pro Ser Asn Met Ala Val Gln
    450                 455                 460

Gly Arg Asn Tyr Ile Pro Gly Pro Ser Tyr Arg Gln Gln Arg Val Ser
465                 470                 475                 480

Thr Thr Val Thr Gln Asn Asn Asn Ser Glu Phe Ala Trp Pro Gly Ala
                485                 490                 495

Ser Ser Trp Ala Leu Asn Gly Arg Asn Ser Leu Met Asn Pro Gly Pro
            500                 505                 510

Ala Met Ala Ser His Lys Glu Gly Glu Asp Arg Phe Phe Pro Leu Ser
    515                 520                 525

Gly Ser Leu Ile Phe Gly Lys Gln Gly Thr Gly Arg Asp Asn Val Asp
    530                 535                 540

Ala Asp Lys Val Met Ile Thr Asn Glu Glu Ile Lys Thr Thr Asn
545                 550                 555                 560

Pro Val Ala Thr Glu Ser Tyr Gly Gln Val Ala Thr Asn His Gln Ser
                565                 570                 575

Ala Gln Ala Gln Ala Gln Thr Gly Trp Val Gln Asn Gln Gly Ile Leu
            580                 585                 590

Pro Gly Met Val Trp Gln Asp Arg Asp Val Tyr Leu Gln Gly Pro Ile
    595                 600                 605

Trp Ala Lys Ile Pro His Thr Asp Gly Asn Phe His Pro Ser Pro Leu
610                 615                 620

Met Gly Gly Phe Gly Met Lys His Pro Pro Gln Ile Leu Ile Lys
625                 630                 635                 640

Asn Thr Pro Val Pro Ala Asp Pro Pro Thr Ala Phe Asn Lys Asp Lys
                645                 650                 655

Leu Asn Ser Phe Ile Thr Gln Tyr Ser Thr Gly Gln Val Ser Val Glu
            660                 665                 670

Ile Glu Trp Glu Leu Gln Lys Glu Asn Ser Lys Arg Trp Asn Pro Glu
    675                 680                 685
```

```
Ile Gln Tyr Thr Ser Asn Tyr Tyr Lys Ser Asn Asn Val Glu Phe Ala
        690                 695                 700
Val Asn Thr Glu Gly Val Tyr Ser Glu Pro Arg Pro Ile Gly Thr Arg
705                 710                 715                 720
Tyr Leu Thr Arg Asn Leu
                725

<210> SEQ ID NO 437
<211> LENGTH: 726
<212> TYPE: PRT
<213> ORGANISM: Artificial Sequence
<220> FEATURE:
<223> OTHER INFORMATION: Recombinant AAV capsid protein

<400> SEQUENCE: 437

Met Ser Phe Val Asp His Pro Pro Asp Trp Leu Glu Glu Val Gly Glu
1               5                   10                  15
Gly Leu Arg Glu Phe Leu Gly Leu Glu Ala Gly Pro Pro Lys Pro Lys
            20                  25                  30
Pro Asn Gln Gln His Gln Asp Gln Ala Arg Gly Leu Val Leu Pro Gly
        35                  40                  45
Tyr Lys Tyr Leu Gly Pro Gly Asn Gly Leu Asp Lys Gly Glu Pro Val
    50                  55                  60
Asn Ala Ala Asp Ala Ala Ala Leu Glu His Asp Lys Ala Tyr Asp Gln
65                  70                  75                  80
Gln Leu Lys Ala Gly Asp Asn Pro Tyr Leu Lys Tyr Asn His Ala Asp
                85                  90                  95
Ala Glu Phe Gln Glu Lys Leu Ala Asp Asp Thr Ser Phe Gly Gly Asn
            100                 105                 110
Leu Gly Lys Ala Val Phe Gln Ala Lys Lys Arg Val Leu Glu Pro Phe
        115                 120                 125
Gly Leu Val Glu Glu Gly Ala Lys Thr Ala Pro Thr Gly Lys Arg Ile
    130                 135                 140
Asp Asp His Phe Pro Lys Arg Lys Lys Ala Arg Thr Glu Glu Asp Ser
145                 150                 155                 160
Lys Pro Ser Thr Ser Ser Asp Ala Glu Ala Gly Pro Ser Gly Ser Gln
                165                 170                 175
Gln Leu Gln Ile Pro Ala Gln Pro Ala Ser Ser Leu Gly Ala Asp Thr
            180                 185                 190
Met Ser Ala Gly Gly Gly Ala Pro Val Ala Asp Asn Asn Glu Gly Ala
        195                 200                 205
Asp Gly Val Gly Ser Ser Ser Gly Asn Trp His Cys Asp Ser Gln Trp
    210                 215                 220
Leu Gly Asp Arg Val Ile Thr Thr Ser Thr Arg Thr Trp Ala Leu Pro
225                 230                 235                 240
Thr Tyr Asn Asn His Leu Tyr Lys Gln Ile Ser Asn Ser Thr Ser Gly
                245                 250                 255
Gly Ser Ser Asn Asp Asn Ala Tyr Phe Gly Tyr Ser Thr Pro Trp Gly
            260                 265                 270
Tyr Phe Asp Phe Asn Arg Phe His Cys His Phe Ser Pro Arg Asp Trp
        275                 280                 285
Gln Arg Leu Ile Asn Asn Asn Trp Gly Phe Arg Pro Lys Arg Leu Asn
    290                 295                 300
Phe Lys Leu Phe Asn Ile Gln Val Lys Glu Val Thr Asp Asn Asn Gly
305                 310                 315                 320
```

```
Val Lys Thr Ile Ala Asn Asn Leu Thr Ser Thr Val Gln Val Phe Thr
            325                 330                 335

Asp Ser Asp Tyr Gln Leu Pro Tyr Val Leu Gly Ser Ala His Glu Gly
            340                 345                 350

Cys Leu Pro Pro Phe Pro Ala Asp Val Phe Met Ile Pro Gln Tyr Gly
            355                 360                 365

Tyr Leu Thr Leu Asn Asp Gly Ser Gln Ala Val Gly Arg Ser Ser Phe
            370                 375                 380

Tyr Cys Leu Glu Tyr Phe Pro Ser Gln Met Leu Arg Thr Gly Asn Asn
385                 390                 395                 400

Phe Gln Phe Ser Tyr Glu Phe Glu Asn Val Pro Phe His Ser Ser Tyr
            405                 410                 415

Ala His Ser Gln Ser Leu Asp Arg Leu Met Asn Pro Leu Ile Asp Gln
            420                 425                 430

Tyr Leu Tyr Tyr Leu Ser Lys Thr Ile Asn Gly Ser Gly Gln Asn Gln
            435                 440                 445

Gln Thr Leu Lys Phe Ser Val Ala Gly Pro Ser Asn Met Ala Val Gln
            450                 455                 460

Gly Arg Asn Tyr Ile Pro Gly Pro Ser Tyr Arg Gln Gln Arg Val Ser
465                 470                 475                 480

Thr Thr Val Thr Gln Asn Asn Asn Ser Glu Phe Ala Trp Pro Gly Ala
            485                 490                 495

Ser Ser Trp Ala Leu Asn Gly Arg Asn Ser Leu Met Asn Pro Gly Pro
            500                 505                 510

Ala Met Ala Ser His Lys Glu Gly Glu Asp Arg Phe Phe Pro Leu Ser
            515                 520                 525

Gly Ser Leu Ile Phe Gly Lys Gln Gly Thr Gly Arg Asp Asn Val Asp
            530                 535                 540

Ala Asp Lys Val Met Ile Thr Asn Glu Glu Glu Ile Lys Thr Thr Asn
545                 550                 555                 560

Pro Val Ala Thr Glu Ser Tyr Gly Gln Val Ala Thr Asn His Gln Ser
            565                 570                 575

Ala Gln Ala Gln Ala Gln Thr Gly Trp Val Gln Asn Gln Gly Ile Leu
            580                 585                 590

Pro Gly Met Val Trp Gln Asp Arg Asp Val Tyr Leu Gln Gly Pro Ile
            595                 600                 605

Trp Ala Lys Ile Pro His Thr Asp Gly Asn Phe His Pro Ser Pro Leu
610                 615                 620

Met Gly Gly Phe Gly Met Lys His Pro Pro Gln Ile Leu Ile Lys
625                 630                 635                 640

Asn Thr Pro Val Pro Ala Asp Pro Pro Thr Ala Phe Asn Lys Asp Lys
            645                 650                 655

Leu Asn Ser Phe Ile Thr Gln Tyr Ser Thr Gly Gln Val Ser Val Glu
            660                 665                 670

Ile Glu Trp Glu Leu Gln Lys Glu Asn Ser Lys Arg Trp Asn Pro Glu
            675                 680                 685

Ile Gln Tyr Thr Ser Asn Tyr Tyr Lys Ser Asn Asn Val Glu Phe Ala
            690                 695                 700

Val Asn Thr Glu Gly Val Tyr Ser Glu Pro Arg Pro Ile Gly Thr Arg
705                 710                 715                 720

Tyr Leu Thr Arg Asn Leu
            725
```

```
<210> SEQ ID NO 438
<211> LENGTH: 727
<212> TYPE: PRT
<213> ORGANISM: Artificial Sequence
<220> FEATURE:
<223> OTHER INFORMATION: Recombinant AAV capsid protein

<400> SEQUENCE: 438
```

| | | | | | | | | | | | | | | |
|---|---|---|---|---|---|---|---|---|---|---|---|---|---|---|
| Met | Ala | Ala | Asp | Gly | Tyr | Leu | Pro | Asp | Trp | Leu | Glu | Asp | Asn | Leu | Ser |
| 1 | | | | 5 | | | | | 10 | | | | | 15 | |
| Glu | Gly | Ile | Arg | Glu | Trp | Trp | Ala | Leu | Lys | Pro | Gly | Ala | Pro | Gln | Pro |
| | | | 20 | | | | | 25 | | | | | 30 | | |
| Lys | Ala | Asn | Gln | Gln | His | Gln | Asp | Asn | Ala | Arg | Gly | Leu | Val | Leu | Pro |
| | | 35 | | | | | 40 | | | | | 45 | | | |
| Gly | Tyr | Lys | Tyr | Leu | Gly | Pro | Gly | Asn | Gly | Leu | Asp | Lys | Gly | Glu | Pro |
| | 50 | | | | | 55 | | | | | 60 | | | | |
| Val | Asn | Ala | Ala | Asp | Ala | Ala | Leu | Glu | His | Asp | Lys | Ala | Tyr | Asp |
| 65 | | | | | 70 | | | | | 75 | | | | | 80 |
| Gln | Gln | Leu | Lys | Ala | Gly | Asp | Asn | Pro | Tyr | Leu | Lys | Tyr | Asn | His | Ala |
| | | | | 85 | | | | | 90 | | | | | 95 | |
| Asp | Ala | Glu | Phe | Gln | Glu | Arg | Leu | Lys | Glu | Asp | Thr | Ser | Phe | Gly | Gly |
| | | | 100 | | | | | 105 | | | | | 110 | | |
| Asn | Leu | Gly | Arg | Ala | Val | Phe | Gln | Ala | Lys | Lys | Arg | Leu | Leu | Glu | Pro |
| | | 115 | | | | | 120 | | | | | 125 | | | |
| Phe | Gly | Leu | Val | Glu | Glu | Gly | Ala | Lys | Thr | Ala | Pro | Thr | Gly | Lys | Arg |
| | 130 | | | | | 135 | | | | | 140 | | | | |
| Ile | Asp | Asp | His | Phe | Pro | Lys | Arg | Lys | Lys | Ala | Arg | Thr | Glu | Glu | Asp |
| 145 | | | | | 150 | | | | | 155 | | | | | 160 |
| Ser | Lys | Pro | Ser | Thr | Ser | Ser | Asp | Ala | Glu | Ala | Gly | Pro | Ser | Gly | Ser |
| | | | | 165 | | | | | 170 | | | | | 175 | |
| Gln | Gln | Leu | Gln | Ile | Pro | Ala | Gln | Pro | Ala | Ser | Ser | Leu | Gly | Ala | Asp |
| | | | 180 | | | | | 185 | | | | | 190 | | |
| Thr | Met | Ser | Ala | Gly | Gly | Gly | Pro | Leu | Gly | Asp | Asn | Asn | Glu | Gly |
| | | 195 | | | | | 200 | | | | | 205 | | | |
| Ala | Asp | Gly | Val | Gly | Ser | Ser | Ser | Gly | Asn | Trp | His | Cys | Asp | Ser | Gln |
| | 210 | | | | | 215 | | | | | 220 | | | | |
| Trp | Leu | Gly | Asp | Arg | Val | Ile | Thr | Thr | Ser | Thr | Arg | Thr | Trp | Ala | Leu |
| 225 | | | | | 230 | | | | | 235 | | | | | 240 |
| Pro | Thr | Tyr | Asn | Asn | His | Leu | Tyr | Lys | Gln | Ile | Ser | Asn | Ser | Thr | Ser |
| | | | | 245 | | | | | 250 | | | | | 255 | |
| Gly | Gly | Ser | Ser | Asn | Asp | Asn | Ala | Tyr | Phe | Gly | Tyr | Ser | Thr | Pro | Trp |
| | | | 260 | | | | | 265 | | | | | 270 | | |
| Gly | Tyr | Phe | Asp | Phe | Asn | Arg | Phe | His | Cys | His | Phe | Ser | Pro | Arg | Asp |
| | | 275 | | | | | 280 | | | | | 285 | | | |
| Trp | Gln | Arg | Leu | Ile | Asn | Asn | Asn | Trp | Gly | Phe | Arg | Pro | Lys | Arg | Leu |
| | 290 | | | | | 295 | | | | | 300 | | | | |
| Asn | Phe | Lys | Leu | Phe | Asn | Ile | Gln | Val | Lys | Glu | Val | Thr | Asp | Asn | Asn |
| 305 | | | | | 310 | | | | | 315 | | | | | 320 |
| Gly | Val | Lys | Thr | Ile | Ala | Asn | Asn | Leu | Thr | Ser | Thr | Val | Gln | Val | Phe |
| | | | | 325 | | | | | 330 | | | | | 335 | |
| Thr | Asp | Ser | Asp | Tyr | Gln | Leu | Pro | Tyr | Val | Leu | Gly | Ser | Ala | His | Glu |
| | | | 340 | | | | | 345 | | | | | 350 | | |
| Gly | Cys | Leu | Pro | Pro | Phe | Pro | Ala | Asp | Val | Phe | Met | Ile | Pro | Gln | Tyr |
| | | 355 | | | | | 360 | | | | | 365 | | | |
| Gly | Tyr | Leu | Thr | Leu | Asn | Asp | Gly | Ser | Gln | Ala | Val | Gly | Arg | Ser | Ser |

```
                    370             375                 380
Phe Tyr Cys Leu Glu Tyr Phe Pro Ser Gln Met Leu Arg Thr Gly Asn
385                 390                 395                 400

Asn Phe Gln Phe Ser Tyr Glu Phe Glu Asn Val Pro Phe His Ser Ser
                405                 410                 415

Tyr Ala His Ser Gln Ser Leu Asp Arg Leu Met Asn Pro Leu Ile Asp
            420                 425                 430

Gln Tyr Leu Tyr Leu Ser Lys Thr Ile Asn Gly Ser Gly Gln Asn
        435                 440                 445

Gln Gln Thr Leu Lys Phe Ser Val Ala Gly Pro Ser Asn Met Ala Val
    450                 455                 460

Gln Gly Arg Asn Tyr Ile Pro Gly Pro Ser Tyr Arg Gln Gln Arg Val
465                 470                 475                 480

Ser Thr Thr Val Thr Gln Asn Asn Asn Ser Glu Phe Ala Trp Pro Gly
                485                 490                 495

Ala Ser Ser Trp Ala Leu Asn Gly Arg Asn Ser Leu Met Asn Pro Gly
            500                 505                 510

Pro Ala Met Ala Ser His Lys Glu Gly Glu Asp Arg Phe Phe Pro Leu
        515                 520                 525

Ser Gly Ser Leu Ile Phe Gly Lys Gln Gly Thr Gly Arg Asp Asn Val
    530                 535                 540

Asp Ala Asp Lys Val Met Ile Thr Asn Glu Glu Glu Ile Lys Thr Thr
545                 550                 555                 560

Asn Pro Val Ala Thr Glu Ser Tyr Gly Gln Val Ala Thr Asn His Gln
                565                 570                 575

Ser Ala Gln Ala Gln Ala Gln Thr Gly Trp Val Gln Asn Gln Gly Ile
            580                 585                 590

Leu Pro Gly Met Val Trp Gln Asp Arg Asp Val Tyr Leu Gln Gly Pro
        595                 600                 605

Ile Trp Ala Lys Ile Pro His Thr Asp Gly Asn Phe His Pro Ser Pro
    610                 615                 620

Leu Met Gly Gly Phe Gly Met Lys His Pro Pro Gln Ile Leu Ile
625                 630                 635                 640

Lys Asn Thr Pro Val Pro Ala Asp Pro Pro Thr Ala Phe Asn Lys Asp
                645                 650                 655

Lys Leu Asn Ser Phe Ile Thr Gln Tyr Ser Thr Gly Gln Val Ser Val
            660                 665                 670

Glu Ile Glu Trp Glu Leu Gln Lys Glu Asn Ser Lys Arg Trp Asn Pro
        675                 680                 685

Glu Ile Gln Tyr Thr Ser Asn Tyr Tyr Lys Ser Asn Asn Val Glu Phe
    690                 695                 700

Ala Val Asn Thr Glu Gly Val Tyr Ser Glu Pro Arg Pro Ile Gly Thr
705                 710                 715                 720

Arg Tyr Leu Thr Arg Asn Leu
                725

<210> SEQ ID NO 439
<211> LENGTH: 727
<212> TYPE: PRT
<213> ORGANISM: Artificial Sequence
<220> FEATURE:
<223> OTHER INFORMATION: Recombinant AAV capsid protein

<400> SEQUENCE: 439

Met Ala Ala Asp Gly Tyr Leu Pro Asp Trp Leu Glu Asp Asn Leu Ser
```

-continued

```
1               5                   10                  15
Glu Gly Ile Arg Glu Trp Trp Ala Leu Lys Pro Gly Ala Pro Gln Pro
                20                  25                  30
Lys Ala Asn Gln Gln His Gln Asp Asn Ala Arg Gly Leu Val Leu Pro
                35                  40                  45
Gly Tyr Lys Tyr Leu Gly Pro Gly Asn Gly Leu Asp Lys Gly Glu Pro
        50                  55                  60
Val Asn Ala Ala Asp Ala Ala Ala Leu Glu His Asp Lys Ala Tyr Asp
65                  70                  75                  80
Gln Gln Leu Glu Ala Gly Asp Asn Pro Tyr Leu Lys Tyr Asn His Ala
                85                  90                  95
Asp Ala Glu Phe Gln Glu Lys Leu Ala Asp Asp Thr Ser Phe Gly Gly
                100                 105                 110
Asn Leu Gly Lys Ala Val Phe Gln Ala Lys Lys Arg Val Leu Glu Pro
                115                 120                 125
Phe Gly Leu Val Glu Glu Gly Ala Lys Thr Ala Pro Thr Gly Lys Arg
        130                 135                 140
Ile Asp Asp His Phe Pro Lys Arg Lys Lys Ala Arg Thr Glu Glu Asp
145                 150                 155                 160
Ser Lys Pro Ser Thr Ser Ser Asp Ala Glu Ala Gly Pro Ser Gly Ser
                165                 170                 175
Gln Gln Leu Gln Ile Pro Ala Gln Pro Ala Ser Ser Leu Gly Ala Asp
                180                 185                 190
Thr Met Ser Ala Gly Gly Gly Pro Leu Gly Asp Asn Asn Gln Gly
                195                 200                 205
Ala Asp Gly Val Gly Asn Ala Ser Gly Asp Trp His Cys Asp Ser Thr
        210                 215                 220
Trp Met Gly Asp Arg Val Val Thr Thr Ser Thr Arg Thr Trp Ala Leu
225                 230                 235                 240
Pro Thr Tyr Asn Asn His Leu Tyr Lys Gln Ile Ser Asn Ser Thr Ser
                245                 250                 255
Gly Gly Ser Ser Asn Asp Asn Ala Tyr Phe Gly Tyr Ser Thr Pro Trp
                260                 265                 270
Gly Tyr Phe Asp Phe Asn Arg Phe His Cys His Phe Ser Pro Arg Asp
        275                 280                 285
Trp Gln Arg Leu Ile Asn Asn Trp Gly Phe Arg Pro Lys Arg Leu
                290                 295                 300
Asn Phe Lys Leu Phe Asn Ile Gln Val Lys Glu Val Thr Asp Asn Asn
305                 310                 315                 320
Gly Val Lys Thr Ile Ala Asn Asn Leu Thr Ser Thr Val Gln Val Phe
                325                 330                 335
Thr Asp Ser Asp Tyr Gln Leu Pro Tyr Val Leu Gly Ser Ala His Glu
                340                 345                 350
Gly Cys Leu Pro Pro Phe Pro Ala Asp Val Phe Met Ile Pro Gln Tyr
        355                 360                 365
Gly Tyr Leu Thr Leu Asn Asp Gly Ser Gln Ala Val Gly Arg Ser Ser
        370                 375                 380
Phe Tyr Cys Leu Glu Tyr Phe Pro Ser Gln Met Leu Arg Thr Gly Asn
385                 390                 395                 400
Asn Phe Gln Phe Ser Tyr Glu Phe Glu Asn Val Pro Phe His Ser Ser
                405                 410                 415
Tyr Ala His Ser Gln Ser Leu Asp Arg Leu Met Asn Pro Leu Ile Asp
                420                 425                 430
```

-continued

```
Gln Tyr Leu Tyr Tyr Leu Ser Lys Thr Ile Asn Gly Ser Gly Gln Asn
            435                 440                 445

Gln Gln Thr Leu Lys Phe Ser Val Ala Gly Pro Ser Asn Met Ala Val
        450                 455                 460

Gln Gly Arg Asn Tyr Ile Pro Gly Pro Ser Tyr Arg Gln Gln Arg Val
465                 470                 475                 480

Ser Thr Thr Val Thr Gln Asn Asn Ser Glu Phe Ala Trp Pro Gly
                485                 490                 495

Ala Ser Ser Trp Ala Leu Asn Gly Arg Asn Ser Leu Met Asn Pro Gly
            500                 505                 510

Pro Ala Met Ala Ser His Lys Glu Gly Glu Asp Arg Phe Phe Pro Leu
            515                 520                 525

Ser Gly Ser Leu Ile Phe Gly Lys Gln Gly Thr Gly Arg Asp Asn Val
        530                 535                 540

Asp Ala Asp Lys Val Met Ile Thr Asn Glu Glu Ile Lys Thr Thr
545                 550                 555                 560

Asn Pro Val Ala Thr Glu Ser Tyr Gly Gln Val Ala Thr Asn His Gln
                565                 570                 575

Ser Ala Gln Ala Gln Ala Gln Thr Gly Trp Val Gln Asn Gln Gly Ile
            580                 585                 590

Leu Pro Gly Met Val Trp Gln Asp Arg Asp Val Tyr Leu Gln Gly Pro
        595                 600                 605

Ile Trp Ala Lys Ile Pro His Thr Asp Gly Asn Phe His Pro Ser Pro
610                 615                 620

Leu Met Gly Gly Phe Gly Met Lys His Pro Pro Gln Ile Leu Ile
625                 630                 635                 640

Lys Asn Thr Pro Val Pro Ala Asp Pro Pro Thr Ala Phe Asn Lys Asp
                645                 650                 655

Lys Leu Asn Ser Phe Ile Thr Gln Tyr Ser Thr Gly Gln Val Ser Val
            660                 665                 670

Glu Ile Glu Trp Glu Leu Gln Lys Glu Asn Ser Lys Arg Trp Asn Pro
        675                 680                 685

Glu Ile Gln Tyr Thr Ser Asn Tyr Tyr Lys Ser Asn Asn Val Glu Phe
        690                 695                 700

Ala Val Asn Thr Glu Gly Val Tyr Ser Glu Pro Arg Pro Ile Gly Thr
705                 710                 715                 720

Arg Tyr Leu Thr Arg Asn Leu
                725

<210> SEQ ID NO 440
<211> LENGTH: 735
<212> TYPE: PRT
<213> ORGANISM: Artificial Sequence
<220> FEATURE:
<223> OTHER INFORMATION: Recombinant AAV capsid protein

<400> SEQUENCE: 440

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
        35                  40                  45

Tyr Asn Tyr Leu Gly Pro Gly Asn Gly Leu Asp Arg Gly Glu Pro Val
    50                  55                  60
```

```
Asn Arg Ala Asp Glu Val Ala Arg Glu His Asp Ile Ser Tyr Asn Glu
 65                  70                  75                  80

Gln Leu Glu Ala Gly Asp Asn Pro Tyr Leu Lys Tyr Asn His Ala Asp
                 85                  90                  95

Ala Glu Phe Gln Glu Arg Leu Lys Glu Asp Thr Ser Phe Gly Gly Asn
                100                 105                 110

Leu Gly Arg Ala Val Phe Gln Ala Lys Lys Arg Leu Leu Glu Pro Leu
                115                 120                 125

Gly Leu Val Glu Glu Ala Ala Lys Thr Ala Pro Gly Lys Lys Arg Pro
130                 135                 140

Val Glu Gln Ser Pro Gln Pro Asp Ser Ser Ala Gly Ile Gly Lys
145                 150                 155                 160

Ser Gly Ala Gln Pro Ala Lys Lys Arg Leu Asn Phe Gly Gln Thr Gly
                165                 170                 175

Asp Thr Glu Ser Val Pro Asp Pro Gln Pro Ile Gly Glu Pro Pro Ala
                180                 185                 190

Ala Pro Ser Gly Val Gly Ser Leu Thr Met Ala Ser Gly Gly Gly Ala
                195                 200                 205

Pro Val Ala Asp Asn Asn Glu Gly Ala Asp Gly Val Gly Ser Ser Ser
210                 215                 220

Gly Asn Trp His Cys Asp Ser Gln Trp Leu Gly Asp Arg Val Ile Thr
225                 230                 235                 240

Thr Ser Thr Arg Thr Trp Ala Leu Pro Thr Tyr Asn Asn His Leu Tyr
                245                 250                 255

Lys Gln Ile Ser Asn Ser Thr Ser Gly Gly Ser Ser Asn Asp Asn Ala
                260                 265                 270

Tyr Phe Gly Tyr Ser Thr Pro Trp Gly Tyr Phe Asp Phe Asn Arg Phe
                275                 280                 285

His Cys His Phe Ser Pro Arg Asp Trp Gln Arg Leu Ile Asn Asn Asn
                290                 295                 300

Trp Gly Phe Arg Pro Lys Arg Leu Asn Phe Lys Leu Phe Asn Ile Gln
305                 310                 315                 320

Val Lys Glu Val Thr Asp Asn Asn Gly Val Lys Thr Ile Ala Asn Asn
                325                 330                 335

Leu Thr Ser Thr Val Gln Val Phe Thr Asp Ser Asp Tyr Gln Leu Pro
                340                 345                 350

Tyr Val Leu Gly Ser Ala His Glu Gly Cys Leu Pro Pro Phe Pro Ala
                355                 360                 365

Asp Val Phe Met Ile Pro Gln Tyr Gly Tyr Leu Thr Leu Asn Asp Gly
                370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Gln Phe Ser Tyr Glu Phe
                405                 410                 415

Glu Asn Val Pro Phe His Ser Ser Tyr Ala His Ser Gln Ser Leu Asp
                420                 425                 430

Arg Leu Met Asn Pro Leu Ile Asp Gln Tyr Leu Tyr Tyr Leu Ser Lys
                435                 440                 445

Thr Ile Asn Gly Ser Gly Gln Asn Gln Gln Thr Leu Lys Phe Ser Val
                450                 455                 460

Ala Gly Pro Ser Asn Met Ala Val Gln Gly Arg Asn Tyr Ile Pro Gly
465                 470                 475                 480
```

-continued

Pro Ser Tyr Arg Gln Gln Arg Val Ser Thr Thr Val Thr Gln Asn Asn
                485                 490                 495

Asn Ser Glu Phe Ala Trp Pro Gly Ala Ser Ser Trp Ala Leu Asn Gly
            500                 505                 510

Arg Asn Ser Leu Met Asn Pro Gly Pro Ala Met Ala Ser His Lys Glu
        515                 520                 525

Gly Glu Asp Arg Phe Phe Pro Leu Ser Gly Ser Leu Ile Phe Gly Lys
    530                 535                 540

Gln Gly Thr Gly Arg Asp Asn Val Asp Ala Asp Lys Val Met Ile Thr
545                 550                 555                 560

Asn Glu Glu Ile Lys Thr Thr Asn Pro Val Ala Thr Glu Ser Tyr
                565                 570                 575

Gly Gln Val Ala Thr Asn His Gln Ser Ala Gln Ala Gln Ala Gln Thr
            580                 585                 590

Gly Trp Val Gln Asn Gln Gly Ile Leu Pro Gly Met Val Trp Gln Asp
        595                 600                 605

Arg Asp Val Tyr Leu Gln Gly Pro Ile Trp Ala Lys Ile Pro His Thr
610                 615                 620

Asp Gly Asn Phe His Pro Ser Pro Leu Met Gly Gly Phe Gly Met Lys
625                 630                 635                 640

His Pro Pro Pro Gln Ile Leu Ile Lys Asn Thr Pro Val Pro Ala Asp
                645                 650                 655

Pro Pro Thr Ala Phe Asn Lys Asp Lys Leu Asn Ser Phe Ile Thr Gln
            660                 665                 670

Tyr Ser Thr Gly Gln Val Ser Val Glu Ile Glu Trp Glu Leu Gln Lys
        675                 680                 685

Glu Asn Ser Lys Arg Trp Asn Pro Glu Ile Gln Tyr Thr Ser Asn Tyr
    690                 695                 700

Tyr Lys Ser Asn Asn Val Glu Phe Ala Val Asn Thr Glu Gly Val Tyr
705                 710                 715                 720

Ser Glu Pro Arg Pro Ile Gly Thr Arg Tyr Leu Thr Arg Asn Leu
                725                 730                 735

<210> SEQ ID NO 441
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 441

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Asn Tyr Leu Gly Pro Gly Asn Gly Leu Asp Arg Gly Glu Pro
    50                  55                  60

Val Asn Arg Ala Asp Glu Val Ala Arg Glu His Asp Ile Ser Tyr Asn
65                  70                  75                  80

Glu Gln Leu Glu Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

-continued

```
Asn Leu Gly Arg Ala Val Phe Gln Ala Lys Lys Arg Leu Glu Pro
            115                 120                 125
Leu Gly Leu Val Glu Glu Ala Ala Lys Thr Ala Pro Gly Lys Lys Arg
        130                 135                 140
Pro Val Glu Gln Ser Pro Gln Glu Pro Asp Ser Ser Ala Gly Ile Gly
145                 150                 155                 160
Lys Ser Gly Ala Gln Pro Ala Lys Lys Arg Leu Asn Phe Gly Gln Thr
                165                 170                 175
Gly Asp Thr Glu Ser Val Pro Asp Pro Gln Pro Ile Gly Glu Pro Pro
            180                 185                 190
Ala Ala Pro Ser Gly Val Gly Ser Leu Thr Met Ala Ser Gly Gly Gly
        195                 200                 205
Ala Pro Val Ala Asp Asn Asn Glu Gly Ala Asp Gly Val Gly Ser Ser
210                 215                 220
Ser Gly Asn Trp His Cys Asp Ser Gln Trp Leu Gly Asp Arg Val Ile
225                 230                 235                 240
Thr Thr Ser Thr Arg Thr Trp Ala Leu Pro Thr Tyr Asn Asn His Leu
                245                 250                 255
Tyr Lys Gln Ile Ser Asn Ser Thr Ser Gly Gly Ser Ser Asn Asp Asn
            260                 265                 270
Ala Tyr Phe Gly Tyr Ser Thr Pro Trp Gly Tyr Phe Asp Phe Asn Arg
        275                 280                 285
Phe His Cys His Phe Ser Pro Arg Asp Trp Gln Arg Leu Ile Asn Asn
    290                 295                 300
Asn Trp Gly Phe Arg Pro Lys Arg Leu Asn Phe Lys Leu Phe Asn Ile
305                 310                 315                 320
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
            340                 345                 350
Pro Tyr Val Leu Gly Ser Ala His Glu Gly Cys Leu Pro Pro Phe Pro
        355                 360                 365
Ala Asp Val Phe Met Ile Pro Gln Tyr Gly Tyr Leu Thr Leu Asn Asp
370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
            420                 425                 430
Asp Arg Leu Met Asn Pro Leu Ile Asp Gln Tyr Leu Tyr Tyr Leu Ser
        435                 440                 445
Lys Thr Ile Asn Gly Ser Gly Gln Asn Gln Gln Thr Leu Lys Phe Ser
    450                 455                 460
Val Ala Gly Pro Ser Asn Met Ala Val Gln Gly Arg Asn Tyr Ile Pro
465                 470                 475                 480
Gly Pro Ser Tyr Arg Gln Gln Arg Val Ser Thr Thr Val Thr Gln Asn
                485                 490                 495
Asn Asn Ser Glu Phe Ala Trp Pro Gly Ala Ser Ser Trp Ala Leu Asn
            500                 505                 510
Gly Arg Asn Ser Leu Met Asn Pro Gly Pro Ala Met Ala Ser His Lys
        515                 520                 525
Glu Gly Glu Asp Arg Phe Phe Pro Leu Ser Gly Ser Leu Ile Phe Gly
```

```
        530             535             540
Lys Gln Gly Thr Gly Arg Asp Asn Val Asp Ala Asp Lys Val Met Ile
545                 550             555             560

Thr Asn Glu Glu Glu Ile Lys Thr Thr Asn Pro Val Ala Thr Glu Ser
                565             570             575

Tyr Gly Gln Val Ala Thr Asn His Gln Ser Ala Gln Ala Gln Ala Gln
                580             585             590

Thr Gly Trp Val Gln Asn Gln Gly Ile Leu Pro Gly Met Val Trp Gln
                595             600             605

Asp Arg Asp Val Tyr Leu Gln Gly Pro Ile Trp Ala Lys Ile Pro His
610                 615             620

Thr Asp Gly Asn Phe His Pro Ser Pro Leu Met Gly Gly Phe Gly Met
625                 630             635             640

Lys His Pro Pro Gln Ile Leu Ile Lys Asn Thr Pro Val Pro Ala
                645             650             655

Asp Pro Pro Thr Ala Phe Asn Lys Asp Lys Leu Asn Ser Phe Ile Thr
                660             665             670

Gln Tyr Ser Thr Gly Gln Val Ser Val Glu Ile Glu Trp Glu Leu Gln
                675             680             685

Lys Glu Asn Ser Lys Arg Trp Asn Pro Glu Ile Gln Tyr Thr Ser Asn
                690             695             700

Tyr Tyr Lys Ser Asn Asn Val Glu Phe Ala Val Asn Thr Glu Gly Val
705                 710             715             720

Tyr Ser Glu Pro Arg Pro Ile Gly Thr Arg Tyr Leu Thr Arg Asn Leu
                725             730             735
```

<210> SEQ ID NO 442
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 442

```
Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Lys Leu Ala Asp Asp Thr Ser Phe Gly Gly
            100                 105                 110

Asn Leu Gly Lys Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
```

-continued

```
                165                 170                 175
Gly Asp Thr Glu Ser Val Pro Asp Pro Gln Pro Ile Gly Glu Pro Pro
                    180                 185                 190

Ala Ala Pro Ser Gly Val Gly Ser Leu Thr Met Ala Ser Gly Gly Gly
                195                 200                 205

Ala Pro Val Ala Asp Asn Asn Glu Gly Ala Asp Gly Val Gly Ser Ser
            210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
                260                 265                 270

Ala Tyr Phe Gly Tyr Ser Thr Pro Trp Gly Tyr Phe Asp Phe Asn Arg
                275                 280                 285

Phe His Cys His Phe Ser Pro Arg Asp Trp Gln Arg Leu Ile Asn Asn
                290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
                340                 345                 350

Pro Tyr Val Leu Gly Ser Ala His Glu Gly Cys Leu Pro Pro Phe Pro
                355                 360                 365

Ala Asp Val Phe Met Ile Pro Gln Tyr Gly Tyr Leu Thr Leu Asn Asp
                370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
                420                 425                 430

Asp Arg Leu Met Asn Pro Leu Ile Asp Gln Tyr Leu Tyr Tyr Leu Ser
                435                 440                 445

Lys Thr Ile Asn Gly Ser Gly Gln Asn Gln Gln Thr Leu Lys Phe Ser
450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
                500                 505                 510

Gly Arg Asn Ser Leu Met Asn Pro Gly Pro Ala Met Ala Ser His Lys
                515                 520                 525

Glu Gly Glu Asp Arg Phe Phe Pro Leu Ser Gly Ser Leu Ile Phe Gly
                530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
                580                 585                 590
```

```
Thr Gly Trp Val Gln Asn Gln Gly Ile Leu Pro Gly Met Val Trp Gln
        595                 600                 605
Asp Arg Asp Val Tyr Leu Gln Gly Pro Ile Trp Ala Lys Ile Pro His
    610                 615                 620
Thr Asp Gly Asn Phe His Pro Ser Pro Leu Met Gly Gly Phe Gly Met
625                 630                 635                 640
Lys His Pro Pro Gln Ile Leu Ile Lys Asn Thr Pro Val Pro Ala
                645                 650                 655
Asp Pro Pro Thr Ala Phe Asn Lys Asp Lys Leu Asn Ser Phe Ile Thr
                660                 665                 670
Gln Tyr Ser Thr Gly Gln Val Ser Val Glu Ile Glu Trp Glu Leu Gln
            675                 680                 685
Lys Glu Asn Ser Lys Arg Trp Asn Pro Glu Ile Gln Tyr Thr Ser Asn
        690                 695                 700
Tyr Tyr Lys Ser Asn Asn Val Glu Phe Ala Val Asn Thr Glu Gly Val
705                 710                 715                 720
Tyr Ser Glu Pro Arg Pro Ile Gly Thr Arg Tyr Leu Thr Arg Asn Leu
                725                 730                 735
```

```
<210> SEQ ID NO 443
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 443
```

```
Met Ala Ala Asp Gly Tyr Leu Pro Asp Trp Leu Glu Asp Asn Leu Ser
1               5                   10                  15
Glu Gly Ile Arg Glu Trp Trp Ala Leu Lys Pro Gly Ala Pro Gln Pro
            20                  25                  30
Lys Ala Asn Gln Gln His Gln Asp Asn Ala Arg Gly Leu Val Leu Pro
        35                  40                  45
Gly Tyr Lys Tyr Leu Gly Pro Gly Asn Gly Leu Asp Lys Gly Glu Pro
    50                  55                  60
Val Asn Ala Ala Asp Ala Ala Ala Leu Glu His Asp Lys Ala Tyr Asp
65                  70                  75                  80
Gln Gln Leu Lys Ala Gly Asp Asn Pro Tyr Leu Lys Tyr Asn His Ala
                85                  90                  95
Asp Ala Glu Phe Gln Glu Lys Leu Ala Asp Asp Thr Ser Phe Gly Gly
            100                 105                 110
Asn Leu Gly Lys Ala Val Phe Gln Ala Lys Lys Arg Val Leu Glu Pro
        115                 120                 125
Leu Gly Leu Val Glu Glu Ala Ala Lys Thr Ala Pro Gly Lys Lys Arg
    130                 135                 140
Pro Val Glu Gln Ser Pro Gln Glu Pro Asp Ser Ser Ala Gly Ile Gly
145                 150                 155                 160
Lys Ser Gly Ala Gln Pro Ala Lys Lys Arg Leu Asn Phe Gly Gln Thr
                165                 170                 175
Gly Asp Thr Glu Ser Val Pro Asp Pro Gln Pro Ile Gly Glu Pro Pro
            180                 185                 190
Ala Ala Pro Ser Gly Val Gly Ser Leu Thr Met Ala Ser Gly Gly Gly
        195                 200                 205
Ala Pro Val Ala Asp Asn Asn Glu Gly Ala Asp Gly Val Gly Ser Ser
    210                 215                 220
```

```
Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
            245                 250                 255

Tyr Lys Gln Ile Ser Asn Ser Thr Ser Gly Ser Ser Asn Asp Asn
                260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
        290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
                420                 425                 430

Asp Arg Leu Met Asn Pro Leu Ile Asp Gln Tyr Leu Tyr Tyr Leu Ser
            435                 440                 445

Lys Thr Ile Asn Gly Ser Gly Gln Asn Gln Gln Thr Leu Lys Phe Ser
450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
            515                 520                 525

Glu Gly Glu Asp Arg Phe Phe Pro Leu Ser Gly Ser Leu Ile Phe Gly
            530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
                580                 585                 590

Thr Gly Trp Val Gln Asn Gln Gly Ile Leu Pro Gly Met Val Trp Gln
            595                 600                 605

Asp Arg Asp Val Tyr Leu Gln Gly Pro Ile Trp Ala Lys Ile Pro His
            610                 615                 620

Thr Asp Gly Asn Phe His Pro Ser Pro Leu Met Gly Gly Phe Gly Met
625                 630                 635                 640
```

```
Lys His Pro Pro Gln Ile Leu Ile Lys Asn Thr Pro Val Pro Ala
            645                 650                 655

Asp Pro Pro Thr Ala Phe Asn Lys Asp Lys Leu Asn Ser Phe Ile Thr
        660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
        690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735
```

<210> SEQ ID NO 444
<211> LENGTH: 735
<212> TYPE: PRT
<213> ORGANISM: Artificial Sequence
<220> FEATURE:
<223> OTHER INFORMATION: Recombinant AAV capsid protein

<400> SEQUENCE: 444

```
Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
        35                  40                  45

Tyr Asn Tyr Leu Gly Pro Gly Asn Gly Leu Asp Arg Gly Glu Pro Val
    50                  55                  60

Asn Ala Ala Asp Ala Ala Ala Leu Glu His Asp Lys Ala Tyr Asp Gln
65                  70                  75                  80

Gln Leu Lys Ala Gly Asp Asn Pro Tyr Leu Lys Tyr Asn His Ala Asp
                85                  90                  95

Ala Glu Phe Gln Glu Arg Leu Lys Glu Asp Thr Ser Phe Gly Gly Asn
            100                 105                 110

Leu Gly Arg Ala Val Phe Gln Ala Lys Lys Arg Leu Leu Glu Pro Leu
        115                 120                 125

Gly Leu Val Glu Glu Ala Ala Lys Thr Ala Pro Gly Lys Lys Arg Pro
    130                 135                 140

Val Glu Gln Ser Pro Gln Glu Pro Asp Ser Ser Ala Gly Ile Gly Lys
145                 150                 155                 160

Ser Gly Ala Gln Pro Ala Lys Lys Arg Leu Asn Phe Gly Gln Thr Gly
                165                 170                 175

Asp Thr Glu Ser Val Pro Asp Pro Gln Pro Ile Gly Glu Pro Pro Ala
            180                 185                 190

Ala Pro Ser Gly Val Gly Ser Leu Thr Met Ala Ser Gly Gly Gly Ala
        195                 200                 205

Pro Val Ala Asp Asn Asn Glu Gly Ala Asp Gly Val Gly Ser Ser Ser
    210                 215                 220

Gly Asn Trp His Cys Asp Ser Gln Trp Leu Gly Asp Arg Val Ile Thr
225                 230                 235                 240

Thr Ser Thr Arg Thr Trp Ala Leu Pro Thr Tyr Asn Asn His Leu Tyr
                245                 250                 255

Lys Gln Ile Ser Asn Ser Thr Ser Gly Gly Ser Ser Asn Asp Asn Ala
            260                 265                 270
```

```
Tyr Phe Gly Tyr Ser Thr Pro Trp Gly Tyr Phe Asp Phe Asn Arg Phe
            275                 280                 285

His Cys His Phe Ser Pro Arg Asp Trp Gln Arg Leu Ile Asn Asn Asn
        290                 295                 300

Trp Gly Phe Arg Pro Lys Arg Leu Asn Phe Lys Leu Phe Asn Ile Gln
305                 310                 315                 320

Val Lys Glu Val Thr Asp Asn Asn Gly Val Lys Thr Ile Ala Asn Asn
                325                 330                 335

Leu Thr Ser Thr Val Gln Val Phe Thr Asp Ser Asp Tyr Gln Leu Pro
            340                 345                 350

Tyr Val Leu Gly Ser Ala His Glu Gly Cys Leu Pro Pro Phe Pro Ala
        355                 360                 365

Asp Val Phe Met Ile Pro Gln Tyr Gly Tyr Leu Thr Leu Asn Asp Gly
370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Gln Phe Ser Tyr Glu Phe
                405                 410                 415

Glu Asn Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Ser Lys
        435                 440                 445

Thr Ile Asn Gly Ser Gly Gln Asn Gln Gln Thr Leu Lys Phe Ser Val
450                 455                 460

Ala Gly Pro Ser Asn Met Ala Val Gln Gly Arg Asn Tyr Ile Pro Gly
465                 470                 475                 480

Pro Ser Tyr Arg Gln Gln Arg Val Ser Thr Thr Val Thr Gln Asn Asn
                485                 490                 495

Asn Ser Glu Phe Ala Trp Pro Gly Ala Ser Ser Trp Ala Leu Asn Gly
            500                 505                 510

Arg Asn Ser Leu Met Asn Pro Gly Pro Ala Met Ala Ser His Lys Glu
        515                 520                 525

Gly Glu Asp Arg Phe Phe Pro Leu Ser Gly Ser Leu Ile Phe Gly Lys
530                 535                 540

Gln Gly Thr Gly Arg Asp Asn Val Asp Ala Asp Lys Val Met Ile Thr
545                 550                 555                 560

Asn Glu Glu Glu Ile Lys Thr Thr Asn Pro Val Ala Thr Glu Ser Tyr
                565                 570                 575

Gly Gln Val Ala Thr Asn His Gln Ser Ala Gln Ala Gln Ala Gln Thr
            580                 585                 590

Gly Trp Val Gln Asn Gln Gly Ile Leu Pro Gly Met Val Trp Gln Asp
        595                 600                 605

Arg Asp Val Tyr Leu Gln Gly Pro Ile Trp Ala Lys Ile Pro His Thr
610                 615                 620

Asp Gly Asn Phe His Pro Ser Pro Leu Met Gly Gly Phe Gly Met Lys
625                 630                 635                 640

His Pro Pro Pro Gln Ile Leu Ile Lys Asn Thr Pro Val Pro Ala Asp
                645                 650                 655

Pro Pro Thr Ala Phe Asn Lys Asp Lys Leu Asn Ser Phe Ile Thr Gln
            660                 665                 670

Tyr Ser Thr Gly Gln Val Ser Val Glu Ile Glu Trp Glu Leu Gln Lys
        675                 680                 685

Glu Asn Ser Lys Arg Trp Asn Pro Glu Ile Gln Tyr Thr Asn Asn Tyr
```

```
                690             695             700
Asn Asp Pro Gln Phe Val Asp Phe Ala Pro Asp Ser Thr Gly Glu Tyr
705                 710             715                 720

Arg Thr Thr Arg Pro Ile Gly Thr Arg Tyr Leu Thr Arg Pro Leu
                725             730             735
```

<210> SEQ ID NO 445
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 445

```
Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
                20                  25                  30

Lys Ala Asn Gln Gln His Gln Asp Asn Ala Arg Gly Leu Val Leu Pro
            35                  40                  45

Gly Tyr Asn Tyr Leu Gly Pro Gly Asn Gly Leu Asp Arg Gly Glu Pro
        50                  55                  60

Val Asn Arg Ala Asp Glu Val Ala Arg Glu His Asp Ile Ser Tyr Asn
65                  70                  75                  80

Glu Gln Leu Glu Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
```

```
                    325                 330                 335
Asn Leu Thr Ser Thr Val Gln Val Phe Thr Asp Ser Asp Tyr Gln Leu
                340                 345                 350

Pro Tyr Val Leu Gly Ser Ala His Glu Gly Cys Leu Pro Pro Phe Pro
            355                 360                 365

Ala Asp Val Phe Met Ile Pro Gln Tyr Gly Tyr Leu Thr Leu Asn Asp
        370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
            405                 410                 415

Phe Glu Asn Val Pro Phe His Ser Ser Tyr Ala His Ser Gln Ser Leu
        420                 425                 430

Asp Arg Leu Met Asn Pro Leu Ile Asp Gln Tyr Leu Tyr Tyr Leu Ser
            435                 440                 445

Lys Thr Ile Gly Tyr His Lys Ser Gly Ala Ala Gln Leu Lys Phe Ser
        450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Val Thr Gln Asn
            485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
            515                 520                 525

Glu Gly Glu Asp Arg Phe Phe Pro Leu Ser Gly Ser Leu Ile Phe Gly
            530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
        610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
        690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 446
```

<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 446

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Asn Tyr Leu Gly Pro Gly Asn Gly Leu Asp Arg Gly Glu Pro
    50                  55                  60

Val Asn Arg Ala Asp Glu Val Ala Arg Glu His Asp Ile Ser Tyr Asn
65                  70                  75                  80

Glu Gln Leu Glu Ala Gly Asp Asn Pro Tyr Leu Lys Tyr Asn His Ala
            85                  90                  95

Asp Ala Glu Phe Gln Glu Arg Leu Lys Glu Asp Thr Ser Phe Gly Gly
        100                 105                 110

Asn Leu Gly Arg Ala Val Phe Gln Ala Lys Lys Arg Leu Leu Glu Pro
    115                 120                 125

Leu Gly Leu Val Glu Glu Ala Lys Thr Ala Pro Gly Lys Lys Arg
130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
            165                 170                 175

Gly Asp Thr Glu Ser Val Pro Asp Pro Gln Pro Ile Gly Glu Pro Pro
        180                 185                 190

Ala Ala Pro Ser Gly Val Gly Ser Leu Thr Met Ala Ser Gly Gly Gly
    195                 200                 205

Ala Pro Val Ala Asp Asn Asn Glu Gly Ala Asp Gly Val Gly Ser Ser
210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
            245                 250                 255

Tyr Lys Gln Ile Ser Asn Ser Thr Ser Gly Gly Ser Ser Asn Asp Asn
        260                 265                 270

Ala Tyr Phe Gly Tyr Ser Thr Pro Trp Gly Tyr Phe Asp Phe Asn Arg
    275                 280                 285

Phe His Cys His Phe Ser Pro Arg Asp Trp Gln Arg Leu Ile Asn Asn
290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
            325                 330                 335

Asn Leu Thr Ser Thr Val Gln Val Phe Thr Asp Ser Asp Tyr Gln Leu
        340                 345                 350

Pro Tyr Val Leu Gly Ser Ala His Glu Gly Cys Leu Pro Pro Phe Pro
    355                 360                 365

Ala Asp Val Phe Met Ile Pro Gln Tyr Gly Tyr Leu Thr Leu Asn Asp
370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
            405                 410                 415

Phe Glu Asn Val Pro Phe His Ser Ser Tyr Ala His Ser Gln Ser Leu
        420                 425                 430

Asp Arg Leu Met Asn Pro Leu Ile Asp Gln Tyr Leu Tyr Tyr Leu Ser
    435                 440                 445

Lys Thr Ile Asn Gly Ser Gly Gln Asn Gln Gln Thr Leu Lys Phe Ser
450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
            485                 490                 495

Asn Asn Ser Glu Phe Ala Trp Pro Gly Ala Ser Ser Trp Ala Leu Asn
        500                 505                 510

Gly Arg Asn Ser Leu Met Asn Pro Gly Pro Ala Met Ala Ser His Lys
    515                 520                 525

Glu Gly Glu Asp Arg Phe Phe Pro Leu Ser Gly Ser Leu Ile Phe Gly
530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
            565                 570                 575

Tyr Gly Gln Val Ala Thr Asn His Gln Ala Asn Tyr Gly Gln Ala Gln
        580                 585                 590

Thr Gly Trp Val Gln Asn Gln Gly Ile Leu Pro Gly Met Val Trp Gln
    595                 600                 605

Asp Arg Asp Val Tyr Leu Gln Gly Pro Ile Trp Ala Lys Ile Pro His
610                 615                 620

Thr Asp Gly Asn Phe His Pro Ser Pro Leu Met Gly Gly Phe Gly Met
625                 630                 635                 640

Lys His Pro Pro Gln Ile Leu Ile Lys Asn Thr Pro Val Pro Ala
            645                 650                 655

Asp Pro Pro Thr Ala Phe Asn Lys Asp Lys Leu Asn Ser Phe Ile Thr
        660                 665                 670

Gln Tyr Ser Thr Gly Gln Val Ser Val Glu Ile Glu Trp Glu Leu Gln
    675                 680                 685

Lys Glu Asn Ser Lys Arg Trp Asn Pro Glu Ile Gln Tyr Thr Ser Asn
690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
            725                 730                 735

<210> SEQ ID NO 447
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 447

Met Ala Ala Asp Gly Tyr Leu Pro Asp Trp Leu Glu Asp Asn Leu Ser
1               5                   10                  15

-continued

Glu Gly Ile Arg Glu Trp Trp Ala Leu Lys Pro Gly Ala Pro Gln Pro
         20                  25                  30

Lys Ala Asn Gln Gln His Gln Asp Asn Ala Arg Gly Leu Val Leu Pro
         35                  40                  45

Gly Tyr Asn Tyr Leu Gly Pro Gly Asn Gly Leu Asp Arg Gly Glu Pro
 50                  55                  60

Val Asn Arg Ala Asp Glu Val Ala Arg Glu His Asp Ile Ser Tyr Asn
 65                  70                  75                  80

Glu Gln Leu Glu Ala Gly Asp Asn Pro Tyr Leu Lys Tyr Asn His Ala
             85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
            115                 120                 125

Leu Gly Leu Val Glu Glu Ala Ala Lys Thr Ala Pro Gly Lys Lys Arg
 130                 135                 140

Pro Val Glu Gln Ser Pro Gln Glu Pro Asp Ser Ser Ala Gly Ile Gly
 145                 150                 155                 160

Lys Ser Gly Ala Gln Pro Ala Lys Lys Arg Leu Asn Phe Gly Gln Thr
                 165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
            195                 200                 205

Ala Pro Val Ala Asp Asn Asn Glu Gly Ala Asp Gly Val Gly Ser Ser
 210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                 245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
            275                 280                 285

Phe His Cys His Phe Ser Pro Arg Asp Trp Gln Arg Leu Ile Asn Asn
 290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                 325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
            355                 360                 365

Ala Asp Val Phe Met Ile Pro Gln Tyr Gly Tyr Leu Thr Leu Asn Asp
 370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                 405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Leu Ser
            435                 440                 445

Lys Thr Ile Gly Tyr His Lys Ser Gly Ala Ala Gln Leu Lys Phe Ser
450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
        515                 520                 525

Glu Gly Glu Asp Arg Phe Phe Pro Leu Ser Gly Ser Leu Ile Phe Gly
530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Thr Glu Ser
                565                 570                 575

Tyr Gly Gln Val Ala Thr Asn His Gln Asn Val Ser Tyr Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
        610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 448
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 448

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Asn Tyr Leu Gly Pro Gly Asn Gly Leu Asp Arg Gly Glu Pro
    50                  55                  60

```
Val Asn Arg Ala Asp Glu Val Ala Arg Glu His Asp Ile Ser Tyr Asn
 65                  70                  75                  80

Glu Gln Leu Glu Ala Gly Asp Asn Pro Tyr Leu Lys Tyr Asn His Ala
                 85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Lys Thr Ala Pro Gly Lys Lys Arg
130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
        435                 440                 445

Lys Thr Ile Asn Gly Ser Gly Gln Asn Gln Gln Thr Leu Lys Phe Ser
450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
```

```
                485                 490                 495
Leu Asn Ser Met Leu Ile Trp Pro Gly Ala Ser Ser Trp Ala Leu Asn
            500                 505                 510

Gly Arg Asn Ser Leu Met Asn Pro Gly Pro Ala Met Ala Ser His Lys
        515                 520                 525

Glu Gly Glu Asp Arg Phe Phe Pro Leu Ser Gly Ser Leu Ile Phe Gly
    530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
            565                 570                 575

Tyr Gly Gln Val Ala Thr Asn His Gln Ser Ala Gln Ala Gln Ala Gln
        580                 585                 590

Thr Gly Trp Val Gln Asn Gln Gly Ile Leu Pro Gly Met Val Trp Gln
    595                 600                 605

Asp Arg Asp Val Tyr Leu Gln Gly Pro Ile Trp Ala Lys Ile Pro His
610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
            645                 650                 655

Asp Pro Pro Thr Ala Phe Asn Lys Asp Lys Leu Asn Ser Phe Ile Thr
        660                 665                 670

Gln Tyr Ser Thr Gly Gln Val Ser Val Glu Ile Glu Trp Glu Leu Gln
    675                 680                 685

Lys Glu Asn Ser Lys Arg Trp Asn Pro Glu Ile Gln Tyr Thr Ser Asn
690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
            725                 730                 735

<210> SEQ ID NO 449
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 449

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Asn Tyr Leu Gly Pro Gly Asn Gly Leu Asp Arg Gly Glu Pro
    50                  55                  60

Val Asn Arg Ala Asp Glu Val Ala Arg Glu His Asp Ile Ser Tyr Asn
65                  70                  75                  80

Glu Gln Leu Glu Ala Gly Asp Asn Pro Tyr Leu Lys Tyr Asn His Ala
            85                  90                  95

Asp Ala Glu Phe Gln Glu Arg Leu Lys Glu Asp Thr Ser Phe Gly Gly
        100                 105                 110

Asn Leu Gly Arg Ala Val Phe Gln Ala Lys Lys Arg Leu Leu Glu Pro
```

```
                115                 120                 125
Leu Gly Leu Val Glu Ala Ala Lys Thr Ala Pro Gly Lys Lys Arg
            130                 135                 140
Pro Val Glu Gln Ser Pro Gln Glu Pro Asp Ser Ser Ala Gly Ile Gly
145                 150                 155                 160
Lys Ser Gly Ala Gln Pro Ala Lys Lys Arg Leu Asn Phe Gly Gln Thr
                165                 170                 175
Gly Asp Thr Glu Ser Val Pro Asp Pro Gln Pro Ile Gly Glu Pro Pro
                180                 185                 190
Ala Ala Pro Ser Gly Val Gly Ser Leu Thr Met Ala Ser Gly Gly Gly
            195                 200                 205
Ala Pro Val Ala Asp Asn Asn Glu Gly Ala Asp Gly Val Gly Ser Ser
            210                 215                 220
Ser Gly Asn Trp His Cys Asp Ser Gln Trp Leu Gly Asp Arg Val Ile
225                 230                 235                 240
Thr Thr Ser Thr Arg Thr Trp Ala Leu Pro Thr Tyr Asn Asn His Leu
                245                 250                 255
Tyr Lys Gln Ile Ser Asn Ser Thr Ser Gly Gly Ser Ser Asn Asp Asn
                260                 265                 270
Ala Tyr Phe Gly Tyr Ser Thr Pro Trp Gly Tyr Phe Asp Phe Asn Arg
            275                 280                 285
Phe His Cys His Phe Ser Pro Arg Asp Trp Gln Arg Leu Ile Asn Asn
            290                 295                 300
Asn Trp Gly Phe Arg Pro Lys Arg Leu Asn Phe Lys Leu Phe Asn Ile
305                 310                 315                 320
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
                340                 345                 350
Pro Tyr Val Leu Gly Ser Ala His Glu Gly Cys Leu Pro Pro Phe Pro
            355                 360                 365
Ala Asp Val Phe Met Ile Pro Gln Tyr Gly Tyr Leu Thr Leu Asn Asp
            370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
                420                 425                 430
Asp Arg Leu Met Asn Pro Leu Ile Asp Gln Tyr Leu Tyr Tyr Leu Ser
            435                 440                 445
Lys Thr Ile Gly Tyr His Lys Ser Gly Ala Ala Gln Leu Lys Phe Ser
            450                 455                 460
Val Ala Gly Pro Ser Asn Met Ala Val Gln Gly Arg Asn Tyr Ile Pro
465                 470                 475                 480
Gly Pro Ser Tyr Arg Gln Gln Arg Val Ser Thr Thr Val Thr Gln Asn
                485                 490                 495
Asn Asn Ser Glu Phe Ala Trp Pro Gly Ala Ser Ser Trp Ala Leu Asn
            500                 505                 510
Gly Arg Asn Ser Leu Met Asn Pro Gly Pro Ala Met Ala Ser His Lys
            515                 520                 525
Glu Gly Glu Asp Arg Phe Phe Pro Leu Ser Gly Ser Leu Ile Phe Gly
            530                 535                 540
```

```
Lys Gln Gly Thr Gly Arg Asp Asn Val Asp Ala Asp Lys Val Met Ile
545                 550                 555                 560

Thr Asn Glu Glu Ile Lys Thr Thr Asn Pro Val Ala Thr Glu Ser
            565                 570                 575

Tyr Gly Gln Val Ala Thr Asn His Gln Ala Asn Tyr Gly Gln Ala Gln
            580                 585                 590

Thr Gly Trp Val Gln Asn Gln Gly Ile Leu Pro Gly Met Val Trp Gln
            595                 600                 605

Asp Arg Asp Val Tyr Leu Gln Gly Pro Ile Trp Ala Lys Ile Pro His
            610                 615                 620

Thr Asp Gly Asn Phe His Pro Ser Pro Leu Met Gly Gly Phe Gly Met
625                 630                 635                 640

Lys His Pro Pro Gln Ile Leu Ile Lys Asn Thr Pro Val Pro Ala
            645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
            675                 680                 685

Lys Glu Asn Ser Lys Arg Trp Asn Pro Glu Ile Gln Tyr Thr Ser Asn
            690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
            725                 730                 735

<210> SEQ ID NO 450
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 450

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Asn Tyr Leu Gly Pro Gly Asn Gly Leu Asp Arg Gly Glu Pro
    50                  55                  60

Val Asn Arg Ala Asp Glu Val Ala Arg Glu His Asp Ile Ser Tyr Asn
65                  70                  75                  80

Glu Gln Leu Glu Ala Gly Asp Asn Pro Tyr Leu Lys Tyr Asn His Ala
            85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
            165                 170                 175
```

```
Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
    290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
    370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
        435                 440                 445

Lys Thr Ile Asn Gly Ser Gly Gln Asn Gln Gln Thr Leu Lys Phe Ser
    450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Leu Asn Ser Met Leu Ile Trp Pro Gly Ala Ser Ser Trp Ala Leu Asn
            500                 505                 510

Gly Arg Asn Ser Leu Met Asn Pro Gly Pro Ala Met Ala Ser His Lys
        515                 520                 525

Glu Gly Glu Asp Arg Phe Phe Pro Leu Ser Gly Ser Leu Ile Phe Gly
    530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ala Asn Tyr Gly Gln Ala Gln
            580                 585                 590
```

```
Thr Gly Trp Val Gln Asn Gln Gly Ile Leu Pro Gly Met Val Trp Gln
            595                 600                 605

Asp Arg Asp Val Tyr Leu Gln Gly Pro Ile Trp Ala Lys Ile Pro His
    610                 615                 620

Thr Asp Gly Asn Phe His Pro Ser Pro Leu Met Gly Phe Gly Met
625                 630                 635                 640

Lys His Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
                660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
        690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 451
<211> LENGTH: 735
<212> TYPE: PRT
<213> ORGANISM: Artificial Sequence
<220> FEATURE:
<223> OTHER INFORMATION: Recombinant AAV capsid protein

<400> SEQUENCE: 451

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
        35                  40                  45

Tyr Asn Tyr Leu Gly Pro Gly Asn Gly Leu Asp Arg Gly Glu Pro Val
    50                  55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
                85                  90                  95

Ala Glu Phe Gln Glu Lys Leu Ala Asp Asp Thr Ser Phe Gly Gly Asn
            100                 105                 110

Leu Gly Lys Ala Val Phe Gln Ala Lys Lys Arg Val Leu Glu Pro Leu
        115                 120                 125

Gly Leu Val Glu Glu Ala Ala Lys Thr Ala Pro Gly Lys Lys Arg Pro
    130                 135                 140

Val Glu Gln Ser Pro Gln Glu Pro Asp Ser Ser Ala Gly Ile Gly Lys
145                 150                 155                 160

Ser Gly Ala Gln Pro Ala Lys Lys Arg Leu Asn Phe Gly Gln Thr Gly
                165                 170                 175

Asp Thr Glu Ser Val Pro Asp Pro Gln Pro Ile Gly Glu Pro Pro Ala
            180                 185                 190

Ala Pro Ser Gly Val Gly Ser Leu Thr Met Ala Ser Gly Gly Gly Ala
        195                 200                 205

Pro Val Ala Asp Asn Asn Glu Gly Ala Asp Gly Val Gly Ser Ser Ser
    210                 215                 220
```

-continued

```
Gly Asn Trp His Cys Asp Ser Gln Trp Leu Gly Asp Arg Val Ile Thr
225                 230                 235                 240

Thr Ser Thr Arg Thr Trp Ala Leu Pro Thr Tyr Asn Asn His Leu Tyr
                245                 250                 255

Lys Gln Ile Ser Asn Ser Thr Ser Gly Gly Ser Ser Asn Asp Asn Ala
            260                 265                 270

Tyr Phe Gly Tyr Ser Thr Pro Trp Gly Tyr Phe Asp Phe Asn Arg Phe
        275                 280                 285

His Cys His Phe Ser Pro Arg Asp Trp Gln Arg Leu Ile Asn Asn Asn
    290                 295                 300

Trp Gly Phe Arg Pro Lys Arg Leu Asn Phe Lys Leu Phe Asn Ile Gln
305                 310                 315                 320

Val Lys Glu Val Thr Asp Asn Asn Gly Val Lys Thr Ile Ala Asn Asn
                325                 330                 335

Leu Thr Ser Thr Val Gln Val Phe Thr Asp Ser Asp Tyr Gln Leu Pro
            340                 345                 350

Tyr Val Leu Gly Ser Ala His Glu Gly Cys Leu Pro Pro Phe Pro Ala
        355                 360                 365

Asp Val Phe Met Ile Pro Gln Tyr Gly Tyr Leu Thr Leu Asn Asp Gly
    370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Gln Phe Ser Tyr Glu Phe
                405                 410                 415

Glu Asn Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Ser Lys
        435                 440                 445

Thr Ile Gly Tyr His Lys Ser Gly Ala Ala Gln Leu Lys Phe Ser Val
    450                 455                 460

Ala Gly Pro Ser Asn Met Ala Val Gln Gly Arg Asn Tyr Ile Pro Gly
465                 470                 475                 480

Pro Ser Tyr Arg Gln Gln Arg Val Ser Thr Thr Val Thr Gln Asn Asn
                485                 490                 495

Asn Ser Glu Phe Ala Trp Pro Gly Ala Ser Ser Trp Ala Leu Asn Gly
            500                 505                 510

Arg Asn Ser Leu Met Asn Pro Gly Pro Ala Met Ala Ser His Lys Glu
        515                 520                 525

Gly Glu Asp Arg Phe Phe Pro Leu Ser Gly Ser Leu Ile Phe Gly Lys
    530                 535                 540

Gln Gly Thr Gly Arg Asp Asn Val Asp Ala Asp Lys Val Met Ile Thr
545                 550                 555                 560

Asn Glu Glu Glu Ile Lys Thr Thr Asn Pro Val Ala Thr Glu Ser Tyr
                565                 570                 575

Gly Gln Val Ala Thr Asn His Gln Ser Ala Gln Ala Gln Ala Gln Thr
            580                 585                 590

Gly Trp Val Gln Asn Gln Gly Ile Leu Pro Gly Met Val Trp Gln Asp
        595                 600                 605

Arg Asp Val Tyr Leu Gln Gly Pro Ile Trp Ala Lys Ile Pro His Thr
    610                 615                 620

Asp Gly Asn Phe His Pro Ser Pro Leu Met Gly Gly Phe Gly Met Lys
625                 630                 635                 640

His Pro Pro Pro Gln Ile Leu Ile Lys Asn Thr Pro Val Pro Ala Asp
```

```
            645                 650                 655
Pro Pro Thr Ala Phe Asn Lys Asp Lys Leu Asn Ser Phe Ile Thr Gln
            660                 665                 670

Tyr Ser Thr Gly Gln Val Ser Val Glu Ile Glu Trp Glu Leu Lys Lys
            675                 680                 685

Glu Asn Ser Lys Arg Trp Asn Pro Glu Ile Gln Tyr Thr Ser Asn Tyr
            690                 695                 700

Tyr Lys Ser Asn Asn Val Glu Phe Ala Val Asn Thr Glu Gly Val Tyr
705                 710                 715                 720

Ser Glu Pro Arg Pro Ile Gly Thr Arg Tyr Leu Thr Arg Asn Leu
            725                 730                 735

<210> SEQ ID NO 452
<211> LENGTH: 735
<212> TYPE: PRT
<213> ORGANISM: Artificial Sequence
<220> FEATURE:
<223> OTHER INFORMATION: Recombinant AAV capsid protein

<400> SEQUENCE: 452

Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
            20                  25                  30

Pro Asn Gln Gln His Gln Asp Gln Ala Arg Gly Leu Val Leu Pro Gly
            35                  40                  45

Tyr Asn Tyr Leu Gly Pro Gly Asn Gly Leu Asp Arg Gly Glu Pro Val
        50                  55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
                85                  90                  95

Ala Glu Phe Gln Glu Lys Leu Ala Asp Asp Thr Ser Phe Gly Gly Asn
            100                 105                 110

Leu Gly Lys Ala Val Phe Gln Ala Lys Lys Arg Val Leu Glu Pro Leu
        115                 120                 125

Gly Leu Val Glu Glu Ala Ala Lys Thr Ala Pro Gly Lys Lys Arg Pro
    130                 135                 140

Val Glu Gln Ser Pro Gln Glu Pro Asp Ser Ser Ala Gly Ile Gly Lys
145                 150                 155                 160

Ser Gly Ala Gln Pro Ala Lys Lys Arg Leu Asn Phe Gly Gln Thr Gly
                165                 170                 175

Asp Thr Glu Ser Val Pro Asp Pro Gln Pro Ile Gly Glu Pro Pro Ala
            180                 185                 190

Ala Pro Ser Gly Val Gly Ser Leu Thr Met Ala Ser Gly Gly Gly Ala
        195                 200                 205

Pro Val Ala Asp Asn Asn Glu Gly Ala Asp Gly Val Gly Ser Ser Ser
    210                 215                 220

Gly Asn Trp His Cys Asp Ser Gln Trp Leu Gly Asp Arg Val Ile Thr
225                 230                 235                 240

Thr Ser Thr Arg Thr Trp Ala Leu Pro Thr Tyr Asn Asn His Leu Tyr
                245                 250                 255

Lys Gln Ile Ser Asn Ser Thr Ser Gly Gly Ser Ser Asn Asp Asn Ala
            260                 265                 270

Tyr Phe Gly Tyr Ser Thr Pro Trp Gly Tyr Phe Asp Phe Asn Arg Phe
```

```
            275                 280                 285
His Cys His Phe Ser Pro Arg Asp Trp Gln Arg Leu Ile Asn Asn Asn
290                 295                 300

Trp Gly Phe Arg Pro Lys Arg Leu Asn Phe Lys Leu Phe Asn Ile Gln
305                 310                 315                 320

Val Lys Glu Val Thr Asp Asn Asn Gly Val Lys Thr Ile Ala Asn Asn
                325                 330                 335

Leu Thr Ser Thr Val Gln Val Phe Thr Asp Ser Asp Tyr Gln Leu Pro
            340                 345                 350

Tyr Val Leu Gly Ser Ala His Glu Gly Cys Leu Pro Phe Pro Ala
        355                 360                 365

Asp Val Phe Met Ile Pro Gln Tyr Gly Tyr Leu Thr Leu Asn Asp Gly
    370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Gln Phe Ser Tyr Glu Phe
                405                 410                 415

Glu Asn Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Ser Lys
        435                 440                 445

Thr Ile Asn Gly Ser Gly Gln Asn Gln Gln Thr Leu Lys Phe Ser Val
    450                 455                 460

Ala Gly Pro Ser Asn Met Ala Val Gln Gly Arg Asn Tyr Ile Pro Gly
465                 470                 475                 480

Pro Ser Tyr Arg Gln Gln Arg Val Ser Thr Thr Val Thr Gln Asn Asn
                485                 490                 495

Asn Ser Glu Phe Ala Trp Pro Gly Ala Ser Ser Trp Ala Leu Asn Gly
            500                 505                 510

Arg Asn Ser Leu Met Asn Pro Gly Pro Ala Met Ala Ser His Lys Glu
        515                 520                 525

Gly Glu Asp Arg Phe Phe Pro Leu Ser Gly Ser Leu Ile Phe Gly Lys
    530                 535                 540

Gln Gly Thr Gly Arg Asp Asn Val Asp Ala Asp Lys Val Met Ile Thr
545                 550                 555                 560

Asn Glu Glu Glu Ile Lys Thr Thr Asn Pro Val Ala Thr Glu Ser Tyr
                565                 570                 575

Gly Gln Val Ala Thr Asn His Gln Ala Asn Tyr Gly Gln Ala Gln Thr
            580                 585                 590

Gly Trp Val Gln Asn Gln Gly Ile Leu Pro Gly Met Val Trp Gln Asp
        595                 600                 605

Arg Asp Val Tyr Leu Gln Gly Pro Ile Trp Ala Lys Ile Pro His Thr
    610                 615                 620

Asp Gly Asn Phe His Pro Ser Pro Leu Met Gly Gly Phe Gly Met Lys
625                 630                 635                 640

His Pro Pro Pro Gln Ile Leu Ile Lys Asn Thr Pro Val Pro Ala Asp
                645                 650                 655

Pro Pro Thr Ala Phe Asn Lys Asp Lys Leu Asn Ser Phe Ile Thr Gln
            660                 665                 670

Tyr Ser Thr Gly Gln Val Ser Val Glu Ile Glu Trp Glu Leu Lys Lys
        675                 680                 685

Glu Asn Ser Lys Arg Trp Asn Pro Glu Ile Gln Tyr Thr Ser Asn Tyr
    690                 695                 700
```

```
Tyr Lys Ser Asn Asn Val Glu Phe Ala Val Asn Thr Glu Gly Val Tyr
705                 710                 715                 720

Ser Glu Pro Arg Pro Ile Gly Thr Arg Tyr Leu Thr Arg Asn Leu
                725                 730                 735
```

<210> SEQ ID NO 453
<211> LENGTH: 735
<212> TYPE: PRT
<213> ORGANISM: Artificial Sequence
<220> FEATURE:
<223> OTHER INFORMATION: Recombinant AAV capsid protein

<400> SEQUENCE: 453

```
Met Ser Phe Val Asp His Pro Pro Asp Trp Leu Glu Glu Val Gly Glu
1               5                   10                  15

Gly Leu Arg Glu Phe Leu Gly Leu Glu Ala Gly Pro Pro Lys Pro Lys
                20                  25                  30

Pro Asn Gln Gln His Gln Asp Gln Ala Arg Gly Leu Val Leu Pro Gly
            35                  40                  45

Tyr Asn Tyr Leu Gly Pro Gly Asn Gly Leu Asp Arg Gly Glu Pro Val
50              55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
                85                  90                  95

Ala Glu Phe Gln Glu Lys Leu Ala Asp Asp Thr Ser Phe Gly Gly Asn
            100                 105                 110

Leu Gly Lys Ala Val Phe Gln Ala Lys Lys Arg Val Leu Glu Pro Leu
        115                 120                 125

Gly Leu Val Glu Glu Ala Ala Lys Thr Ala Pro Gly Lys Lys Arg Pro
130                 135                 140

Val Glu Gln Ser Pro Gln Glu Pro Asp Ser Ser Ala Gly Ile Gly Lys
145                 150                 155                 160

Ser Gly Ala Gln Pro Ala Lys Lys Arg Leu Asn Phe Gly Gln Thr Gly
                165                 170                 175

Asp Thr Glu Ser Val Pro Asp Pro Gln Pro Ile Gly Glu Pro Pro Ala
            180                 185                 190

Ala Pro Ser Gly Val Gly Ser Leu Thr Met Ala Ser Gly Gly Gly Ala
        195                 200                 205

Pro Val Ala Asp Asn Asn Glu Gly Ala Asp Gly Val Gly Ser Ser Ser
210                 215                 220

Gly Asn Trp His Cys Asp Ser Gln Trp Leu Gly Asp Arg Val Ile Thr
225                 230                 235                 240

Thr Ser Thr Arg Thr Trp Ala Leu Pro Thr Tyr Asn Asn His Leu Tyr
                245                 250                 255

Lys Gln Ile Ser Asn Ser Thr Ser Gly Gly Ser Ser Asn Asp Asn Ala
            260                 265                 270

Tyr Phe Gly Tyr Ser Thr Pro Trp Gly Tyr Phe Asp Phe Asn Arg Phe
        275                 280                 285

His Cys His Phe Ser Pro Arg Asp Trp Gln Arg Leu Ile Asn Asn Asn
290                 295                 300

Trp Gly Phe Arg Pro Lys Arg Leu Asn Phe Lys Leu Phe Asn Ile Gln
305                 310                 315                 320

Val Lys Glu Val Thr Asp Asn Asn Gly Val Lys Thr Ile Ala Asn Asn
                325                 330                 335
```

```
Leu Thr Ser Thr Val Gln Val Phe Thr Asp Ser Asp Tyr Gln Leu Pro
            340                 345                 350

Tyr Val Leu Gly Ser Ala His Glu Gly Cys Leu Pro Pro Phe Pro Ala
            355                 360                 365

Asp Val Phe Met Ile Pro Gln Tyr Gly Tyr Leu Thr Leu Asn Asp Gly
            370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Gln Phe Ser Tyr Glu Phe
                405                 410                 415

Glu Asn Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Ser Lys
            435                 440                 445

Thr Ile Gly Tyr His Lys Ser Gly Ala Ala Gln Leu Lys Phe Ser Val
            450                 455                 460

Ala Gly Pro Ser Asn Met Ala Val Gln Gly Arg Asn Tyr Ile Pro Gly
465                 470                 475                 480

Pro Ser Tyr Arg Gln Gln Arg Val Ser Thr Thr Val Thr Gln Asn Asn
                485                 490                 495

Asn Ser Glu Phe Ala Trp Pro Gly Ala Ser Ser Trp Ala Leu Asn Gly
            500                 505                 510

Arg Asn Ser Leu Met Asn Pro Gly Pro Ala Met Ala Ser His Lys Glu
            515                 520                 525

Gly Glu Asp Arg Phe Phe Pro Leu Ser Gly Ser Leu Ile Phe Gly Lys
            530                 535                 540

Gln Gly Thr Gly Arg Asp Asn Val Asp Ala Asp Lys Val Met Ile Thr
545                 550                 555                 560

Asn Glu Glu Glu Ile Lys Thr Thr Asn Pro Val Ala Thr Glu Ser Tyr
                565                 570                 575

Gly Gln Val Ala Thr Asn His Gln Asn Val Ser Tyr Gln Ala Gln Thr
            580                 585                 590

Gly Trp Val Gln Asn Gln Gly Ile Leu Pro Gly Met Val Trp Gln Asp
            595                 600                 605

Arg Asp Val Tyr Leu Gln Gly Pro Ile Trp Ala Lys Ile Pro His Thr
610                 615                 620

Asp Gly Asn Phe His Pro Ser Pro Leu Met Gly Gly Phe Gly Met Lys
625                 630                 635                 640

His Pro Pro Pro Gln Ile Leu Ile Lys Asn Thr Pro Val Pro Ala Asp
                645                 650                 655

Pro Pro Thr Ala Phe Asn Lys Asp Lys Leu Asn Ser Phe Ile Thr Gln
            660                 665                 670

Tyr Ser Thr Gly Gln Val Ser Val Glu Ile Glu Trp Glu Leu Lys Lys
            675                 680                 685

Glu Asn Ser Lys Arg Trp Asn Pro Glu Ile Gln Tyr Thr Ser Asn Tyr
            690                 695                 700

Tyr Lys Ser Asn Asn Val Glu Phe Ala Val Asn Thr Glu Gly Val Tyr
705                 710                 715                 720

Ser Glu Pro Arg Pro Ile Gly Thr Arg Tyr Leu Thr Arg Asn Leu
                725                 730                 735

<210> SEQ ID NO 454
<211> LENGTH: 735
```

```
<212> TYPE: PRT
<213> ORGANISM: Artificial Sequence
<220> FEATURE:
<223> OTHER INFORMATION: Recombinant AAV capsid protein

<400> SEQUENCE: 454
```

| | | | | | | | | | | | | | | |
|---|---|---|---|---|---|---|---|---|---|---|---|---|---|---|
| Met | Ser | Phe | Val | Asp | His | Pro | Pro | Asp | Trp | Leu | Glu | Glu | Val | Gly | Glu |
| 1 | | | | 5 | | | | | 10 | | | | | 15 | |
| Gly | Leu | Arg | Glu | Phe | Leu | Gly | Leu | Glu | Ala | Gly | Pro | Pro | Lys | Pro | Lys |
| | | | 20 | | | | | 25 | | | | | 30 | | |
| Pro | Asn | Gln | Gln | His | Gln | Asp | Gln | Ala | Arg | Gly | Leu | Val | Leu | Pro | Gly |
| | | 35 | | | | | 40 | | | | | 45 | | | |
| Tyr | Asn | Tyr | Leu | Gly | Pro | Gly | Asn | Gly | Leu | Asp | Arg | Gly | Glu | Pro | Val |
| | 50 | | | | | 55 | | | | | 60 | | | | |
| Asn | Arg | Ala | Asp | Glu | Val | Ala | Arg | Glu | His | Asp | Ile | Ser | Tyr | Asn | Glu |
| 65 | | | | | 70 | | | | | 75 | | | | | 80 |
| Gln | Leu | Glu | Ala | Gly | Asp | Asn | Pro | Tyr | Leu | Lys | Tyr | Asn | His | Ala | Asp |
| | | | | 85 | | | | | 90 | | | | | 95 | |
| Ala | Glu | Phe | Gln | Glu | Lys | Leu | Ala | Asp | Asp | Thr | Ser | Phe | Gly | Gly | Asn |
| | | | 100 | | | | | 105 | | | | | 110 | | |
| Leu | Gly | Lys | Ala | Val | Phe | Gln | Ala | Lys | Lys | Arg | Val | Leu | Glu | Pro | Leu |
| | | 115 | | | | | 120 | | | | | 125 | | | |
| Gly | Leu | Val | Glu | Glu | Ala | Ala | Lys | Thr | Ala | Pro | Gly | Lys | Lys | Arg | Pro |
| | 130 | | | | | 135 | | | | | 140 | | | | |
| Val | Glu | Gln | Ser | Pro | Gln | Glu | Pro | Asp | Ser | Ser | Ala | Gly | Ile | Gly | Lys |
| 145 | | | | | 150 | | | | | 155 | | | | | 160 |
| Ser | Gly | Ala | Gln | Pro | Ala | Lys | Lys | Arg | Leu | Asn | Phe | Gly | Gln | Thr | Gly |
| | | | | 165 | | | | | 170 | | | | | 175 | |
| Asp | Thr | Glu | Ser | Val | Pro | Asp | Pro | Gln | Pro | Ile | Gly | Glu | Pro | Pro | Ala |
| | | | 180 | | | | | 185 | | | | | 190 | | |
| Ala | Pro | Ser | Gly | Val | Gly | Ser | Leu | Thr | Met | Ala | Ser | Gly | Gly | Gly | Ala |
| | | 195 | | | | | 200 | | | | | 205 | | | |
| Pro | Val | Ala | Asp | Asn | Asn | Glu | Gly | Ala | Asp | Gly | Val | Gly | Ser | Ser | Ser |
| | 210 | | | | | 215 | | | | | 220 | | | | |
| Gly | Asn | Trp | His | Cys | Asp | Ser | Gln | Trp | Leu | Gly | Asp | Arg | Val | Ile | Thr |
| 225 | | | | | 230 | | | | | 235 | | | | | 240 |
| Thr | Ser | Thr | Arg | Thr | Trp | Ala | Leu | Pro | Thr | Tyr | Asn | Asn | His | Leu | Tyr |
| | | | | 245 | | | | | 250 | | | | | 255 | |
| Lys | Gln | Ile | Ser | Asn | Ser | Thr | Ser | Gly | Gly | Ser | Ser | Asn | Asp | Asn | Ala |
| | | | 260 | | | | | 265 | | | | | 270 | | |
| Tyr | Phe | Gly | Tyr | Ser | Thr | Pro | Trp | Gly | Tyr | Phe | Asp | Phe | Asn | Arg | Phe |
| | | 275 | | | | | 280 | | | | | 285 | | | |
| His | Cys | His | Phe | Ser | Pro | Arg | Asp | Trp | Gln | Arg | Leu | Ile | Asn | Asn | Asn |
| | 290 | | | | | 295 | | | | | 300 | | | | |
| Trp | Gly | Phe | Arg | Pro | Lys | Arg | Leu | Asn | Phe | Lys | Leu | Phe | Asn | Ile | Gln |
| 305 | | | | | 310 | | | | | 315 | | | | | 320 |
| Val | Lys | Glu | Val | Thr | Asp | Asn | Asn | Gly | Val | Lys | Thr | Ile | Ala | Asn | Asn |
| | | | | 325 | | | | | 330 | | | | | 335 | |
| Leu | Thr | Ser | Thr | Val | Gln | Val | Phe | Thr | Asp | Ser | Asp | Tyr | Gln | Leu | Pro |
| | | | 340 | | | | | 345 | | | | | 350 | | |
| Tyr | Val | Leu | Gly | Ser | Ala | His | Glu | Gly | Cys | Leu | Pro | Pro | Phe | Pro | Ala |
| | | 355 | | | | | 360 | | | | | 365 | | | |
| Asp | Val | Phe | Met | Ile | Pro | Gln | Tyr | Gly | Tyr | Leu | Thr | Leu | Asn | Asp | Gly |
| | 370 | | | | | 375 | | | | | 380 | | | | |

```
Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Gln Phe Ser Tyr Glu Phe
            405                 410                 415

Glu Asn Val Pro Phe His Ser Ser Tyr Ala His Ser Gln Ser Leu Asp
        420                 425                 430

Arg Leu Met Asn Pro Leu Ile Asp Gln Tyr Leu Tyr Tyr Leu Ser Lys
    435                 440                 445

Thr Ile Asn Gly Ser Gly Gln Asn Gln Gln Thr Leu Lys Phe Ser Val
450                 455                 460

Ala Gly Pro Ser Asn Met Ala Val Gln Gly Arg Asn Tyr Ile Pro Gly
465                 470                 475                 480

Pro Ser Tyr Arg Gln Gln Arg Val Ser Thr Thr Val Thr Gln Asn Leu
            485                 490                 495

Asn Ser Met Leu Ile Trp Pro Gly Ala Ser Ser Trp Ala Leu Asn Gly
        500                 505                 510

Arg Asn Ser Leu Met Asn Pro Gly Pro Ala Met Ala Ser His Lys Glu
    515                 520                 525

Gly Glu Asp Arg Phe Phe Pro Leu Ser Gly Ser Leu Ile Phe Gly Lys
530                 535                 540

Gln Gly Thr Gly Arg Asp Asn Val Asp Ala Asp Lys Val Met Ile Thr
545                 550                 555                 560

Asn Glu Glu Glu Ile Lys Thr Thr Asn Pro Val Ala Thr Glu Ser Tyr
            565                 570                 575

Gly Gln Val Ala Thr Asn His Gln Ser Ala Gln Ala Gln Ala Gln Thr
        580                 585                 590

Gly Trp Val Gln Asn Gln Gly Ile Leu Pro Gly Met Val Trp Gln Asp
    595                 600                 605

Arg Asp Val Tyr Leu Gln Gly Pro Ile Trp Ala Lys Ile Pro His Thr
610                 615                 620

Asp Gly Asn Phe His Pro Ser Pro Leu Met Gly Gly Phe Gly Met Lys
625                 630                 635                 640

His Pro Pro Pro Gln Ile Leu Ile Lys Asn Thr Pro Val Pro Ala Asp
            645                 650                 655

Pro Pro Thr Ala Phe Asn Lys Asp Lys Leu Asn Ser Phe Ile Thr Gln
        660                 665                 670

Tyr Ser Thr Gly Gln Val Ser Val Glu Ile Glu Trp Glu Leu Lys Lys
    675                 680                 685

Glu Asn Ser Lys Arg Trp Asn Pro Glu Ile Gln Tyr Thr Ser Asn Tyr
690                 695                 700

Tyr Lys Ser Asn Asn Val Glu Phe Ala Val Asn Thr Glu Gly Val Tyr
705                 710                 715                 720

Ser Glu Pro Arg Pro Ile Gly Thr Arg Tyr Leu Thr Arg Asn Leu
            725                 730                 735

<210> SEQ ID NO 455
<211> LENGTH: 735
<212> TYPE: PRT
<213> ORGANISM: Artificial Sequence
<220> FEATURE:
<223> OTHER INFORMATION: Recombinant AAV capsid protein

<400> SEQUENCE: 455

Met Ser Phe Val Asp His Pro Pro Asp Trp Leu Glu Glu Val Gly Glu
1               5                   10                  15
```

-continued

Gly Leu Arg Glu Phe Leu Gly Leu Glu Ala Gly Pro Pro Lys Pro Lys
                20                  25                  30

Pro Asn Gln Gln His Gln Asp Gln Ala Arg Gly Leu Val Leu Pro Gly
            35                  40                  45

Tyr Asn Tyr Leu Gly Pro Gly Asn Gly Leu Asp Arg Gly Glu Pro Val
        50                  55                  60

Asn Arg Ala Asp Glu Val Ala Arg Glu His Asp Ile Ser Tyr Asn Glu
65                  70                  75                  80

Gln Leu Glu Ala Gly Asp Asn Pro Tyr Leu Lys Tyr Asn His Ala Asp
                85                  90                  95

Ala Glu Phe Gln Glu Lys Leu Ala Asp Asp Thr Ser Phe Gly Gly Asn
            100                 105                 110

Leu Gly Lys Ala Val Phe Gln Ala Lys Lys Arg Val Leu Glu Pro Leu
        115                 120                 125

Gly Leu Val Glu Glu Ala Ala Lys Thr Ala Pro Gly Lys Lys Arg Pro
    130                 135                 140

Val Glu Gln Ser Pro Gln Glu Pro Asp Ser Ser Ala Gly Ile Gly Lys
145                 150                 155                 160

Ser Gly Ala Gln Pro Ala Lys Lys Arg Leu Asn Phe Gly Gln Thr Gly
                165                 170                 175

Asp Thr Glu Ser Val Pro Asp Pro Gln Pro Ile Gly Glu Pro Pro Ala
            180                 185                 190

Ala Pro Ser Gly Val Gly Ser Leu Thr Met Ala Ser Gly Gly Gly Ala
        195                 200                 205

Pro Val Ala Asp Asn Asn Glu Gly Ala Asp Gly Val Gly Ser Ser Ser
    210                 215                 220

Gly Asn Trp His Cys Asp Ser Gln Trp Leu Gly Asp Arg Val Ile Thr
225                 230                 235                 240

Thr Ser Thr Arg Thr Trp Ala Leu Pro Thr Tyr Asn Asn His Leu Tyr
                245                 250                 255

Lys Gln Ile Ser Asn Ser Thr Ser Gly Gly Ser Ser Asn Asp Asn Ala
            260                 265                 270

Tyr Phe Gly Tyr Ser Thr Pro Trp Gly Tyr Phe Asp Phe Asn Arg Phe
        275                 280                 285

His Cys His Phe Ser Pro Arg Asp Trp Gln Arg Leu Ile Asn Asn Asn
    290                 295                 300

Trp Gly Phe Arg Pro Lys Arg Leu Asn Phe Lys Leu Phe Asn Ile Gln
305                 310                 315                 320

Val Lys Glu Val Thr Asp Asn Asn Gly Val Lys Thr Ile Ala Asn Asn
                325                 330                 335

Leu Thr Ser Thr Val Gln Val Phe Thr Asp Ser Asp Tyr Gln Leu Pro
            340                 345                 350

Tyr Val Leu Gly Ser Ala His Glu Gly Cys Leu Pro Pro Phe Pro Ala
        355                 360                 365

Asp Val Phe Met Ile Pro Gln Tyr Gly Tyr Leu Thr Leu Asn Asp Gly
    370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Gln Phe Ser Tyr Glu Phe
                405                 410                 415

Glu Asn Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Ser Lys

```
                435              440              445
Thr Ile Gly Tyr His Lys Ser Gly Ala Ala Gln Leu Lys Phe Ser Val
            450              455              460
Ala Gly Pro Ser Asn Met Ala Val Gln Gly Arg Asn Tyr Ile Pro Gly
465              470              475              480
Pro Ser Tyr Arg Gln Gln Arg Val Ser Thr Thr Val Thr Gln Asn Asn
                485              490              495
Asn Ser Glu Phe Ala Trp Pro Gly Ala Ser Ser Trp Ala Leu Asn Gly
                500              505              510
Arg Asn Ser Leu Met Asn Pro Gly Pro Ala Met Ala Ser His Lys Glu
            515              520              525
Gly Glu Asp Arg Phe Phe Pro Leu Ser Gly Ser Leu Ile Phe Gly Lys
            530              535              540
Gln Gly Thr Gly Arg Asp Asn Val Asp Ala Asp Lys Val Met Ile Thr
545              550              555              560
Asn Glu Glu Glu Ile Lys Thr Thr Asn Pro Val Ala Thr Glu Ser Tyr
                565              570              575
Gly Gln Val Ala Thr Asn His Gln Ala Asn Tyr Gly Gln Ala Gln Thr
                580              585              590
Gly Trp Val Gln Asn Gln Gly Ile Leu Pro Gly Met Val Trp Gln Asp
            595              600              605
Arg Asp Val Tyr Leu Gln Gly Pro Ile Trp Ala Lys Ile Pro His Thr
610              615              620
Asp Gly Asn Phe His Pro Ser Pro Leu Met Gly Gly Phe Gly Met Lys
625              630              635              640
His Pro Pro Pro Gln Ile Leu Ile Lys Asn Thr Pro Val Pro Ala Asp
                645              650              655
Pro Pro Thr Ala Phe Asn Lys Asp Lys Leu Asn Ser Phe Ile Thr Gln
                660              665              670
Tyr Ser Thr Gly Gln Val Ser Val Glu Ile Glu Trp Glu Leu Lys Lys
            675              680              685
Glu Asn Ser Lys Arg Trp Asn Pro Glu Ile Gln Tyr Thr Ser Asn Tyr
            690              695              700
Tyr Lys Ser Asn Asn Val Glu Phe Ala Val Asn Thr Glu Gly Val Tyr
705              710              715              720
Ser Glu Pro Arg Pro Ile Gly Thr Arg Tyr Leu Thr Arg Asn Leu
                725              730              735

<210> SEQ ID NO 456
<211> LENGTH: 735
<212> TYPE: PRT
<213> ORGANISM: Artificial Sequence
<220> FEATURE:
<223> OTHER INFORMATION: Recombinant AAV capsid protein

<400> SEQUENCE: 456

Met Ser Phe Val Asp His Pro Pro Asp Trp Leu Glu Glu Val Gly Glu
1               5                   10                  15
Gly Leu Arg Glu Phe Leu Gly Leu Glu Ala Gly Pro Pro Lys Pro Lys
            20                  25                  30
Pro Asn Gln Gln His Gln Asp Gln Ala Arg Gly Leu Val Leu Pro Gly
        35                  40                  45
Tyr Asn Tyr Leu Gly Pro Gly Asn Gly Leu Asp Arg Gly Glu Pro Val
    50                  55                  60
Asn Arg Ala Asp Glu Val Ala Arg Glu His Asp Ile Ser Tyr Asn Glu
```

```
                65                  70                  75                  80
Gln Leu Glu Ala Gly Asp Asn Pro Tyr Leu Lys Tyr Asn His Ala Asp
                    85                  90                  95
Ala Glu Phe Gln Glu Lys Leu Ala Asp Asp Thr Ser Phe Gly Gly Asn
                    100                 105                 110
Leu Gly Lys Ala Val Phe Gln Ala Lys Lys Arg Val Leu Glu Pro Leu
                    115                 120                 125
Gly Leu Val Glu Glu Ala Ala Lys Thr Ala Pro Gly Lys Lys Arg Pro
    130                 135                 140
Val Glu Gln Ser Pro Gln Glu Pro Asp Ser Ser Ala Gly Ile Gly Lys
145                 150                 155                 160
Ser Gly Ala Gln Pro Ala Lys Lys Arg Leu Asn Phe Gly Gln Thr Gly
                    165                 170                 175
Asp Thr Glu Ser Val Pro Asp Pro Gln Pro Ile Gly Glu Pro Pro Ala
                    180                 185                 190
Ala Pro Ser Gly Val Gly Ser Leu Thr Met Ala Ser Gly Gly Gly Ala
                    195                 200                 205
Pro Val Ala Asp Asn Asn Glu Gly Ala Asp Gly Val Gly Ser Ser Ser
    210                 215                 220
Gly Asn Trp His Cys Asp Ser Gln Trp Leu Gly Asp Arg Val Ile Thr
225                 230                 235                 240
Thr Ser Thr Arg Thr Trp Ala Leu Pro Thr Tyr Asn Asn His Leu Tyr
                    245                 250                 255
Lys Gln Ile Ser Asn Ser Thr Ser Gly Gly Ser Ser Asn Asp Asn Ala
                    260                 265                 270
Tyr Phe Gly Tyr Ser Thr Pro Trp Gly Tyr Phe Asp Phe Asn Arg Phe
                    275                 280                 285
His Cys His Phe Ser Pro Arg Asp Trp Gln Arg Leu Ile Asn Asn Asn
        290                 295                 300
Trp Gly Phe Arg Pro Lys Arg Leu Asn Phe Lys Leu Phe Asn Ile Gln
305                 310                 315                 320
Val Lys Glu Val Thr Asp Asn Asn Gly Val Lys Thr Ile Ala Asn Asn
                    325                 330                 335
Leu Thr Ser Thr Val Gln Val Phe Thr Asp Ser Asp Tyr Gln Leu Pro
                    340                 345                 350
Tyr Val Leu Gly Ser Ala His Glu Gly Cys Leu Pro Pro Phe Pro Ala
                    355                 360                 365
Asp Val Phe Met Ile Pro Gln Tyr Gly Tyr Leu Thr Leu Asn Asp Gly
                    370                 375                 380
Ser Gln Ala Val Gly Arg Ser Ser Phe Tyr Cys Leu Glu Tyr Phe Pro
385                 390                 395                 400
Ser Gln Met Leu Arg Thr Gly Asn Asn Phe Gln Phe Ser Tyr Glu Phe
                    405                 410                 415
Glu Asn Val Pro Phe His Ser Ser Tyr Ala His Ser Gln Ser Leu Asp
                    420                 425                 430
Arg Leu Met Asn Pro Leu Ile Asp Gln Tyr Leu Tyr Tyr Leu Ser Lys
                    435                 440                 445
Thr Ile Asn Gly Ser Gly Gln Asn Gln Gln Thr Leu Lys Phe Ser Val
                    450                 455                 460
Ala Gly Pro Ser Asn Met Ala Val Gln Gly Arg Asn Tyr Ile Pro Gly
465                 470                 475                 480
Pro Ser Tyr Arg Gln Gln Arg Val Ser Thr Thr Val Thr Gln Asn Leu
                    485                 490                 495
```

```
Asn Ser Met Leu Ile Trp Pro Gly Ala Ser Ser Trp Ala Leu Asn Gly
                500                 505                 510

Arg Asn Ser Leu Met Asn Pro Gly Pro Ala Met Ala Ser His Lys Glu
            515                 520                 525

Gly Glu Asp Arg Phe Phe Pro Leu Ser Gly Ser Leu Ile Phe Gly Lys
        530                 535                 540

Gln Gly Thr Gly Arg Asp Asn Val Asp Ala Asp Lys Val Met Ile Thr
545                 550                 555                 560

Asn Glu Glu Glu Ile Lys Thr Thr Asn Pro Val Ala Thr Glu Ser Tyr
                565                 570                 575

Gly Gln Val Ala Thr Asn His Gln Ala Asn Tyr Gly Gln Ala Gln Thr
            580                 585                 590

Gly Trp Val Gln Asn Gln Gly Ile Leu Pro Gly Met Val Trp Gln Asp
        595                 600                 605

Arg Asp Val Tyr Leu Gln Gly Pro Ile Trp Ala Lys Ile Pro His Thr
610                 615                 620

Asp Gly Asn Phe His Pro Ser Pro Leu Met Gly Gly Phe Gly Met Lys
625                 630                 635                 640

His Pro Pro Pro Gln Ile Leu Ile Lys Asn Thr Pro Val Pro Ala Asp
                645                 650                 655

Pro Pro Thr Ala Phe Asn Lys Asp Lys Leu Asn Ser Phe Ile Thr Gln
            660                 665                 670

Tyr Ser Thr Gly Gln Val Ser Val Glu Ile Glu Trp Glu Leu Lys Lys
        675                 680                 685

Glu Asn Ser Lys Arg Trp Asn Pro Glu Ile Gln Tyr Thr Ser Asn Tyr
690                 695                 700

Tyr Lys Ser Asn Asn Val Glu Phe Ala Val Asn Thr Glu Gly Val Tyr
705                 710                 715                 720

Ser Glu Pro Arg Pro Ile Gly Thr Arg Tyr Leu Thr Arg Asn Leu
                725                 730                 735

<210> SEQ ID NO 457
<211> LENGTH: 727
<212> TYPE: PRT
<213> ORGANISM: Artificial Sequence
<220> FEATURE:
<223> OTHER INFORMATION: Recombinant AAV capsid protein

<400> SEQUENCE: 457

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125
```

Phe Gly Leu Val Glu Glu Gly Ala Lys Thr Ala Pro Thr Gly Lys Arg
    130                 135                 140

Ile Asp Asp His Phe Pro Lys Arg Lys Lys Ala Arg Thr Glu Glu Asp
145                 150                 155                 160

Ser Lys Pro Ser Thr Ser Ser Asp Ala Glu Ala Gly Pro Ser Gly Ser
                165                 170                 175

Gln Gln Leu Gln Ile Pro Ala Gln Pro Ala Ser Ser Leu Gly Ala Asp
                180                 185                 190

Thr Met Ser Ala Gly Gly Gly Pro Leu Gly Asp Asn Asn Glu Gly
    195                 200                 205

Ala Asp Gly Val Gly Ser Ser Gly Asn Trp His Cys Asp Ser Gln
    210                 215                 220

Trp Leu Gly Asp Arg Val Ile Thr Thr Ser Thr Arg Thr Trp Ala Leu
225                 230                 235                 240

Pro Thr Tyr Asn Asn His Leu Tyr Lys Gln Ile Ser Asn Ser Thr Ser
                245                 250                 255

Gly Gly Ser Ser Asn Asp Asn Ala Tyr Phe Gly Tyr Ser Thr Pro Trp
                260                 265                 270

Gly Tyr Phe Asp Phe Asn Arg Phe His Cys His Phe Ser Pro Arg Asp
                275                 280                 285

Trp Gln Arg Leu Ile Asn Asn Asn Trp Gly Phe Arg Pro Lys Arg Leu
    290                 295                 300

Asn Phe Lys Leu Phe Asn Ile Gln Val Lys Glu Val Thr Asp Asn Asn
305                 310                 315                 320

Gly Val Lys Thr Ile Ala Asn Asn Leu Thr Ser Thr Val Gln Val Phe
                325                 330                 335

Thr Asp Ser Asp Tyr Gln Leu Pro Tyr Val Leu Gly Ser Ala His Glu
                340                 345                 350

Gly Cys Leu Pro Pro Phe Pro Ala Asp Val Phe Met Ile Pro Gln Tyr
                355                 360                 365

Gly Tyr Leu Thr Leu Asn Asp Gly Ser Gln Ala Val Gly Arg Ser Ser
                370                 375                 380

Phe Tyr Cys Leu Glu Tyr Phe Pro Ser Gln Met Leu Arg Thr Gly Asn
385                 390                 395                 400

Asn Phe Gln Phe Ser Tyr Glu Phe Glu Asn Val Pro Phe His Ser Ser
                405                 410                 415

Tyr Ala His Ser Gln Ser Leu Asp Arg Leu Met Asn Pro Leu Ile Asp
                420                 425                 430

Gln Tyr Leu Tyr Tyr Leu Ser Lys Thr Ile Gly Tyr His Lys Ser Gly
    435                 440                 445

Ala Ala Gln Leu Lys Phe Ser Val Ala Gly Pro Ser Asn Met Ala Val
    450                 455                 460

Gln Gly Arg Asn Tyr Ile Pro Gly Pro Ser Tyr Arg Gln Gln Arg Val
465                 470                 475                 480

Ser Thr Thr Val Thr Gln Asn Asn Asn Ser Glu Phe Ala Trp Pro Gly
                485                 490                 495

Ala Ser Ser Trp Ala Leu Asn Gly Arg Asn Ser Leu Met Asn Pro Gly
                500                 505                 510

Pro Ala Met Ala Ser His Lys Glu Gly Glu Asp Arg Phe Phe Pro Leu
    515                 520                 525

Ser Gly Ser Leu Ile Phe Gly Lys Gln Gly Thr Gly Arg Asp Asn Val
    530                 535                 540

```
Asp Ala Asp Lys Val Met Ile Thr Asn Glu Glu Ile Lys Thr Thr
545                 550                 555                 560

Asn Pro Val Ala Thr Glu Ser Tyr Gly Gln Val Ala Thr Asn His Gln
                565                 570                 575

Ser Ala Gln Ala Gln Ala Gln Thr Gly Trp Val Gln Asn Gln Gly Ile
                580                 585                 590

Leu Pro Gly Met Val Trp Gln Asp Arg Asp Val Tyr Leu Gln Gly Pro
                595                 600                 605

Ile Trp Ala Lys Ile Pro His Thr Asp Gly Asn Phe His Pro Ser Pro
610                 615                 620

Leu Met Gly Gly Phe Gly Met Lys His Pro Pro Gln Ile Leu Ile
625                 630                 635                 640

Lys Asn Thr Pro Val Pro Ala Asp Pro Pro Thr Ala Phe Asn Lys Asp
                645                 650                 655

Lys Leu Asn Ser Phe Ile Thr Gln Tyr Ser Thr Gly Gln Val Ser Val
                660                 665                 670

Glu Ile Glu Trp Glu Leu Gln Lys Glu Asn Ser Lys Arg Trp Asn Pro
                675                 680                 685

Glu Ile Gln Tyr Thr Ser Asn Tyr Tyr Lys Ser Asn Asn Val Glu Phe
                690                 695                 700

Ala Val Asn Thr Glu Gly Val Tyr Ser Glu Pro Arg Pro Ile Gly Thr
705                 710                 715                 720

Arg Tyr Leu Thr Arg Asn Leu
                725

<210> SEQ ID NO 458
<211> LENGTH: 727
<212> TYPE: PRT
<213> ORGANISM: Artificial Sequence
<220> FEATURE:
<223> OTHER INFORMATION: Recombinant AAV capsid protein

<400> SEQUENCE: 458

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
                20                  25                  30

Lys Ala Asn Gln Gln His Gln Asp Asn Ala Arg Gly Leu Val Leu Pro
                35                  40                  45

Gly Tyr Lys Tyr Leu Gly Pro Gly Asn Gly Leu Asp Lys Gly Glu Pro
        50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
                100                 105                 110

Asn Leu Gly Arg Ala Val Phe Gln Ala Lys Lys Arg Leu Leu Glu Pro
                115                 120                 125

Phe Gly Leu Val Glu Glu Gly Ala Lys Thr Ala Pro Thr Gly Lys Arg
        130                 135                 140

Ile Asp Asp His Phe Pro Lys Arg Lys Lys Ala Arg Thr Glu Glu Asp
145                 150                 155                 160

Ser Lys Pro Ser Thr Ser Ser Asp Ala Glu Ala Gly Pro Ser Gly Ser
                165                 170                 175
```

```
Gln Gln Leu Gln Ile Pro Ala Gln Pro Ala Ser Ser Leu Gly Ala Asp
            180                 185                 190

Thr Met Ser Ala Gly Gly Gly Pro Leu Gly Asp Asn Asn Glu Gly
        195                 200                 205

Ala Asp Gly Val Gly Ser Ser Ser Gly Asn Trp His Cys Asp Ser Gln
    210                 215                 220

Trp Leu Gly Asp Arg Val Ile Thr Thr Ser Thr Arg Thr Trp Ala Leu
225                 230                 235                 240

Pro Thr Tyr Asn Asn His Leu Tyr Lys Gln Ile Ser Asn Ser Thr Ser
                245                 250                 255

Gly Gly Ser Ser Asn Asp Asn Ala Tyr Phe Gly Tyr Ser Thr Pro Trp
            260                 265                 270

Gly Tyr Phe Asp Phe Asn Arg Phe His Cys His Phe Ser Pro Arg Asp
        275                 280                 285

Trp Gln Arg Leu Ile Asn Asn Asn Trp Gly Phe Arg Pro Lys Arg Leu
    290                 295                 300

Asn Phe Lys Leu Phe Asn Ile Gln Val Lys Glu Val Thr Asp Asn Asn
305                 310                 315                 320

Gly Val Lys Thr Ile Ala Asn Asn Leu Thr Ser Thr Val Gln Val Phe
                325                 330                 335

Thr Asp Ser Asp Tyr Gln Leu Pro Tyr Val Leu Gly Ser Ala His Glu
            340                 345                 350

Gly Cys Leu Pro Pro Phe Pro Ala Asp Val Phe Met Ile Pro Gln Tyr
        355                 360                 365

Gly Tyr Leu Thr Leu Asn Asp Gly Ser Gln Ala Val Gly Arg Ser Ser
    370                 375                 380

Phe Tyr Cys Leu Glu Tyr Phe Pro Ser Gln Met Leu Arg Thr Gly Asn
385                 390                 395                 400

Asn Phe Gln Phe Ser Tyr Glu Phe Glu Asn Val Pro Phe His Ser Ser
                405                 410                 415

Tyr Ala His Ser Gln Ser Leu Asp Arg Leu Met Asn Pro Leu Ile Asp
            420                 425                 430

Gln Tyr Leu Tyr Tyr Leu Ser Lys Thr Ile Asn Gly Ser Gly Gln Asn
        435                 440                 445

Gln Gln Thr Leu Lys Phe Ser Val Ala Gly Pro Ser Asn Met Ala Val
    450                 455                 460

Gln Gly Arg Asn Tyr Ile Pro Gly Pro Ser Tyr Arg Gln Gln Arg Val
465                 470                 475                 480

Ser Thr Thr Val Thr Gln Asn Asn Asn Ser Glu Phe Ala Trp Pro Gly
                485                 490                 495

Ala Ser Ser Trp Ala Leu Asn Gly Arg Asn Ser Leu Met Asn Pro Gly
            500                 505                 510

Pro Ala Met Ala Ser His Lys Glu Gly Glu Asp Arg Phe Phe Pro Leu
        515                 520                 525

Ser Gly Ser Leu Ile Phe Gly Lys Gln Gly Thr Gly Arg Asp Asn Val
    530                 535                 540

Asp Ala Asp Lys Val Met Ile Thr Asn Glu Glu Glu Ile Lys Thr Thr
545                 550                 555                 560

Asn Pro Val Ala Thr Glu Ser Tyr Gly Gln Val Ala Thr Asn His Gln
                565                 570                 575

Ser Ala Gln Ala Gln Ala Gln Thr Gly Trp Val Gln Asn Gln Gly Ile
            580                 585                 590

Leu Pro Gly Met Val Trp Gln Asp Arg Asp Val Tyr Leu Gln Gly Pro
```

```
                595                 600                 605
Ile Trp Ala Lys Ile Pro His Thr Asp Gly Asn Phe His Pro Ser Pro
610                 615                 620

Leu Met Gly Gly Phe Gly Met Lys His Pro Pro Gln Ile Leu Ile
625                 630                 635                 640

Lys Asn Thr Pro Val Pro Ala Asp Pro Pro Thr Ala Phe Asn Lys Asp
                645                 650                 655

Lys Leu Asn Ser Phe Ile Thr Gln Tyr Ser Thr Gly Gln Val Ser Val
                660                 665                 670

Glu Ile Glu Trp Glu Leu Gln Lys Glu Asn Ser Lys Arg Trp Asn Pro
                675                 680                 685

Glu Ile Gln Tyr Thr Ser Asn Tyr Tyr Lys Ser Asn Asn Val Glu Phe
                690                 695                 700

Ala Val Asn Thr Glu Gly Val Tyr Ser Glu Pro Arg Pro Ile Gly Thr
705                 710                 715                 720

Arg Tyr Leu Thr Arg Asn Leu
                725

<210> SEQ ID NO 459
<211> LENGTH: 727
<212> TYPE: PRT
<213> ORGANISM: Artificial Sequence
<220> FEATURE:
<223> OTHER INFORMATION: Recombinant AAV capsid protein

<400> SEQUENCE: 459

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
                20                  25                  30

Lys Ala Asn Gln Gln His Gln Asp Asn Ala Arg Gly Leu Val Leu Pro
            35                  40                  45

Gly Tyr Lys Tyr Leu Gly Pro Gly Asn Gly Leu Asp Lys Gly Glu Pro
        50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
                100                 105                 110

Asn Leu Gly Arg Ala Val Phe Gln Ala Lys Lys Arg Leu Leu Glu Pro
            115                 120                 125

Phe Gly Leu Val Glu Glu Gly Ala Lys Thr Ala Pro Thr Gly Lys Arg
        130                 135                 140

Ile Asp Asp His Phe Pro Lys Arg Lys Lys Ala Arg Thr Glu Glu Asp
145                 150                 155                 160

Ser Lys Pro Ser Thr Ser Ser Asp Ala Glu Ala Gly Pro Ser Gly Ser
                165                 170                 175

Gln Gln Leu Gln Ile Pro Ala Gln Pro Ala Ser Ser Leu Gly Ala Asp
            180                 185                 190

Thr Met Ser Ala Gly Gly Gly Gly Pro Leu Gly Asp Asn Asn Glu Gly
        195                 200                 205

Ala Asp Gly Val Gly Ser Ser Ser Gly Asn Trp His Cys Asp Ser Gln
    210                 215                 220

Trp Leu Gly Asp Arg Val Ile Thr Thr Ser Thr Arg Thr Trp Ala Leu
```

-continued

```
            225                 230                 235                 240
Pro Thr Tyr Asn Asn His Leu Tyr Lys Gln Ile Ser Asn Ser Thr Ser
                245                 250                 255
Gly Gly Ser Ser Asn Asp Asn Ala Tyr Phe Gly Tyr Ser Thr Pro Trp
                260                 265                 270
Gly Tyr Phe Asp Phe Asn Arg Phe His Cys His Phe Ser Pro Arg Asp
            275                 280                 285
Trp Gln Arg Leu Ile Asn Asn Asn Trp Gly Phe Arg Pro Lys Arg Leu
        290                 295                 300
Asn Phe Lys Leu Phe Asn Ile Gln Val Lys Glu Val Thr Asp Asn Asn
305                 310                 315                 320
Gly Val Lys Thr Ile Ala Asn Asn Leu Thr Ser Thr Val Gln Val Phe
                325                 330                 335
Thr Asp Ser Asp Tyr Gln Leu Pro Tyr Val Leu Gly Ser Ala His Glu
                340                 345                 350
Gly Cys Leu Pro Pro Phe Pro Ala Asp Val Phe Met Ile Pro Gln Tyr
            355                 360                 365
Gly Tyr Leu Thr Leu Asn Asp Gly Ser Gln Ala Val Gly Arg Ser Ser
        370                 375                 380
Phe Tyr Cys Leu Glu Tyr Phe Pro Ser Gln Met Leu Arg Thr Gly Asn
385                 390                 395                 400
Asn Phe Gln Phe Ser Tyr Glu Phe Glu Asn Val Pro Phe His Ser Ser
                405                 410                 415
Tyr Ala His Ser Gln Ser Leu Asp Arg Leu Met Asn Pro Leu Ile Asp
                420                 425                 430
Gln Tyr Leu Tyr Tyr Leu Ser Lys Thr Ile Gly Tyr His Lys Ser Gly
            435                 440                 445
Ala Ala Gln Leu Lys Phe Ser Val Ala Gly Pro Ser Asn Met Ala Val
        450                 455                 460
Gln Gly Arg Asn Tyr Ile Pro Gly Pro Ser Tyr Arg Gln Gln Arg Val
465                 470                 475                 480
Ser Thr Thr Val Thr Gln Asn Asn Asn Ser Glu Phe Ala Trp Pro Gly
                485                 490                 495
Ala Ser Ser Trp Ala Leu Asn Gly Arg Asn Ser Leu Met Asn Pro Gly
            500                 505                 510
Pro Ala Met Ala Ser His Lys Glu Gly Glu Asp Arg Phe Phe Pro Leu
        515                 520                 525
Ser Gly Ser Leu Ile Phe Gly Lys Gln Gly Thr Gly Arg Asp Asn Val
    530                 535                 540
Asp Ala Asp Lys Val Met Ile Thr Asn Glu Glu Glu Ile Lys Thr Thr
545                 550                 555                 560
Asn Pro Val Ala Thr Glu Ser Tyr Gly Gln Val Ala Thr Asn His Gln
                565                 570                 575
Asn Val Ser Tyr Gln Ala Gln Thr Gly Trp Val Gln Asn Gln Gly Ile
            580                 585                 590
Leu Pro Gly Met Val Trp Gln Asp Arg Asp Val Tyr Leu Gln Gly Pro
        595                 600                 605
Ile Trp Ala Lys Ile Pro His Thr Asp Gly Asn Phe His Pro Ser Pro
    610                 615                 620
Leu Met Gly Gly Phe Gly Met Lys His Pro Pro Gln Ile Leu Ile
625                 630                 635                 640
Lys Asn Thr Pro Val Pro Ala Asp Pro Pro Thr Ala Phe Asn Lys Asp
            645                 650                 655
```

```
Lys Leu Asn Ser Phe Ile Thr Gln Tyr Ser Thr Gly Gln Val Ser Val
                660                 665                 670

Glu Ile Glu Trp Glu Leu Gln Lys Glu Asn Ser Lys Arg Trp Asn Pro
            675                 680                 685

Glu Ile Gln Tyr Thr Ser Asn Tyr Tyr Lys Ser Asn Asn Val Glu Phe
        690                 695                 700

Ala Val Asn Thr Glu Gly Val Tyr Ser Glu Pro Arg Pro Ile Gly Thr
705                 710                 715                 720

Arg Tyr Leu Thr Arg Asn Leu
                725

<210> SEQ ID NO 460
<211> LENGTH: 727
<212> TYPE: PRT
<213> ORGANISM: Artificial Sequence
<220> FEATURE:
<223> OTHER INFORMATION: Recombinant AAV capsid protein

<400> SEQUENCE: 460

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Phe Gly Leu Val Glu Glu Gly Ala Lys Thr Ala Pro Thr Gly Lys Arg
    130                 135                 140

Ile Asp Asp His Phe Pro Lys Arg Lys Ala Arg Thr Glu Glu Asp
145                 150                 155                 160

Ser Lys Pro Ser Thr Ser Ser Asp Ala Glu Ala Gly Pro Ser Gly Ser
                165                 170                 175

Gln Gln Leu Gln Ile Pro Ala Gln Pro Ala Ser Ser Leu Gly Ala Asp
            180                 185                 190

Thr Met Ser Ala Gly Gly Gly Gly Pro Leu Gly Asp Asn Asn Glu Gly
        195                 200                 205

Ala Asp Gly Val Gly Ser Ser Ser Gly Asn Trp His Cys Asp Ser Gln
    210                 215                 220

Trp Leu Gly Asp Arg Val Ile Thr Thr Ser Thr Arg Thr Trp Ala Leu
225                 230                 235                 240

Pro Thr Tyr Asn Asn His Leu Tyr Lys Gln Ile Ser Asn Ser Thr Ser
                245                 250                 255

Gly Gly Ser Ser Asn Asp Asn Ala Tyr Phe Gly Tyr Ser Thr Pro Trp
            260                 265                 270

Gly Tyr Phe Asp Phe Asn Arg Phe His Cys His Phe Ser Pro Arg Asp
        275                 280                 285
```

-continued

Trp Gln Arg Leu Ile Asn Asn Asn Trp Gly Phe Arg Pro Lys Arg Leu
        290                 295                 300

Asn Phe Lys Leu Phe Asn Ile Gln Val Lys Glu Val Thr Asp Asn Asn
305                 310                 315                 320

Gly Val Lys Thr Ile Ala Asn Asn Leu Thr Ser Thr Val Gln Val Phe
                325                 330                 335

Thr Asp Ser Asp Tyr Gln Leu Pro Tyr Val Leu Gly Ser Ala His Glu
            340                 345                 350

Gly Cys Leu Pro Pro Phe Pro Ala Asp Val Phe Met Ile Pro Gln Tyr
        355                 360                 365

Gly Tyr Leu Thr Leu Asn Asp Gly Ser Gln Ala Val Gly Arg Ser Ser
    370                 375                 380

Phe Tyr Cys Leu Glu Tyr Phe Pro Ser Gln Met Leu Arg Thr Gly Asn
385                 390                 395                 400

Asn Phe Gln Phe Ser Tyr Glu Phe Glu Asn Val Pro Phe His Ser Ser
                405                 410                 415

Tyr Ala His Ser Gln Ser Leu Asp Arg Leu Met Asn Pro Leu Ile Asp
            420                 425                 430

Gln Tyr Leu Tyr Tyr Leu Ser Lys Thr Ile Asn Gly Ser Gly Gln Asn
        435                 440                 445

Gln Gln Thr Leu Lys Phe Ser Val Ala Gly Pro Ser Asn Met Ala Val
450                 455                 460

Gln Gly Arg Asn Tyr Ile Pro Gly Pro Ser Tyr Arg Gln Gln Arg Val
465                 470                 475                 480

Ser Thr Thr Val Thr Gln Asn Leu Asn Ser Met Leu Ile Trp Pro Gly
                485                 490                 495

Ala Ser Ser Trp Ala Leu Asn Gly Arg Asn Ser Leu Met Asn Pro Gly
            500                 505                 510

Pro Ala Met Ala Ser His Lys Glu Gly Glu Asp Arg Phe Phe Pro Leu
        515                 520                 525

Ser Gly Ser Leu Ile Phe Gly Lys Gln Gly Thr Gly Arg Asp Asn Val
    530                 535                 540

Asp Ala Asp Lys Val Met Ile Thr Asn Glu Glu Glu Ile Lys Thr Thr
545                 550                 555                 560

Asn Pro Val Ala Thr Glu Ser Tyr Gly Gln Val Ala Thr Asn His Gln
                565                 570                 575

Ser Ala Gln Ala Gln Ala Gln Thr Gly Trp Val Gln Asn Gln Gly Ile
            580                 585                 590

Leu Pro Gly Met Val Trp Gln Asp Arg Asp Val Tyr Leu Gln Gly Pro
        595                 600                 605

Ile Trp Ala Lys Ile Pro His Thr Asp Gly Asn Phe His Pro Ser Pro
    610                 615                 620

Leu Met Gly Gly Phe Gly Met Lys His Pro Pro Gln Ile Leu Ile
625                 630                 635                 640

Lys Asn Thr Pro Val Pro Ala Asp Pro Thr Ala Phe Asn Lys Asp
                645                 650                 655

Lys Leu Asn Ser Phe Ile Thr Gln Tyr Ser Thr Gly Gln Val Ser Val
            660                 665                 670

Glu Ile Glu Trp Glu Leu Gln Lys Glu Asn Ser Lys Arg Trp Asn Pro
        675                 680                 685

Glu Ile Gln Tyr Thr Ser Asn Tyr Tyr Lys Ser Asn Asn Val Glu Phe
    690                 695                 700

```
Ala Val Asn Thr Glu Gly Val Tyr Ser Glu Pro Arg Pro Ile Gly Thr
705                 710                 715                 720

Arg Tyr Leu Thr Arg Asn Leu
                725
```

<210> SEQ ID NO 461
<211> LENGTH: 727
<212> TYPE: PRT
<213> ORGANISM: Artificial Sequence
<220> FEATURE:
<223> OTHER INFORMATION: Recombinant AAV capsid protein

<400> SEQUENCE: 461

```
Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Phe Gly Leu Val Glu Glu Gly Ala Lys Thr Ala Pro Thr Gly Lys Arg
130                 135                 140

Ile Asp Asp His Phe Pro Lys Arg Lys Lys Ala Arg Thr Glu Glu Asp
145                 150                 155                 160

Ser Lys Pro Ser Thr Ser Ser Asp Ala Glu Ala Gly Pro Ser Gly Ser
                165                 170                 175

Gln Gln Leu Gln Ile Pro Ala Gln Pro Ala Ser Ser Leu Gly Ala Asp
            180                 185                 190

Thr Met Ser Ala Gly Gly Gly Pro Leu Gly Asp Asn Asn Glu Gly
        195                 200                 205

Ala Asp Gly Val Gly Ser Ser Gly Asn Trp His Cys Asp Ser Gln
210                 215                 220

Trp Leu Gly Asp Arg Val Ile Thr Thr Ser Thr Arg Thr Trp Ala Leu
225                 230                 235                 240

Pro Thr Tyr Asn Asn His Leu Tyr Lys Gln Ile Ser Asn Ser Thr Ser
                245                 250                 255

Gly Gly Ser Ser Asn Asp Asn Ala Tyr Phe Gly Tyr Ser Thr Pro Trp
            260                 265                 270

Gly Tyr Phe Asp Phe Asn Arg Phe His Cys His Phe Ser Pro Arg Asp
        275                 280                 285

Trp Gln Arg Leu Ile Asn Asn Trp Gly Phe Arg Pro Lys Arg Leu
290                 295                 300

Asn Phe Lys Leu Phe Asn Ile Gln Val Lys Glu Val Thr Asp Asn Asn
305                 310                 315                 320

Gly Val Lys Thr Ile Ala Asn Asn Leu Thr Ser Thr Val Gln Val Phe
                325                 330                 335
```

Thr Asp Ser Asp Tyr Gln Leu Pro Tyr Val Leu Gly Ser Ala His Glu
          340                 345                 350

Gly Cys Leu Pro Pro Phe Pro Ala Asp Val Phe Met Ile Pro Gln Tyr
              355                 360                 365

Gly Tyr Leu Thr Leu Asn Asp Gly Ser Gln Ala Val Gly Arg Ser Ser
      370                 375                 380

Phe Tyr Cys Leu Glu Tyr Phe Pro Ser Gln Met Leu Arg Thr Gly Asn
385                 390                 395                 400

Asn Phe Gln Phe Ser Tyr Glu Phe Glu Asn Val Pro Phe His Ser Ser
              405                 410                 415

Tyr Ala His Ser Gln Ser Leu Asp Arg Leu Met Asn Pro Leu Ile Asp
              420                 425                 430

Gln Tyr Leu Tyr Tyr Leu Ser Lys Thr Ile Gly Tyr His Lys Ser Gly
          435                 440                 445

Ala Ala Gln Leu Lys Phe Ser Val Ala Gly Pro Ser Asn Met Ala Val
      450                 455                 460

Gln Gly Arg Asn Tyr Ile Pro Gly Pro Ser Tyr Arg Gln Gln Arg Val
465                 470                 475                 480

Ser Thr Thr Val Thr Gln Asn Asn Asn Ser Glu Phe Ala Trp Pro Gly
              485                 490                 495

Ala Ser Ser Trp Ala Leu Asn Gly Arg Asn Ser Leu Met Asn Pro Gly
          500                 505                 510

Pro Ala Met Ala Ser His Lys Glu Gly Glu Asp Arg Phe Phe Pro Leu
          515                 520                 525

Ser Gly Ser Leu Ile Phe Gly Lys Gln Gly Thr Gly Arg Asp Asn Val
530                 535                 540

Asp Ala Asp Lys Val Met Ile Thr Asn Glu Glu Glu Ile Lys Thr Thr
545                 550                 555                 560

Asn Pro Val Ala Thr Glu Ser Tyr Gly Gln Val Ala Thr Asn His Gln
              565                 570                 575

Ala Asn Tyr Gly Gln Ala Gln Thr Gly Trp Val Gln Asn Gln Gly Ile
          580                 585                 590

Leu Pro Gly Met Val Trp Gln Asp Arg Asp Val Tyr Leu Gln Gly Pro
      595                 600                 605

Ile Trp Ala Lys Ile Pro His Thr Asp Gly Asn Phe His Pro Ser Pro
610                 615                 620

Leu Met Gly Gly Phe Gly Met Lys His Pro Pro Gln Ile Leu Ile
625                 630                 635                 640

Lys Asn Thr Pro Val Pro Ala Asp Pro Pro Thr Ala Phe Asn Lys Asp
              645                 650                 655

Lys Leu Asn Ser Phe Ile Thr Gln Tyr Ser Thr Gly Gln Val Ser Val
              660                 665                 670

Glu Ile Glu Trp Glu Leu Gln Lys Glu Asn Ser Lys Arg Trp Asn Pro
          675                 680                 685

Glu Ile Gln Tyr Thr Ser Asn Tyr Tyr Lys Ser Asn Asn Val Glu Phe
          690                 695                 700

Ala Val Asn Thr Glu Gly Val Tyr Ser Glu Pro Arg Pro Ile Gly Thr
705                 710                 715                 720

Arg Tyr Leu Thr Arg Asn Leu
              725

<210> SEQ ID NO 462
<211> LENGTH: 727
<212> TYPE: PRT

<213> ORGANISM: Artificial Sequence
<220> FEATURE:
<223> OTHER INFORMATION: Recombinant AAV capsid protein

<400> SEQUENCE: 462

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Phe Gly Leu Val Glu Glu Gly Ala Lys Thr Ala Pro Thr Gly Lys Arg
    130                 135                 140

Ile Asp Asp His Phe Pro Lys Arg Lys Lys Ala Arg Thr Glu Glu Asp
145                 150                 155                 160

Ser Lys Pro Ser Thr Ser Ser Asp Ala Glu Ala Gly Pro Ser Gly Ser
                165                 170                 175

Gln Gln Leu Gln Ile Pro Ala Gln Pro Ala Ser Ser Leu Gly Ala Asp
            180                 185                 190

Thr Met Ser Ala Gly Gly Gly Pro Leu Gly Asp Asn Asn Glu Gly
        195                 200                 205

Ala Asp Gly Val Gly Ser Ser Gly Asn Trp His Cys Asp Ser Gln
    210                 215                 220

Trp Leu Gly Asp Arg Val Ile Thr Thr Ser Thr Arg Thr Trp Ala Leu
225                 230                 235                 240

Pro Thr Tyr Asn Asn His Leu Tyr Lys Gln Ile Ser Asn Ser Thr Ser
                245                 250                 255

Gly Gly Ser Ser Asn Asp Asn Ala Tyr Phe Gly Tyr Ser Thr Pro Trp
            260                 265                 270

Gly Tyr Phe Asp Phe Asn Arg Phe His Cys His Phe Ser Pro Arg Asp
        275                 280                 285

Trp Gln Arg Leu Ile Asn Asn Asn Trp Gly Phe Arg Pro Lys Arg Leu
    290                 295                 300

Asn Phe Lys Leu Phe Asn Ile Gln Val Lys Glu Val Thr Asp Asn Asn
305                 310                 315                 320

Gly Val Lys Thr Ile Ala Asn Asn Leu Thr Ser Thr Val Gln Val Phe
                325                 330                 335

Thr Asp Ser Asp Tyr Gln Leu Pro Tyr Val Leu Gly Ser Ala His Glu
            340                 345                 350

Gly Cys Leu Pro Pro Phe Pro Ala Asp Val Phe Met Ile Pro Gln Tyr
        355                 360                 365

Gly Tyr Leu Thr Leu Asn Asp Gly Ser Gln Ala Val Gly Arg Ser Ser
    370                 375                 380

Phe Tyr Cys Leu Glu Tyr Phe Pro Ser Gln Met Leu Arg Thr Gly Asn

```
                    385                 390                 395                 400
        Asn Phe Gln Phe Ser Tyr Glu Phe Glu Asn Val Pro Phe His Ser Ser
                            405                 410                 415

Tyr Ala His Ser Gln Ser Leu Asp Arg Leu Met Asn Pro Leu Ile Asp
                        420                 425                 430

Gln Tyr Leu Tyr Tyr Leu Ser Lys Thr Ile Asn Gly Ser Gly Gln Asn
                    435                 440                 445

Gln Gln Thr Leu Lys Phe Ser Val Ala Gly Pro Ser Asn Met Ala Val
                450                 455                 460

Gln Gly Arg Asn Tyr Ile Pro Gly Pro Ser Tyr Arg Gln Gln Arg Val
        465                 470                 475                 480

Ser Thr Thr Val Thr Gln Asn Leu Asn Ser Met Leu Ile Trp Pro Gly
                        485                 490                 495

Ala Ser Ser Trp Ala Leu Asn Gly Arg Asn Ser Leu Met Asn Pro Gly
                    500                 505                 510

Pro Ala Met Ala Ser His Lys Glu Gly Glu Asp Arg Phe Phe Pro Leu
                515                 520                 525

Ser Gly Ser Leu Ile Phe Gly Lys Gln Gly Thr Gly Arg Asp Asn Val
        530                 535                 540

Asp Ala Asp Lys Val Met Ile Thr Asn Glu Glu Ile Lys Thr Thr
        545                 550                 555                 560

Asn Pro Val Ala Thr Glu Ser Tyr Gly Gln Val Ala Thr Asn His Gln
                        565                 570                 575

Ala Asn Tyr Gly Gln Ala Gln Thr Gly Trp Val Gln Asn Gln Gly Ile
                    580                 585                 590

Leu Pro Gly Met Val Trp Gln Asp Arg Asp Val Tyr Leu Gln Gly Pro
                595                 600                 605

Ile Trp Ala Lys Ile Pro His Thr Asp Gly Asn Phe His Pro Ser Pro
        610                 615                 620

Leu Met Gly Gly Phe Gly Met Lys His Pro Pro Gln Ile Leu Ile
        625                 630                 635                 640

Lys Asn Thr Pro Val Pro Ala Asp Pro Pro Thr Ala Phe Asn Lys Asp
                        645                 650                 655

Lys Leu Asn Ser Phe Ile Thr Gln Tyr Ser Thr Gly Gln Val Ser Val
                    660                 665                 670

Glu Ile Glu Trp Glu Leu Gln Lys Glu Asn Ser Lys Arg Trp Asn Pro
                675                 680                 685

Glu Ile Gln Tyr Thr Ser Asn Tyr Tyr Lys Ser Asn Asn Val Glu Phe
        690                 695                 700

Ala Val Asn Thr Glu Gly Val Tyr Ser Glu Pro Arg Pro Ile Gly Thr
        705                 710                 715                 720

Arg Tyr Leu Thr Arg Asn Leu
                        725

<210> SEQ ID NO 463
<211> LENGTH: 502
<212> TYPE: PRT
<213> ORGANISM: Artificial Sequence
<220> FEATURE:
<223> OTHER INFORMATION: Recombinant AAV capsid protein
<220> FEATURE:
<221> NAME/KEY: misc_feature
<222> LOCATION: (218)..(226)
<223> OTHER INFORMATION: Xaa can be any naturally occurring amino acid
<220> FEATURE:
<221> NAME/KEY: misc_feature
<222> LOCATION: (263)..(268)
```

```
<223> OTHER INFORMATION: Xaa can be any naturally occurring amino acid
<220> FEATURE:
<221> NAME/KEY: misc_feature
<222> LOCATION: (315)..(319)
<223> OTHER INFORMATION: Xaa can be any naturally occurring amino acid
<220> FEATURE:
<221> NAME/KEY: misc_feature
<222> LOCATION: (352)..(355)
<223> OTHER INFORMATION: Xaa can be any naturally occurring amino acid

<400> SEQUENCE: 463

Leu Gly Asp Arg Val Ile Thr Thr Ser Thr Arg Thr Trp Ala Leu Pro
1               5                   10                  15

Thr Tyr Asn Asn His Leu Tyr Lys Gln Ile Ser Asn Ser Thr Ser Gly
            20                  25                  30

Gly Ser Ser Asn Asp Asn Ala Tyr Phe Gly Tyr Ser Thr Pro Trp Gly
        35                  40                  45

Tyr Phe Asp Phe Asn Arg Phe His Cys His Phe Ser Pro Arg Asp Trp
    50                  55                  60

Gln Arg Leu Ile Asn Asn Asn Trp Gly Phe Arg Pro Lys Arg Leu Asn
65                  70                  75                  80

Phe Lys Leu Phe Asn Ile Gln Val Lys Glu Val Thr Asp Asn Asn Gly
                85                  90                  95

Val Lys Thr Ile Ala Asn Asn Leu Thr Ser Thr Val Gln Val Phe Thr
            100                 105                 110

Asp Ser Asp Tyr Gln Leu Pro Tyr Val Leu Gly Ser Ala His Glu Gly
        115                 120                 125

Cys Leu Pro Pro Phe Pro Ala Asp Val Phe Met Ile Pro Gln Tyr Gly
130                 135                 140

Tyr Leu Thr Leu Asn Asp Gly Ser Gln Ala Val Gly Arg Ser Ser Phe
145                 150                 155                 160

Tyr Cys Leu Glu Tyr Phe Pro Ser Gln Met Leu Arg Thr Gly Asn Asn
                165                 170                 175

Phe Gln Phe Ser Tyr Glu Phe Glu Asn Val Pro Phe His Ser Ser Tyr
            180                 185                 190

Ala His Ser Gln Ser Leu Asp Arg Leu Met Asn Pro Leu Ile Asp Gln
        195                 200                 205

Tyr Leu Tyr Tyr Leu Ser Lys Thr Ile Xaa Xaa Xaa Xaa Xaa Xaa Xaa
    210                 215                 220

Xaa Xaa Leu Lys Phe Ser Val Ala Gly Pro Ser Asn Met Ala Val Gln
225                 230                 235                 240

Gly Arg Asn Tyr Ile Pro Gly Pro Ser Tyr Arg Gln Gln Arg Val Ser
                245                 250                 255

Thr Thr Val Thr Gln Asn Xaa Xaa Xaa Xaa Xaa Trp Pro Gly Ala
            260                 265                 270

Ser Ser Trp Ala Leu Asn Gly Arg Asn Ser Leu Met Asn Pro Gly Pro
        275                 280                 285

Ala Met Ala Ser His Lys Glu Gly Glu Asp Arg Phe Phe Pro Leu Ser
    290                 295                 300

Gly Ser Leu Ile Phe Gly Lys Gln Gly Thr Xaa Xaa Xaa Xaa Xaa Asp
305                 310                 315                 320

Ala Asp Lys Val Met Ile Thr Asn Glu Glu Ile Lys Thr Thr Asn
                325                 330                 335

Pro Val Ala Thr Glu Ser Tyr Gly Gln Val Ala Thr Asn His Gln Xaa
            340                 345                 350

Xaa Xaa Xaa Gln Ala Gln Thr Gly Trp Val Gln Asn Gln Gly Ile Leu
```

```
                355                 360                 365
Pro Gly Met Val Trp Gln Asp Arg Asp Val Tyr Leu Gln Gly Pro Ile
    370                 375                 380

Trp Ala Lys Ile Pro His Thr Asp Gly Asn Phe His Pro Ser Pro Leu
385                 390                 395                 400

Met Gly Gly Phe Gly Met Lys His Pro Pro Gln Ile Leu Ile Lys
                405                 410                 415

Asn Thr Pro Val Pro Ala Asp Pro Pro Thr Ala Phe Asn Lys Asp Lys
                420                 425                 430

Leu Asn Ser Phe Ile Thr Gln Tyr Ser Thr Gly Gln Val Ser Val Glu
                435                 440                 445

Ile Glu Trp Glu Leu Gln Lys Glu Asn Ser Lys Arg Trp Asn Pro Glu
                450                 455                 460

Ile Gln Tyr Thr Ser Asn Tyr Tyr Lys Ser Asn Asn Val Glu Phe Ala
465                 470                 475                 480

Val Asn Thr Glu Gly Val Tyr Ser Glu Pro Arg Pro Ile Gly Thr Arg
                485                 490                 495

Tyr Leu Thr Arg Asn Leu
                500

<210> SEQ ID NO 464
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 464

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
                20                  25                  30

Lys Ala Asn Gln Gln His Gln Asp Asn Ala Arg Gly Leu Val Leu Pro
                35                  40                  45

Gly Tyr Lys Tyr Leu Gly Pro Gly Asn Gly Leu Asp Lys Gly Glu Pro
            50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
                100                 105                 110

Asn Leu Gly Arg Ala Val Phe Gln Ala Lys Lys Arg Leu Leu Glu Pro
                115                 120                 125

Leu Gly Leu Val Glu Glu Ala Ala Lys Thr Ala Pro Gly Lys Lys Arg
            130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
                180                 185                 190

Ala Ala Pro Ser Gly Val Gly Ser Leu Thr Met Ala Ser Gly Gly Gly
                195                 200                 205

Ala Pro Val Ala Asp Asn Asn Glu Gly Ala Asp Gly Val Gly Ser Ser
```

-continued

```
            210                 215                 220
Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Ser Ser Asn Asp Asn
                    260                 265                 270

Ala Tyr Phe Gly Tyr Ser Thr Pro Trp Gly Tyr Phe Asp Phe Asn Arg
                275                 280                 285

Phe His Cys His Phe Ser Pro Arg Asp Trp Gln Arg Leu Ile Asn Asn
                290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
                340                 345                 350

Pro Tyr Val Leu Gly Ser Ala His Glu Gly Cys Leu Pro Pro Phe Pro
                355                 360                 365

Ala Asp Val Phe Met Ile Pro Gln Tyr Gly Tyr Leu Thr Leu Asn Asp
                370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
                420                 425                 430

Asp Arg Leu Met Asn Pro Leu Ile Asp Gln Tyr Leu Tyr Tyr Leu Ser
                435                 440                 445

Lys Thr Ile Asn Gly Ser Gly Gln Asn Gln Gln Thr Leu Lys Phe Ser
450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
                500                 505                 510

Gly Arg Asn Ser Leu Met Asn Pro Gly Pro Ala Met Ala Ser His Lys
                515                 520                 525

Glu Gly Glu Asp Arg Phe Phe Pro Leu Ser Gly Ser Leu Ile Phe Gly
                530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Asn Val Ser Tyr Gln Ala Gln
                580                 585                 590

Thr Gly Trp Val Gln Asn Gln Gly Ile Leu Pro Gly Met Val Trp Gln
                595                 600                 605

Asp Arg Asp Val Tyr Leu Gln Gly Pro Ile Trp Ala Lys Ile Pro His
                610                 615                 620

Thr Asp Gly Asn Phe His Pro Ser Pro Leu Met Gly Gly Phe Gly Met
625                 630                 635                 640
```

```
Lys His Pro Pro Gln Ile Leu Ile Lys Asn Thr Pro Val Pro Ala
            645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
            675                 680                 685

Lys Glu Asn Ser Lys Arg Trp Asn Pro Glu Ile Gln Tyr Thr Ser Asn
        690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 465
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 465

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270
```

```
Ala Tyr Phe Gly Tyr Ser Thr Pro Trp Gly Tyr Phe Asp Phe Asn Arg
            275                 280                 285

Phe His Cys His Phe Ser Pro Arg Asp Trp Gln Arg Leu Ile Asn Asn
290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
            355                 360                 365

Ala Asp Val Phe Met Ile Pro Gln Tyr Gly Tyr Leu Thr Leu Asn Asp
370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
            435                 440                 445

Lys Thr Ile Asn Gly Ser Gly Gln Asn Gln Gln Thr Leu Lys Phe Ser
450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
            515                 520                 525

Glu Gly Glu Asp Arg Phe Phe Pro Leu Ser Gly Ser Leu Ile Phe Gly
            530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Met Val Asn Gln Ala Gln
            580                 585                 590

Thr Gly Trp Val Gln Asn Gln Gly Ile Leu Pro Gly Met Val Trp Gln
            595                 600                 605

Asp Arg Asp Val Tyr Leu Gln Gly Pro Ile Trp Ala Lys Ile Pro His
610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
            675                 680                 685
```

```
Lys Glu Asn Ser Lys Arg Trp Asn Pro Glu Ile Gln Tyr Thr Ser Asn
690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
            725                 730                 735

<210> SEQ ID NO 466
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 466

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
290                 295                 300

Asn Trp Gly Phe Arg Pro Lys Arg Leu Asn Phe Lys Leu Phe Asn Ile
305                 310                 315                 320
```

-continued

```
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
            340                 345                 350
Pro Tyr Val Leu Gly Ser Ala His Glu Gly Cys Leu Pro Pro Phe Pro
        355                 360                 365
Ala Asp Val Phe Met Ile Pro Gln Tyr Gly Tyr Leu Thr Leu Asn Asp
370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
            420                 425                 430
Asp Arg Leu Met Asn Pro Leu Ile Asp Gln Tyr Leu Tyr Tyr Leu Ser
        435                 440                 445
Lys Thr Ile Asn Gly Ser Gly Gln Asn Gln Gln Thr Leu Lys Phe Ser
450                 455                 460
Val Ala Gly Pro Ser Asn Met Ala Val Gln Gly Arg Asn Tyr Ile Pro
465                 470                 475                 480
Gly Pro Ser Tyr Arg Gln Gln Arg Val Ser Thr Thr Val Thr Gln Asn
                485                 490                 495
Asn Asn Ser Glu Phe Ala Trp Pro Gly Ala Ser Ser Trp Ala Leu Asn
            500                 505                 510
Gly Arg Asn Ser Leu Met Asn Pro Gly Pro Ala Met Ala Ser His Lys
        515                 520                 525
Glu Gly Glu Asp Arg Phe Phe Pro Leu Ser Gly Ser Leu Ile Phe Gly
530                 535                 540
Lys Gln Gly Thr Gly Arg Asp Asn Val Asp Ala Asp Lys Val Met Ile
545                 550                 555                 560
Thr Asn Glu Glu Glu Ile Lys Thr Thr Asn Pro Val Ala Thr Glu Ser
                565                 570                 575
Tyr Gly Gln Val Ala Thr Asn His Gln Asn Val Gly Thr Gln Ala Gln
            580                 585                 590
Thr Gly Trp Val Gln Asn Gln Gly Ile Leu Pro Gly Met Val Trp Gln
        595                 600                 605
Asp Arg Asp Val Tyr Leu Gln Gly Pro Ile Trp Ala Lys Ile Pro His
610                 615                 620
Thr Asp Gly Asn Phe His Pro Ser Pro Leu Met Gly Gly Phe Gly Met
625                 630                 635                 640
Lys His Pro Pro Pro Gln Ile Leu Ile Lys Asn Thr Pro Val Pro Ala
                645                 650                 655
Asp Pro Pro Thr Ala Phe Asn Lys Asp Lys Leu Asn Ser Phe Ile Thr
            660                 665                 670
Gln Tyr Ser Thr Gly Gln Val Ser Val Glu Ile Glu Trp Glu Leu Gln
        675                 680                 685
Lys Glu Asn Ser Lys Arg Trp Asn Pro Glu Ile Gln Tyr Thr Ser Asn
690                 695                 700
Tyr Tyr Lys Ser Asn Asn Val Glu Phe Ala Val Asn Thr Glu Gly Val
705                 710                 715                 720
Tyr Ser Glu Pro Arg Pro Ile Gly Thr Arg Tyr Leu Thr Arg Asn Leu
                725                 730                 735
```

-continued

```
<210> SEQ ID NO 467
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 467
```

| Met | Ala | Ala | Asp | Gly | Tyr | Leu | Pro | Asp | Trp | Leu | Glu | Asp | Asn | Leu | Ser |
|---|---|---|---|---|---|---|---|---|---|---|---|---|---|---|---|
| 1 | | | | 5 | | | | | 10 | | | | | 15 | |

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
    290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp

```
                370                 375                 380
Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
                420                 425                 430

Asp Arg Leu Met Asn Pro Leu Ile Asp Gln Tyr Leu Tyr Tyr Leu Ser
            435                 440                 445

Lys Thr Ile Asn Gly Ser Gly Gln Asn Gln Gln Thr Leu Lys Phe Ser
        450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Gln Asp Ala Ser Leu Leu Trp Pro Gly Ala Ser Ser Trp Ala Leu Asn
            500                 505                 510

Gly Arg Asn Ser Leu Met Asn Pro Gly Pro Ala Met Ala Ser His Lys
        515                 520                 525

Glu Gly Glu Asp Arg Phe Phe Pro Leu Ser Gly Ser Leu Ile Phe Gly
530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735
```

<210> SEQ ID NO 468
<211> LENGTH: 736
<212> TYPE: PRT
<213> ORGANISM: Artificial Sequence
<220> FEATURE:
<223> OTHER INFORMATION: Recombinant AAV capsid protein

<400> SEQUENCE: 468

Met Ala Ala Asp Gly Tyr Leu Pro Asp Trp Leu Glu Asp Asn Leu Ser

-continued

```
1               5                   10                  15
Glu Gly Ile Arg Glu Trp Trp Ala Leu Lys Pro Gly Ala Pro Gln Pro
            20                  25                  30
Lys Ala Asn Gln Gln His Gln Asp Asn Ala Arg Gly Leu Val Leu Pro
            35                  40                  45
Gly Tyr Lys Tyr Leu Gly Pro Gly Asn Gly Leu Asp Lys Gly Glu Pro
        50                  55                  60
Val Asn Ala Ala Asp Ala Ala Leu Glu His Asp Lys Ala Tyr Asp
65                  70                  75                  80
Gln Gln Leu Lys Ala Gly Asp Asn Pro Tyr Leu Lys Tyr Asn His Ala
                85                  90                  95
Asp Ala Glu Phe Gln Glu Arg Leu Lys Glu Asp Thr Ser Phe Gly Gly
            100                 105                 110
Asn Leu Gly Arg Ala Val Phe Gln Ala Lys Lys Arg Leu Leu Glu Pro
            115                 120                 125
Leu Gly Leu Val Glu Glu Ala Ala Lys Thr Ala Pro Gly Lys Lys Arg
        130                 135                 140
Pro Val Glu Gln Ser Pro Gln Glu Pro Asp Ser Ser Ala Gly Ile Gly
145                 150                 155                 160
Lys Ser Gly Ala Gln Pro Ala Lys Lys Arg Leu Asn Phe Gly Gln Thr
                165                 170                 175
Gly Asp Thr Glu Ser Val Pro Asp Pro Gln Pro Ile Gly Glu Pro Pro
            180                 185                 190
Ala Ala Pro Ser Gly Val Gly Ser Leu Thr Met Ala Ser Gly Gly Gly
            195                 200                 205
Ala Pro Val Ala Asp Asn Asn Glu Gly Ala Asp Gly Val Gly Ser Ser
        210                 215                 220
Ser Gly Asn Trp His Cys Asp Ser Gln Trp Leu Gly Asp Arg Val Ile
225                 230                 235                 240
Thr Thr Ser Thr Arg Thr Trp Ala Leu Pro Thr Tyr Asn Asn His Leu
                245                 250                 255
Tyr Lys Gln Ile Ser Asn Ser Thr Ser Gly Gly Ser Ser Asn Asp Asn
            260                 265                 270
Ala Tyr Phe Gly Tyr Ser Thr Pro Trp Gly Tyr Phe Asp Phe Asn Arg
            275                 280                 285
Phe His Cys His Phe Ser Pro Arg Asp Trp Gln Arg Leu Ile Asn Asn
        290                 295                 300
Asn Trp Gly Phe Arg Pro Lys Arg Leu Asn Phe Lys Leu Phe Asn Ile
305                 310                 315                 320
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
            340                 345                 350
Pro Tyr Val Leu Gly Ser Ala His Glu Gly Cys Leu Pro Pro Phe Pro
            355                 360                 365
Ala Asp Val Phe Met Ile Pro Gln Tyr Gly Tyr Leu Thr Leu Asn Asp
        370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
            420                 425                 430
```

Asp Arg Leu Met Asn Pro Leu Ile Asp Gln Tyr Leu Tyr Leu Ser
            435                 440                 445

Lys Thr Ile Asn Gly Ser Gly Gln Asn Gln Gln Thr Leu Lys Phe Ser
        450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Gly Met Ser Phe Thr Trp Pro Gly Ala Ser Ser Trp Ala Leu Asn
            500                 505                 510

Gly Arg Asn Ser Leu Met Asn Pro Gly Pro Ala Met Ala Ser His Lys
        515                 520                 525

Glu Gly Glu Asp Arg Phe Phe Pro Leu Ser Gly Ser Leu Ile Phe Gly
530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 469
<211> LENGTH: 9
<212> TYPE: PRT
<213> ORGANISM: Dependoparvovirus Adeno-associated virus serotype 9

<400> SEQUENCE: 469

Asn Gly Ser Gly Gln Asn Gln Gln Thr
1               5

<210> SEQ ID NO 470
<211> LENGTH: 18
<212> TYPE: PRT
<213> ORGANISM: Dependoparvovirus Adeno-associated virus serotype 9

<400> SEQUENCE: 470

Arg Val Ser Thr Thr Val Thr Gln Asn Asn Asn Ser Glu Phe Ala Trp
1               5                   10                  15

Pro Gly

<210> SEQ ID NO 471
<211> LENGTH: 14
<212> TYPE: PRT
<213> ORGANISM: Dependoparvovirus Adeno-associated virus serotype 9

<400> SEQUENCE: 471

Lys Gln Gly Thr Gly Arg Asp Asn Val Asp Ala Asp Lys Val
1               5                   10

<210> SEQ ID NO 472
<211> LENGTH: 13
<212> TYPE: PRT
<213> ORGANISM: Dependoparvovirus Adeno-associated virus serotype 9

<400> SEQUENCE: 472

Ala Thr Asn His Gln Ser Ala Gln Ala Gln Ala Gln Thr
1               5                   10

<210> SEQ ID NO 473
<211> LENGTH: 9
<212> TYPE: PRT
<213> ORGANISM: Artificial Sequence
<220> FEATURE:
<223> OTHER INFORMATION: VR-IV protein motif
<220> FEATURE:
<221> NAME/KEY: MISC_FEATURE
<222> LOCATION: (1)..(1)
<223> OTHER INFORMATION: Xaa is Gly or Val
<220> FEATURE:
<221> NAME/KEY: MISC_FEATURE
<222> LOCATION: (2)..(2)
<223> OTHER INFORMATION: Xaa is Tyr or Ile
<220> FEATURE:
<221> NAME/KEY: MISC_FEATURE
<222> LOCATION: (3)..(3)
<223> OTHER INFORMATION: Xaa is His or Ile
<220> FEATURE:
<221> NAME/KEY: MISC_FEATURE
<222> LOCATION: (5)..(5)
<223> OTHER INFORMATION: Xaa is Ser or Ile
<220> FEATURE:
<221> NAME/KEY: MISC_FEATURE
<222> LOCATION: (7)..(7)
<223> OTHER INFORMATION: Xaa is Ala or Val

<400> SEQUENCE: 473

Xaa Xaa Xaa Lys Xaa Gly Xaa Ala Gln
1               5

<210> SEQ ID NO 474
<211> LENGTH: 6
<212> TYPE: PRT
<213> ORGANISM: Artificial Sequence
<220> FEATURE:
<223> OTHER INFORMATION: VR-V protein motif
<220> FEATURE:
<221> NAME/KEY: MISC_FEATURE
<222> LOCATION: (1)..(1)
<223> OTHER INFORMATION: Xaa is Ser, Leu, His, Asn or Ala
<220> FEATURE:
<221> NAME/KEY: MISC_FEATURE
<222> LOCATION: (2)..(2)
<223> OTHER INFORMATION: Xaa is Thr, Met, Lys, Gly or Asn
<220> FEATURE:
<221> NAME/KEY: MISC_FEATURE
<222> LOCATION: (3)..(3)
<223> OTHER INFORMATION: Xaa is Ser, Thr, Met or Ile
<220> FEATURE:
<221> NAME/KEY: MISC_FEATURE

```
<222> LOCATION: (4)..(4)
<223> OTHER INFORMATION: Xaa is Ser, Pro, Phe, Met or Asn
<220> FEATURE:
<221> NAME/KEY: MISC_FEATURE
<222> LOCATION: (5)..(5)
<223> OTHER INFORMATION: Xaa is Phe, Ser, Pro or Leu
<220> FEATURE:
<221> NAME/KEY: MISC_FEATURE
<222> LOCATION: (6)..(6)
<223> OTHER INFORMATION: Xaa is Ile, Val or Thr

<400> SEQUENCE: 474

Xaa Xaa Xaa Xaa Xaa Xaa
1               5

<210> SEQ ID NO 475
<211> LENGTH: 5
<212> TYPE: PRT
<213> ORGANISM: Artificial Sequence
<220> FEATURE:
<223> OTHER INFORMATION: VR-VII protein motif
<220> FEATURE:
<221> NAME/KEY: MISC_FEATURE
<222> LOCATION: (1)..(1)
<223> OTHER INFORMATION: Xaa is Val, Leu, Gln, Cys or Arg
<220> FEATURE:
<221> NAME/KEY: MISC_FEATURE
<222> LOCATION: (2)..(2)
<223> OTHER INFORMATION: Xaa is Ser, His, Gly, Cys or Asp
<220> FEATURE:
<221> NAME/KEY: MISC_FEATURE
<222> LOCATION: (3)..(3)
<223> OTHER INFORMATION: Xaa is Tyr, Ser, Leu, Gly or Asn
<220> FEATURE:
<221> NAME/KEY: MISC_FEATURE
<222> LOCATION: (4)..(4)
<223> OTHER INFORMATION: Xaa is Ser, Leu, His, Gln or Asn
<220> FEATURE:
<221> NAME/KEY: MISC_FEATURE
<222> LOCATION: (5)..(5)
<223> OTHER INFORMATION: Xaa is Val, Ile or Arg

<400> SEQUENCE: 475

Xaa Xaa Xaa Xaa Xaa
1               5

<210> SEQ ID NO 476
<211> LENGTH: 4
<212> TYPE: PRT
<213> ORGANISM: Artificial Sequence
<220> FEATURE:
<223> OTHER INFORMATION: VR-VIII protein motif
<220> FEATURE:
<221> NAME/KEY: MISC_FEATURE
<222> LOCATION: (1)..(1)
<223> OTHER INFORMATION: Xaa is Ser, Asn or Ala
<220> FEATURE:
<221> NAME/KEY: MISC_FEATURE
<222> LOCATION: (2)..(2)
<223> OTHER INFORMATION: Xaa is Val, Met, Asn or Ala
<220> FEATURE:
<221> NAME/KEY: MISC_FEATURE
<222> LOCATION: (3)..(3)
<223> OTHER INFORMATION: Xaa is Tyr, Val, Ser or Gly
<220> FEATURE:
<221> NAME/KEY: MISC_FEATURE
<222> LOCATION: (4)..(4)
<223> OTHER INFORMATION: Xaa is Tyr, Thr, Met, Gly or Asn

<400> SEQUENCE: 476

Xaa Xaa Xaa Xaa
1
```

```
<210> SEQ ID NO 477
<211> LENGTH: 9
<212> TYPE: PRT
<213> ORGANISM: Artificial Sequence
<220> FEATURE:
<223> OTHER INFORMATION: VR-IV variant
<220> FEATURE:
<221> NAME/KEY: MISC_FEATURE
<222> LOCATION: (1)..(1)
<223> OTHER INFORMATION: Xaa is Gly, Ser or Val
<220> FEATURE:
<221> NAME/KEY: MISC_FEATURE
<222> LOCATION: (2)..(2)
<223> OTHER INFORMATION: Xaa is Tyr, Gln or Ile
<220> FEATURE:
<221> NAME/KEY: MISC_FEATURE
<222> LOCATION: (3)..(3)
<223> OTHER INFORMATION: Xaa is His, Trp, Val or Ile
<220> FEATURE:
<221> NAME/KEY: MISC_FEATURE
<222> LOCATION: (4)..(4)
<223> OTHER INFORMATION: Xaa is Lys or Asn
<220> FEATURE:
<221> NAME/KEY: MISC_FEATURE
<222> LOCATION: (5)..(5)
<223> OTHER INFORMATION: Xaa is Ser, Gly or Ile
<220> FEATURE:
<221> NAME/KEY: MISC_FEATURE
<222> LOCATION: (6)..(6)
<223> OTHER INFORMATION: Xaa is Gly or Arg
<220> FEATURE:
<221> NAME/KEY: MISC_FEATURE
<222> LOCATION: (7)..(7)
<223> OTHER INFORMATION: Xaa is Ala, Pro or Val
<220> FEATURE:
<221> NAME/KEY: MISC_FEATURE
<222> LOCATION: (8)..(8)
<223> OTHER INFORMATION: Xaa is Ala or Arg
<220> FEATURE:
<221> NAME/KEY: MISC_FEATURE
<222> LOCATION: (9)..(9)
<223> OTHER INFORMATION: Xaa is Gln or Asp

<400> SEQUENCE: 477

Xaa Xaa Xaa Xaa Xaa Xaa Xaa Xaa Xaa
1               5

<210> SEQ ID NO 478
<211> LENGTH: 11
<212> TYPE: PRT
<213> ORGANISM: Artificial Sequence
<220> FEATURE:
<223> OTHER INFORMATION: VR-IV variant
<220> FEATURE:
<221> NAME/KEY: MISC_FEATURE
<222> LOCATION: (1)..(11)
<223> OTHER INFORMATION: Xaa is any amino acid
<220> FEATURE:
<221> NAME/KEY: MISC_FEATURE
<222> LOCATION: (8)..(11)
<223> OTHER INFORMATION: Xaa may be present or up to 4 residues may be
      absent

<400> SEQUENCE: 478

Xaa Xaa Xaa Xaa Xaa Xaa Xaa Xaa Xaa Xaa Xaa
1               5                   10

<210> SEQ ID NO 479
<211> LENGTH: 8
<212> TYPE: PRT
<213> ORGANISM: Artificial Sequence
<220> FEATURE:
<223> OTHER INFORMATION: VR-V variant
<220> FEATURE:
<221> NAME/KEY: MISC_FEATURE
```

```
<222> LOCATION: (1)..(8)
<223> OTHER INFORMATION: Xaa is any amino acid
<220> FEATURE:
<221> NAME/KEY: MISC_FEATURE
<222> LOCATION: (5)..(8)
<223> OTHER INFORMATION: Xaa may be present or up to 4 residues may be
      absent

<400> SEQUENCE: 479

Xaa Xaa Xaa Xaa Xaa Xaa Xaa Xaa
1               5

<210> SEQ ID NO 480
<211> LENGTH: 7
<212> TYPE: PRT
<213> ORGANISM: Artificial Sequence
<220> FEATURE:
<223> OTHER INFORMATION: VR-VII variant
<220> FEATURE:
<221> NAME/KEY: MISC_FEATURE
<222> LOCATION: (1)..(7)
<223> OTHER INFORMATION: Xaa is any amino acid
<220> FEATURE:
<221> NAME/KEY: MISC_FEATURE
<222> LOCATION: (4)..(7)
<223> OTHER INFORMATION: Xaa may be present or up to 4 residues may be
      absent

<400> SEQUENCE: 480

Xaa Xaa Xaa Xaa Xaa Xaa Xaa
1               5

<210> SEQ ID NO 481
<211> LENGTH: 6
<212> TYPE: PRT
<213> ORGANISM: Artificial Sequence
<220> FEATURE:
<223> OTHER INFORMATION: VR-VIII variant
<220> FEATURE:
<221> NAME/KEY: MISC_FEATURE
<222> LOCATION: (1)..(6)
<223> OTHER INFORMATION: Xaa is any amino acid
<220> FEATURE:
<221> NAME/KEY: MISC_FEATURE
<222> LOCATION: (3)..(6)
<223> OTHER INFORMATION: Xaa may be present or up to 4 residues may be
      absent

<400> SEQUENCE: 481

Xaa Xaa Xaa Xaa Xaa Xaa
1               5

<210> SEQ ID NO 482
<211> LENGTH: 745
<212> TYPE: PRT
<213> ORGANISM: Artificial Sequence
<220> FEATURE:
<223> OTHER INFORMATION: Recombinant AAV capsid protein

<400> SEQUENCE: 482

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ser Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60
```

```
Val Asn Ala Ala Asp Ala Ala Leu Glu His Asp Lys Ala Tyr Asp
 65                  70                  75                  80

Gln Gln Leu Lys Ala Gly Asp Asn Pro Tyr Leu Lys Tyr Asn His Ala
                 85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
    290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
    370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
        435                 440                 445

Lys Thr Ile Gly Tyr His Lys Ser Gly Ala Ala Gln Leu Lys Phe Ser
    450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
```

```
                485                 490                 495
Asn Asn Ser Glu Phe Ala Trp Pro Gly Ala Ser Ser Trp Ala Leu Asn
            500                 505                 510
Gly Arg Asn Ser Leu Met Asn Pro Gly Pro Ala Met Ala Ser His Lys
            515                 520                 525
Glu Gly Glu Asp Arg Phe Phe Pro Leu Ser Gly Ser Leu Ile Phe Gly
            530                 535                 540
Lys Gln Gly Thr Gly Arg Asp Asn Val Asp Ala Asp Lys Val Met Ile
545                 550                 555                 560
Thr Asn Glu Glu Glu Ile Lys Thr Thr Asn Pro Val Ala Thr Glu Ser
                565                 570                 575
Tyr Gly Gln Val Ala Thr Asn His Gln Ser Ala Gln Ala Gln Ser Ala
            580                 585                 590
Ser Asn Val Asn Ala Ala Gln Ala Gln Thr Gly Trp Val Gln Asn Gln
            595                 600                 605
Gly Ile Leu Pro Gly Met Val Trp Gln Asp Arg Asp Val Tyr Leu Gln
            610                 615                 620
Gly Pro Ile Trp Ala Lys Ile Pro His Thr Asp Gly Asn Phe His Pro
625                 630                 635                 640
Ser Pro Leu Met Gly Gly Phe Gly Met Lys His Pro Pro Gln Ile
                645                 650                 655
Leu Ile Lys Asn Thr Pro Val Pro Ala Asp Pro Pro Thr Ala Phe Asn
                660                 665                 670
Lys Asp Lys Leu Asn Ser Phe Ile Thr Gln Tyr Ser Thr Gly Gln Val
            675                 680                 685
Ser Val Glu Ile Glu Trp Glu Leu Gln Lys Glu Asn Ser Lys Arg Trp
            690                 695                 700
Asn Pro Glu Ile Gln Tyr Thr Ser Asn Tyr Tyr Lys Ser Asn Asn Val
705                 710                 715                 720
Glu Phe Ala Val Asn Thr Glu Gly Val Tyr Ser Glu Pro Arg Pro Ile
                725                 730                 735
Gly Thr Arg Tyr Leu Thr Arg Asn Leu
            740                 745

<210> SEQ ID NO 483
<211> LENGTH: 745
<212> TYPE: PRT
<213> ORGANISM: Artificial Sequence
<220> FEATURE:
<223> OTHER INFORMATION: Recombinant AAV capsid protein.

<400> SEQUENCE: 483

Met Ala Ala Asp Gly Tyr Leu Pro Asp Trp Leu Glu Asp Asn Leu Ser
1               5                   10                  15
Glu Gly Ile Arg Glu Trp Trp Ala Leu Lys Pro Gly Ser Pro Gln Pro
            20                  25                  30
Lys Ala Asn Gln Gln His Gln Asp Asn Ala Arg Gly Leu Val Leu Pro
        35                  40                  45
Gly Tyr Lys Tyr Leu Gly Pro Gly Asn Gly Leu Asp Lys Gly Glu Pro
    50                  55                  60
Val Asn Ala Ala Asp Ala Ala Leu Glu His Asp Lys Ala Tyr Asp
65                  70                  75                  80
Gln Gln Leu Lys Ala Gly Asp Asn Pro Tyr Leu Lys Tyr Asn His Ala
                85                  90                  95
Asp Ala Glu Phe Gln Glu Arg Leu Lys Glu Asp Thr Ser Phe Gly Gly
```

```
                100                 105                 110
Asn Leu Gly Arg Ala Val Phe Gln Ala Lys Lys Arg Leu Leu Glu Pro
            115                 120                 125

Leu Gly Leu Val Glu Glu Ala Ala Lys Thr Ala Pro Gly Lys Lys Arg
130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
    290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
    370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
        435                 440                 445

Lys Thr Ile Gly Tyr His Lys Ser Gly Ala Ala Gln Leu Lys Phe Ser
    450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
        515                 520                 525
```

-continued

Glu Gly Glu Asp Arg Phe Phe Pro Leu Ser Gly Ser Leu Ile Phe Gly
            530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Ala Ala Ser
                580                 585                 590

Pro Thr Thr Thr Ala Ala Gln Ala Gln Thr Gly Trp Val Gln Asn Gln
            595                 600                 605

Gly Ile Leu Pro Gly Met Val Trp Gln Asp Arg Asp Val Tyr Leu Gln
            610                 615                 620

Gly Pro Ile Trp Ala Lys Ile Pro His Thr Asp Gly Asn Phe His Pro
625                 630                 635                 640

Ser Pro Leu Met Gly Gly Phe Gly Met Lys His Pro Pro Gln Ile
                645                 650                 655

Leu Ile Lys Asn Thr Pro Val Pro Ala Asp Pro Pro Thr Ala Phe Asn
                660                 665                 670

Lys Asp Lys Leu Asn Ser Phe Ile Thr Gln Tyr Ser Thr Gly Gln Val
            675                 680                 685

Ser Val Glu Ile Glu Trp Glu Leu Gln Lys Glu Asn Ser Lys Arg Trp
690                 695                 700

Asn Pro Glu Ile Gln Tyr Thr Ser Asn Tyr Tyr Lys Ser Asn Asn Val
705                 710                 715                 720

Glu Phe Ala Val Asn Thr Glu Gly Val Tyr Ser Glu Pro Arg Pro Ile
                725                 730                 735

Gly Thr Arg Tyr Leu Thr Arg Asn Leu
            740                 745

<210> SEQ ID NO 484
<211> LENGTH: 736
<212> TYPE: PRT
<213> ORGANISM: Artificial Sequence
<220> FEATURE:
<223> OTHER INFORMATION: Recombinant AAV capsid protein.

<400> SEQUENCE: 484

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
                20                  25                  30

Lys Ala Asn Gln Gln His Gln Asp Asn Ala Arg Gly Leu Val Leu Pro
            35                  40                  45

Gly Tyr Lys Tyr Leu Gly Pro Gly Asn Gly Leu Asp Lys Gly Glu Pro
        50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
130                 135                 140

```
Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
                195                 200                 205

Ala Pro Val Ala Asp Asn Asn Glu Gly Ala Asp Gly Val Gly Ser Ser
210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
            245                 250                 255

Tyr Lys Gln Ile Ser Asn Ser Thr Ser Gly Gly Ser Ser Asn Asp Asn
                260                 265                 270

Ala Tyr Phe Gly Tyr Ser Thr Pro Trp Gly Tyr Phe Asp Phe Asn Arg
            275                 280                 285

Phe His Cys His Phe Ser Pro Arg Asp Trp Gln Arg Leu Ile Asn Asn
        290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
    370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
            435                 440                 445

Lys Thr Ile Gly Tyr His Lys Ser Gly Ala Ala Gln Leu Lys Phe Ser
        450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Thr Ser Thr Thr Asp Thr Gln Asn
                485                 490                 495

Asn Asn Ser Glu Phe Ala Trp Pro Ala Ala Ser Ser Trp Ala Leu Asn
            500                 505                 510

Gly Arg Asn Ser Leu Met Asn Pro Gly Pro Ala Met Ala Ser His Lys
        515                 520                 525

Glu Gly Glu Asp Arg Phe Phe Pro Leu Ser Gly Ser Leu Ile Phe Gly
    530                 535                 540

Lys Gln Gly Thr Gly Arg Asp Asn Val Asp Ala Asp Lys Val Met Ile
545                 550                 555                 560
```

Thr Asn Glu Glu Ile Lys Thr Thr Asn Pro Val Ala Thr Glu Ser
            565                 570                 575

Tyr Gly Gln Val Ala Thr Asn His Gln Ser Ala Gln Ala Gln Ala Gln
        580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
    610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
    690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 485
<211> LENGTH: 736
<212> TYPE: PRT
<213> ORGANISM: Artificial Sequence
<220> FEATURE:
<223> OTHER INFORMATION: Recombinant AAV capsid protein.

<400> SEQUENCE: 485

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

-continued

```
Ala Ala Pro Ser Gly Val Gly Ser Leu Thr Met Ala Ser Gly Gly
            195                 200                 205
Ala Pro Val Ala Asp Asn Asn Glu Gly Ala Asp Gly Val Gly Ser Ser
210                 215                 220
Ser Gly Asn Trp His Cys Asp Ser Gln Trp Leu Gly Asp Arg Val Ile
225                 230                 235                 240
Thr Thr Ser Thr Arg Thr Trp Ala Leu Pro Thr Tyr Asn Asn His Leu
                245                 250                 255
Tyr Lys Gln Ile Ser Asn Ser Thr Ser Gly Gly Ser Ser Asn Asp Asn
            260                 265                 270
Ala Tyr Phe Gly Tyr Ser Thr Pro Trp Gly Tyr Phe Asp Phe Asn Arg
        275                 280                 285
Phe His Cys His Phe Ser Pro Arg Asp Trp Gln Arg Leu Ile Asn Asn
    290                 295                 300
Asn Trp Gly Phe Arg Pro Lys Arg Leu Asn Phe Lys Leu Phe Asn Ile
305                 310                 315                 320
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
            340                 345                 350
Pro Tyr Val Leu Gly Ser Ala His Glu Gly Cys Leu Pro Pro Phe Pro
        355                 360                 365
Ala Asp Val Phe Met Ile Pro Gln Tyr Gly Tyr Leu Thr Leu Asn Asp
    370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
            420                 425                 430
Asp Arg Leu Met Asn Pro Leu Ile Asp Gln Tyr Leu Tyr Tyr Leu Ser
        435                 440                 445
Lys Thr Ile Gly Tyr His Lys Ser Gly Ala Ala Gln Leu Lys Phe Ser
    450                 455                 460
Val Ala Gly Pro Ser Asn Met Ala Val Gln Gly Arg Asn Tyr Ile Pro
465                 470                 475                 480
Gly Pro Ser Tyr Arg Gln Gln Val Val Ser Gly Asp Asp Thr Gln Asp
                485                 490                 495
Ala Gly Leu Glu Leu Asn Ile Ala Gly Ala Ser Ser Trp Ala Leu Asn
            500                 505                 510
Gly Arg Asn Ser Leu Met Asn Pro Gly Pro Ala Met Ala Ser His Lys
        515                 520                 525
Glu Gly Glu Asp Arg Phe Phe Pro Leu Ser Gly Ser Leu Ile Phe Gly
    530                 535                 540
Lys Gln Gly Thr Gly Arg Asp Asn Val Asp Ala Asp Lys Val Met Ile
545                 550                 555                 560
Thr Asn Glu Glu Glu Ile Lys Thr Thr Asn Pro Val Ala Thr Glu Ser
                565                 570                 575
Tyr Gly Gln Val Ala Thr Asn His Gln Ser Ala Gln Ala Gln Ala Gln
            580                 585                 590
Thr Gly Trp Val Gln Asn Gln Gly Ile Leu Pro Gly Met Val Trp Gln
        595                 600                 605
Asp Arg Asp Val Tyr Leu Gln Gly Pro Ile Trp Ala Lys Ile Pro His
```

```
                610              615              620
Thr Asp Gly Asn Phe His Pro Ser Pro Leu Met Gly Gly Phe Gly Met
625                 630              635                 640

Lys His Pro Pro Pro Gln Ile Leu Ile Lys Asn Thr Pro Val Pro Ala
                645              650              655

Asp Pro Pro Thr Ala Phe Asn Lys Asp Lys Leu Asn Ser Phe Ile Thr
            660              665              670

Gln Tyr Ser Thr Gly Gln Val Ser Val Glu Ile Glu Trp Glu Leu Gln
        675              680              685

Lys Glu Asn Ser Lys Arg Trp Asn Pro Glu Ile Gln Tyr Thr Ser Asn
        690              695              700

Tyr Tyr Lys Ser Asn Asn Val Glu Phe Ala Val Asn Thr Glu Gly Val
705             710              715                 720

Tyr Ser Glu Pro Arg Pro Ile Gly Thr Arg Tyr Leu Thr Arg Asn Leu
                725              730              735
```